(12) United States Patent
Dula

(10) Patent No.: US 11,724,836 B2
(45) Date of Patent: Aug. 15, 2023

(54) TETHER FOR SPACECRAFT REACTION CONTROL SYSTEM

(71) Applicant: Arthur M Dula, Houston, TX (US)

(72) Inventor: Arthur M Dula, Houston, TX (US)

(*) Notice: Subject to any disclaimer, the term of this patent is extended or adjusted under 35 U.S.C. 154(b) by 0 days.

(21) Appl. No.: 14/469,941

(22) Filed: Aug. 27, 2014

(65) Prior Publication Data
US 2015/0076287 A1 Mar. 19, 2015

Related U.S. Application Data

(63) Continuation-in-part of application No. 14/025,822, filed on Sep. 13, 2013, now abandoned.

(51) Int. Cl.
| | |
|---|---|
| *B64G 1/64* | (2006.01) |
| *B64G 1/26* | (2006.01) |
| *B64G 1/62* | (2006.01) |
| *B64G 1/24* | (2006.01) |
| B64G 1/12 | (2006.01) |
| B64G 1/58 | (2006.01) |
| B64G 1/14 | (2006.01) |
| B64G 1/52 | (2006.01) |
| B64G 1/22 | (2006.01) |

(52) U.S. Cl.
CPC .............. *B64G 1/648* (2013.01); *B64G 1/244* (2019.05); *B64G 1/26* (2013.01); *B64G 1/62* (2013.01); *B64G 1/12* (2013.01); *B64G 1/14* (2013.01); *B64G 1/52* (2013.01); *B64G 1/58* (2013.01); *B64G 2001/224* (2013.01); *B64G 2001/525* (2013.01)

(58) Field of Classification Search
CPC . B64D 17/80; B64G 1/12; B64G 1/14; B64G 1/222; B64G 1/28; B64G 1/24; B64G 1/62
USPC ......................................................... 244/158.2
See application file for complete search history.

(56) References Cited

U.S. PATENT DOCUMENTS

| | | | | |
|---|---|---|---|---|
| 3,241,142 A | * | 3/1966 | Raabe ...................... | B64G 1/34 244/1 R |
| 3,582,016 A | * | 6/1971 | Sherman ....................... | 244/167 |
| 4,097,010 A | * | 6/1978 | Colombo ........... | H04B 7/18508 244/158.2 |
| 4,580,747 A | * | 4/1986 | Pearson ................. | B64G 1/648 244/1 TD |
| 4,824,051 A | * | 4/1989 | Engelking ................ | B64G 1/14 244/158.2 |
| 5,310,144 A | * | 5/1994 | Salvatore et al. ............ | 244/168 |

(Continued)

OTHER PUBLICATIONS

Penzo et al, Tethers in Space Handbook Second Edition, May 1989, NASA (Year: 1989).*

(Continued)

*Primary Examiner* — Medhat Badawi
*Assistant Examiner* — Vicente Rodriguez
(74) *Attorney, Agent, or Firm* — Law Office of Arthur M. Dula; Arthur M. Dula

(57) ABSTRACT

A spacecraft reaction control system comprising: a spacecraft having a center of mass; a length of tether extending from said spacecraft and offset from said spacecraft's center of mass and means for controllably changing said extension of said offset such that a variable force is exerted upon said spacecraft by said tether, said force being offset from said center of mass.

22 Claims, 94 Drawing Sheets

(56) References Cited

U.S. PATENT DOCUMENTS 8,052,092 B2 * 11/2011 Atmur et al. ............. 244/158.2

OTHER PUBLICATIONS

Carroll et al, Tether for Small Space Application, 1995, AIAA/ASU small satellite conference (Year: 1995).*
Gavira Izquierdo et al, The tether System Experiment Preparing for ESA's First Tether Mission, May 2000, ESA bulletin (Year: 2000).*

* cited by examiner

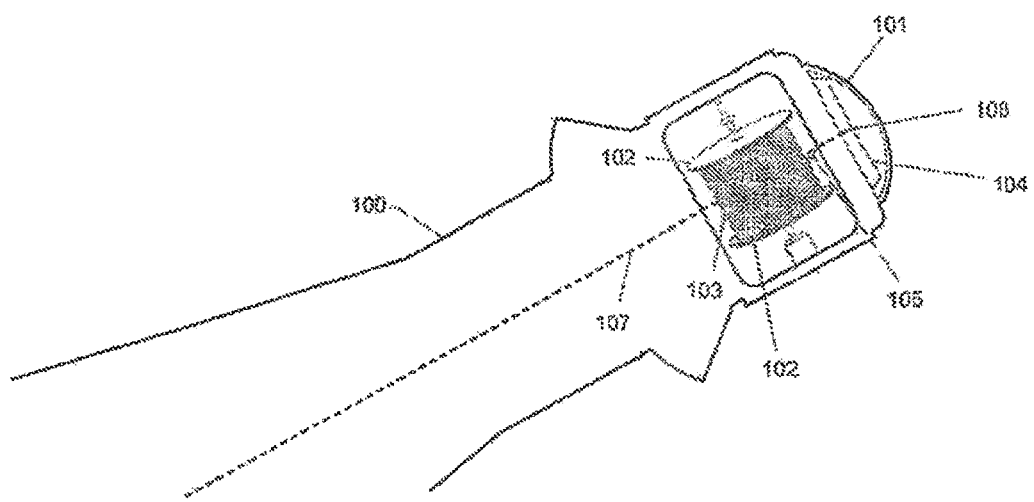

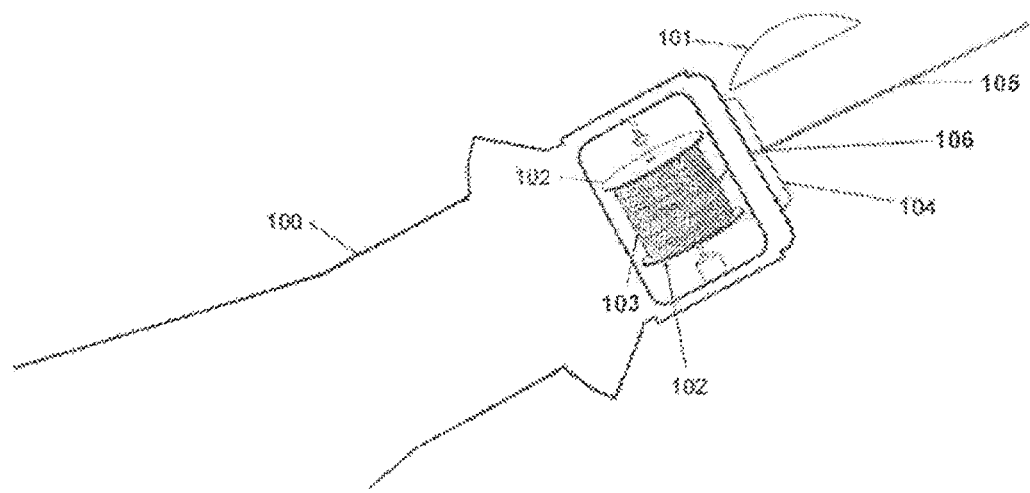
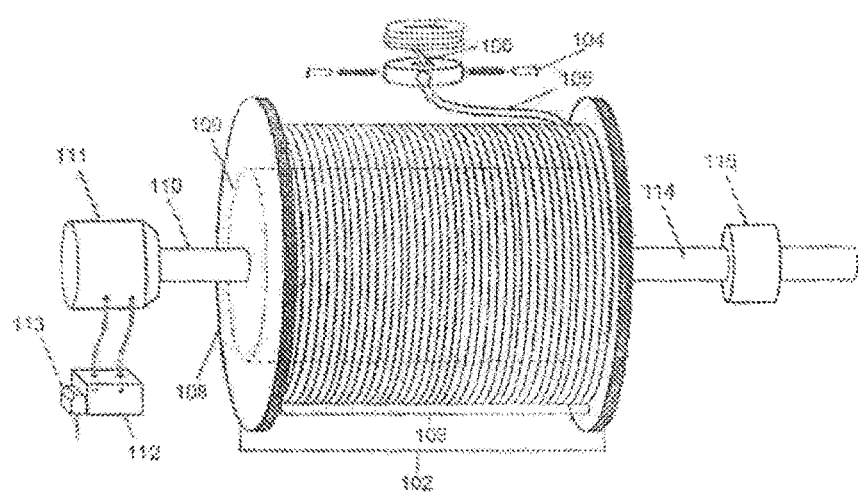

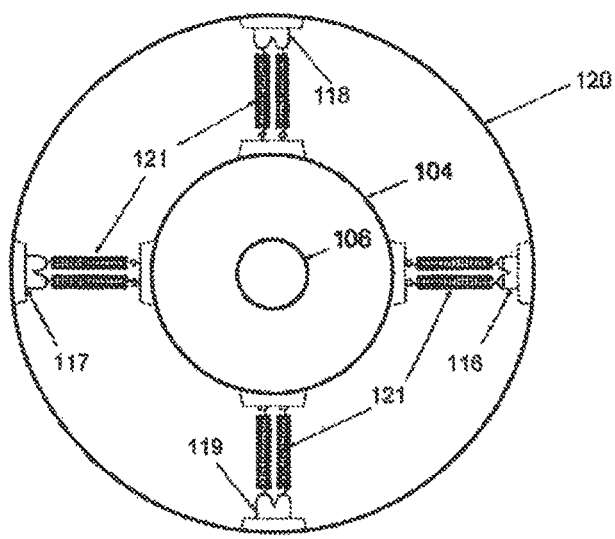
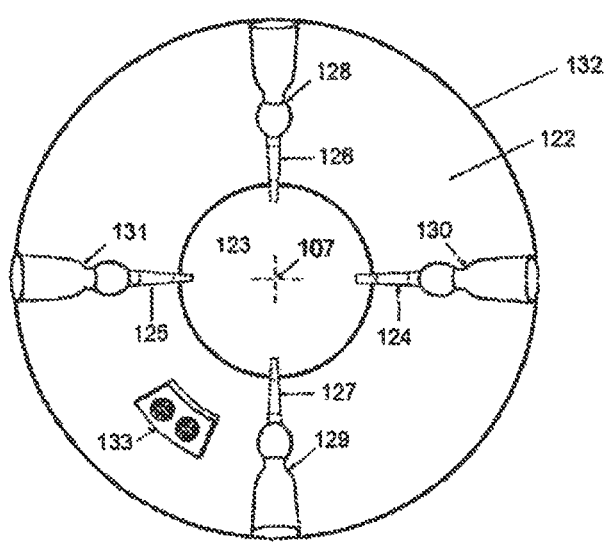

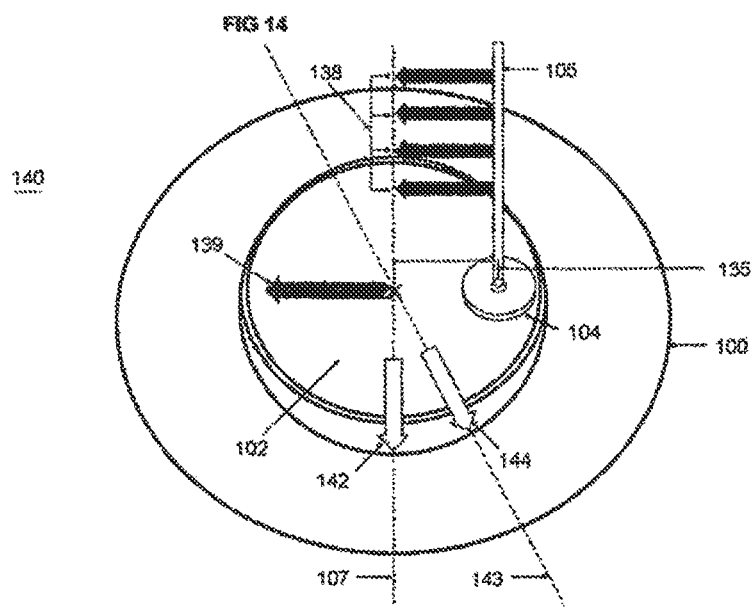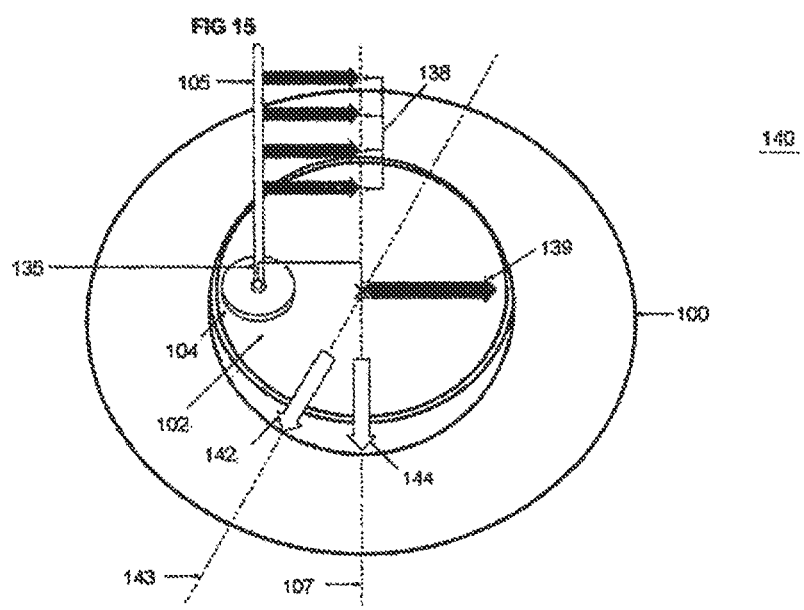

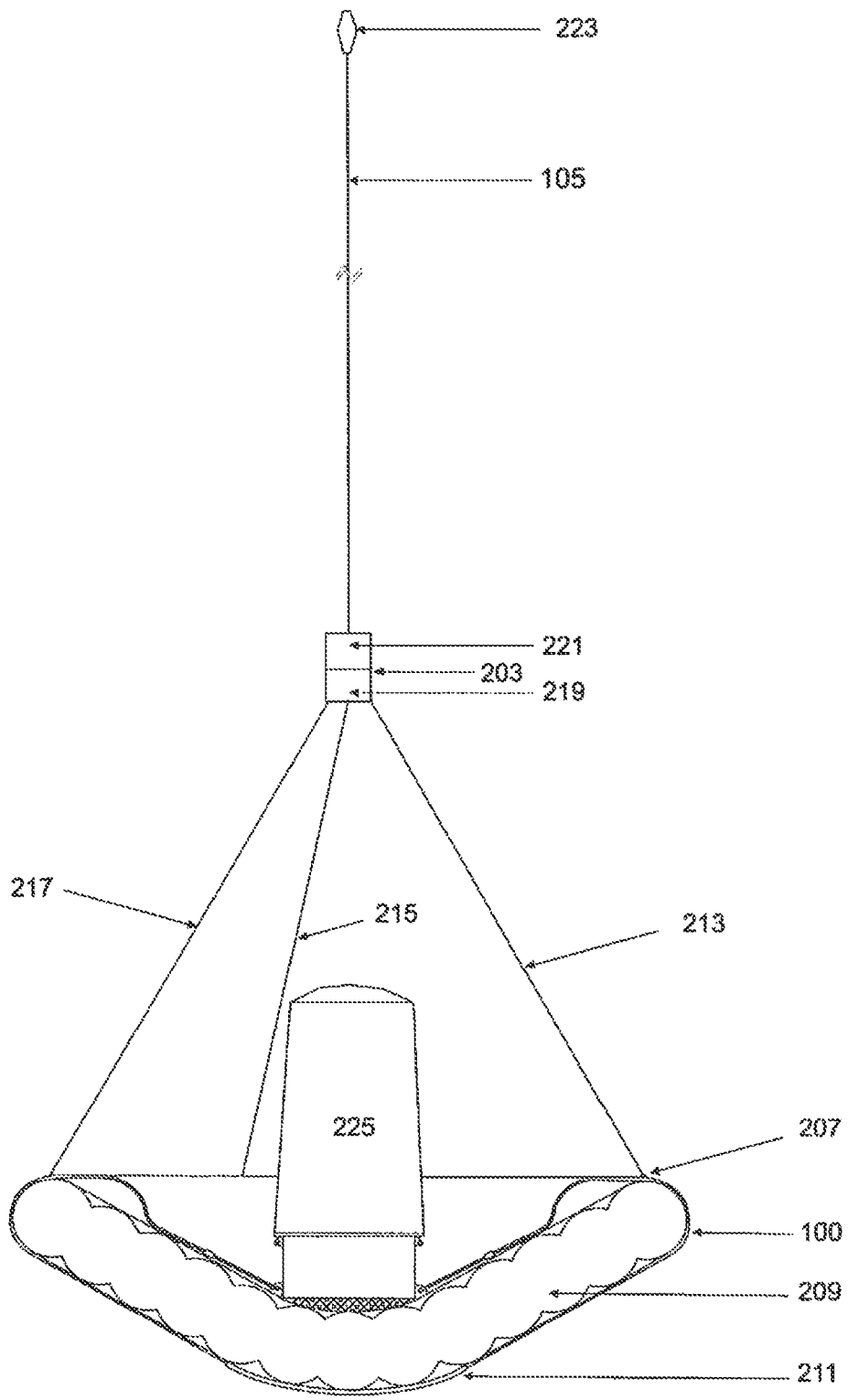
FIG 16 - Skipper Cross-Section Side View

FIG 17 - Almaz Teather Placement
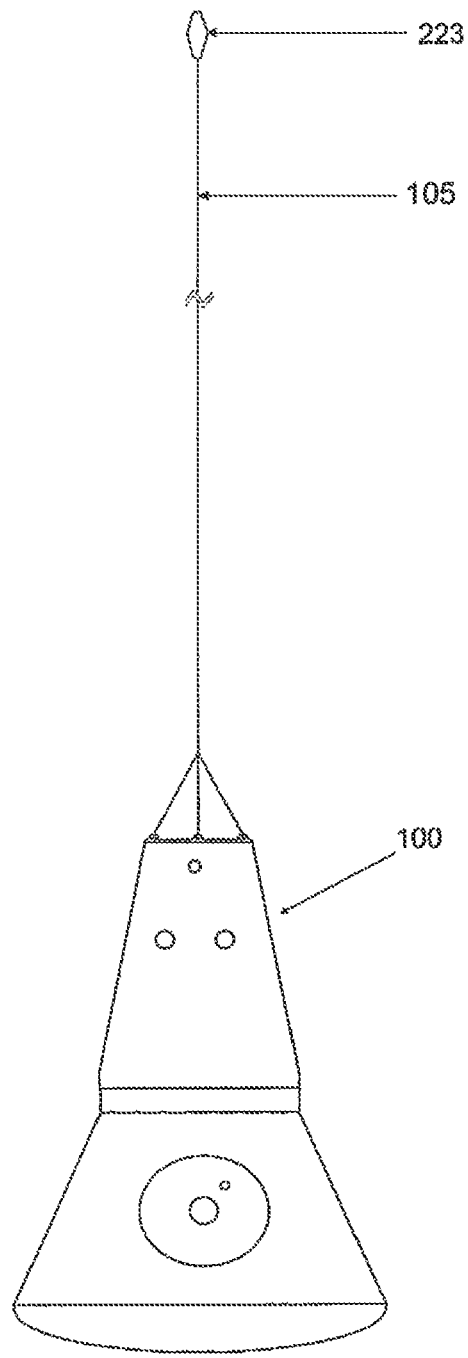

FIG 18 - Soyuz Teather Placement
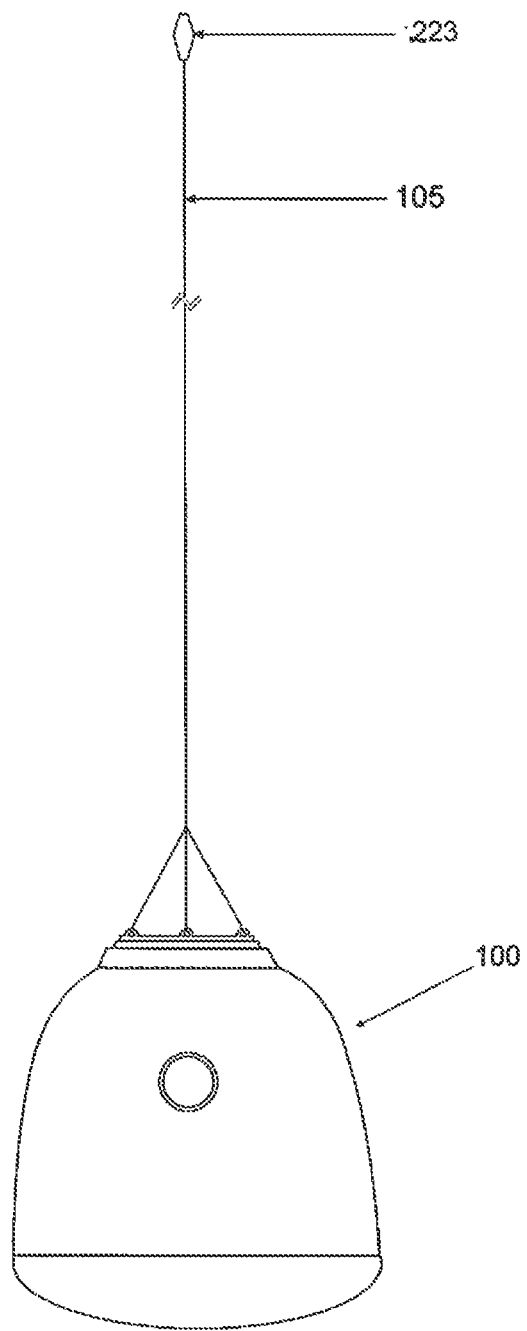

FIG 19 - USAF X37B Teather Placement
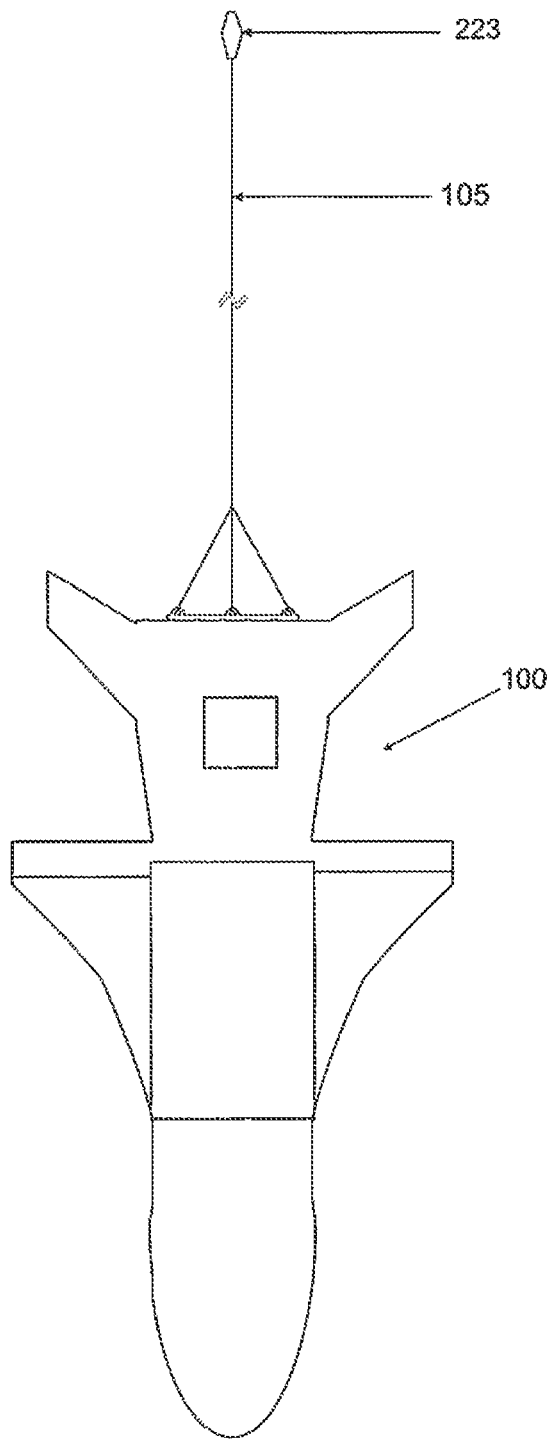

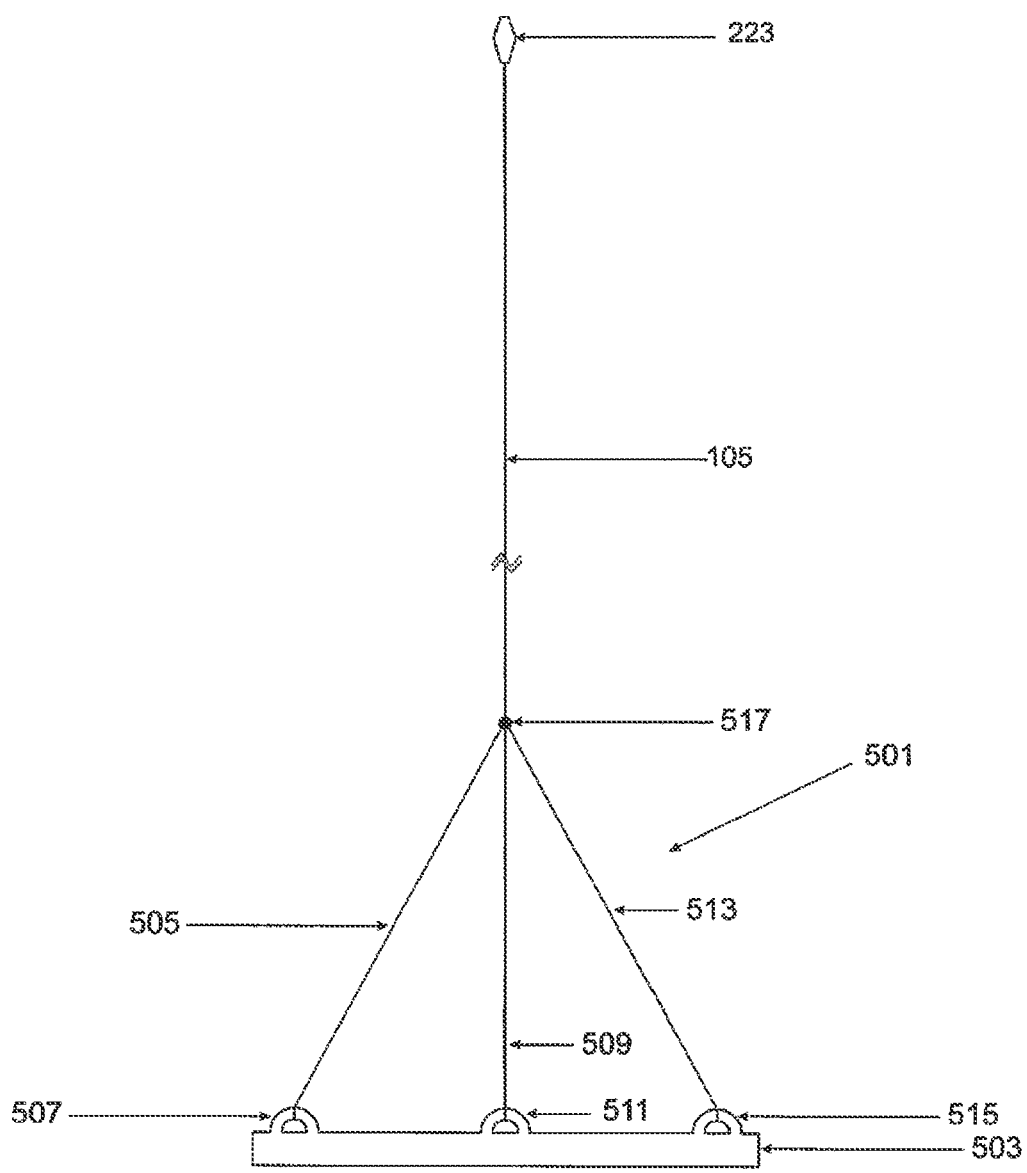
FIG 20 - Teather Assembly

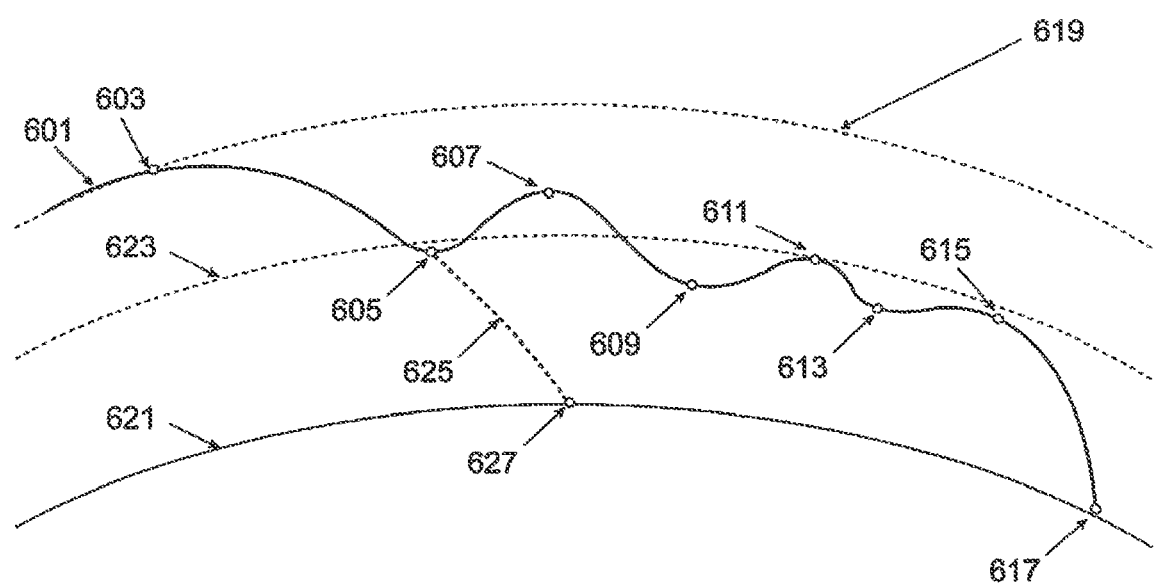
FIG 21 - Re-entry Path

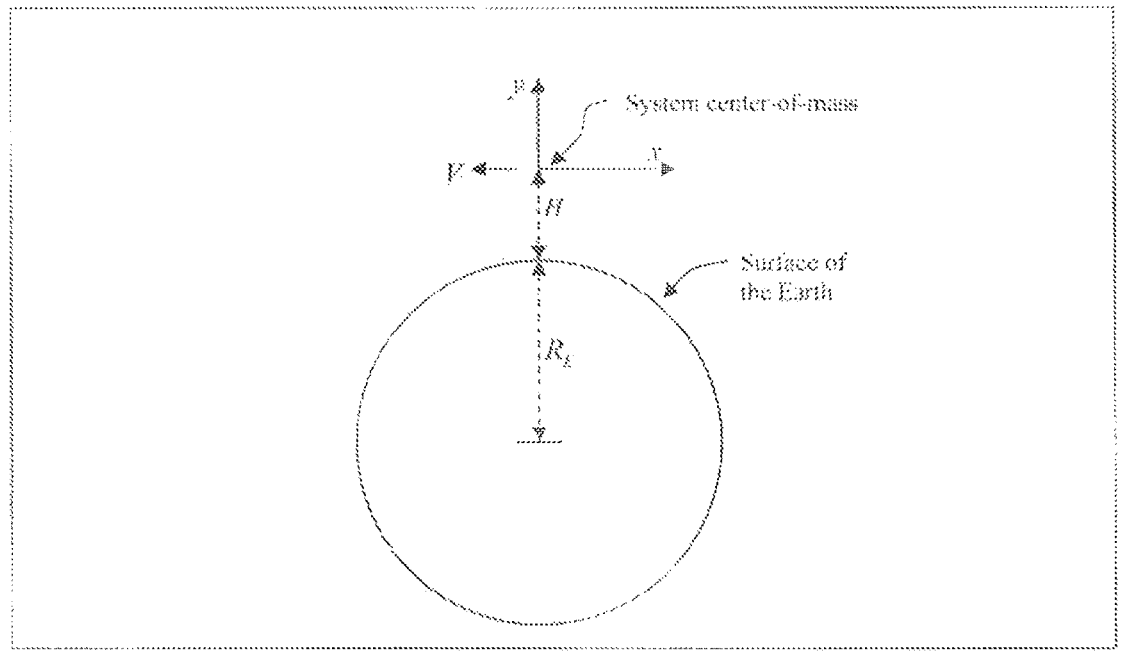
FIG 22: Rotating reference frame and coordinate system
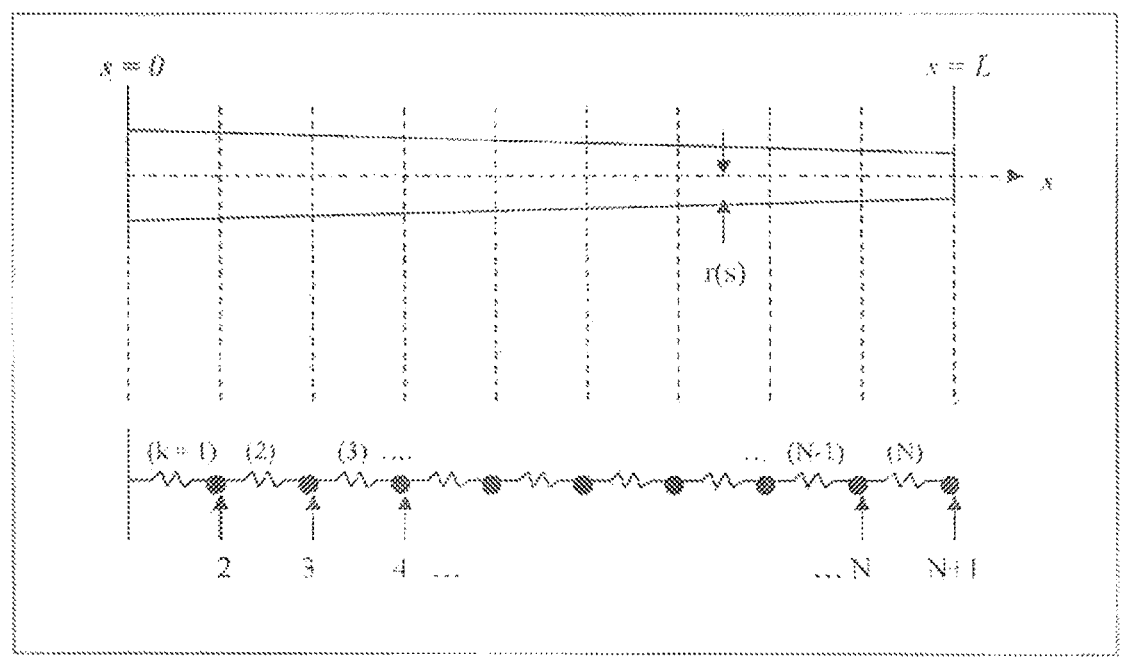
FIG 23: Lumped mass model of the tether.

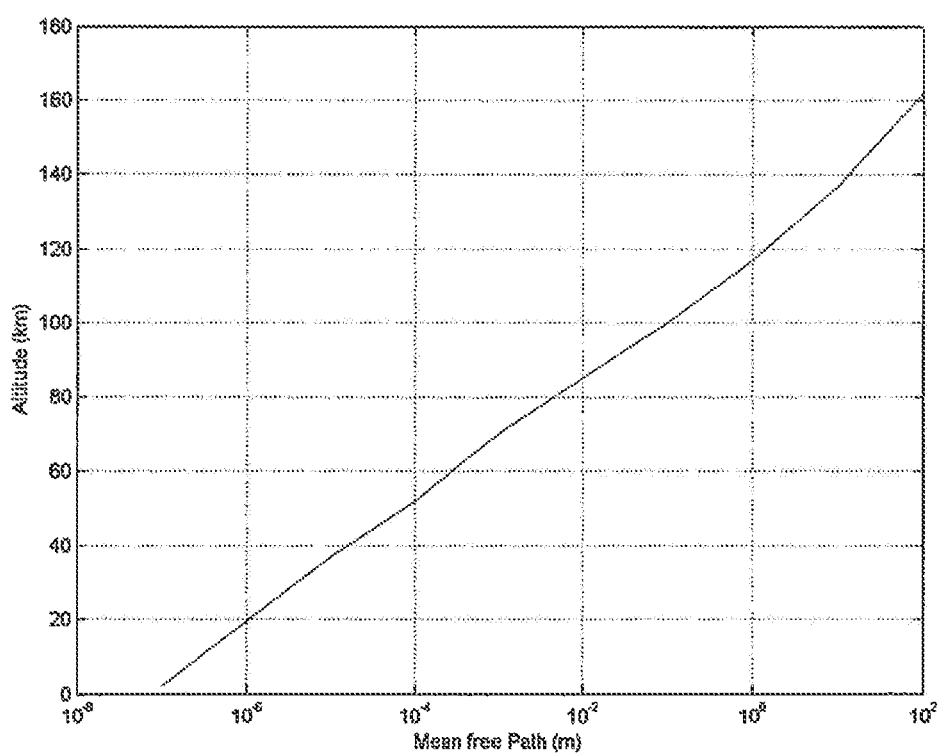
FIG 24: Altitude as a function of mean free path in the atmosphere

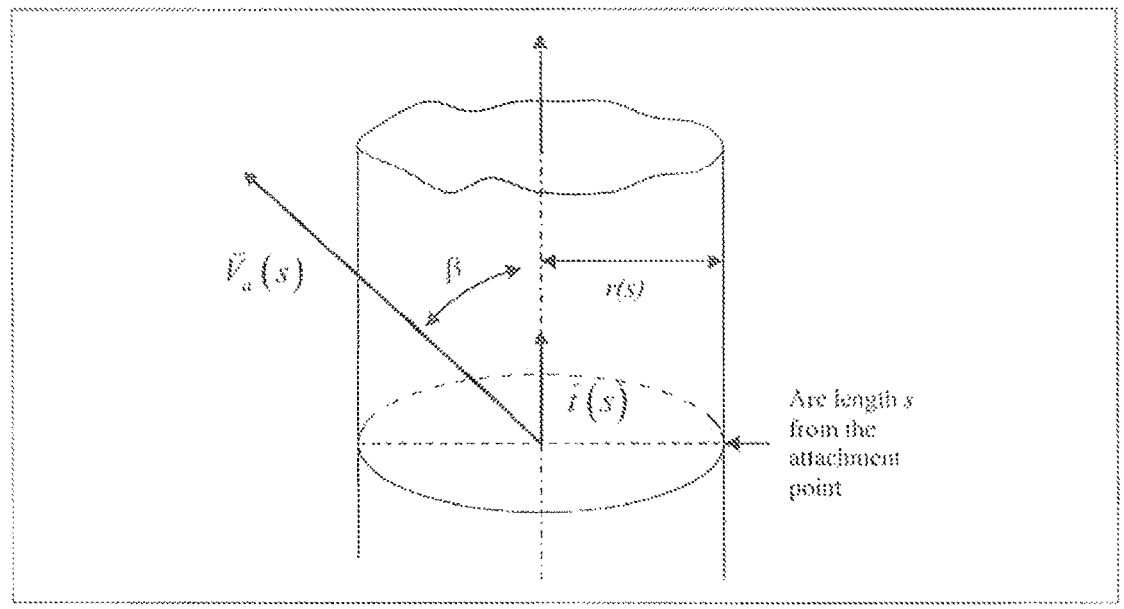
FIG 25: Geometry for calculation of aerodynamic forces
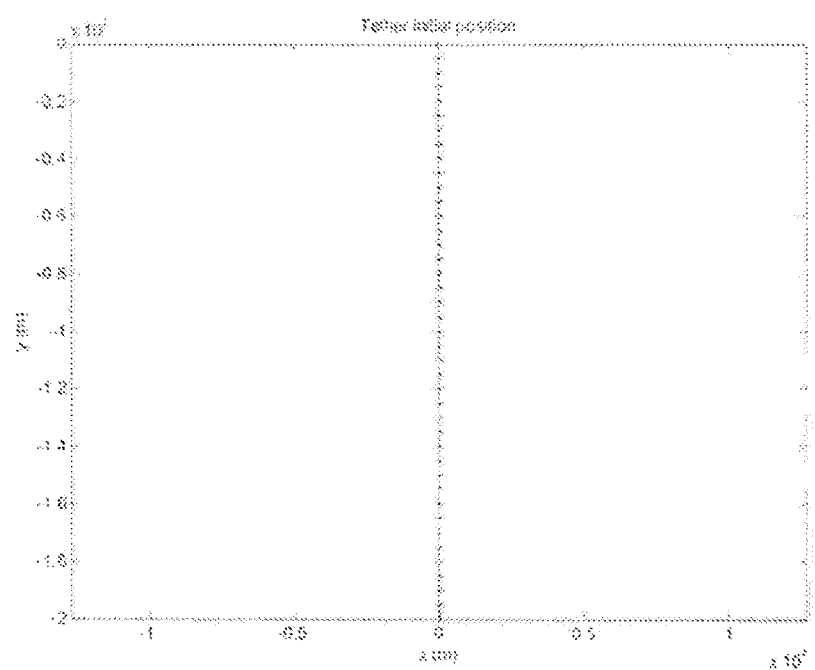
FIG 26: Initial position of tether, assuming it has been gravity gradient stabilized in exo-atmospheric flight

| Max excursions (km) | -20 | +16.9 | -16.2 | +12.2 | -11.0 | +9.0 | -8.7 | +6.9 | ... |
FIG 27: Maximum distances along the y-axis (gravity gradient initial conditions, specular reflection.
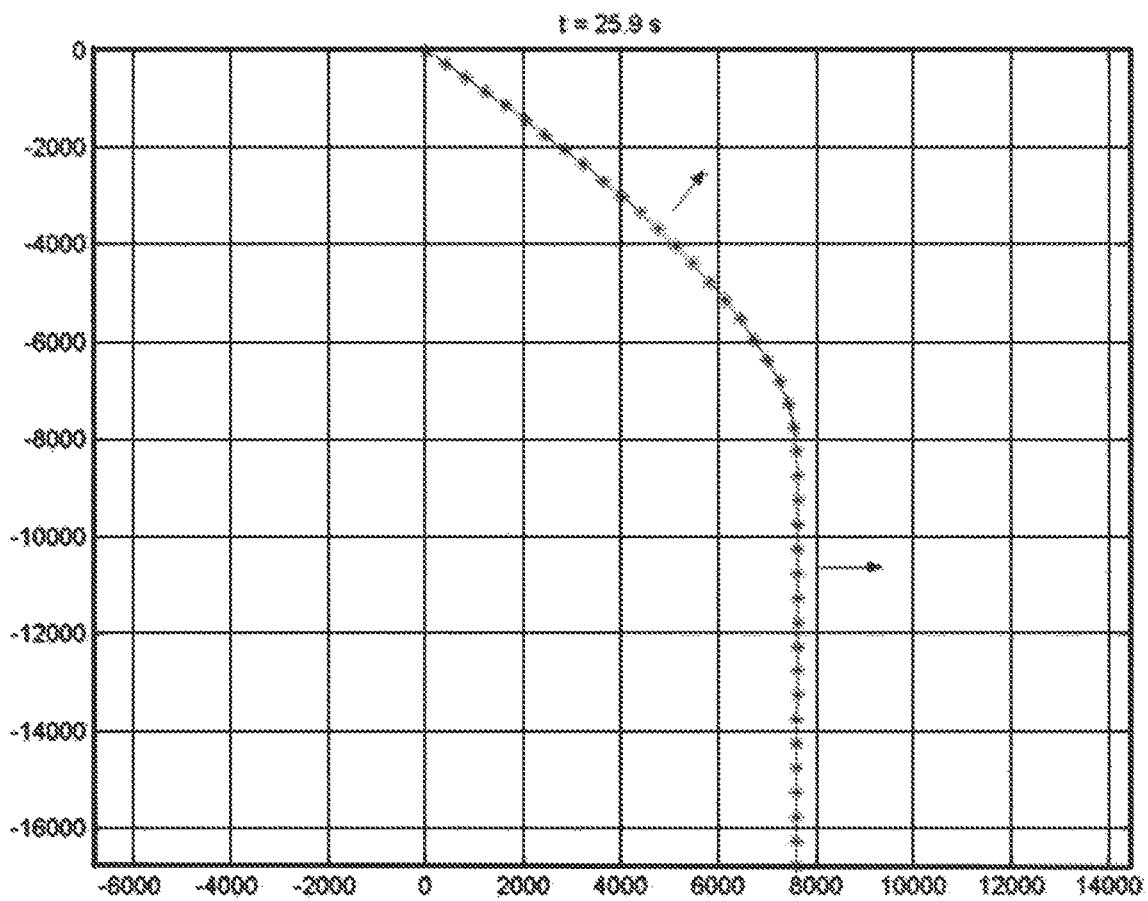
FIG 28: Tether shape at t = 25.9s, specular reflection case

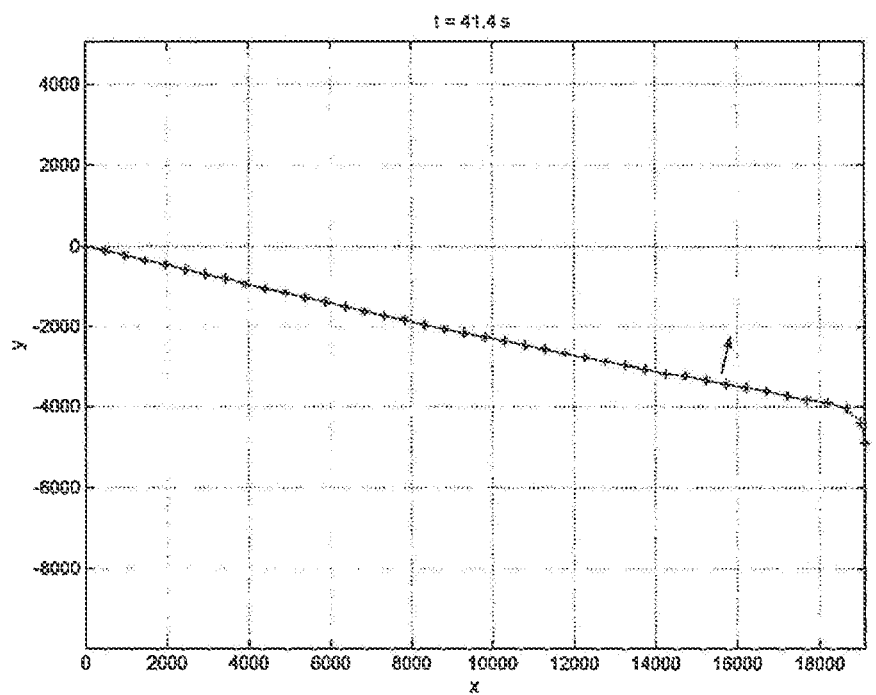
FIG 29: Tether shape at t = 41.4s, specular reflection case
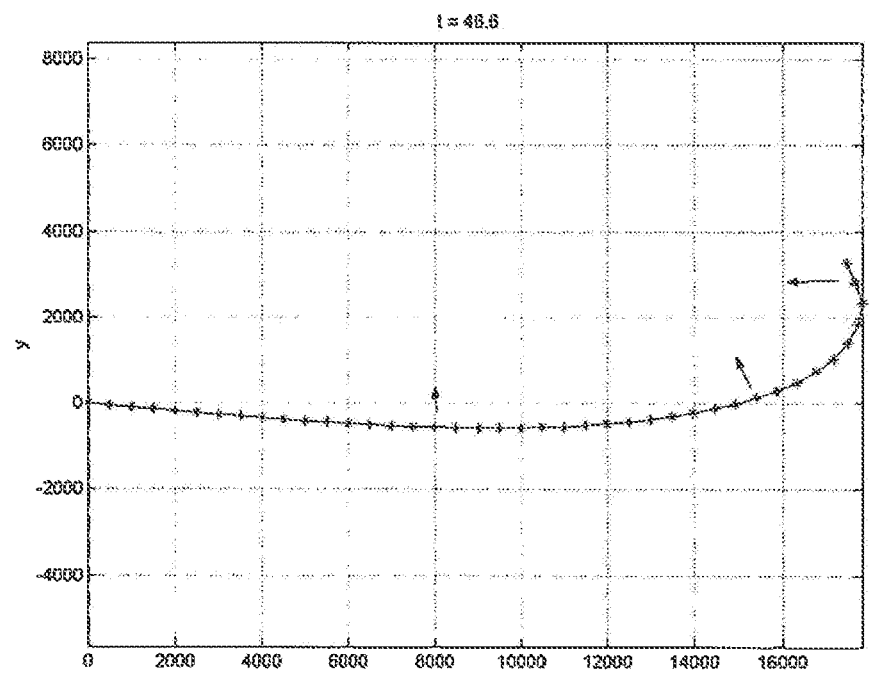
FIG 30: Tether shape at t = 46.6s, specular reflection case

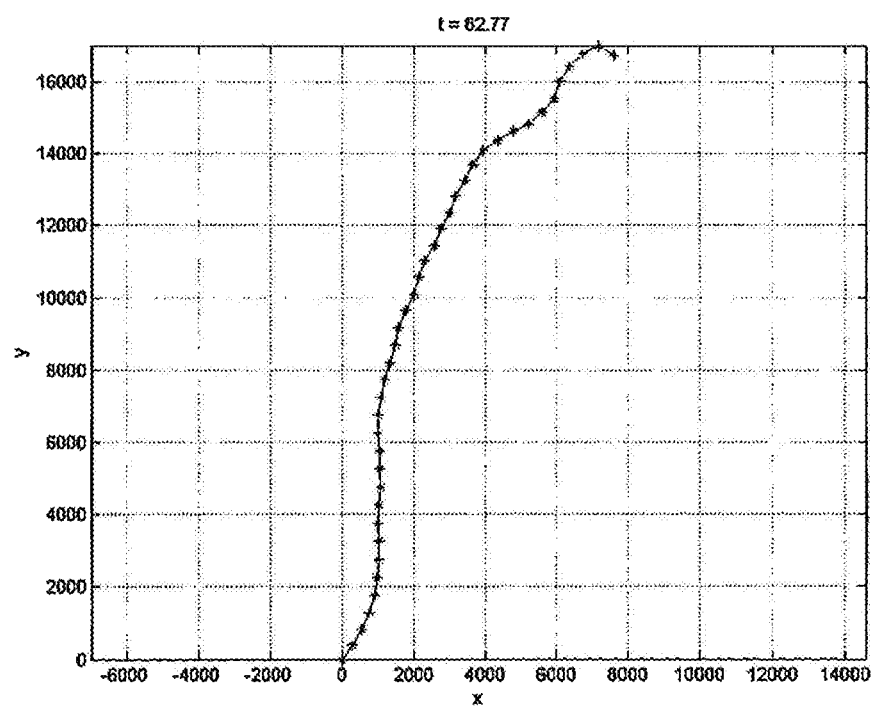
FIG 31: Tether shape at t = 82.77s, specular reflection case

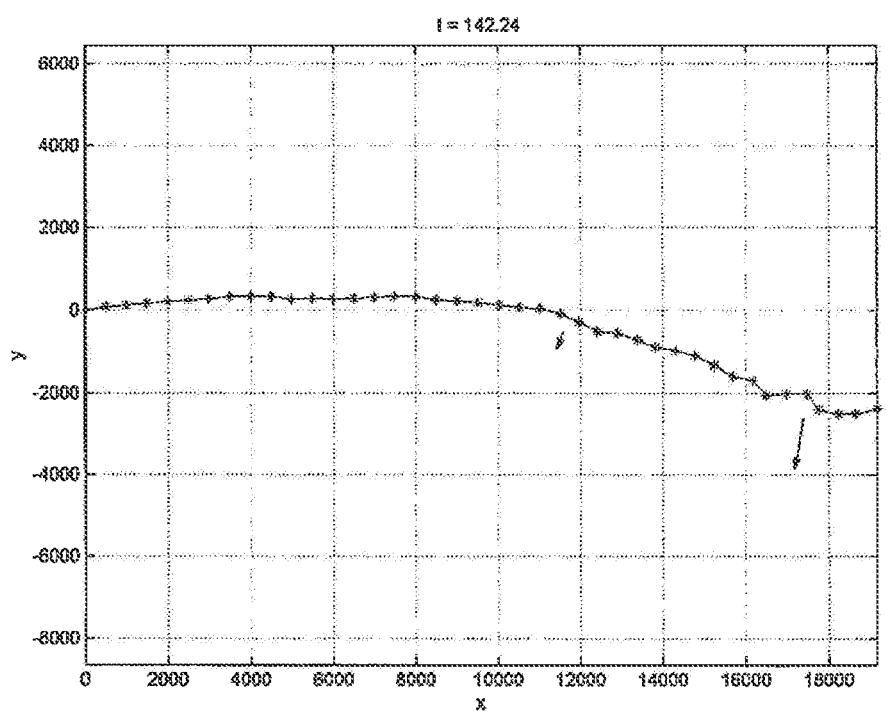
FIG 32: Tether shape at t = 142.24s, specular reflection case

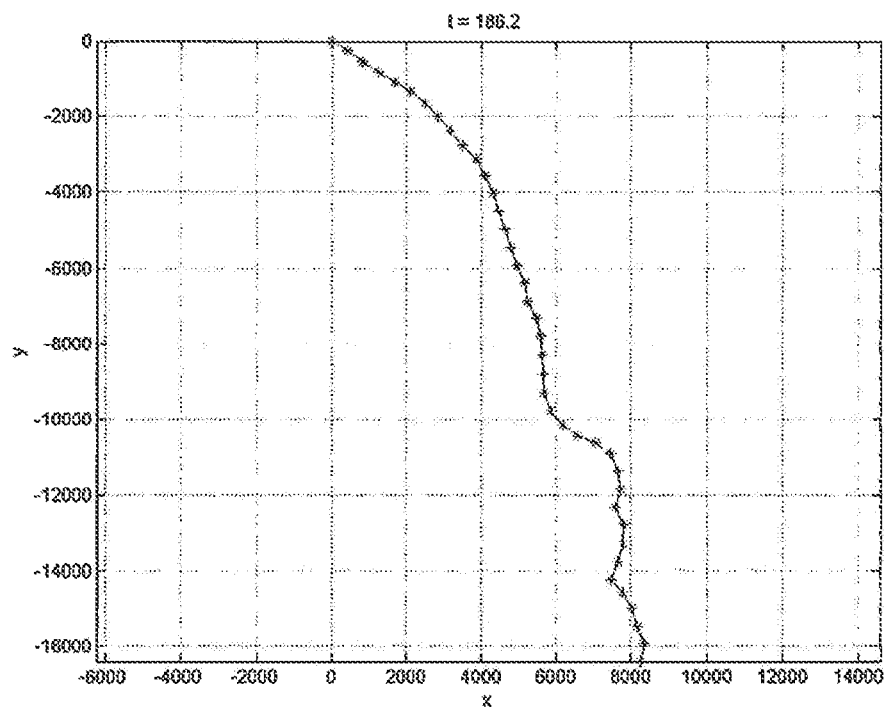
FIG 33: Tether shape at t = 186.2s, specular reflection case
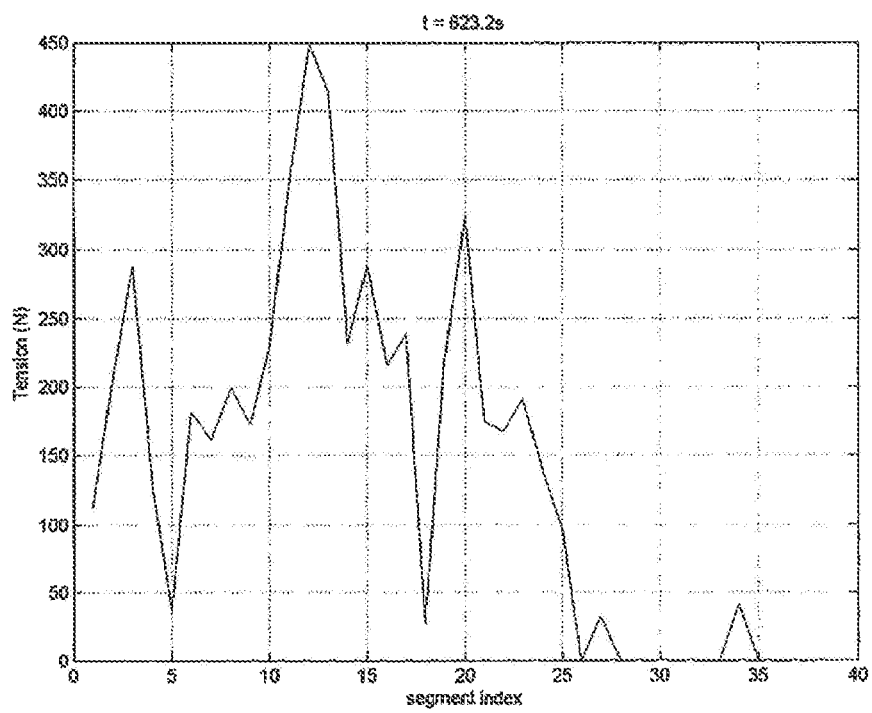
FID 34: Tension distribution at t = 623.3s, specular reflection case

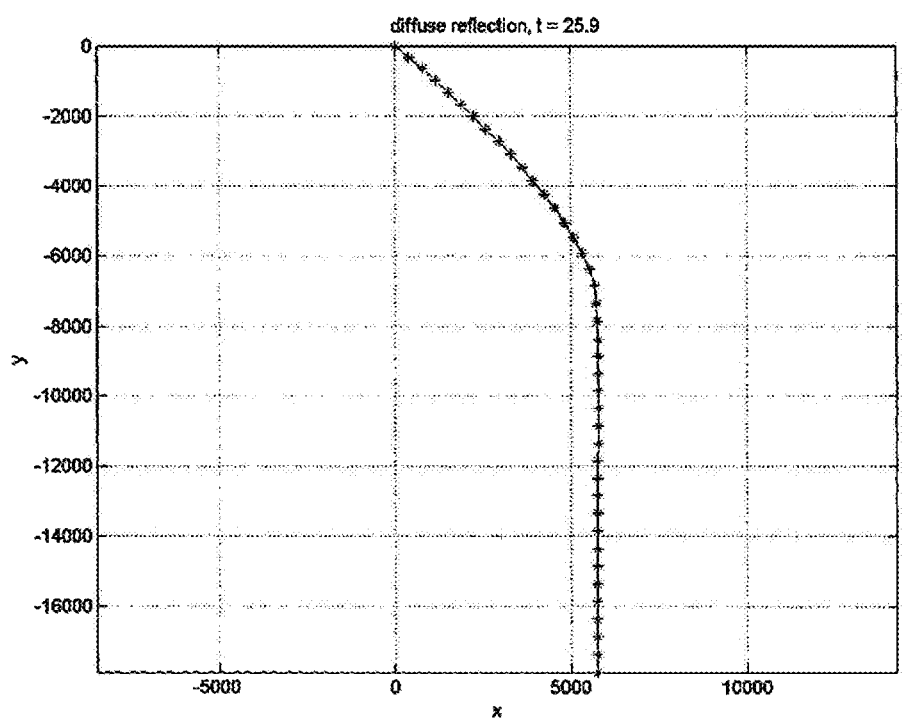
FIG 35: Tether shape at t = 25.9s, diffuse reflection case

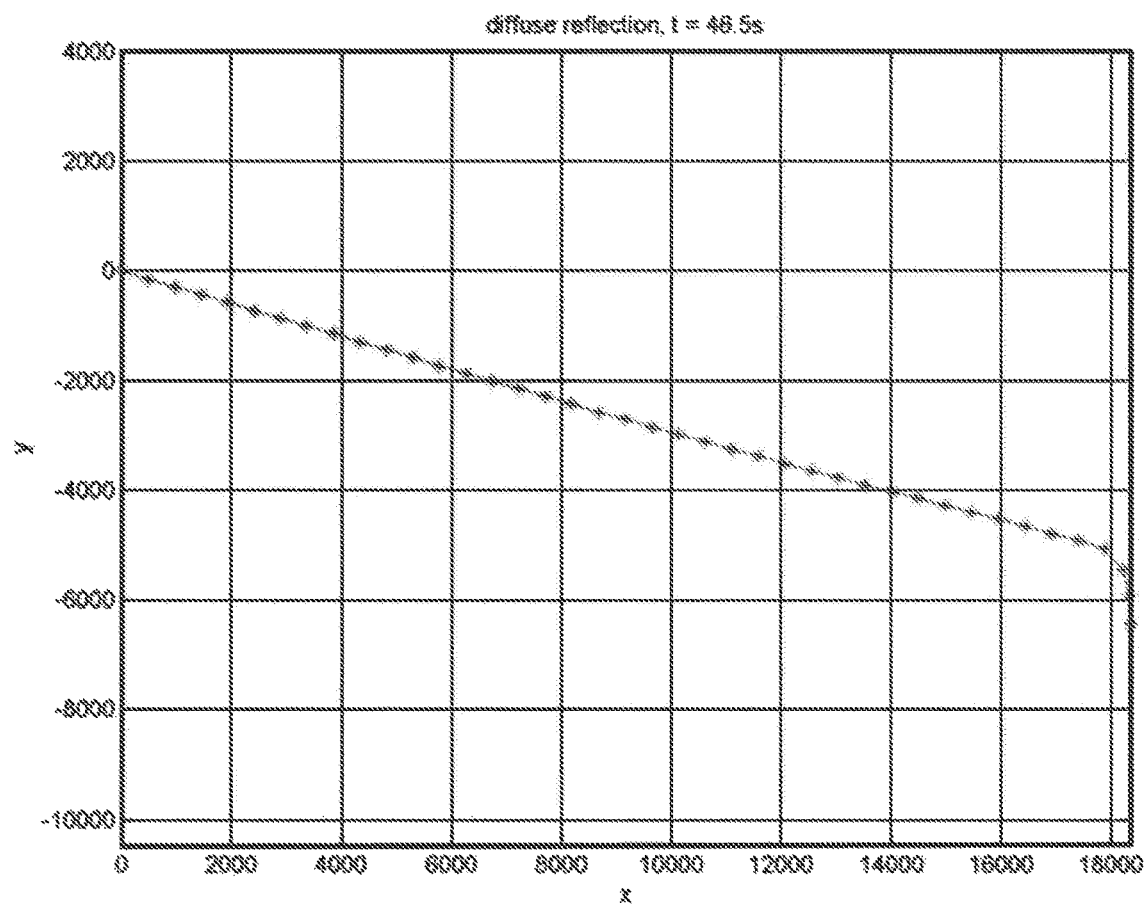
FIG 36: Tether shape at t = 46.5s, diffuse reflection case.

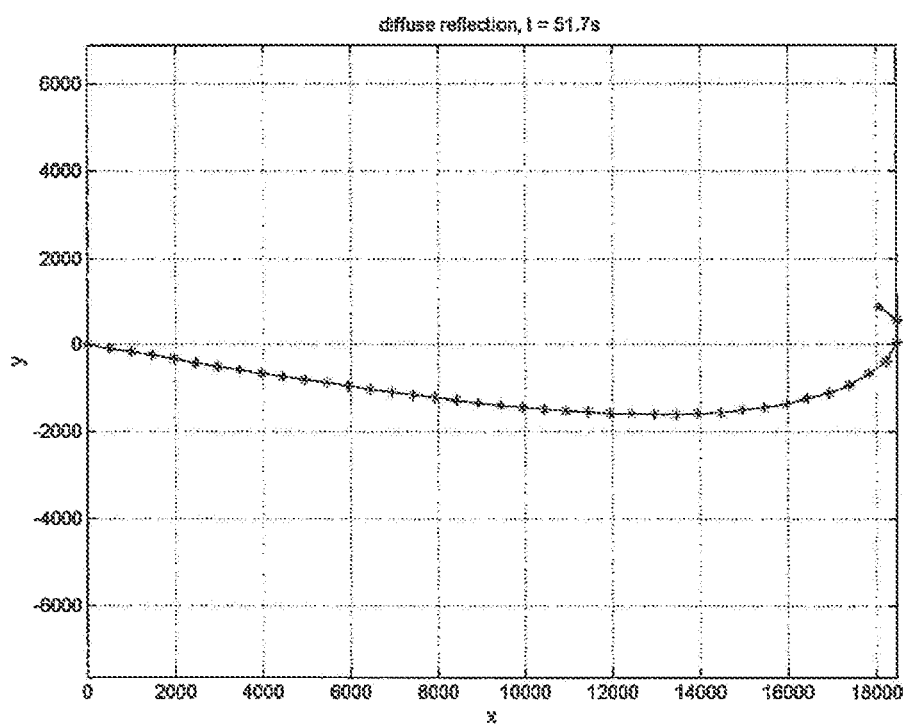
FIG 37: Tether shape at t = 51.7s, diffuse reflection case

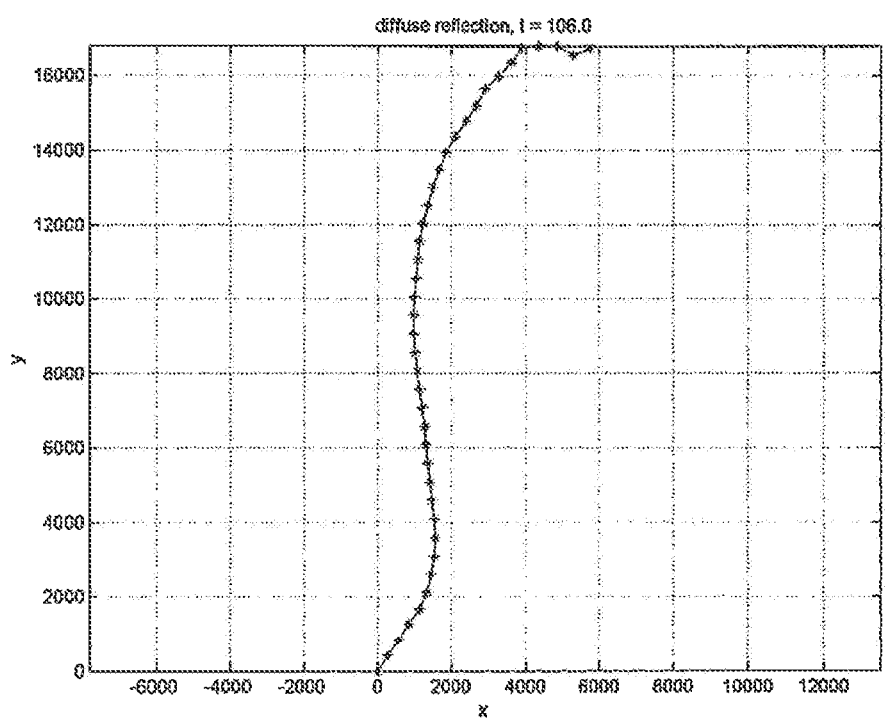
FIG 38: Tether shape at t = 106.0s, diffuse reflection case

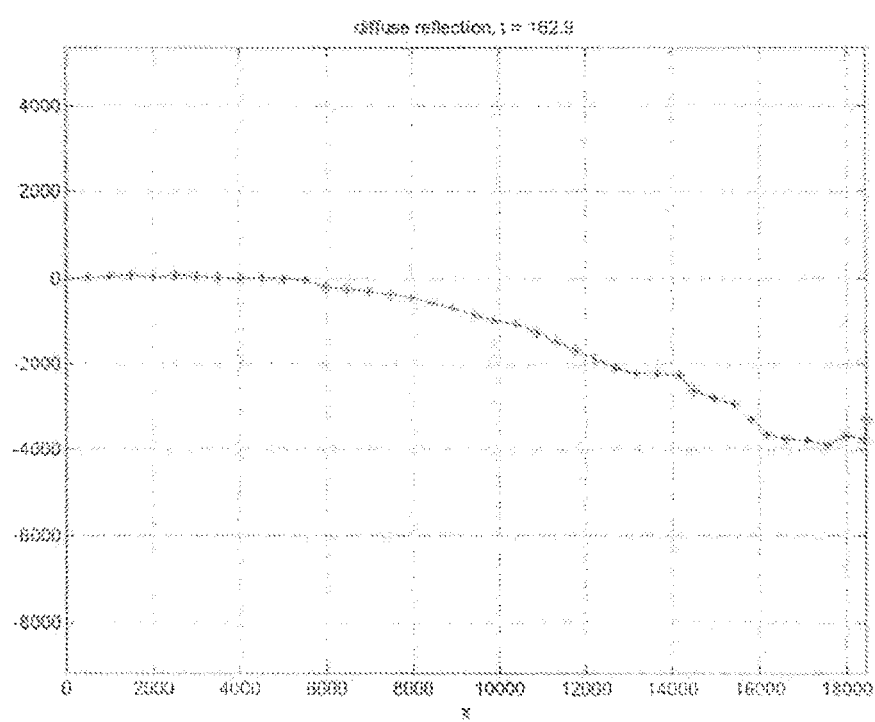
FIG. 39: Tether shape at t = 162.9s, diffuse reflection case

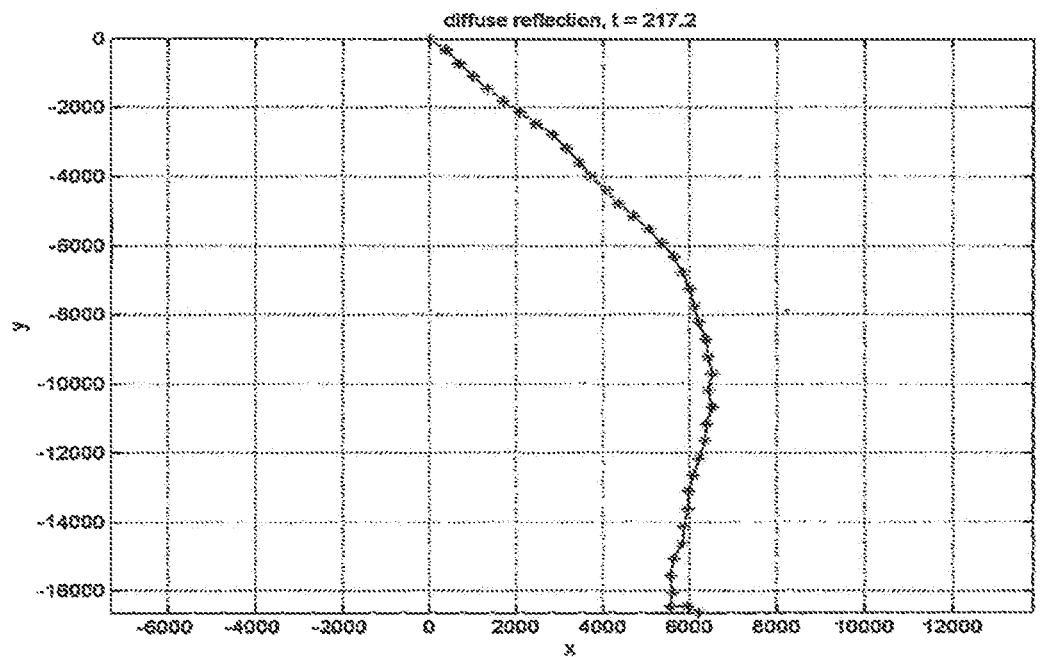
FIG 40: Tether shape at t = 217.2s, diffuse reflection case
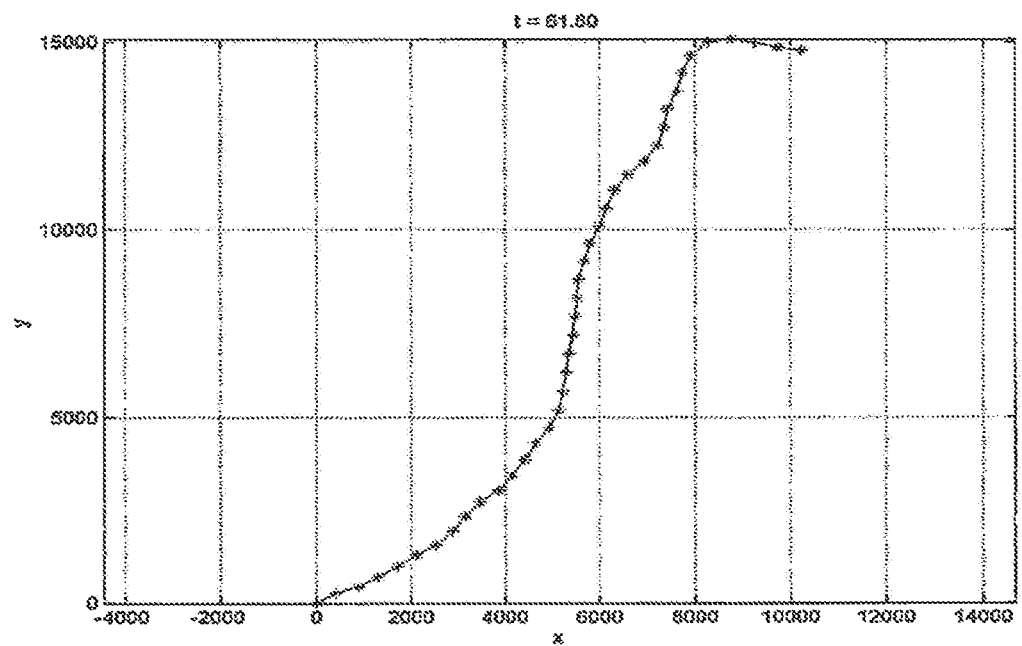
FIG 41: t = 61.80, tether equipped with aft-body

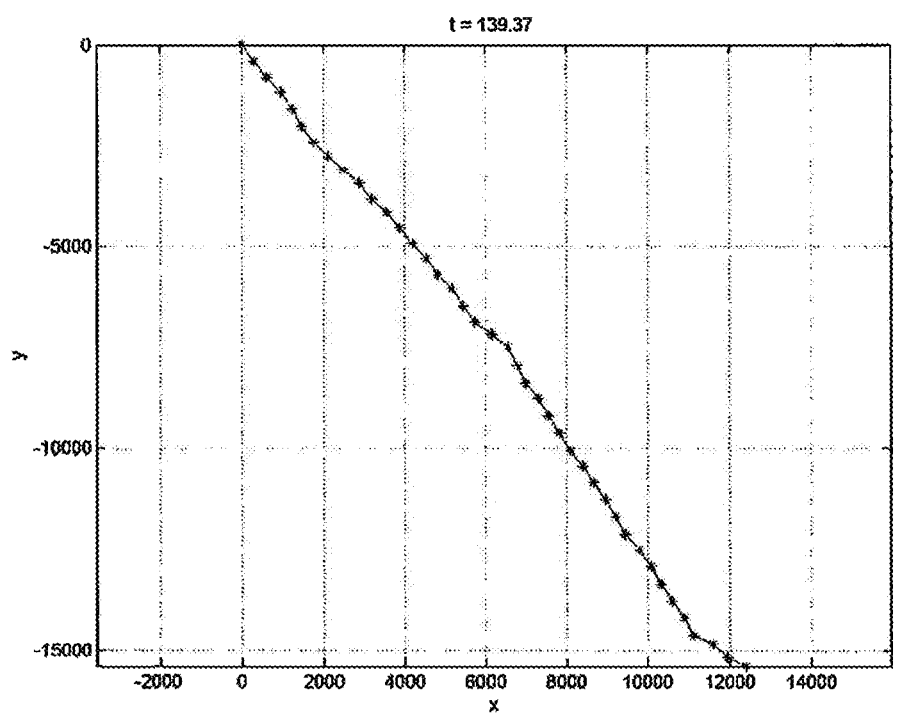
FIG 42: t = 139.37, tether equipped with aft-body

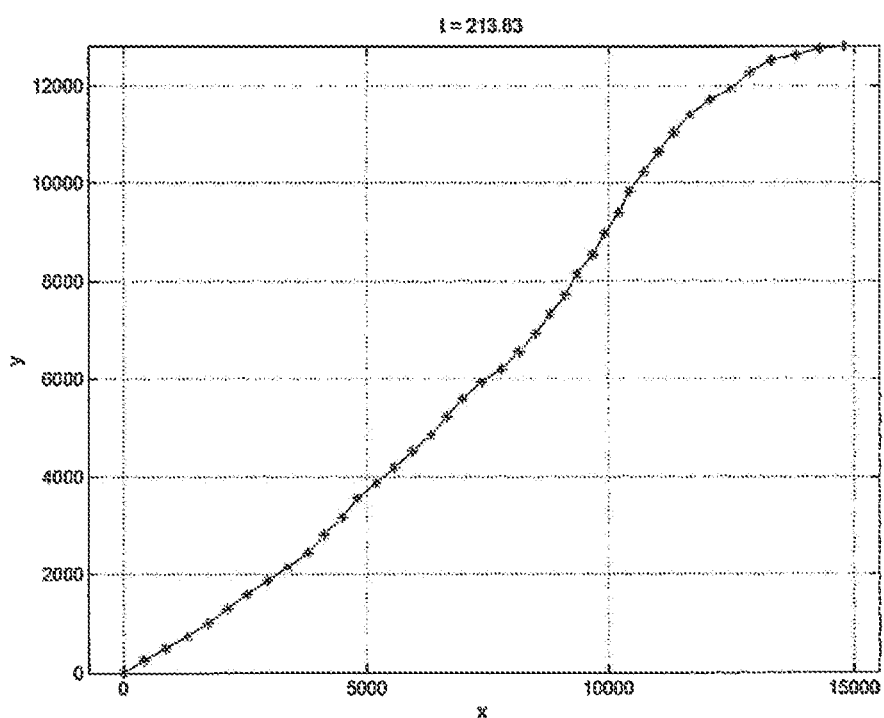
FIG 43: t = 213.83, tether equipped with aft-body

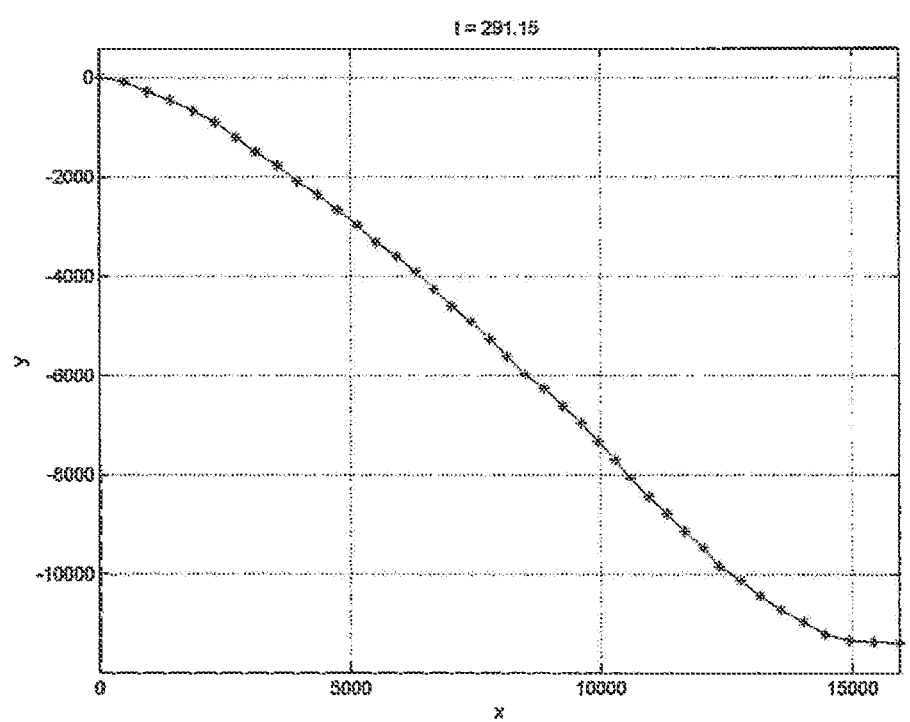
FIG 44: t = 291.15, tether equipped with aft-body

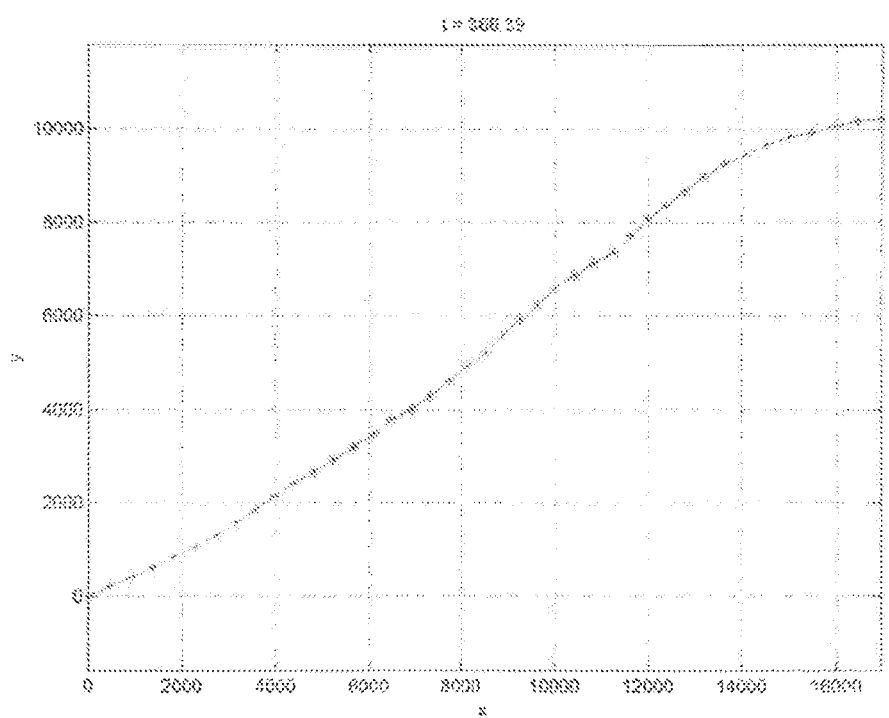
FIG 45: t = 366.39, tether equipped with aft-body

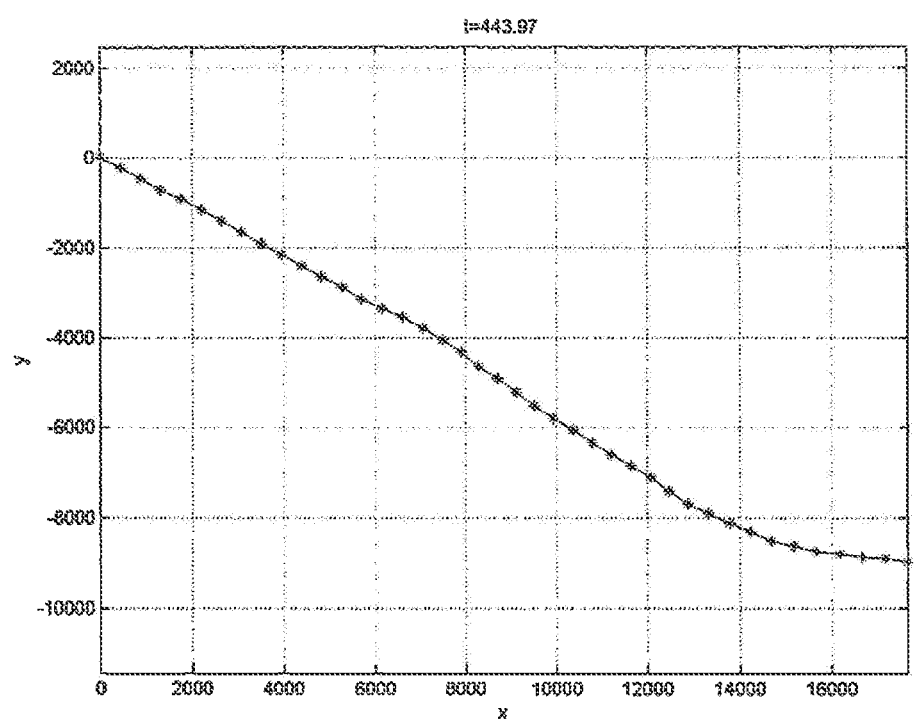
FIG 46: t = 433.97, tether equipped with aft-body

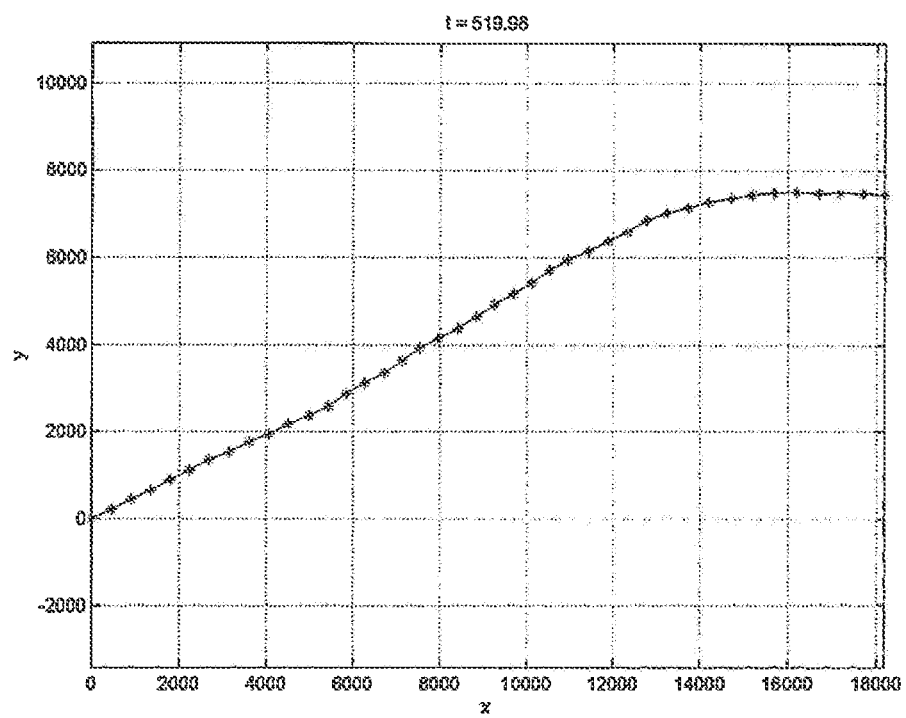
FIG 47: t = 519.98, tether equipped with aft-body

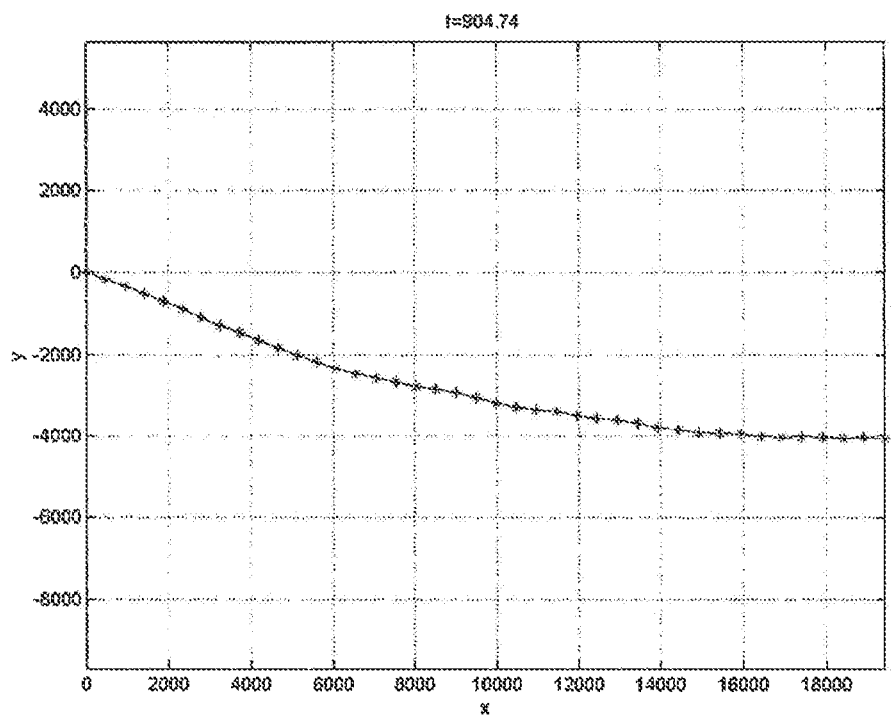
FIG 48: t = 904.74, tether equipped with aft-body
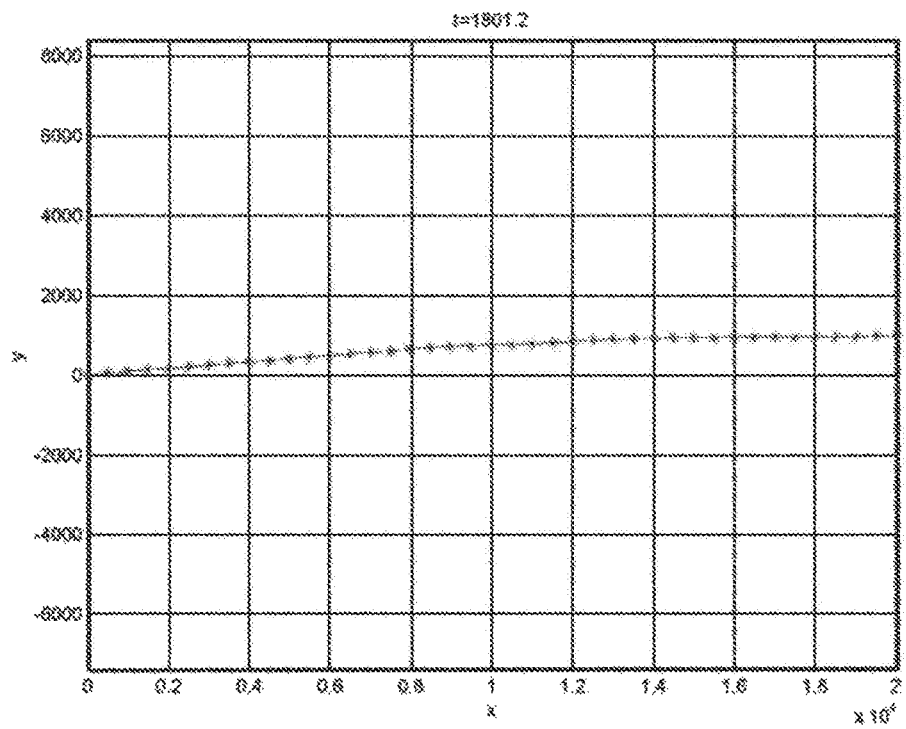
FIG 49: Shape at time 1801.2, when the maximum displacement from the x axis falls below 1 km for the tether equipped with aft-body.

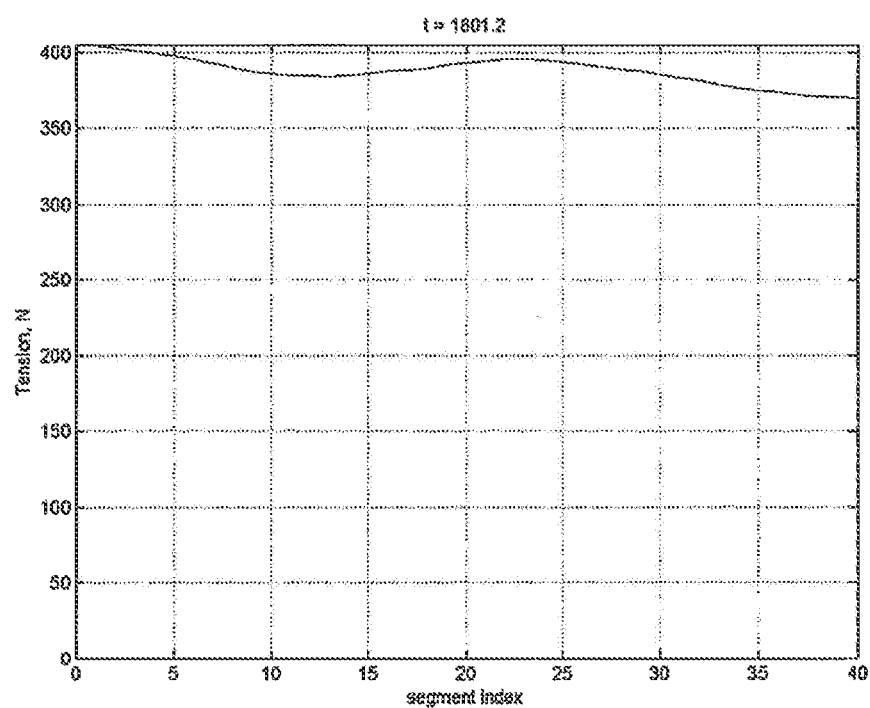
FIG 50: Tension distribution at time 1801.2 (with shape in 5.6.a)

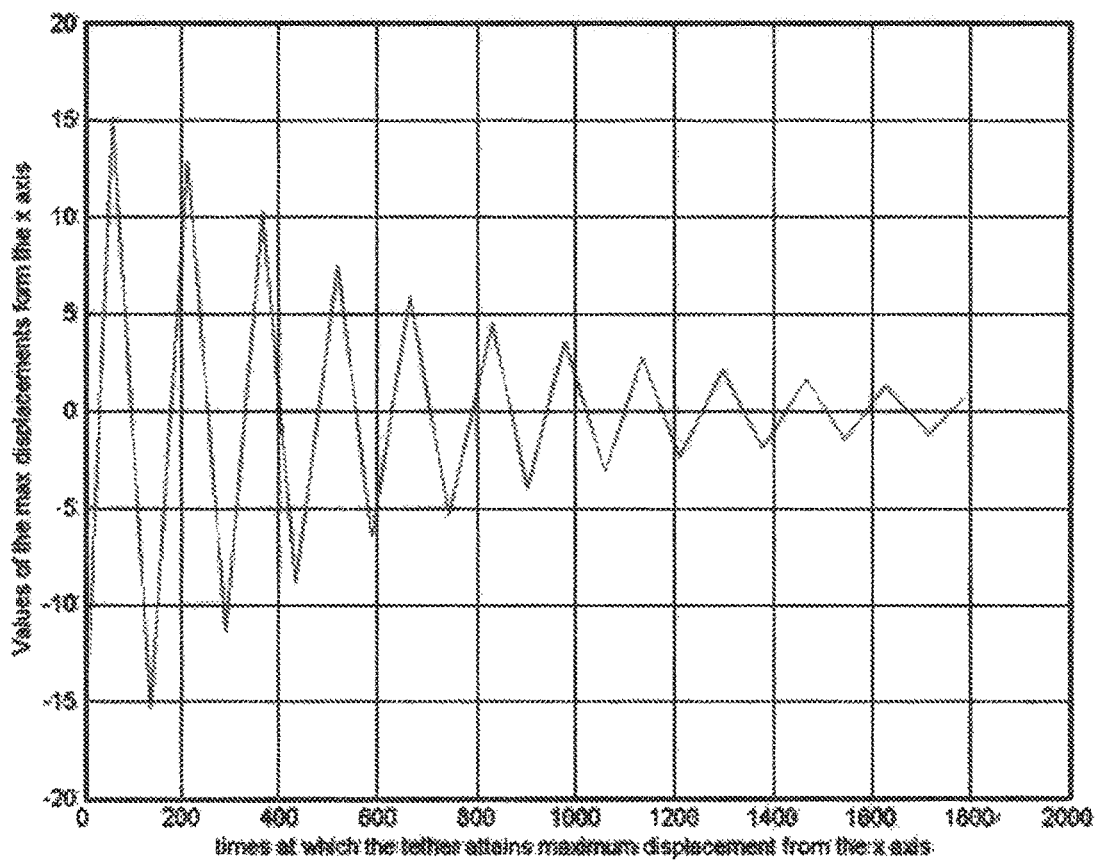
FIG 51: Values of the maximum displacements from the x axis and the times at which the maxima occur.
| Max excursions (km) | -20 | +16.9 | -16.2 | +12.2 | -11.0 | +9.0 | -8.7 | +6.9 | ... |
FIG 52: Maximum distances along the y-axis (gravity gradient initial conditions,
specular reflection

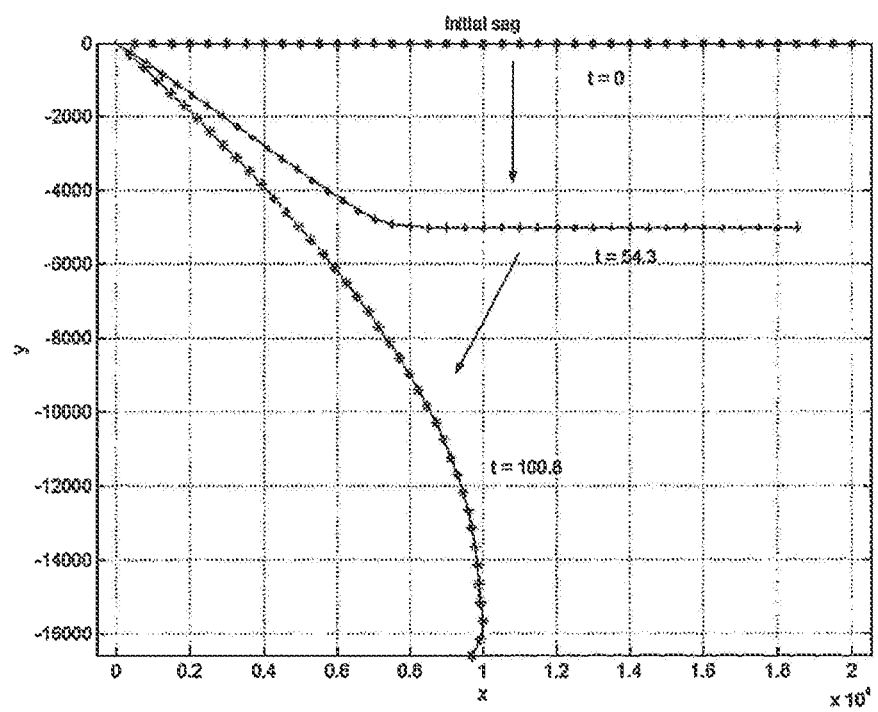
FIG 53: Initial sag of the tether starting from the position along the x axis with the stream speed 80% of the orbital speed.

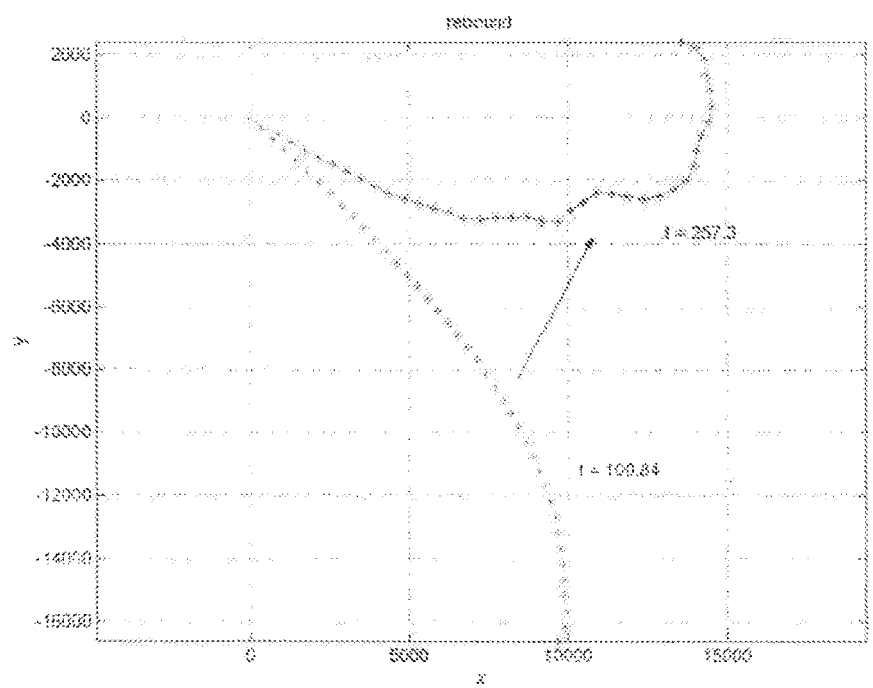
FIG 54: Subsequent rebound of the tether.

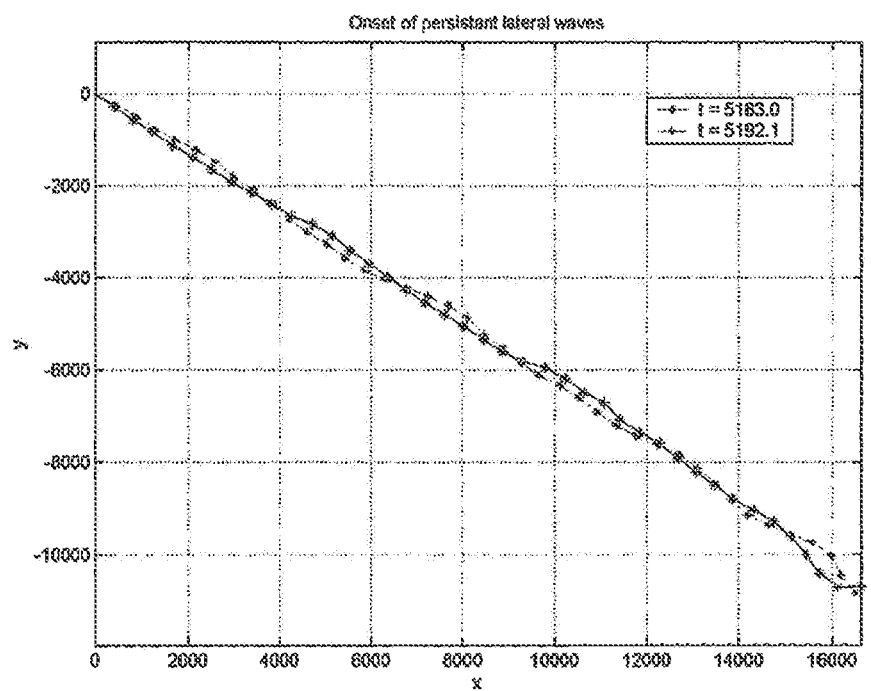
FIG 55: After an extended period, traveling waves begin to appear along the tether length and standing waves persist at the free end.

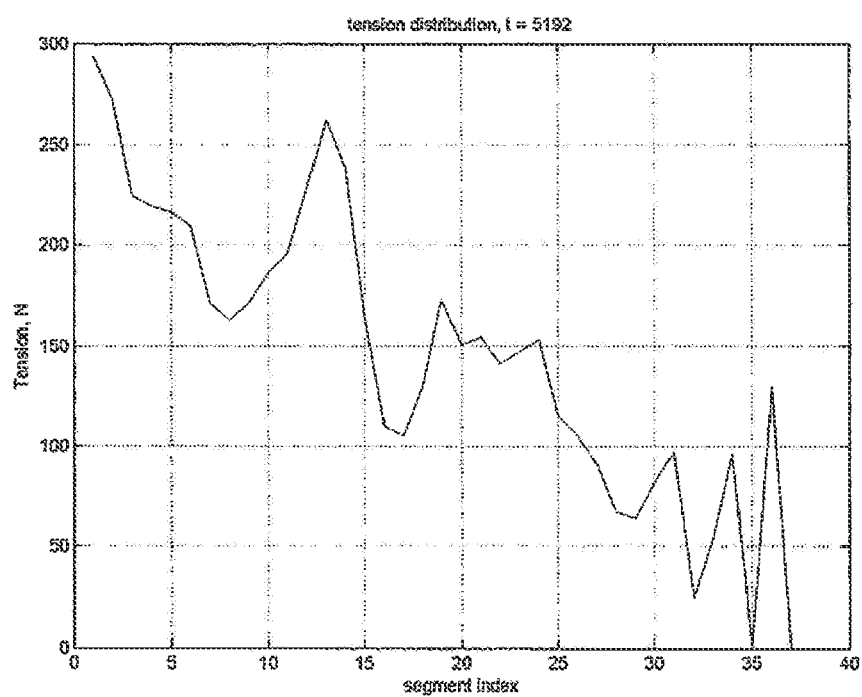
FIG 56: Tension distribution at t = 5192.1 s

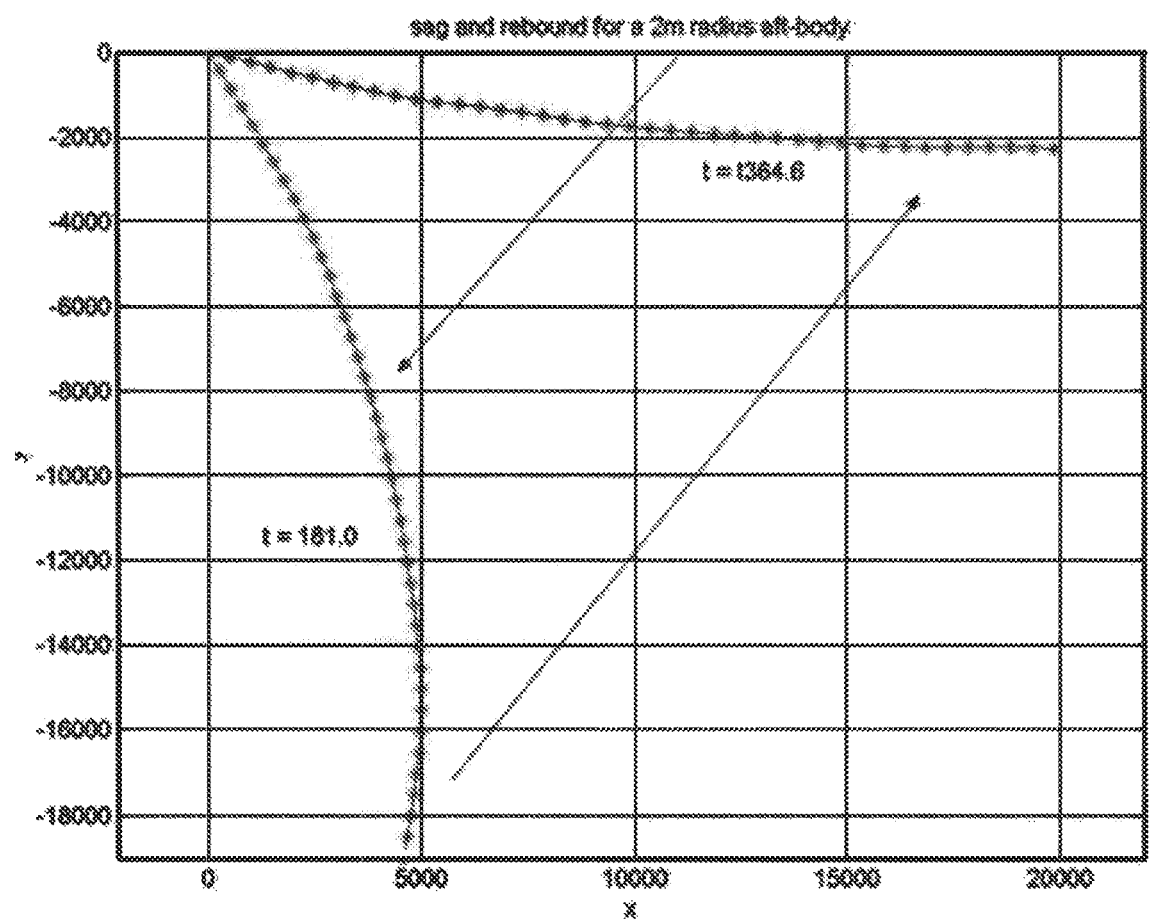
FIG 57: Initial sag and rebound for a 2m radius aft-body.

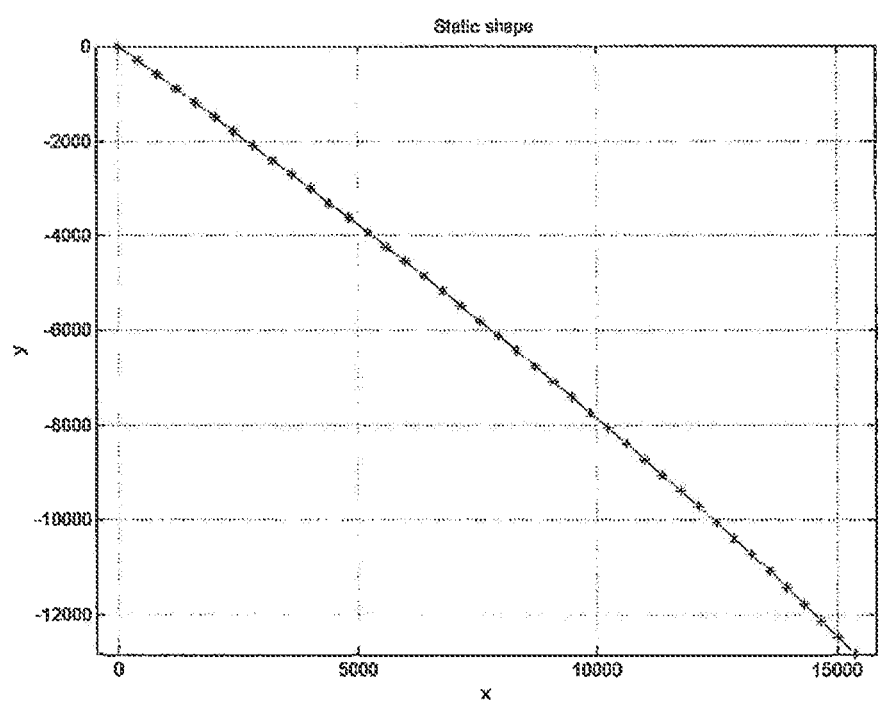
FIG 58: Static tether shape for the 2m radius aft-body case

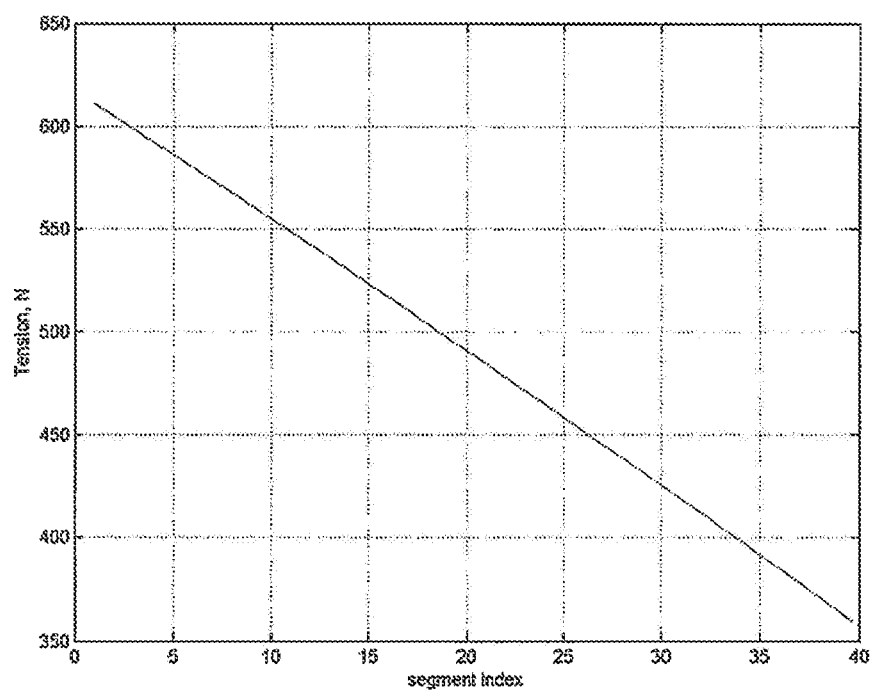
FIG 59: Static tension distribution for the 2m radius aft-body case.

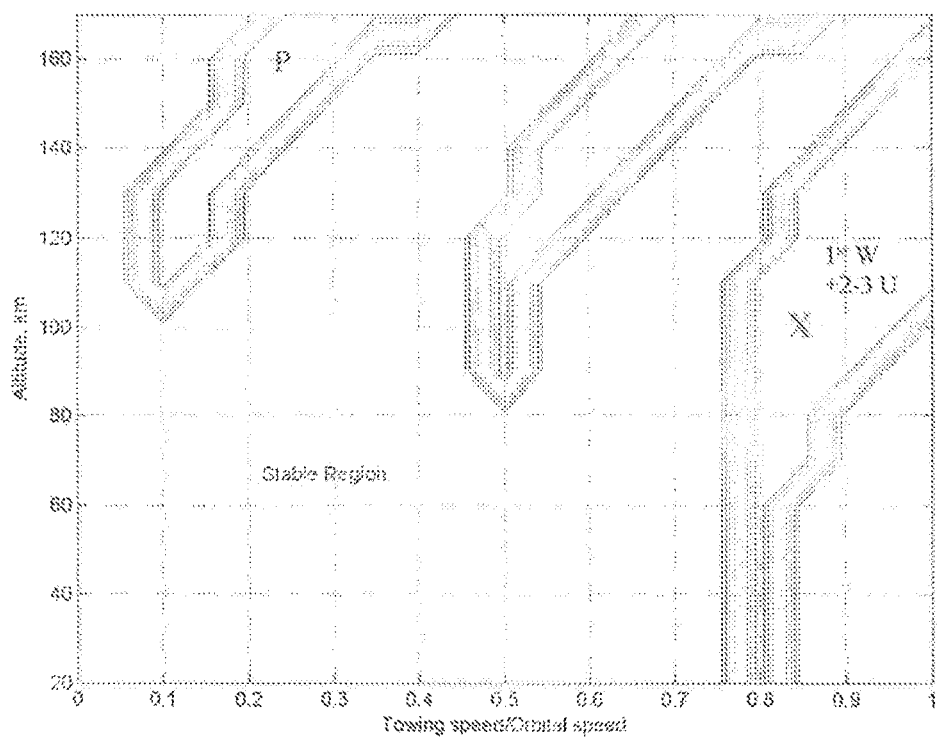
FIG 60: Stability chart in the (V/V₀, H) plane, all other tether parameters as previously given, and without an aft body.

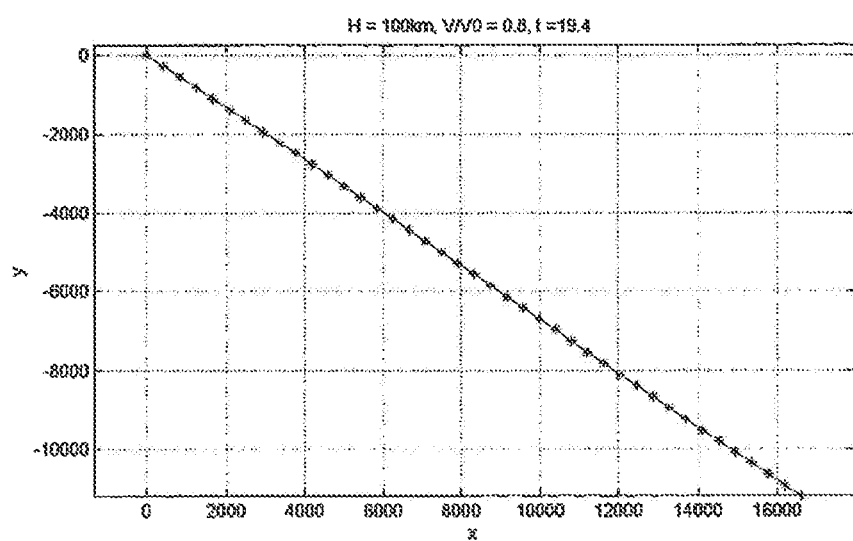
FIG 61: Early in the simulation, the tether shape is still very close to its equilibrium solution

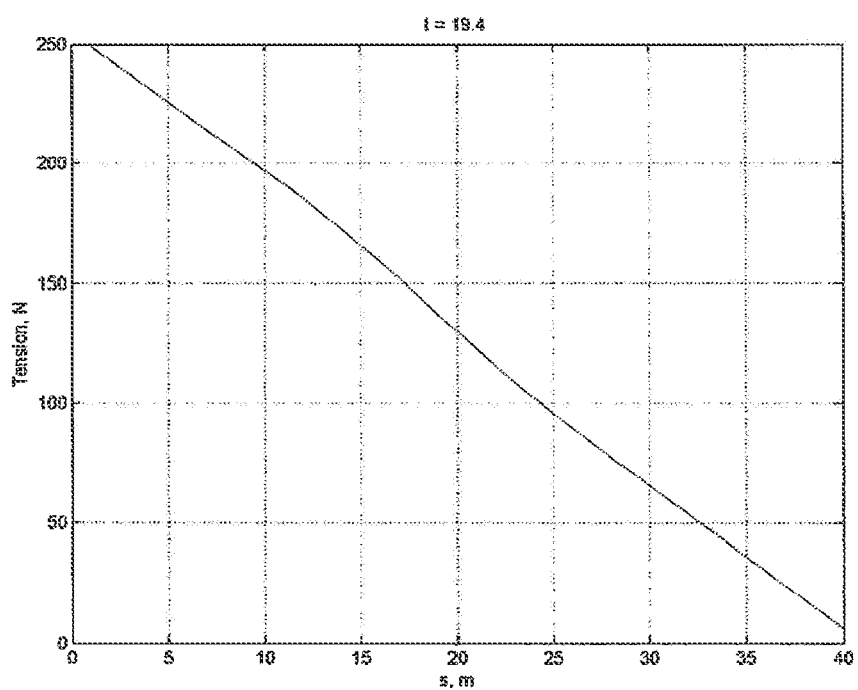
FIG 62: Counterpart to Figure 10.1.a. At 19.4s the tension remains close to the equilibrium distribution

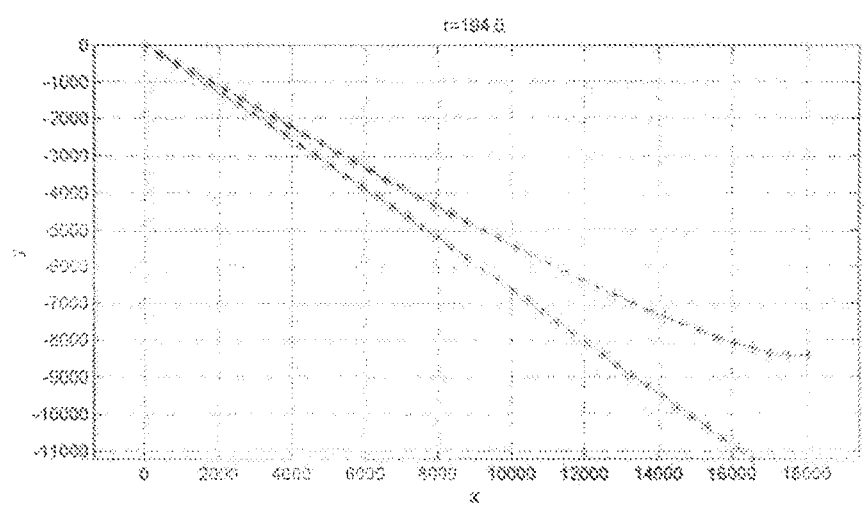
FIG 63t, starting at 194 s, a 140s half-period lateral oscillation is observed

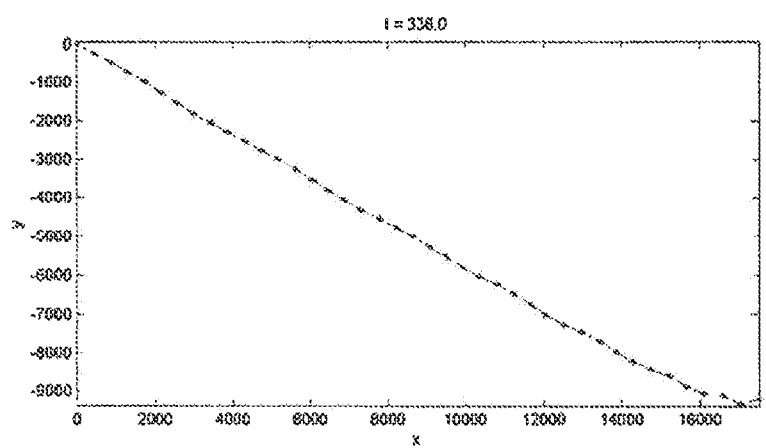
FIG 64: Lateral amplitude is reduced but a strongly curled lateral motion – "whip lash" – occurs near the free end.

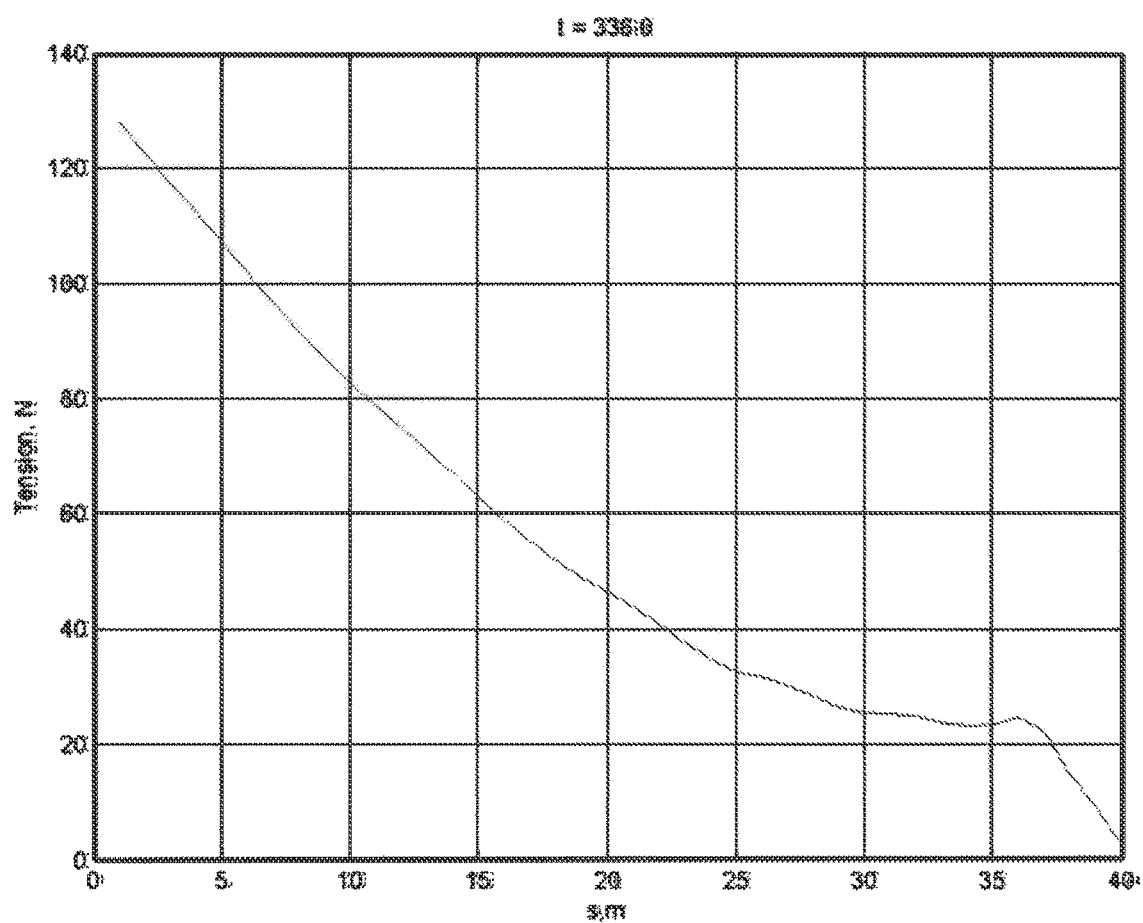
FIG 65: The "whip lash", in Figure (10.4.a) is accompanied by a distinct tension wave near the free end, which travels toward the attachment point.

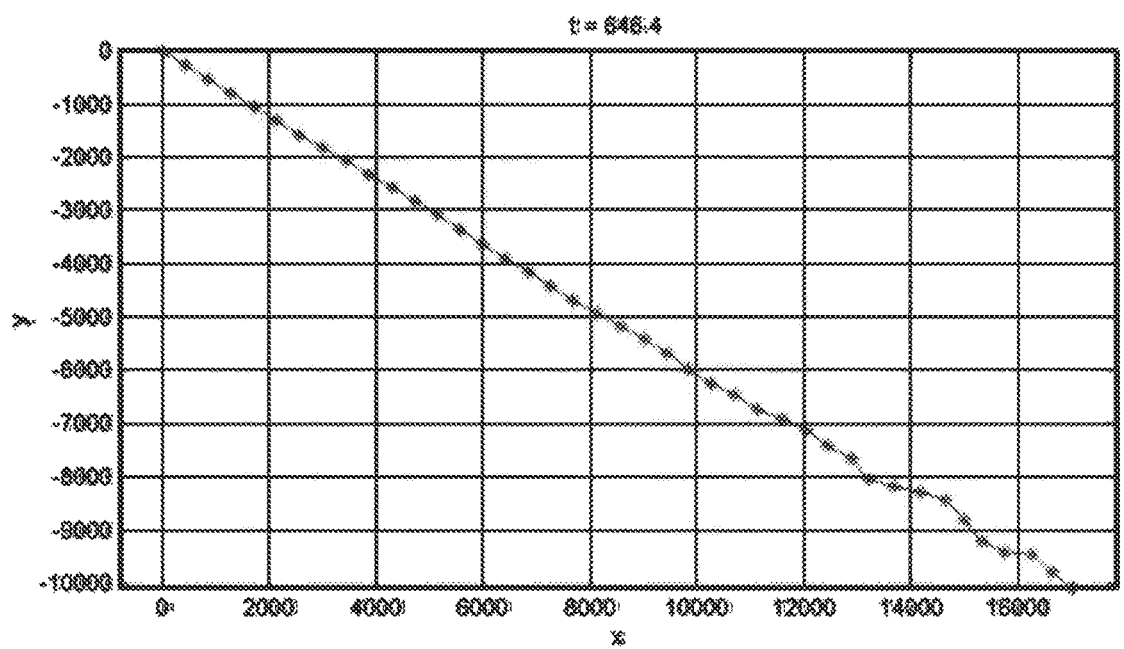
FIG 66: At 646 seconds, higher order lateral waves dominate.

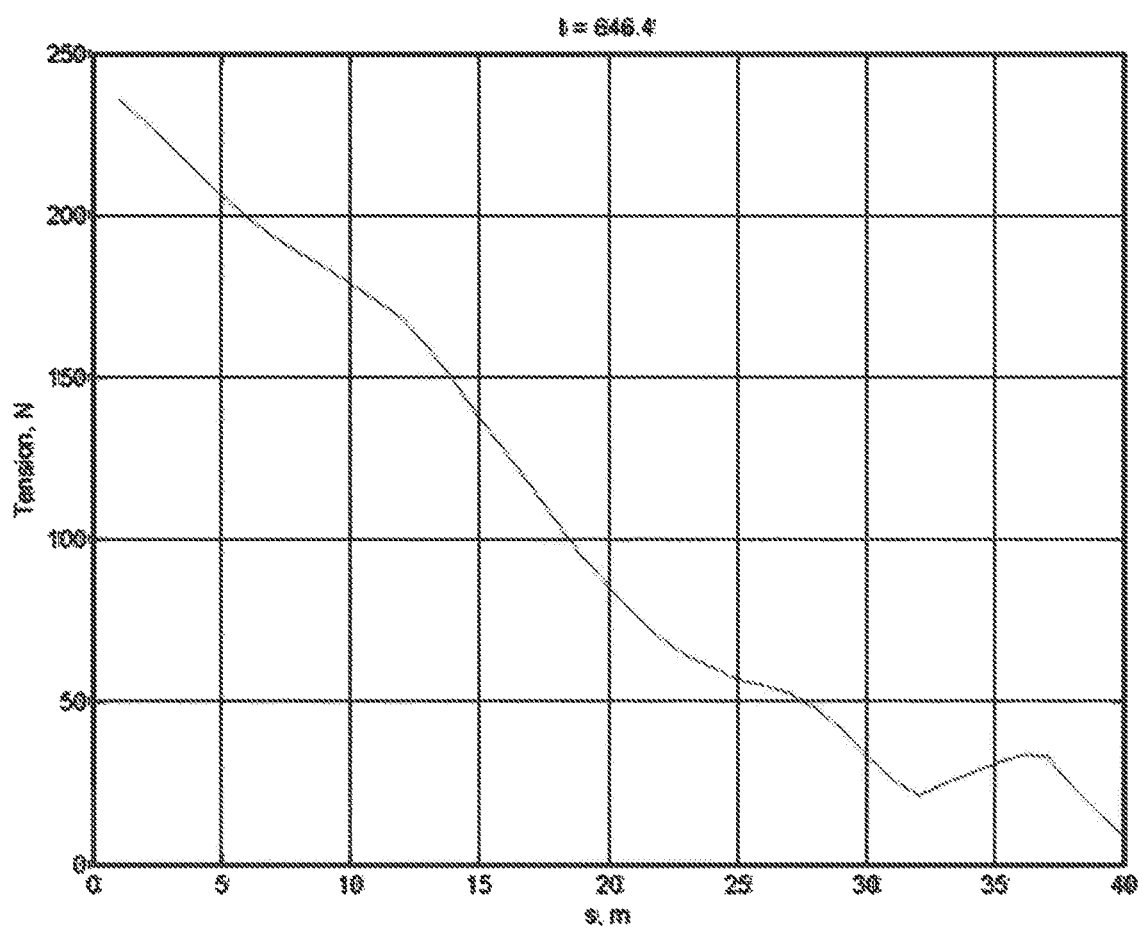
FIG 67: At time 646 s, high order longitudinal vibration begins to amplify.

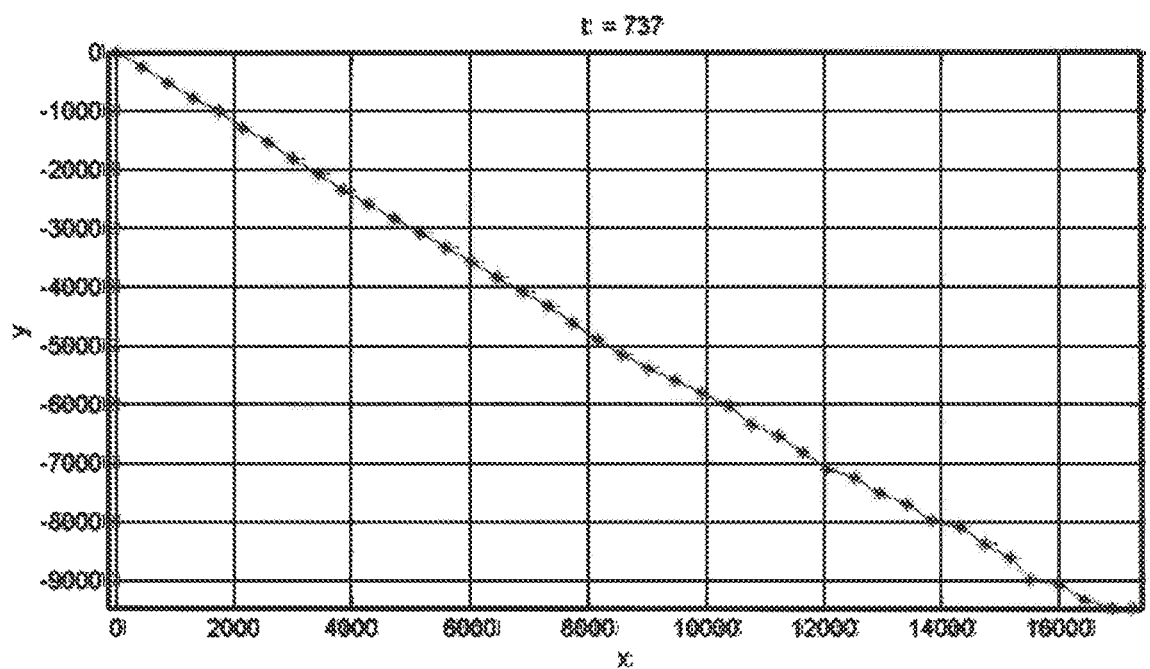
FIG 68: At 737s, high-order, but reduced amplitude lateral motion persists.

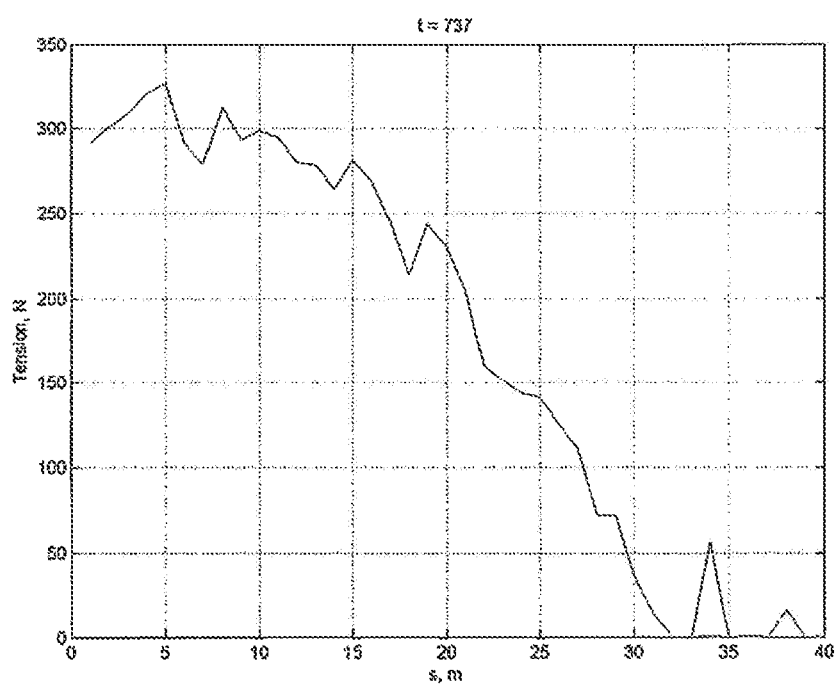
FIG 69: Near 737 s, longitudinal waves increase in amplitude sufficiently to produce slack regions near the free end

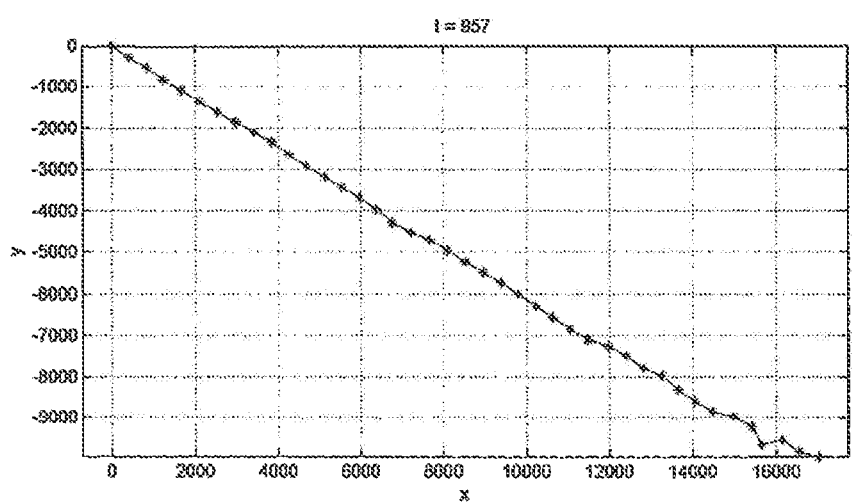
FIG 70: After about 15 minutes, chaotic lateral motion begins near the free end

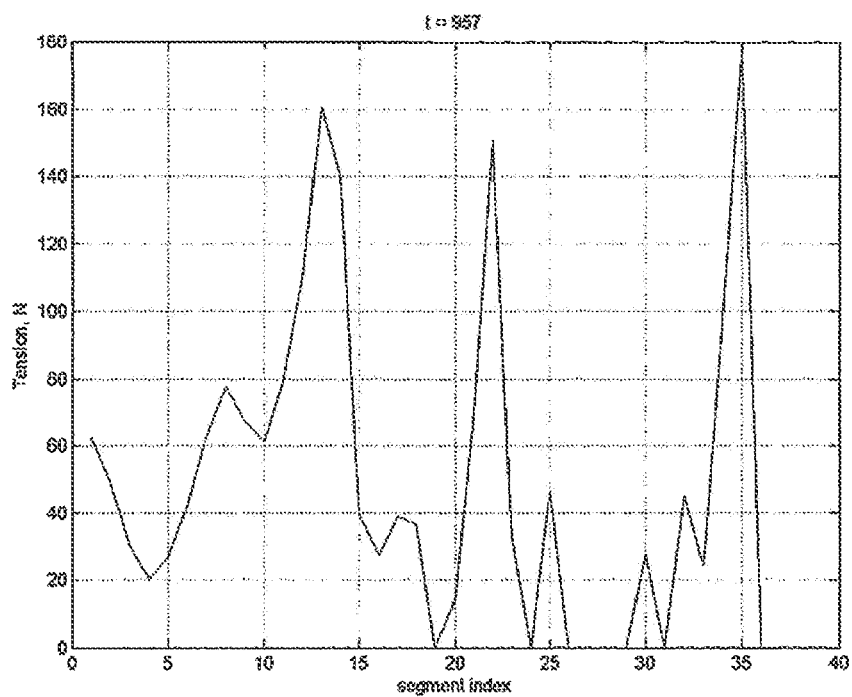
FIG 71: Counterpart to Figure (10.6.a). Chaotic longitudinal motion

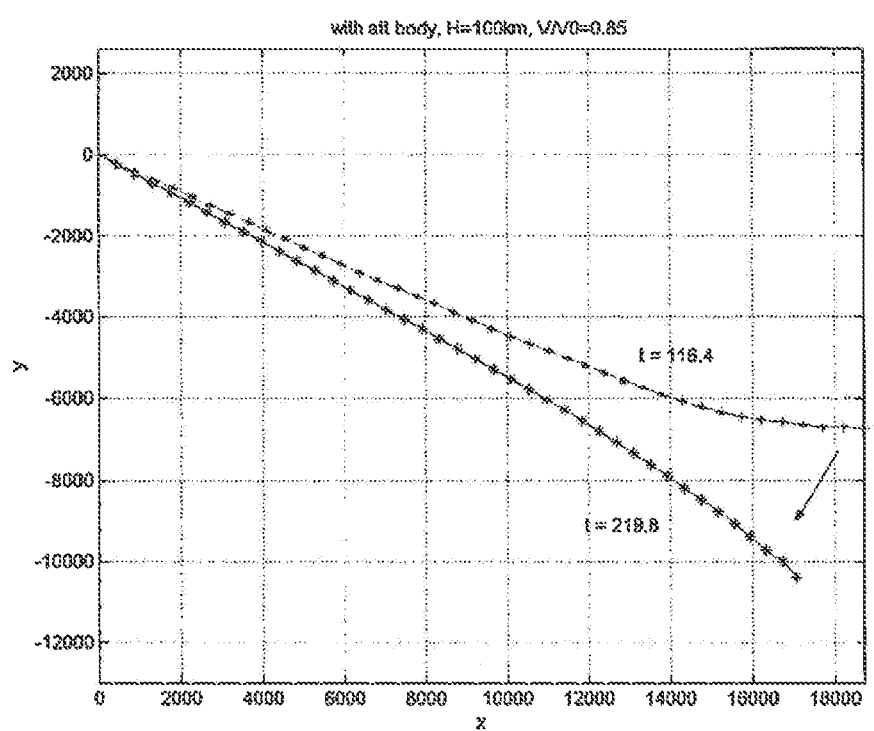
FIG 72: 0.5m radius aft-body, initial shape oscillation

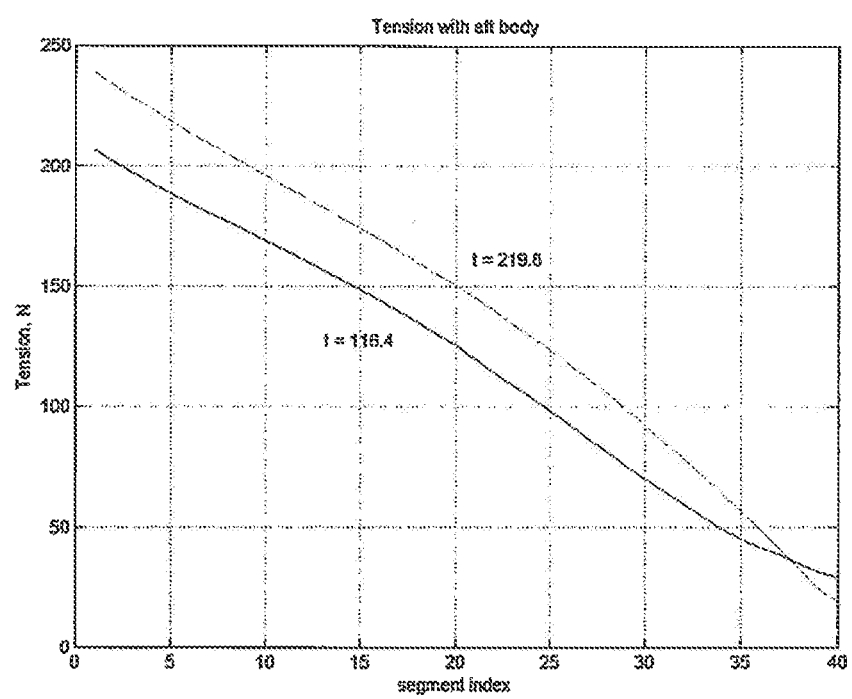
FIG 73: 0.5m radius aft-body, initial tension variation

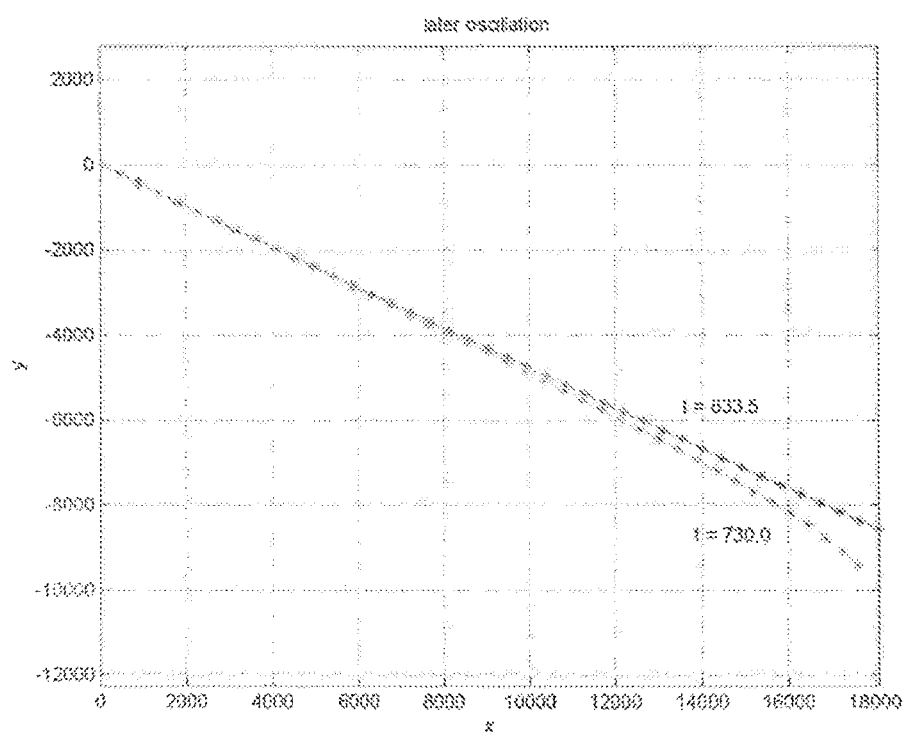
FIG 74: 0.5m radius aft-body, a later shape oscillation

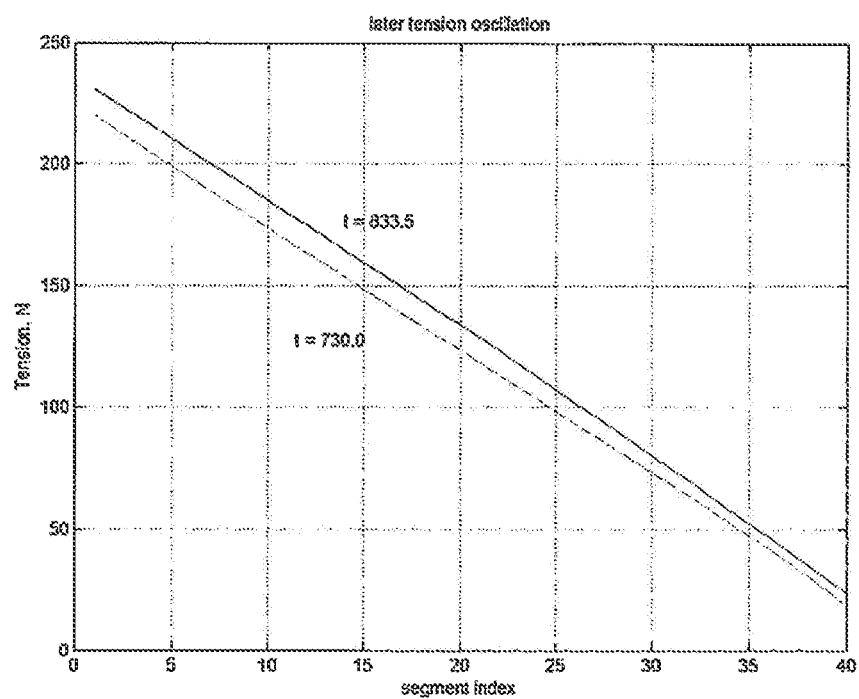
FIG 75: 0.5m radius aft-body, tension variation corresponding to Figure (10.8.b)

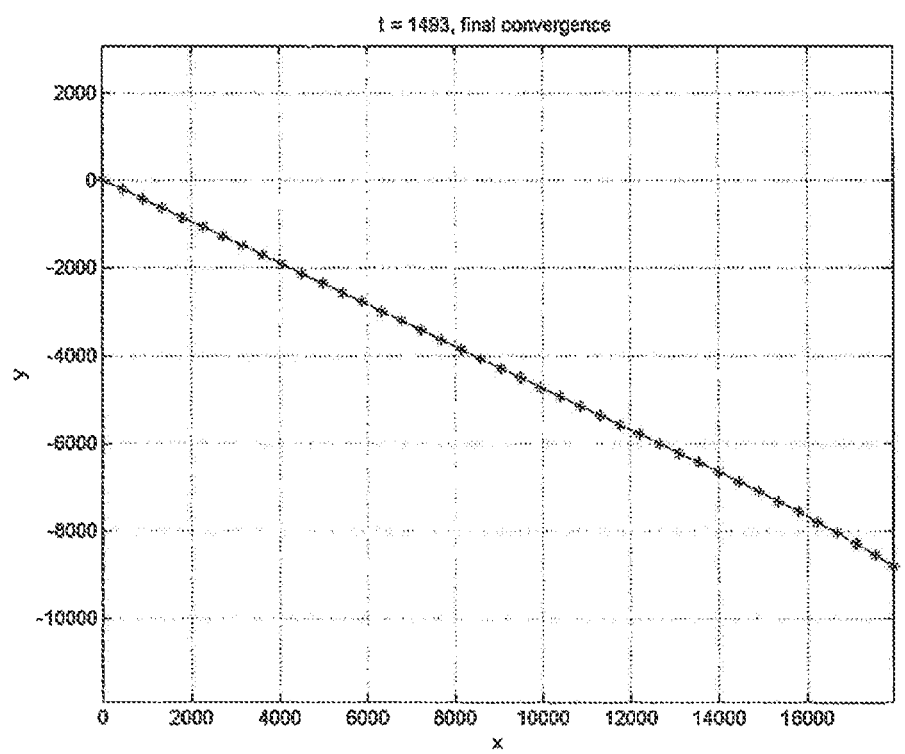
FIG 76: 0.5m radius aft-body, final convergence of the shape.

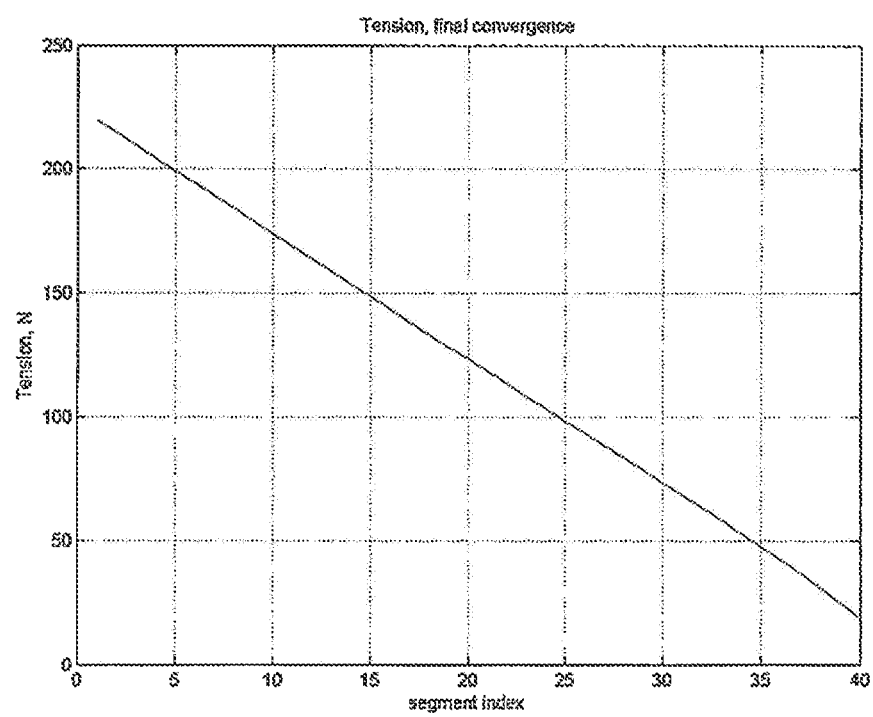
FIG 77: 0.5m radius aft-body, final convergence of the tension

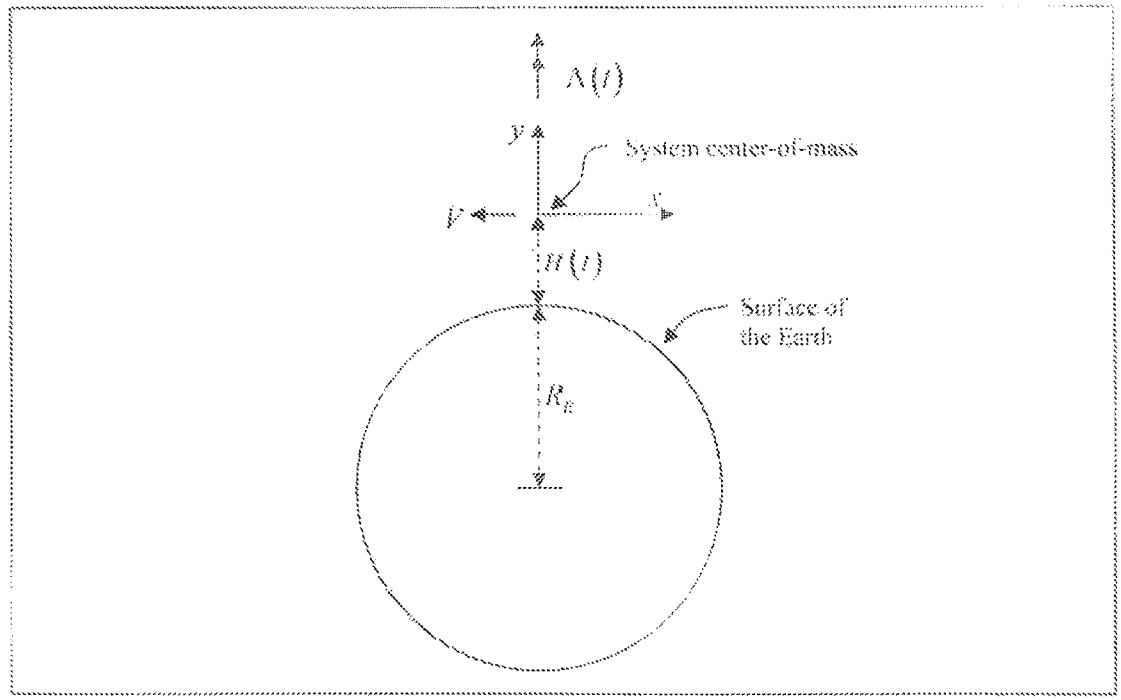
FIG 78: Rotating reference frame and coordinate system for the fore-body dynamics
Effecting the transformations to the $(\hat{x}_b, \hat{y}_b, \hat{z}_b)$ basis:
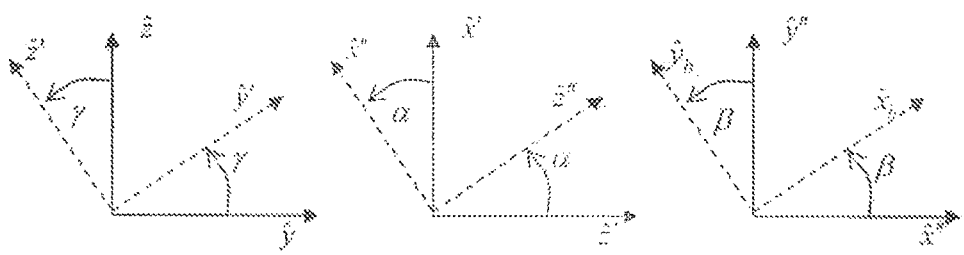
FIG 79: Three successive rotations defining the roll, yaw and pitch Euler angles of the fore-body-fixed reference frame.

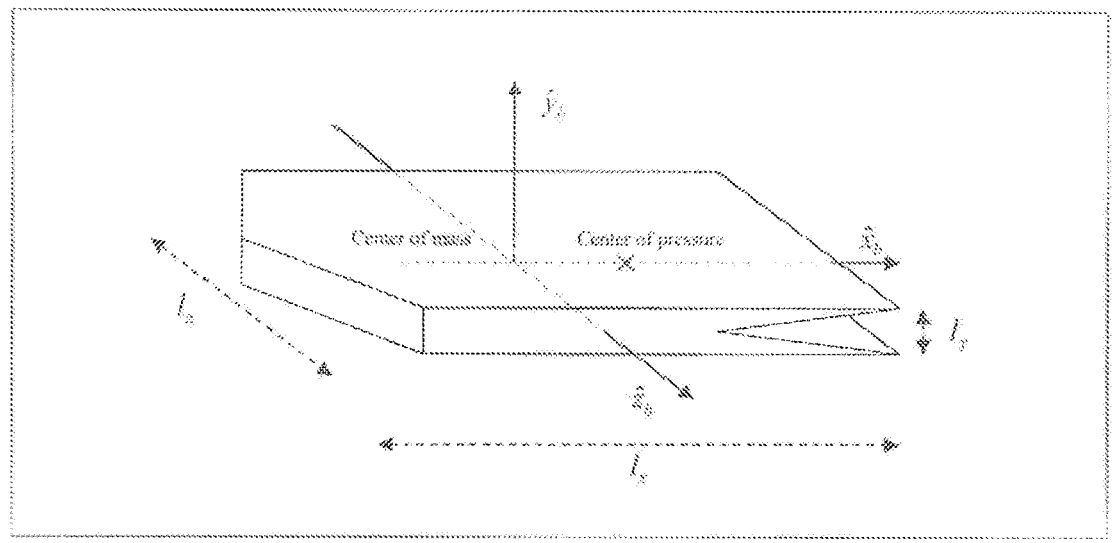
FIG 80: Conceptual sketch of a generic fore-body

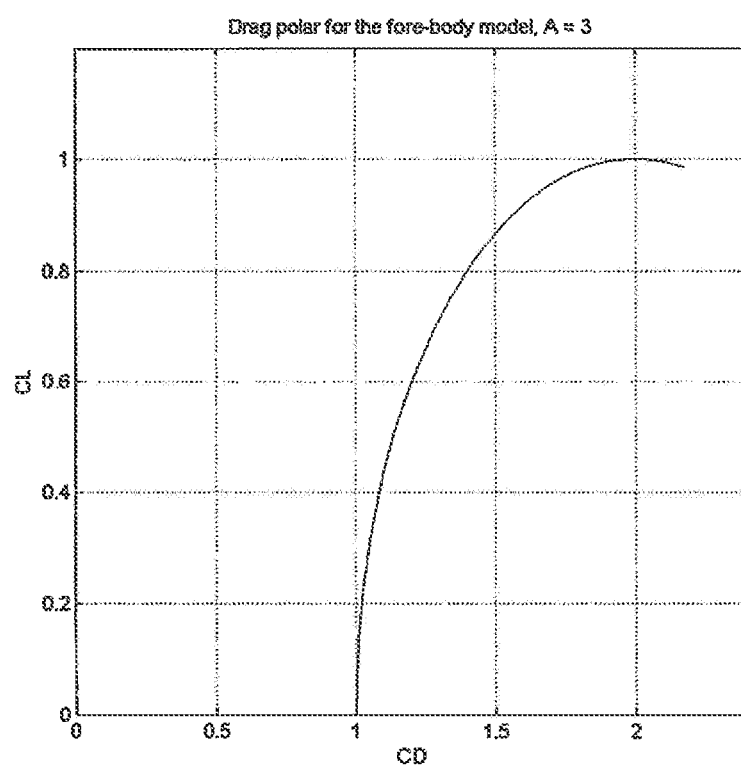
FIG 81: Drag polar for the Fore-body model ($A = 3$)

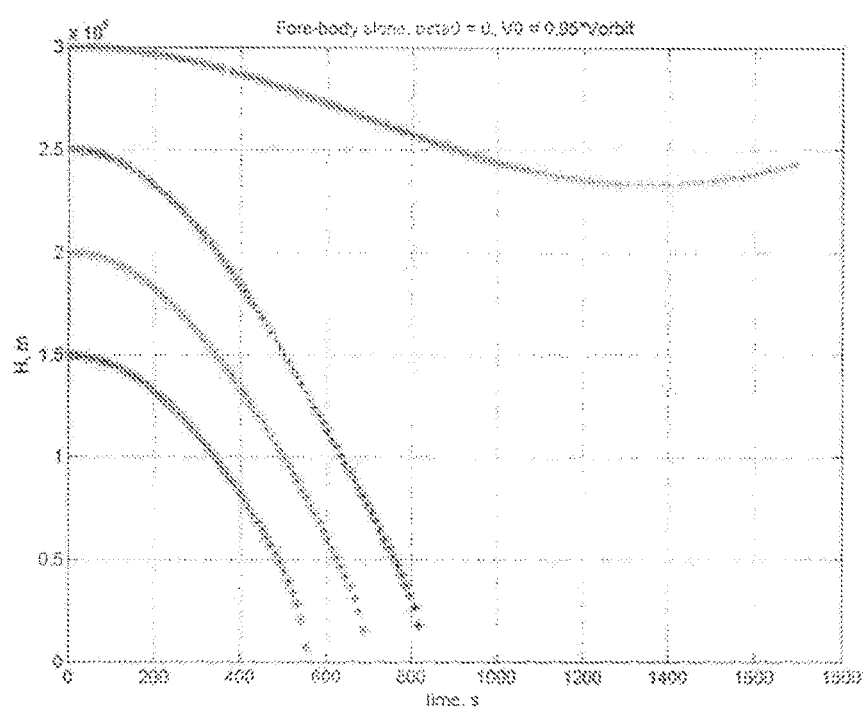
FIG 82: Altitude versus time for the fore-body without tether, starting at various altitudes with β = 0, and initial velocity 95% of orbital velocity.

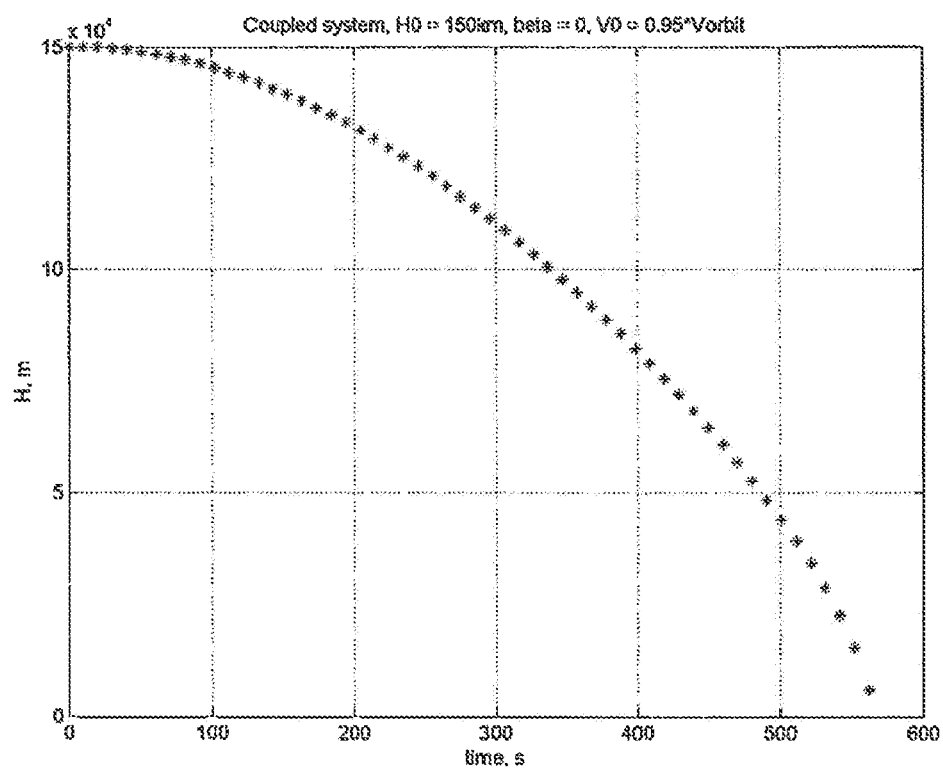
FIG 83: Altitude versus time for the combined system for the severe entry case

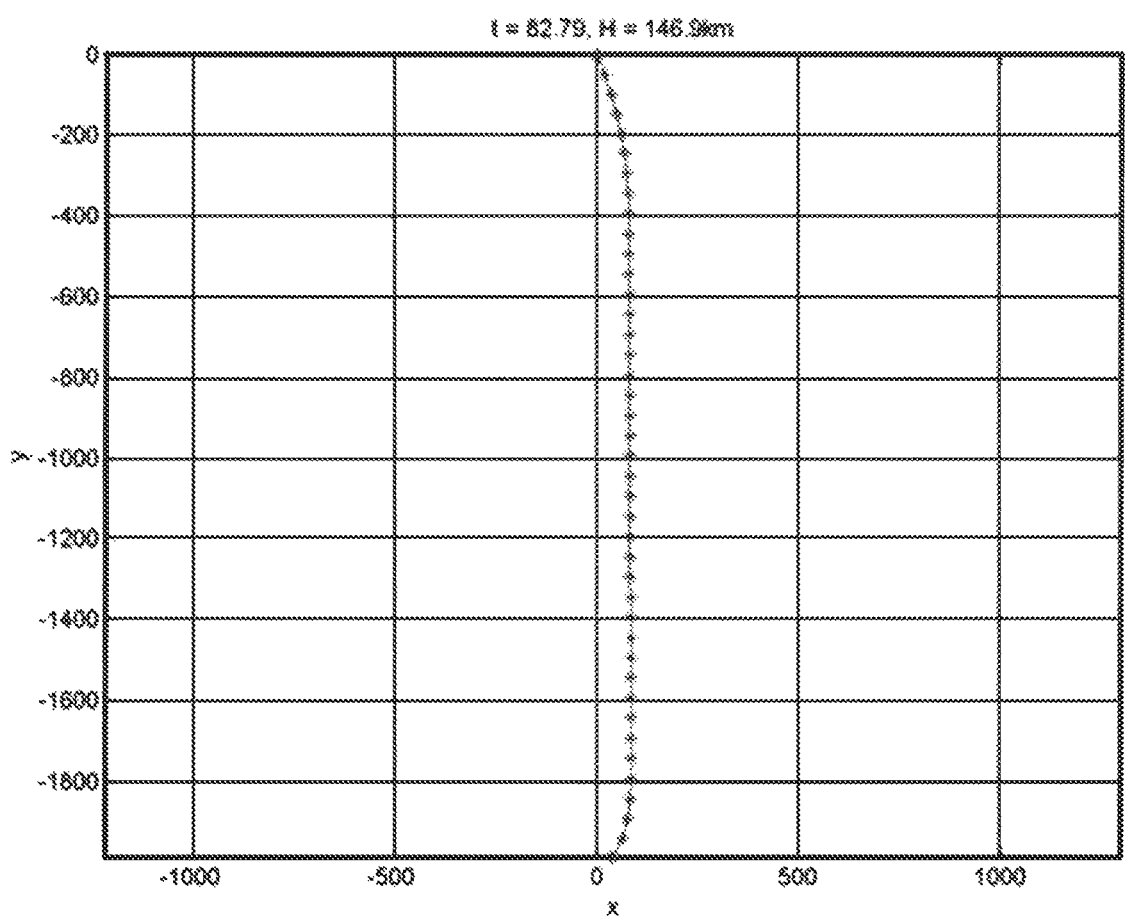
FIG 84: Tether shape at 146.9km altitude.

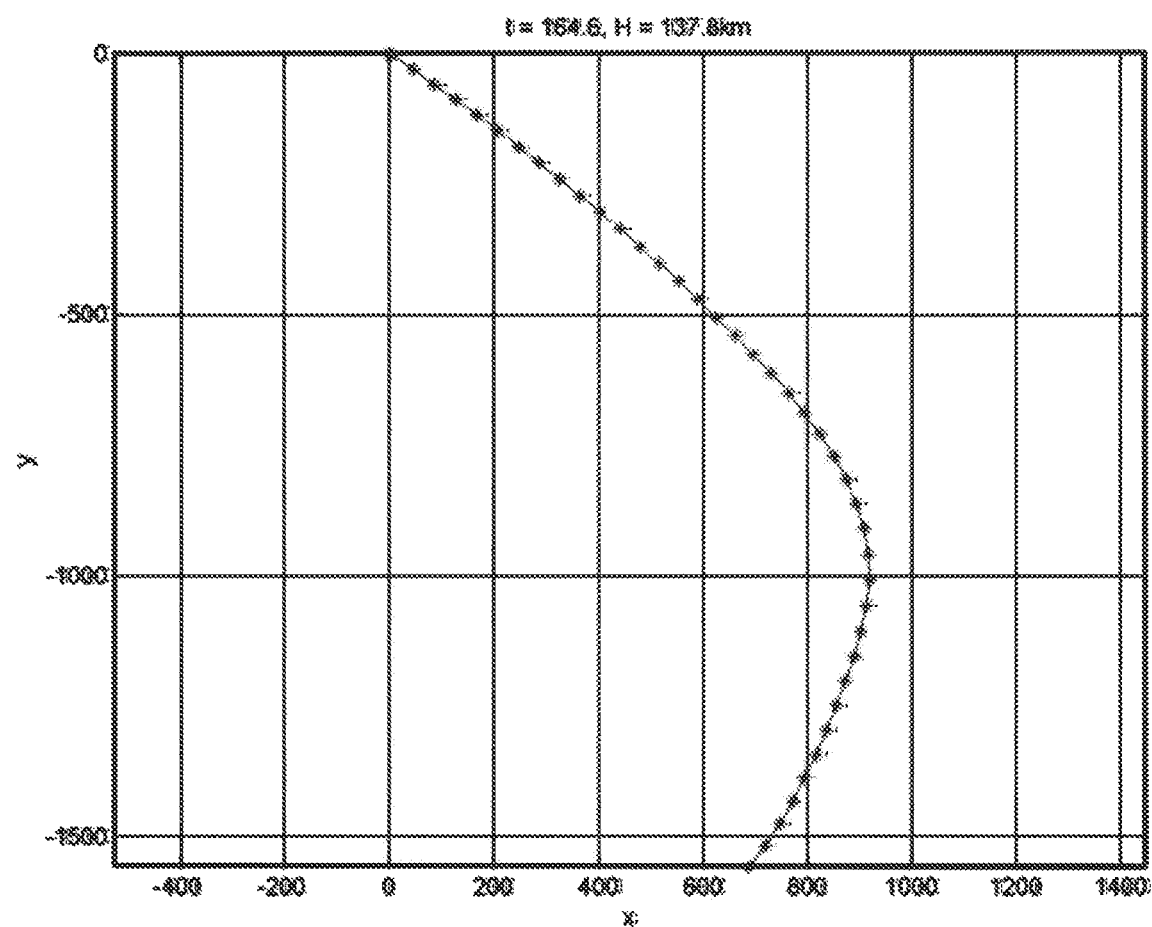
FIG 85: Tether shape at 137.8km altitude.

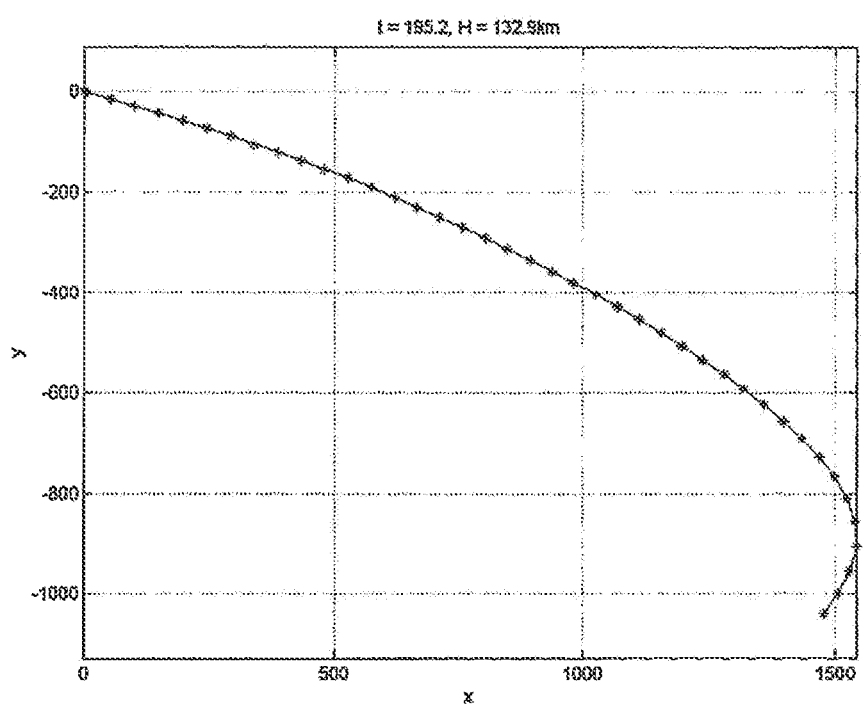
FIG 86: Tether shape at 132.9km altitude

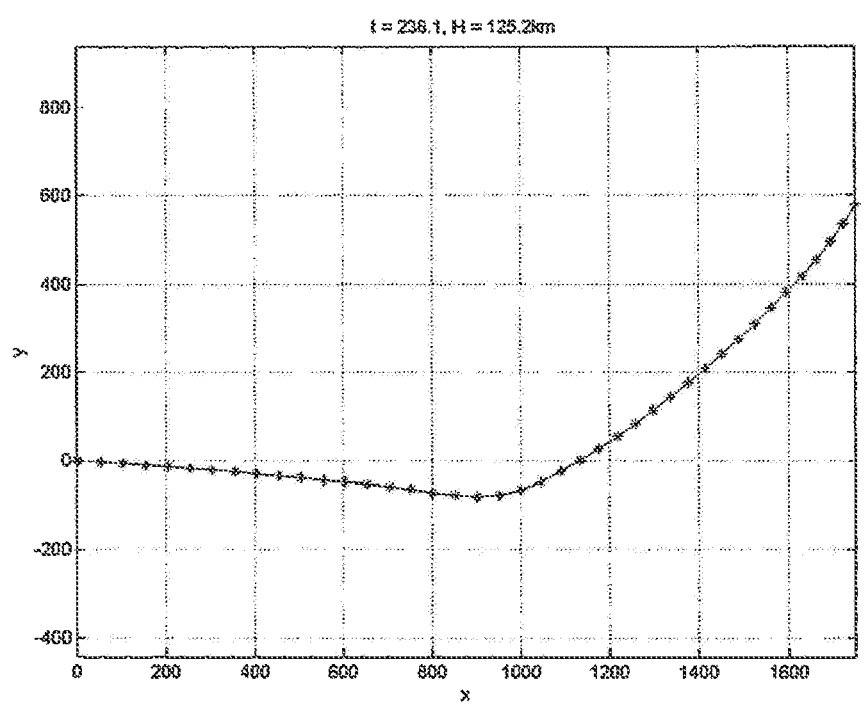
FIG 87: Tether shape at 125.2km altitude

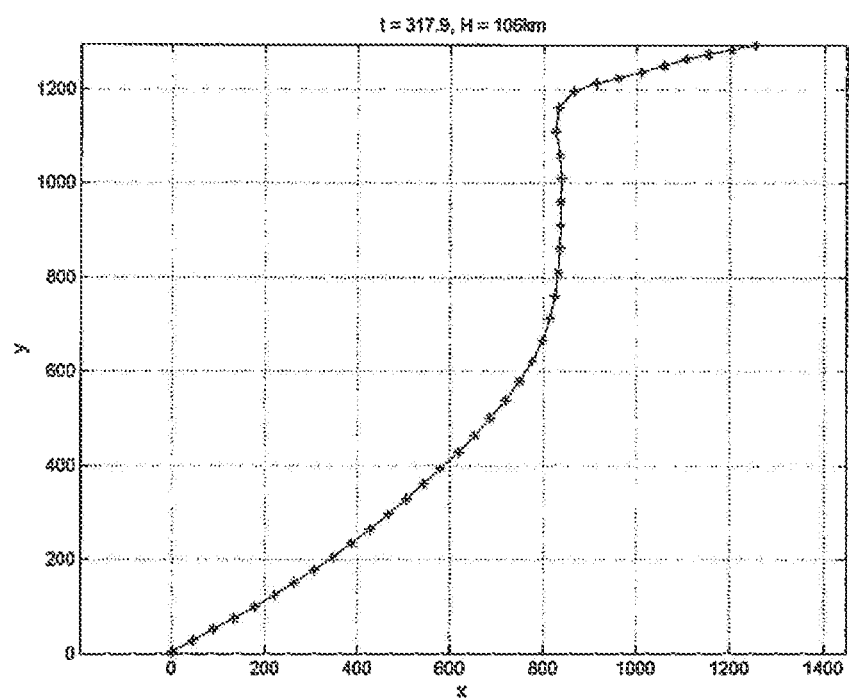
FIG 88: Tether shape at 106km altitude

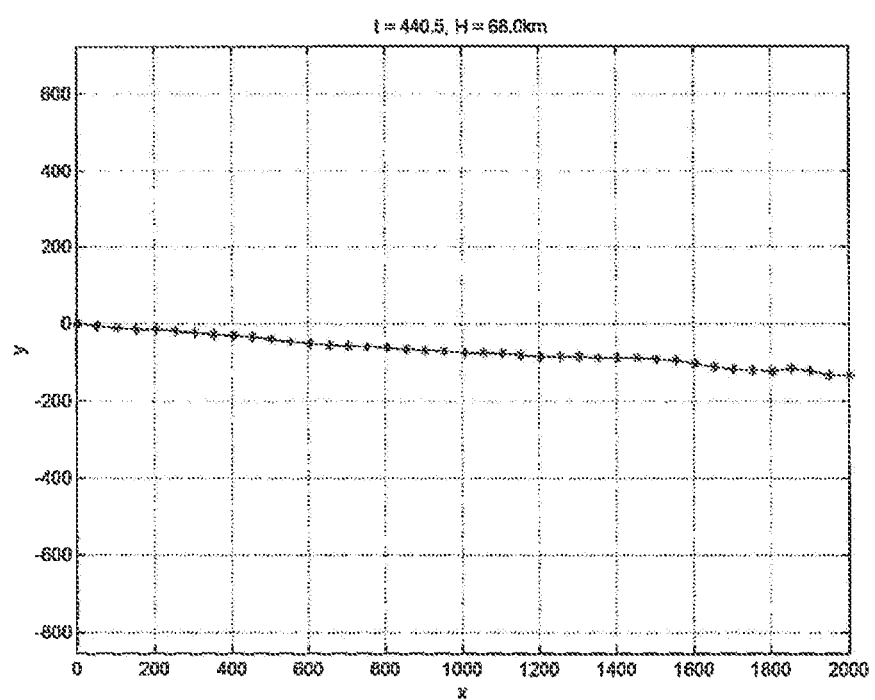
FIG 89: Tether shape at 68km altitude

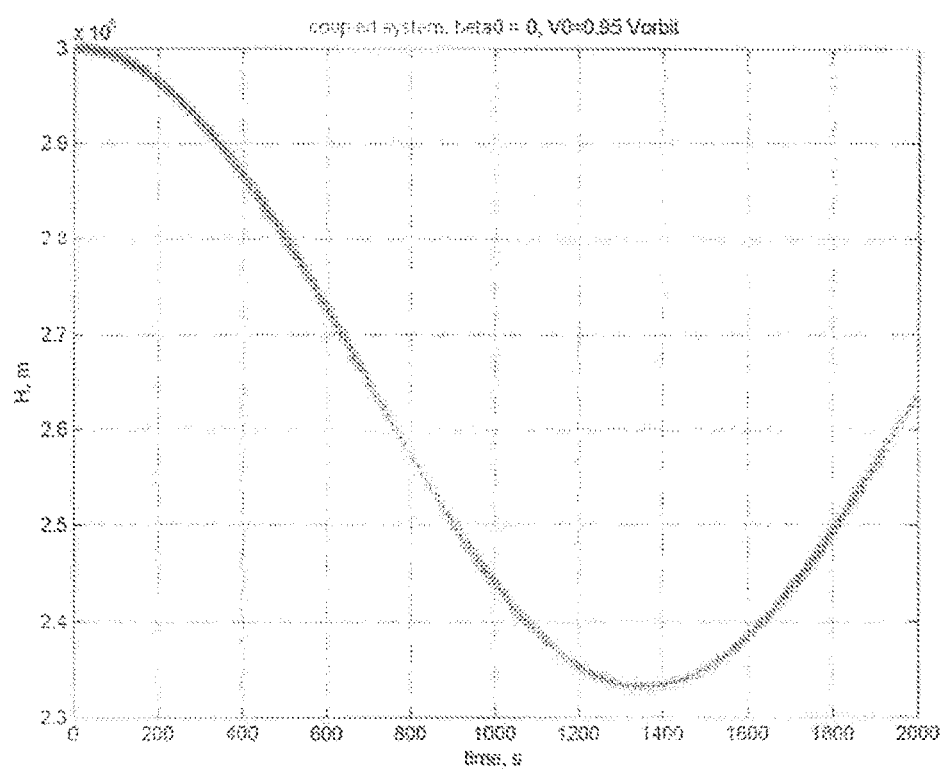
FIG 90: Altitude versus time for the coupled system in the shallow entry case.

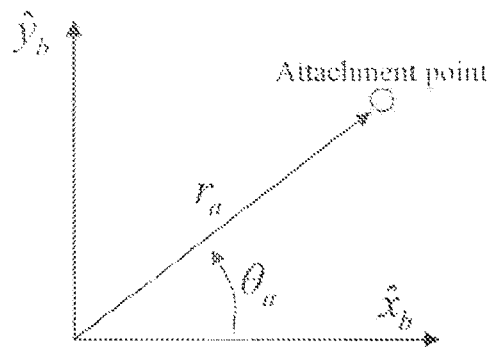
FIG 91: Alternate description of the attachment point geometry.
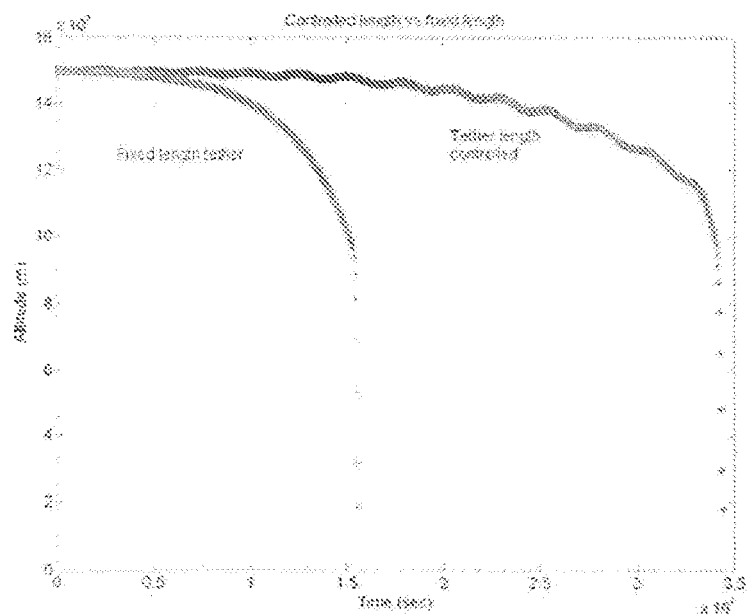
FIG 92: Comparison of altitude vs time behavior of the system with tether length

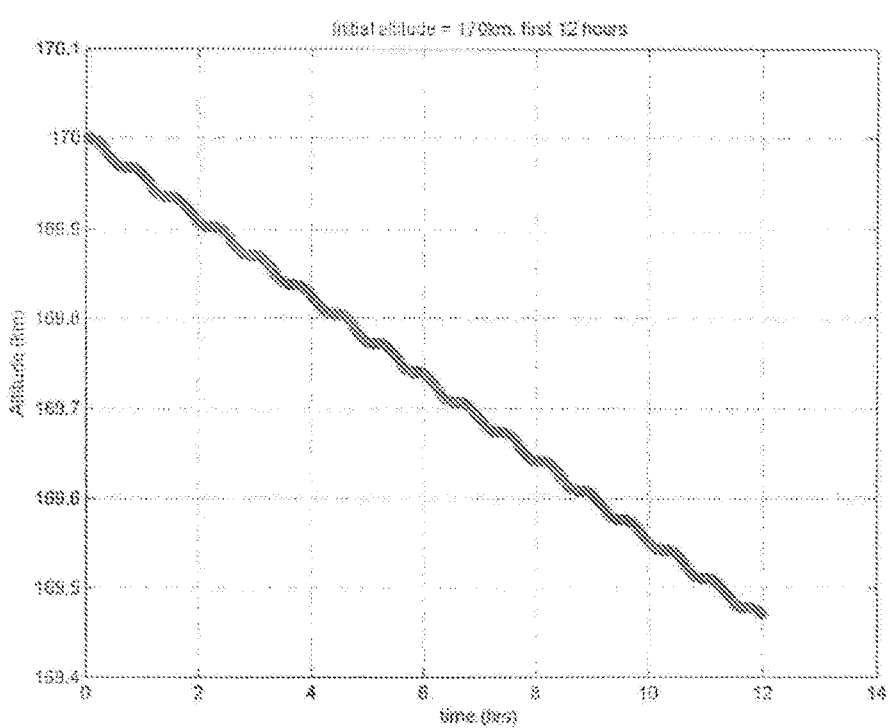
FIG 93: First 12 hours of flight (controlled system)

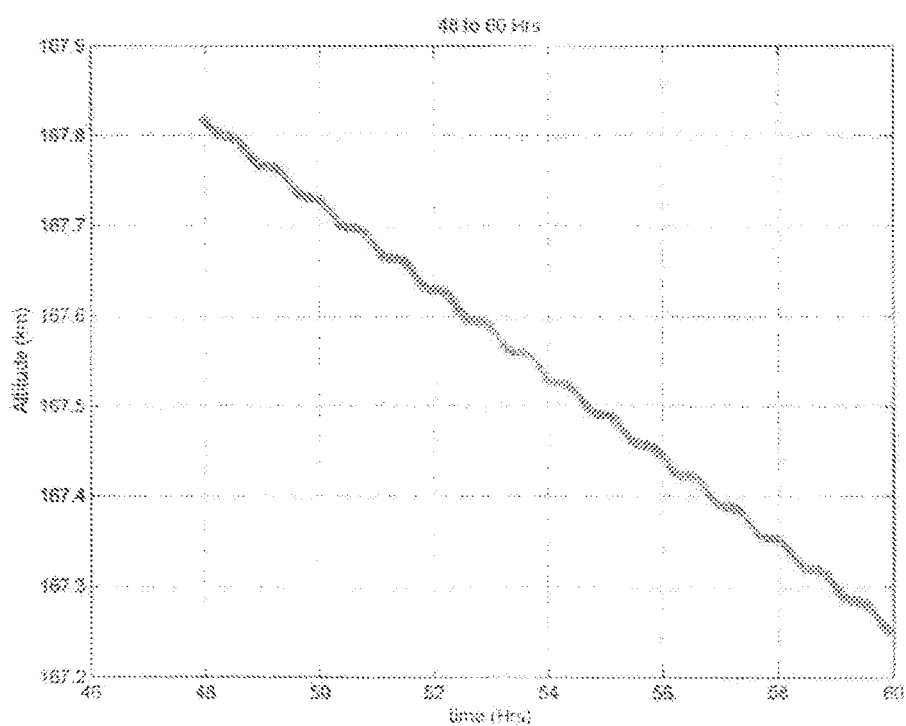
FIG 94: 48 to 60 hours after initiation (controlled system)

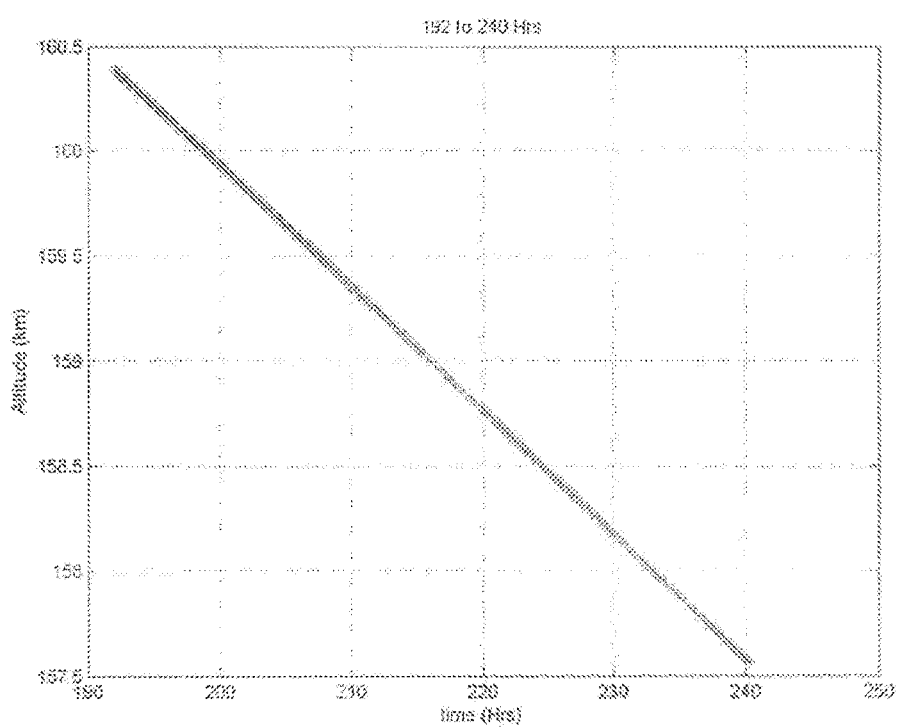
FIG 95: 192 to 240 hours after initiation (controlled system)

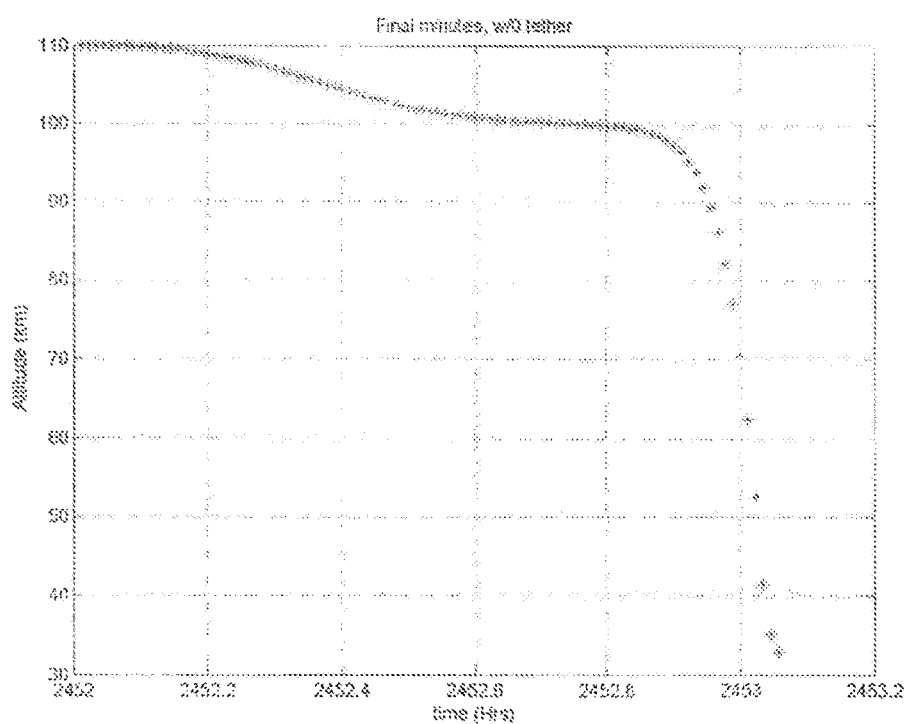
FIG 96: Altitude vs time, final 45 minutes, uncontrolled system

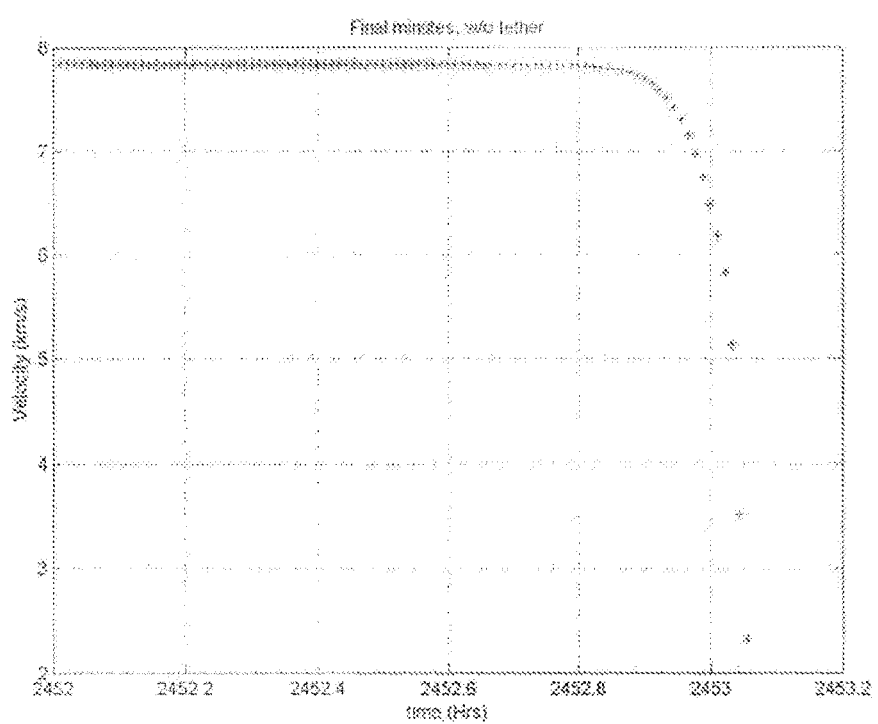
FIG 97: Velocity vs time, final 45 minutes, uncontrolled system

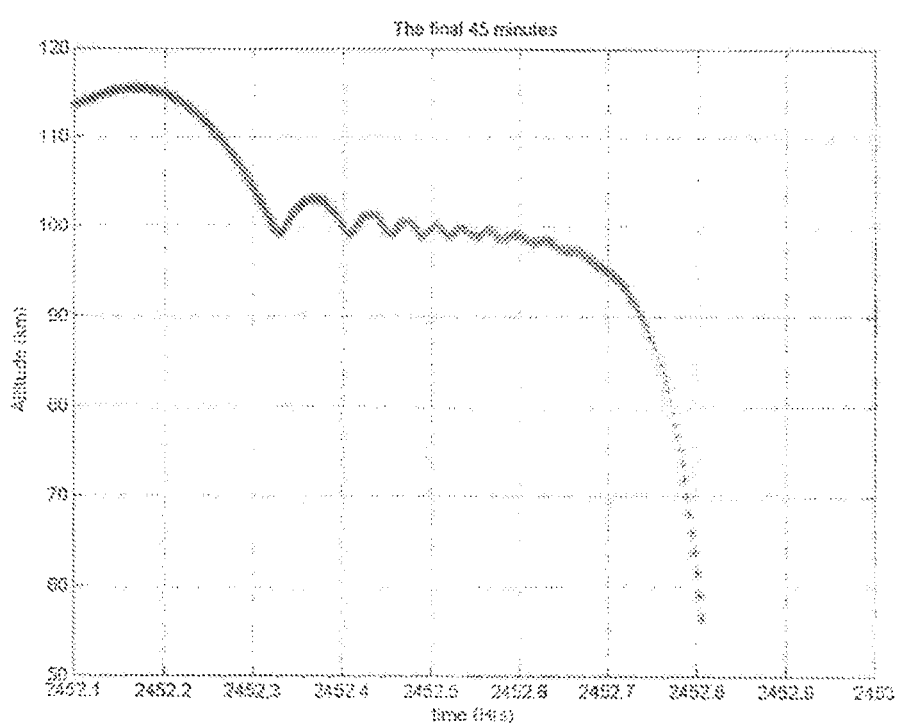
FIG 98: Altitude vs time, final 45 minutes, controlled system

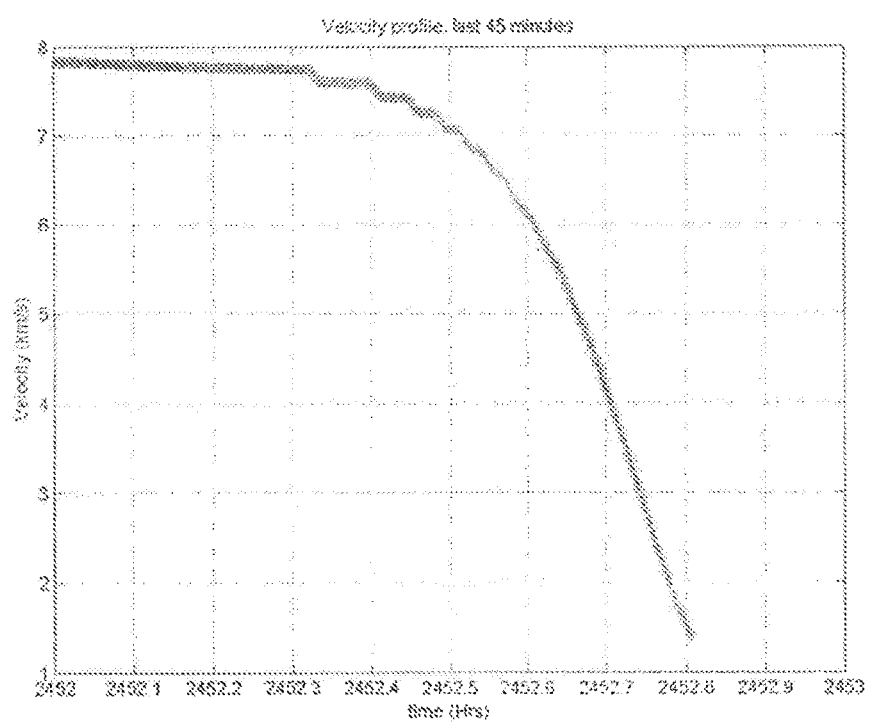
FIG 99: Velocity vs time, final 45 minutes, controlled system

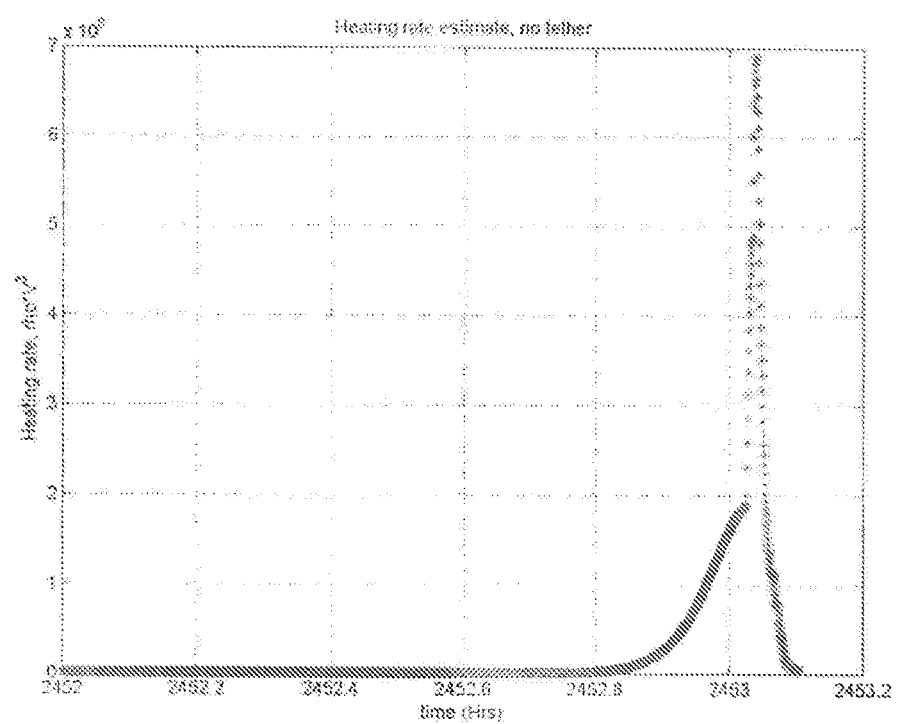
FIG 100: Heating rate estimate, uncontrolled system

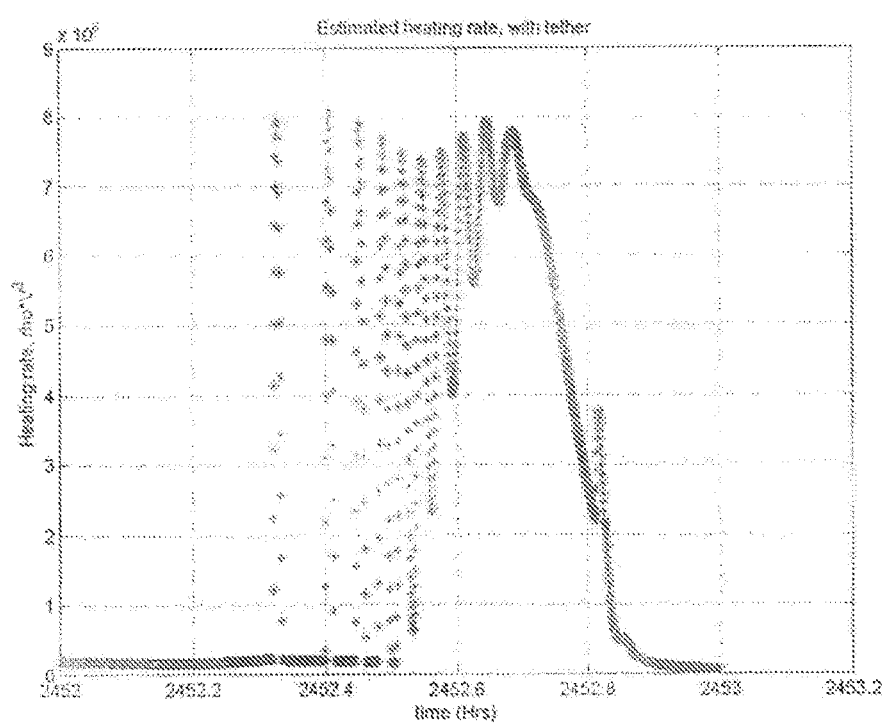
FIG 101: Heating rate estimate, controlled system

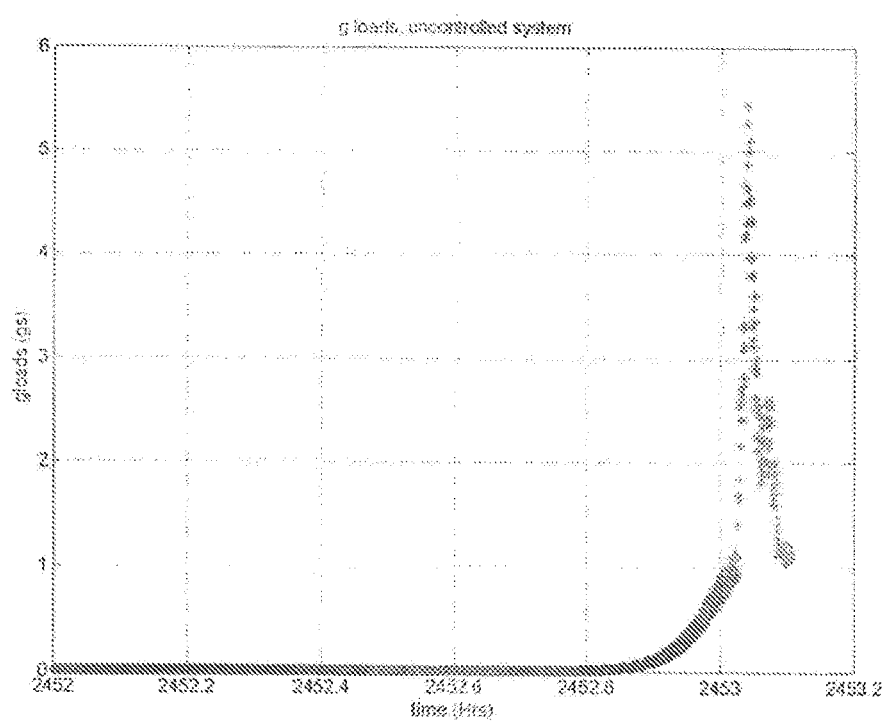
FIG 102:g-loads on the fore-body, uncontrolled system

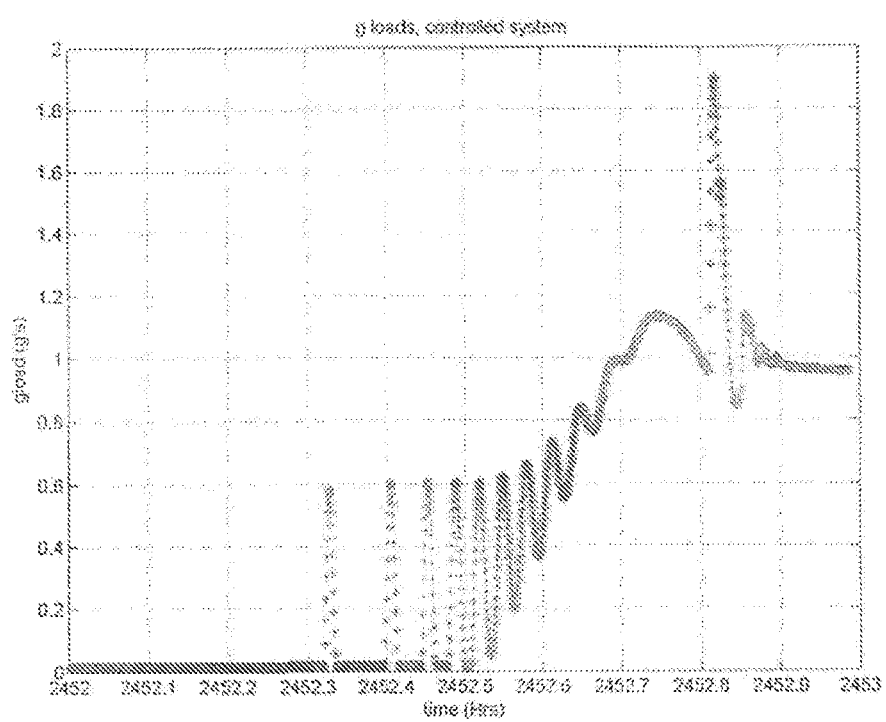
FIG 103: g-loads on the fore-body, controlled system

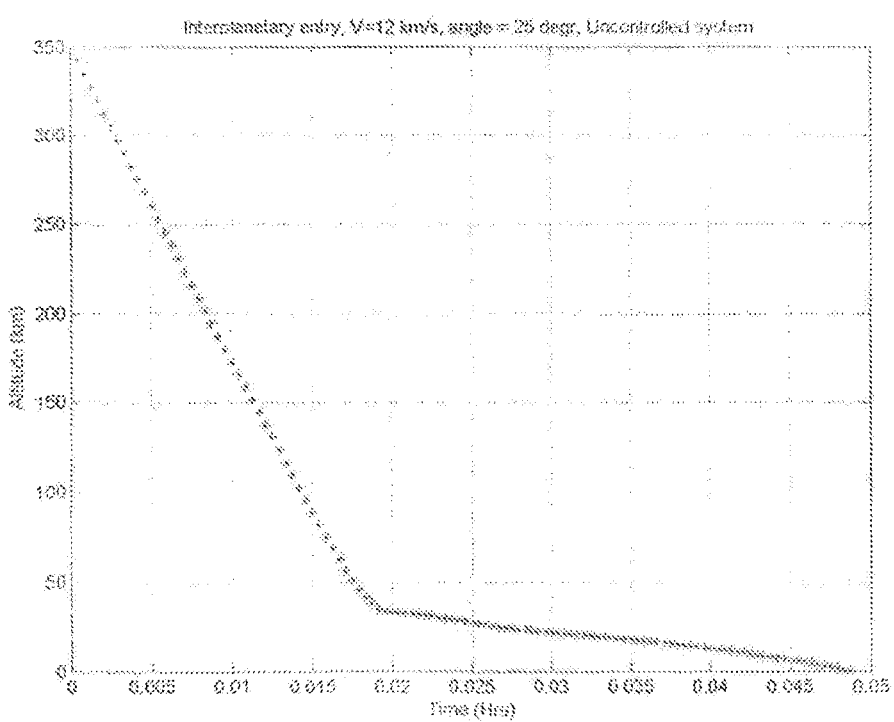
FIG 104: Interplanetary entry, altitude versus time, uncontrolled system.

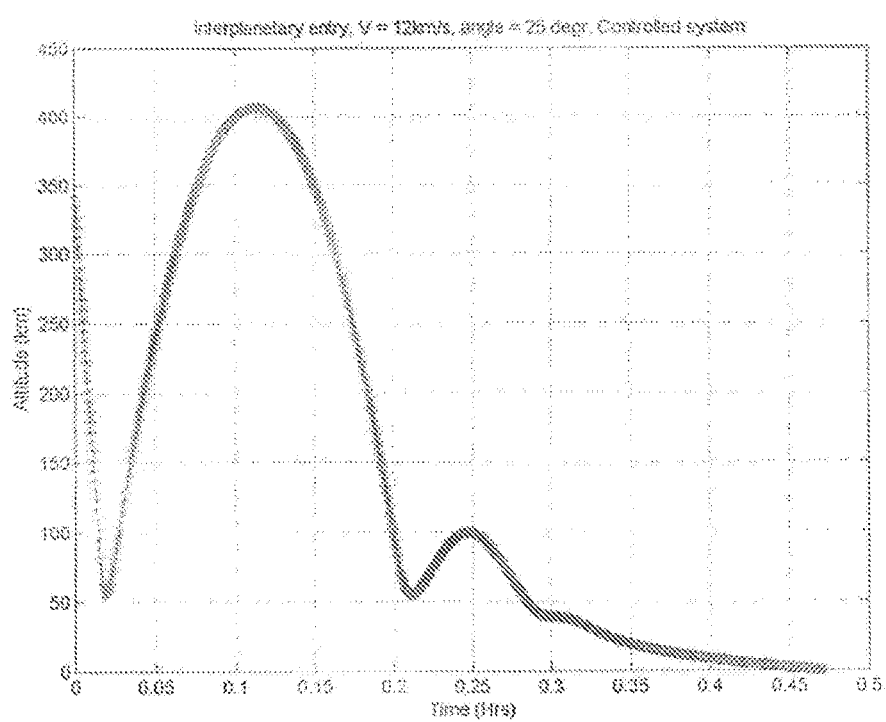
FIG 105: Interplanetary entry, altitude versus time, controlled system.

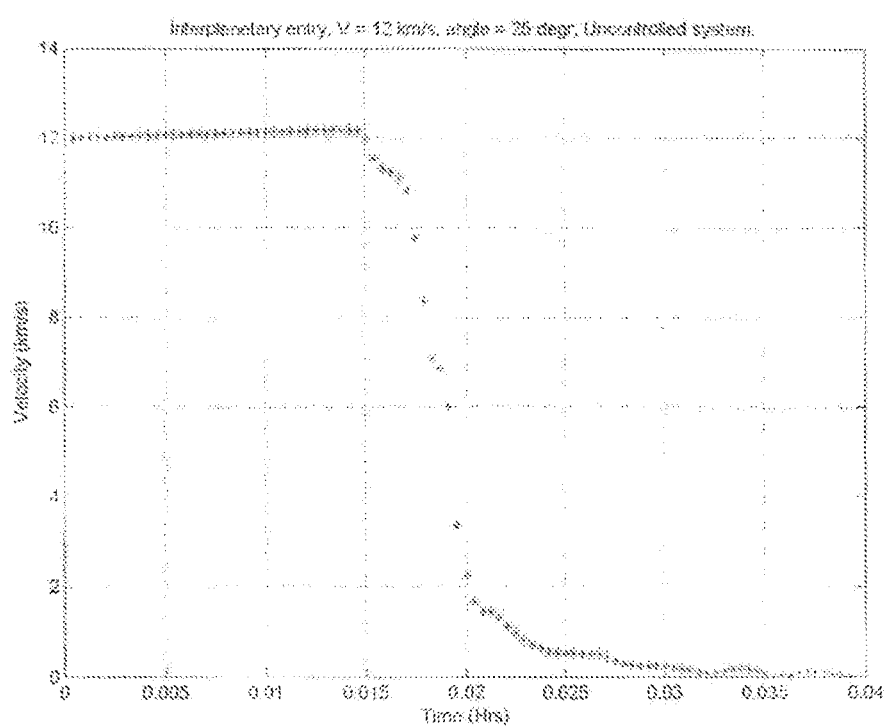
FIG 106: Interplanetary entry, velocity versus time, uncontrolled system.

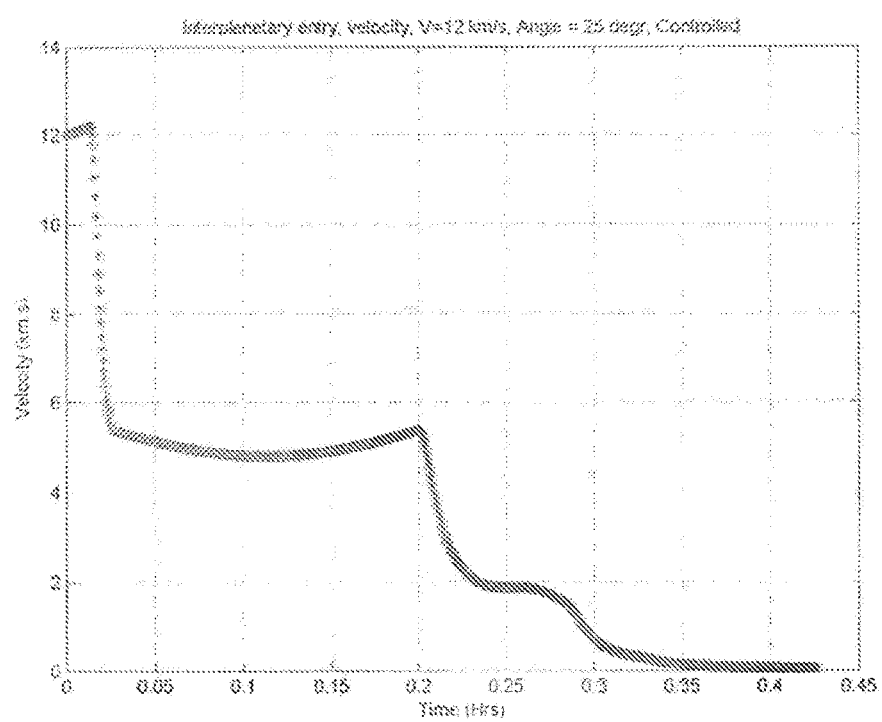
FIG 107: Interplanetary entry, velocity versus time, controlled system.

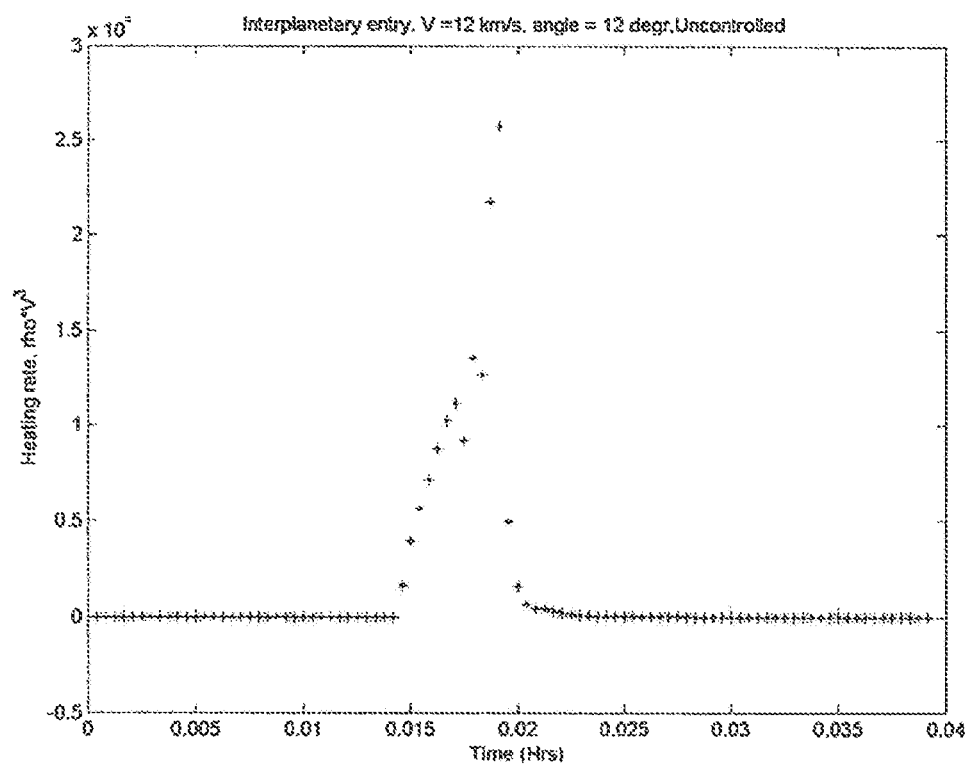
FIG 108: Interplanetary entry, heating rate estimate, uncontrolled system.

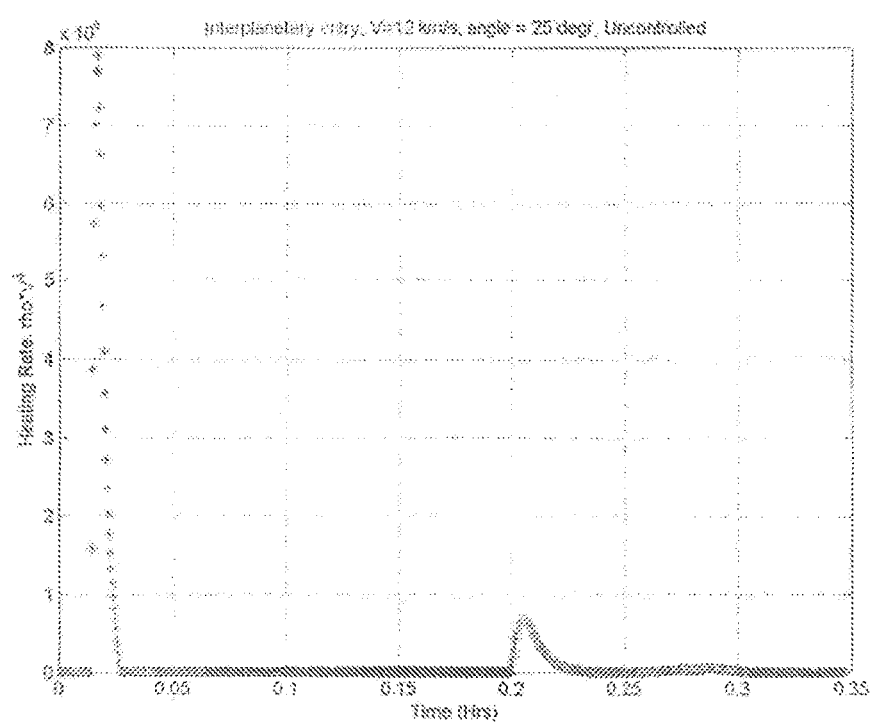
FIG 109: Interplanetary entry, heating rate estimate, controlled system.

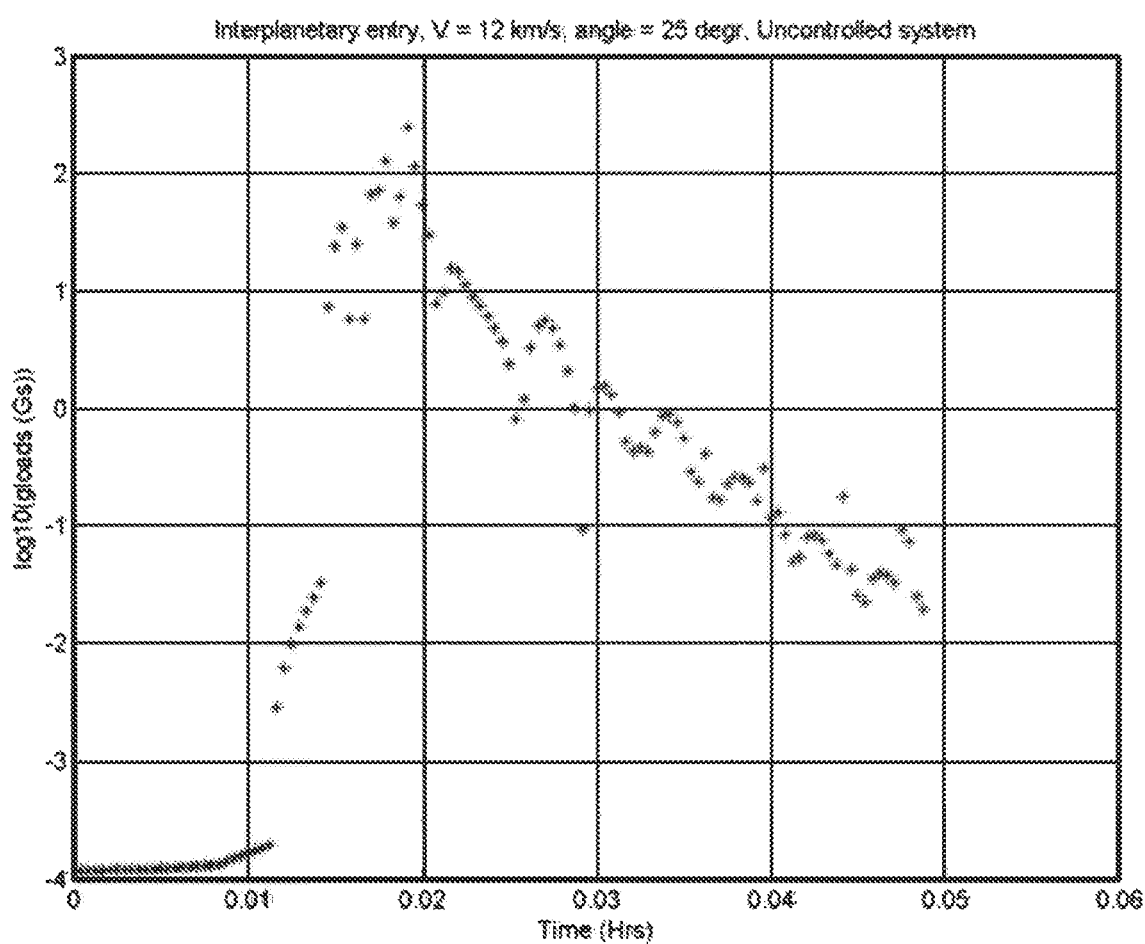
FIG 110: Interplanetary entry, g-loads, uncontrolled system.

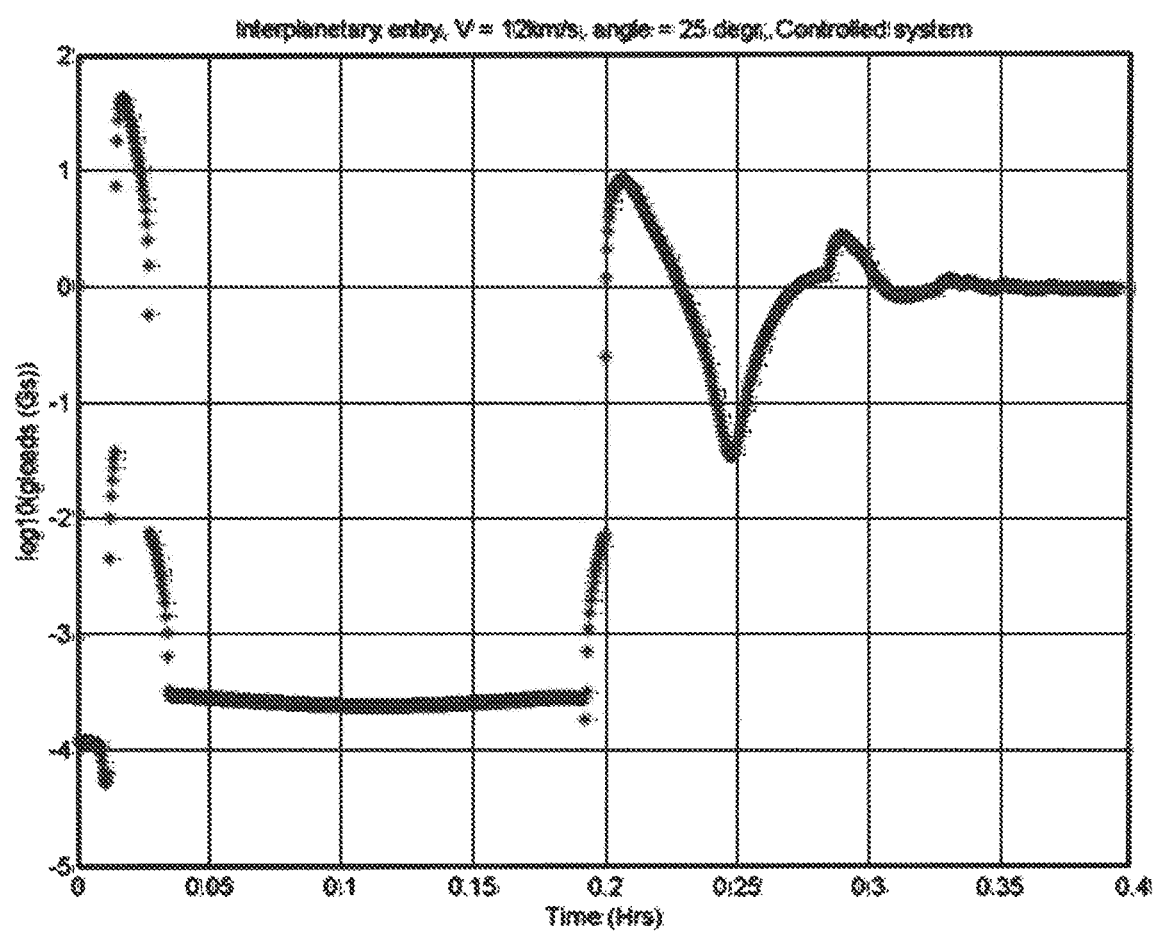
FIG 111: Interplanetary entry, g-loads, controlled system.

TETHER FOR SPACECRAFT REACTION CONTROL SYSTEM

CROSS-REFERENCE TO RELATED APPLICATIONS

This application is a continuation in part of and claims the benefit of U.S. application Ser. No. 14/025,822 filed on Sep. 13, 2013, which application claims the benefit of Patent Cooperation Treaty application number US2012/028841 filed Mar. 12, 2012 and U.S. provisional application No. 61/801,092 filed Mar. 15, 2013, which applications are hereby incorporated by reference.

STATEMENT RELATED TO FEDERALLY SPONSORED RESEARCH OR DEVELOPMENT

Not Applicable

FIELD OF THE INVENTION

The present invention pertains generally to safely return spacecrafts and space vehicles to earth's surface. The term "returnable" refers to the ability of spacecraft to leave and later reenter planetary atmospheres and reach the planet's surface intact and safe. More specifically, the invention pertains to control systems and methods of control for returnable space vehicles re-entering planetary atmosphere.

BACKGROUND OF THE INVENTION

Atmospheric re-entry refers to the process by which vehicles outside of a planet's atmosphere can enter or reenter the atmosphere and reach the surface of the planet intact. The technology for atmospheric re-entry owes its origins to the development of intercontinental ballistic missiles (ICBMs) during the Cold War. Early calculations showed that the kinetic energy of a nuclear warhead returning from orbit was sufficient to completely vaporize the warhead. In order to prevent a spacecraft from suffering a similar fate, several obstacles had to be overcome. There are difficulties that are inherent aspects of atmospheric entry caused by high velocity transit through an atmosphere. These problems include high temperatures generated by friction between the entry system and the atmosphere while the atmospheric entry system is traveling through the atmosphere at high velocities, high acceleration loads experienced by the reentry system and its payload due to rapid changes in the system's velocity, and difficulty of controlling the flight path as the system descends through an atmosphere due to several causes including poor aerodynamics, high velocities, and the requirement of fast reacting guidance methods. Each of these problems can be mitigated by allowing the atmospheric transit to occur over a longer period of time to allow for better flight control and less extreme aeroheating.

The transportation of a space object through an atmosphere is not necessarily difficult. All that must occur is that the gravitational attraction between the object in space and the celestial body overcome the other forces acting on the object. This results in a ballistic entry into and through the atmosphere of the celestial body, followed by the object reaching the surface of the celestial body. However, entering and traversing an atmosphere ballistically is relatively uncontrolled and can be physically damaging to the object entering the atmosphere, its payload, or to the celestial body. The energy put into a spacecraft by the launch system, usually a powerful rocket, must be removed from the spacecraft before it can land without damage. The spacecraft starts at zero altitude and zero velocity. It is then accelerated to a high velocity by the launch system. For example, the velocity required to keep a spacecraft in low Earth orbit is about 18,000 miles per hour while a spacecraft on a direct return from the Moon will have a reentry velocity of about 25,000 miles per hour. The kinetic energy (Ek) of the returning spacecraft is equal to half the mass (m) of the spacecraft multiplied by the square of the spacecraft's velocity (v), expressed as $Ek=\frac{1}{2}mv^2$. The potential energy (Ep) of a returning spacecraft is its altitude (h) multiplied by its mass (m) and a gravitational constant (g), expressed as $Ep=mgh$. Most of a spacecraft's kinetic energy must be removed during reentry by aerodynamic drag between the spacecraft and the atmosphere for the spacecraft to land safely. This is why reentering spacecraft must have effective thermal protection systems, "heat shields," and even with effective thermal protection the temperature on the aerodynamic surface of the spacecraft can rise to thousands of degrees because all of the kinetic energy of the spacecraft's velocity is removed in only a few minutes of flight. This heating causes the plasma "fireball" that surrounds a reentering spacecraft.

Deceleration is one obstacle in atmospheric re-entry. The Earth's rotational velocity is approximately 1000 miles per hour at the equator, and slower as a cosine function at higher latitudes. When a spacecraft leaves Earth orbit and prepares for re-entry, it can be traveling as fast as 18,000 mph. From the time of re-entry to just before landing, the spacecraft must decelerate to match the Earth's rotational velocity as closely as possible. Deceleration is generally accomplished by relying on atmospheric friction and drag (i.e. using wind resistance), a technique known as aerobraking. Aerobraking, however, presents another obstacle. The air in the Earth's atmosphere is composed mostly of nitrogen and oxygen. When an object such as a spacecraft moves through the atmosphere at supersonic speeds, it generates shockwaves as it collides with particles in the atmosphere. Since the orbital velocity for most spacecraft is about 25 times the speed of sound, air molecules in the path of the spacecraft are "shock heated", i.e. compressed so violently that the temperature of the shockwaves increases to several thousand degrees. To provide an example, meteorites entering the Earth's atmosphere are often vaporized by their own shock waves. Because of shock heating, re-entry space vehicles require a heat shield of some form, usually comprising ablative materials and highly effective insulators. The spacecraft must also have great structural strength to bear the deceleration mechanical loads generated by these forces which have been measured to be 6 to 40 gravities or more (60-400 m/s$^2$)

Additionally, a spacecraft's speed and the resulting collisions with molecules in the atmosphere break up neutral atoms and molecules into electrons and ions. In high speed flows, shock heating and viscous dissipation in the boundary layers will first lead to a dissociation of the participating molecules (breaking the molecules into their individual atoms). At higher temperatures the collisions are so violent that the electrons are knocked clear of the nucleus. These free electrons and ions form plasma. Re-entry vehicles all generate plasmas due to shock and boundary layer heating, Radio waves cannot penetrate the highly conductive plasma, and therefore, re-entry vehicles suffer from a temporary radio blackout during re-entries.

Resulting heat from collisions with molecules in the atmosphere makes it imperative for a spacecraft's re-entry "angle of attack," relative to the atmosphere, to fall within a certain range. The angle of attack must be oriented so that the heatshield absorbs the bulk of the re-entry heat. If the angle of attack is too shallow, the spacecraft will skip off the atmosphere and back towards space (similar to a stone being skipped across the surface of a lake. If the spacecraft's angle of attack is too steep, the spacecraft risks burning up due to extremely high heat loads from excess friction with air molecules. The window of a successful angle of attack depends on the spacecraft's geometry, speed, and surrounding air density. Air is less dense in the upper atmosphere, and thus, a spacecraft will encounter less friction. By approaching the Earth at a shallow angle, the spacecraft can spend more time in the upper atmosphere and increase the duration of deceleration. As the spacecraft moves lower into the atmosphere, it may have to adjust its angle of attack by means of a reaction control system, a mechanism for attitude control.

A reaction control system (RCS) is a subsystem of a spacecraft that is used for reentry flight dynamics. Its purpose is for attitude control and steering. Attitude control refers to control of the angular position or rotation of the spacecraft relative to the object it is orbiting. These angles are referred to as pitch, yaw and roll. An RCS system is capable of providing small amounts of thrust in a desired direction or combination of directions. An RCS system is also capable of providing torque to allow control of rotation. This is in contrast to a spacecraft's main engine, which is only capable of providing thrust in one direction, but is much more powerful. RCS systems can be used not only for attitude control during re-entry, but also for station keeping in orbit, close maneuvering during docking procedures, control of orientation, and as a backup means of de-orbiting.

On Apr. 12, 1961, the Soviet space program launched Vostok I, the first manned space flight. Although the service module of Vostok I had a nitrogen gas RCS system, the re-entry capsule lacked an RCS system and was unable to perform attitude control in flight. Hence, the Vostok I re-entry capsule was designed as a sphere with a heat-shield covering the entire outer surface of the capsule.

U.S. Pat. No. 3,093,346, by Faget, discloses a space re-entry capsule with attitude control via means of generating torque thrusts. The '346 patent was the design for the space capsules for Project Mercury, the first United States manned flight space program. The Mercury capsules were equipped with hydrogen peroxide (H202) RCS systems providing thrust for attitude control.

Over the years, RCS systems have improved, but generally maintain the same operating concepts. Conventional RCS systems are limited by the amount of fuel the spacecraft can carry. If the fuel is completely exhausted before reentry is achieved, the spacecraft will lose its ability for attitude control.

Beginning with the United States Gemini Program, the standard for fuel on many RCS systems has been a hi-propellant hypergolic liquid combination of an oxidizer and hydrazine or a hydrazine derivative. One example is monomethyl hydrazine ($CH_3N_2H_2$) with nitrogen tetroxide ($N_2O_2$) as an oxidizer. As a hypergolic combination, the constituents ignite on contact with each other and create the thrust force for the RCS system. The disadvantages are that hydrazine, hydrazine derivatives, and nitrogen tetraoxide are generally expensive and toxic. Orion Propulsion, Inc. has developed an oxygen and methane RCS thruster for use on spacecraft. However, the inventor is not aware of an RCS system that uses oxygen or a mixture of oxygen and other gases (i.e. nitrogen) breathable by humans having the further feature of serving as part of a secondary life support system.

Because spacecraft can only carry a finite amount of fuel with little chance to refill, some alternative RCS systems have been developed so that fuel can be conserved. One such alternative RCS system used momentum wheels which spin to control rotational rates on a vehicle. U.S. Pat. Nos. 6,834,561, 6,463,365, and 5,386,738 describe a control moment gyroscope ("CMG") for spacecraft attitude control consisting of a spinning rotor and one or more motorized gimbals that tilt the rotor's angular momentum. As the rotor tilts, the changing angular momentum causes a gyroscopic torque that rotates the spacecraft.

A tether is a long cable usually made of thin strands of high-strength fibers and/or conducting wires. It is known in the art to use tethers to decelerate and deorbit an object in orbit around a celestial body. The inventor is not aware of any publication describing the use of a tether for spacecraft attitude control.

The NASA Hypersonic Inflatable Heat Shield Prototype which was tested suborbitally on Jul. 23, 2012 is an example of an inflatable reentry system. This inflatable aeroshell flew on a suborbital trajectory to an altitude of 450 km, was inflated from a 22 inch wide 308 kg capsule into a 10 foot wide aeroshell, and reentered successfully. This inflatable aeroshell, although having the great benefit of being lightweight, experienced 20 gravities of force and 1,000 degrees Fahrenheit of heat load during the suborbital reentry.

Another example of an inflatable aeroshell reentry system is the Russian Inflatable Re-entry and Descent Technology system that was launched to Low Earth Orbit in February 2000 from the Baikonur Cosmodrome. After completing six orbits of the Earth, the system reentered, but it also experienced extreme and uncontrollable thermal and force loads.

It should be noted that both of these inflatable reentry aeroshell vehicles incorporate robust thermal protection systems adapted to withstand ballistic reentry from hypersonic and orbital velocities. Neither of these aeroshell inflatable reentry systems has any means of controlling its trajectory, angle of attack or G force load.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present invention is directed at a system, method, or apparatus satisfying the need to overcome the fuel limitations and costs of conventional RCS systems.

An embodiment allows spacecraft attitude control by generating moments about the center of mass, producing an angular acceleration. An embodiment does not require motorized gimbals and spinning rotors to generate a torque force. Rather, torque is generated by producing a friction force on a tether at a distance from an axis of rotation. In accordance with an embodiment, there is a length of tether extending from the forward section of a space capsule in a manner such that the tether's force line is aligned perpendicularly through the capsule's center of mass. "Forward section" as used herein, is in reference to the forward section of a spacecraft during the launching phase. The tether is held by a reel which can vary the length of the section of tether extended from the body of a spacecraft. The tether can be kept enclosed within the capsule during flight and deployed or extended using a reel when the capsule is preparing for re-entry. The reel can be operated by crew members or remotely from a mission control facility on Earth. An excessive length of tether is wound about the reel so that additional tether can be unreeled in the event that part or all of the extended portion of tether is severed or burned away from the spacecraft during re-entry. The tether, when extended from the forward section of the space capsule, functions as a hypersonic parachute, decreasing the capsule's velocity via drag forces.

In accordance with an embodiment, the tether can be made of a heat resistant material with conductive properties making it suitable to function as an antenna. The unexposed end of the tether can be integrated with the spacecraft's radio communications system. The entire length of tether can serve as an antenna for transmitting and receiving radio communications. The reel can feasibly extend the tether to a sufficient length for radio communications to avoid the conductive plasma generated from shock and boundary heating during re-entry, allowing continuous radio communications.

An embodiment, can comprise a "tether direction control apparatus" (hereinafter referred to as "control apparatus") for offsetting the tether's force line away from a space capsule's center of mass for the purpose of attitude control. If there is no offset, the control apparatus remains in a "zero position", or centrally aligned with the capsule's z-axis. During re-entry flight, due to drag forces, the extended tether will hold a position parallel to the direction of air resistance relative to the capsule. By offsetting the tether while a drag force is exerted upon it, a moment equal to the drag force multiplied by the distance of the offset from the control apparatus's zero position will be produced about the capsule's center of mass. Moments created by the offset and drag forces can be used to alter pitch, yaw and roll with regards to attitude control.

Certain embodiments can comprise a propellant-based RCS system to serve as a backup system for spacecraft attitude control in the event that a primary tether-based RCS system fails to operate successfully. The propellant-based RCS system functions on the same principle as traditional propellant-based RCS systems, in that it provides attitude control via a series of torque thrusts generated by exhaust of a gas propellant through translation thrusters. The placement of the translation thrusters generally requires that the thrust vector be aligned to pass through the z-axis of the spacecraft or an unwanted roll or rotation will result when the thrusters are fired.

An embodiment's propellant-based RCS system can comprise a ventilation line connected to a backup life support system. For certain embodiments, the propellant comprises compressed oxygen gas. The propellant can comprise a combination of compressed oxygen and other gases (i.e. nitrogen) in a ratio suitable for sustaining human life. In the event that oxygen levels in the passenger cabin fall below a safe level for humans, the backup life support system can be activated by controls within the spacecraft or automatically activated when one or more sensors detect oxygen and/or carbon dioxide levels.

BRIEF DESCRIPTION OF FIGURES

The present invention is illustrated by way of examples, not by way of limitation, in the figures of the accompanying drawings and in which like reference numerals refer to similar elements and in which:

FIG. 1 illustrates a cut-away side-view of a forward section of a space capsule prior to the re-entry phase, showing a tether-based RCS system comprising a control apparatus and a reel for holding a length of tether, in accordance with an embodiment.

FIG. 2 illustrates a cut-away side-view of a forward section of a space capsule during the re-entry phase, showing a tether-based RCS system comprising a control apparatus and a reel for holding a length of tether and varying the "free tether" length extending outwards from said control apparatus and beyond a spacecraft body, in accordance with an embodiment.

FIG. 3 is a side view of a reel mechanism for holding a length of tether and varying the length of the portion of said tether extending from a spacecraft body, in accordance with an embodiment.

FIG. 4 is a top view of a forward section of a space capsule showing a control apparatus in its zero position, in accordance with an embodiment.

FIG. 5 is a top view of a propellant based backup RCS system, in accordance with an embodiment.

FIG. 14 is a top view looking down on a space capsule re-entering the atmosphere, illustrating the steps by which said space capsule uses a tether-based RCS system to adjust yaw to steer said space capsule's approach vector to the right of the z-axis, relative to said capsule's orientation in the present illustration, in accordance with an embodiment.

FIG. 15 is a top view looking down on a space capsule re-entering the atmosphere, illustrating the steps by which said space capsule uses a tether-based RCS system to adjust yaw to steer said space capsule's approach vector to the left of the z-axis, relative to said capsule's orientation in the present illustration, in accordance with an embodiment.

FIG. 16 is an isometric drawing of an embodiment that comprises an aerodynamic decellerator comprising a tether, an aerodynamic vehicle comprising an inflatable aeroshell reentry system, and a control system that connects the tether to the vehicle, the control system comprising three lines whose length can be mechanically varied to change the angle of attack of the vehicle.

FIG. 17 shows an embodiment comprising a tether RCS attached to an Excalibur Almaz reuseable reentry vehicle.

FIG. 18 shows an embodiment comprising a tether RCS attached to a US Air Force X-37B robotically controlled reusable spacecraft.

FIG. 19 shows an embodiment comprising a tether RCS attached to a Russian Soyuz single use reentry vehicle.

FIG. 20 shows details of an example control apparatus.

FIG. 21 illustrates a trajectory according to an example method for atmospheric skip entry.

FIG. 22 Mathematical model: Rotating reference frame and coordinate system

FIG. 23 Mathematical model: Lumped mass model of the tether.

FIG. 24 Mathematical model: Altitude as a function of mean free path in the atmosphere FIG. 25 Mathematical model: Geometry for calculation of aerodynamic forces FIG. 26 Mathematical model: Initial position of tether, assuming it has been gravity gradient stabilized in exo-atmospheric flight.

FIG. 27 Mathematical model: Maximum distances along the y-axis (gravity gradient initial conditions, specular reflection.

FIG. 28 Mathematical model: Tether shape at t=25.9 s, specular reflection case.

FIG. 29 Mathematical model: Tether shape at t=41.4 s, specular reflection case.

FIG. 30 Mathematical model: Tether shape at t=46.6 s, specular reflection case.

FIG. 31 Mathematical model: Tether shape at t=82.77 s, specular reflection case.

FIG. 32 Mathematical model: Tether shape at t=142.24 s, specular reflection case.

FIG. 33 Mathematical model: Tether shape at t=186.2 s, specular reflection case.

FIG. 34 Mathematical model: Tension distribution at t=623.3 s, specular reflection case.

FIG. 35 Mathematical model: Tether shape at t=25.9 s, diffuse reflection case.

FIG. 36 Mathematical model: Tether shape at t=46.5 s, diffuse reflection case.

FIG. 37 Mathematical model: Tether shape at t=51.7 s, diffuse reflection case.

FIG. 38 Mathematical model: Tether shape at t=106.0 s, diffuse reflection case.

FIG. 39 Mathematical model: Tether shape at t=162.9 s, diffuse reflection case.

FIG. 40 Mathematical model: Tether shape at t=217.2 s, diffuse reflection case.

FIG. 41 Mathematical model: t=61.80, tether equipped with aft-body.

FIG. 42 Mathematical model: t=139.37, tether equipped with aft-body

FIG. 43 Mathematical model: t=213.83, tether equipped with aft-body.

FIG. 44 Mathematical model: t=291.15, tether equipped with aft-body.

FIG. 45 Mathematical model: t=366.39, tether equipped with aft-body.

FIG. 46 Mathematical model: t=433.97, tether equipped with aft-body.

FIG. 47 Mathematical model: t=519.98, tether equipped with aft-body.

FIG. 48 Mathematical model: t=904.74, tether equipped with aft-body.

FIG. 49 Mathematical model: Shape at time 1801.2, when the maximum displacement from the x axis falls below 1 km for the tether equipped with aft-body.

FIG. 50 Mathematical model: Tension distribution at time 1801.2 (with shape in 5.6.a).

FIG. 51 Mathematical model: Values of the maximum displacements from the x axis and the times at which the maxima occur.

FIG. 52 Mathematical model: Maximum distances along the y-axis (gravity gradient initial conditions, specular reflection FIG. 53 Mathematical model: Initial sag of the tether starting from the position along the x axis with the stream speed 80% of the orbital speed.

FIG. 54 Mathematical model: Subsequent rebound of the tether.

FIG. 55 Mathematical model: After an extended period, traveling waves begin to appear along the tether length and standing waves persist at the free end.

FIG. 56 Mathematical model: Tension distribution at t=5192.1 s

FIG. 57 Mathematical model: Initial sag and rebound for a 2 m radius aft-body

FIG. 58 Mathematical model: Static tether shape for the 2 m radius aft-body case FIG. 59 Mathematical model: Static tension distribution for the 2 m radius aft-body case FIG. 60 Mathematical model: Stability chart in the ($V/V_0$, H) plane, all other tether parameters as previously given, and without an aft body.

FIG. 61 Mathematical model: Early in the simulation, the tether shape is still very close to its equilibrium solution FIG. 62 Mathematical model: Counterpart to FIG. 61. At 19.4 s the tension remains close to the equilibrium distribution.

FIG. 63 Mathematical model: starting at 194 s, a 140 s half-period lateral oscillation is observed FIG. 64 Mathematical model: Lateral amplitude is reduced but a strongly curled lateral motion "whip lash" occurs near the free end.

FIG. 65 Mathematical model: The "whip lash", in FIG. 64 is accompanied by a distinct tension wave near the free end, which travels toward the attachment point.

FIG. 66 Mathematical model: At 646 seconds, higher order lateral waves dominate.

FIG. 67 Mathematical model: At time 646 s, high order longitudinal vibration begins to amplify FIG. 68 Mathematical model: At 737 s, high-order, but reduced amplitude lateral motion persists.

FIG. 69 Mathematical model: Near 737 s, longitudinal waves increase in amplitude sufficiently to produce slack regions near the free end.

FIG. 70 Mathematical model: After about 15 minutes, chaotic lateral motion begins near the free end.

FIG. 71 Mathematical model: Counterpart to FIG. 68 Chaotic longitudinal motion.

FIG. 72 Mathematical model: 0.5 m radius aft-body, initial shape oscillation.

FIG. 73 Mathematical model: 0.5 m radius aft-body, initial tension variation.

FIG. 74 Mathematical model: 0.5 m radius aft-body, a later shape oscillation.

FIG. 75 Mathematical model: 0.5 m radius aft-body, tension variation corresponding to FIG. 74.

FIG. 76 Mathematical model: 0.5 m radius aft-body, final convergence of the shape.

FIG. 77 Mathematical model: 0.5 m radius aft-body, final convergence of the tension.

FIG. 78 Mathematical model: Rotating reference frame and coordinate system for the fore-body dynamics.

FIG. 79 Mathematical model: Three successive rotations defining the roll, yaw and pitch Euler angles of the fore-body-fixed reference frame.

FIG. 80 Mathematical model: Conceptual sketch of a generic fore-body.

FIG. 81 Mathematical model: Drag polar for the Fore-body model (A=3).

FIG. 82 Mathematical model: Altitude versus time for the fore-body without tether, stating at various altitudes with $\beta=0$, and initial velocity 95% of orbital velocity.

FIG. 83 Mathematical model: Altitude versus time for the combined system for the severe entry case.

FIG. 84 Mathematical model: Tether shape at 146.9 km altitude.

FIG. 85 Mathematical model: Tether shape at 137.8 km altitude.

FIG. 86 Mathematical model: Tether shape at 132.9 km altitude.

FIG. 87 Mathematical model: Tether shape at 125.2 km altitude.

FIG. 88 Mathematical model: Tether shape at 106 km altitude.

FIG. 89 Mathematical model: Tether shape at 68 km altitude.

FIG. 90 Mathematical model: Altitude versus time for the coupled system in the shallow entry case.

FIG. 91 Mathematical model: Alternate description of the attachment point geometry.

FIG. 92 Mathematical model: Comparison of altitude vs time behavior of the system with tether length.

FIG. 93 Mathematical model: First 12 hours of flight (controlled system).

FIG. 94: 48 to 60 hours after initiation (controlled system).

FIG. 95 Mathematical model: 192 to 240 hours after initiation (controlled system).

FIG. 96 Mathematical model: Altitude vs time, final 45 minutes, uncontrolled system.

FIG. 97 Mathematical model: Velocity vs time, final 45 minutes, uncontrolled system.

FIG. 98 Mathematical model: Altitude vs time, final 45 minutes, controlled system.

FIG. 99 Mathematical model: Velocity vs time, final 45 minutes, controlled system.

FIG. 100: Heating rate estimate, uncontrolled system.

FIG. 101 Mathematical model: Heating rate estimate, controlled system.

FIG. 102 Mathematical model: g-loads on the fore-body, uncontrolled system

FIG. 103 Mathematical model: g-loads on the fore-body, controlled system.

FIG. 104 Mathematical model: Interplanetary entry, altitude versus time, uncontrolled system.

FIG. 105 Mathematical model: Interplanetary entry, altitude versus time, controlled system.

FIG. 106 Mathematical model: Interplanetary entry, velocity versus time, uncontrolled system.

FIG. 107 Mathematical model: Interplanetary entry, velocity versus time, controlled system.

FIG. 108 Mathematical model: Interplanetary entry, heating rate estimate, uncontrolled system.

FIG. 109 Mathematical model: Interplanetary entry, heating rate estimate, controlled system.

FIG. 110 Mathematical model: Interplanetary entry, g-loads, uncontrolled system.

FIG. 111 Mathematical model: Interplanetary entry, g-loads, controlled system.

DETAILED DESCRIPTION

Figure 6:
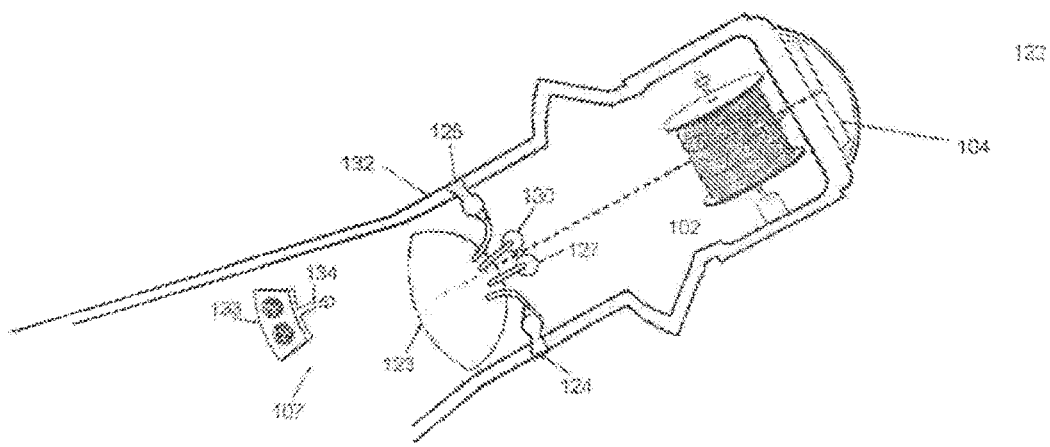
FIG. 6 is a side view of a propellant based backup RCS system, in accordance with an embodiment.

In the following description, for purposes of explanation, numerous specific details are set forth in order to provide a thorough understanding of the present invention. It will be apparent, however, that the present invention may be practiced without these specific details. In other instances, well-known structures and devices are shown in block diagram form to avoid unnecessarily obscuring the present invention.

FIG. 1 illustrates a cut-away side-view of a forward section of a space capsule 100 prior to the re-entry phase, showing a tether-based RCS system comprising a control apparatus 104 and a reel 102 for holding a length of tether 103, in accordance with an embodiment. Prior to re-entry, the opening at the end of the forward section of the capsule is covered by a lid 101 for keeping an initial length of unreeled tether 105 confined within the capsule. The unreeled tether 105 is the portion of tether held by the reel 102 that is threaded through a "center hole" 106 of the control apparatus 104 and is initially coiled and stored above the control-apparatus 104. As used herein, "center hole" or the like refers to the hole in the center of the control apparatus 104 through which a tether 103 is threaded. The control apparatus 104 is initially in a zero position. As used herein, zero position refers to the default position where the control apparatus' center hole is directly aligned with a spacecraft's z-axis 107 that passes through a spacecraft's center of mass.

FIG. 2 illustrates a cut-away side-view of a forward section of a space capsule 100 during reentry, showing a tether-based RCS system comprising a control apparatus 104 and a reel 102 for holding a length of tether 103 and varying the length of a portion of "free tether" 105, in accordance with an embodiment. As used herein, "free tether" or the like refers to the portion of a tether 103 which extends outwards from the control apparatus 104 and beyond a spacecraft's body.

A lid 101 covering the opening at the forward section of the capsule detaches from the capsule body 100 during re-entry and prior to the release of the tree tether 105 from the capsule body 100, the detachment may be triggered via controls within the capsule or remotely from a mission control facility on Earth. At this point, the lid 101 can be considered to be a discarded expendable component. The free tether 105 is released from the capsule 100. The tether 105 remains threaded through the center hole 106 of the control apparatus 104 and held in place by the reel 102. The control apparatus 104 is initially in a zero position.

FIG. 3 is a side view of a reel mechanism 102 for holding a length of tether 103 and for varying the length of the free tether 105, in accordance with an embodiment. The reel 102 comprises two circular flanges 108 and a cylindrical shaft 109 situated horizontally between said circular flanges 108, said circular flanges 108 having equal radii substantially larger than the radius of said cylindrical shaft 109.

Each end of the cylindrical shaft 109 is connected to the center of a circular flange 108. During flight, the tether 103 is stored by being wound around the cylindrical shaft 109 on the reel 102, between the flanges 108. One circular flange 108 is connected to a driveshaft 110, said driveshaft 110 being further connected to a motor 111. The motor 111 is bi-directional and turns the driveshaft 110 clockwise or counter-clockwise. When driven by the motor 111, the driveshaft 110 turns the reel 102 accordingly and retracts or extends the tether 103 depending on the direction of the motor. In this embodiment, turning the driveshaft 110 counter-clockwise extends the tether, or causes free tether 105 to lengthen, and turning the driveshaft 110 clockwise retracts the tether 103 shortening the free tether 105, The motor 111 is powered by a power source 112, and can be controlled via an interface 113 from the spacecraft's controls.

The free tether 105 remains threaded through the center hole 106 of a control apparatus 104, initially in a zero position. The free tether 105 remains loosely coiled above the control apparatus 104 and remains so until the spacecraft is ready for atmospheric re-entry. On re-entry, the free tether 105 is released into the atmosphere and drags behind the spacecraft, serving as a hypersonic parachute. The unexposed end 114 of the tether 103 is interfaced with the spacecraft's radio communications system 115, allowing the tether 103 to function as a radio antenna during atmospheric re-entry. Highly conductive plasma forms as a result of shock and boundary layer heating during atmospheric re-entry, blocking radio waves. The free tether 105 extends far behind the spacecraft, avoiding the conductive plasma and allowing the spacecraft to send and receive radio transmissions during re-entry. The tether 103 is made of a heat-resistant conductive material such as aluminum or steel for sending and receiving radio communications and withstanding the high temperature of the conductive plasma.

FIG. 4 is a top view of a forward section of a space capsule showing a control apparatus 104 in the zero position, in accordance with an embodiment of the present invention. The control apparatus 104 is connected to four identical retracting arms 116, 117, 118, 119 equidistant from each other along the inner hull 120 of the space capsule. Relative to the x-y axes as shown in FIG. 4, the retracting arms 116, 117, 118, 119 are denoted as follows: "positive-x" 116, "negative-x" 117, "positive-y" 118, and "negative-y" 119. The control apparatus 104 has a center hole 106 through which a tether is threaded. Initially, the control apparatus 104 is in the zero position. The retractable arms 116, 117, 118, 119 are connected to the control apparatus 104 by a total of eight identical tension springs 121, designed to become longer under load. Each arm 116, 117, 118, 119 is connected to the control apparatus 104 by two tension springs 121. When one of the retracting arms 116, 117, 118, 119 retracts into the inner hull 120, a load affects all the springs 121. The tension springs 121 have turns normally touching in the unloaded position, and the springs 121 have a hook, eye, or some other means of attachment at each end connecting it to the retracting arms 116, 117, 118, 119 and the control apparatus 104.

FIG. 5 is a top view of a propellant based backup RCS system, in accordance with an embodiment. The propellant based RCS system also concurrently functions as part of a backup life support system. The propellant can comprise compressed oxygen, or a combination of compressed oxygen and other gases in a ratio suitable for sustaining human life (i.e. appropriate mixture of oxygen and nitrogen). The propellant is stored in a gas propellant tank 122. There is a central hub mechanism 123 connecting the tank 122 to four gas lines denoted as: positive-x 124, positive-y 126, negative-x 125, and negative-y 127, relative to the x-y axes shown in FIG. 5. The opposite ends of the gas lines 126, 127, 124, 125 are connected to translation thrusters 128, 129, 130, 131 used to alter the spacecraft's velocity or attitude (pitch, yaw, roll). Each thruster 128, 129, 130, 131 has a nozzle directed perpendicularly outward from the capsule's hull 132. Translation thrusters 128, 129, 130, 131 is that should align with the z-axis 107 of the capsule to avoid unwanted roll or rotation when the thruster is fired. Torque thrust is produced by the gas propellant leaving the nozzle as exhaust. A control system inside a spacecraft controls the release of the gas propellant into the gas lines 126, 127, 124, 125, said control system having the ability to selectively release the propellant into single or multiple gas lines.

While the spacecraft has a primary life-support system, the backup RCS system further functions as part of a backup life support system, supplying the breathable gas propellant to the human occupants of the spacecraft should the oxygen or carbon dioxide levels reach a predetermined danger threshold and/or the primary life-support system fails. The gas propellant tank 122 is further connected to a backup life-support system 133 by a ventilation line 134. The backup life-support system comprises carbon dioxide canisters, fans, and filters. The carbon dioxide canisters remove carbon dioxide by reacting it with another chemical (i.e. lithium hydroxide, calcium hydroxide, sodium hydroxide), and the fans and filters remove dust and trace odors from within the spacecraft. The backup life-support system can be activated manually by controls within the spacecraft, or automatically when one or more sensors detect that oxygen or carbon dioxide concentrations have reached an unsafe level.

FIG. 6 is a side view of a propellant based backup RCS system, in accordance with an embodiment. The backup RCS system is located, relative to the tether RCS system comprising the reel 102 and control apparatus 104. A central hub mechanism 123 connects a gas propellant tank 122 to four gas lines 124, 125, 126, and 12. The opposite ends of the gas lines are connected to translation thrusters denoted as: positive-x 128, negative-x 129, positive-y 130 and negative-y 131, with respect to the x-y axes shown in FIG. 10. The translation thrusters 128, 129, 130, 131 are used to alter the spacecraft's velocity or attitude (pitch, yaw, roll angles). Each thruster 128, 129, 130, 131 has a nozzle directed perpendicularly outwards from the capsule's hull 132. The translation thrusters 128, 129, 130, 131 should align with the capsule's z-axis 107. Torque thrust is produced by gas propellant leaving a nozzle as exhaust. A control system inside a spacecraft controls the release of gas propellant into the gas lines. The control system has the ability to selectively release the propellant into single or multiple gas lines.

The backup RCS also functions as part of a backup life support system 133 comprising fans and filters for removing dust, odors, and carbon dioxide. The gas propellant tank 122 is connected to the backup life support system by a ventilation line 134 and can be activated manually by controls within the spacecraft, or automatically when one or more sensors detect that oxygen or carbon dioxide concentrations have reached an unsafe level.

Figure 7:
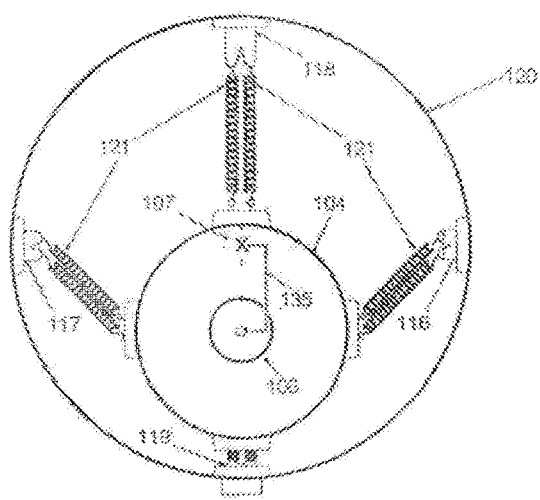
FIG. 7 is a top view of a forward section of a space capsule showing a control apparatus in a "y-axis" offset position, in accordance with an embodiment.

FIG. 7 is a top view of a forward section of a space capsule showing the operation of the control apparatus 104, in accordance with an embodiment of the present invention. The control-apparatus 104 is connected to four identical retracting arms 116, 117, 118, 119 equidistant from each other along the inner hull 120 of the space capsule. Relative to the x-y axes as depicted in FIG. 7, the retracting arms are denoted as follows: "positive-x" 116, "negative-x" 117, "positive-y" 118, and "negative-y" 119. The retractable arms 116, 117, 118, 119 are connected to the control apparatus 104 by eight identical tension springs 121, designed to become longer under load. Each arm 116, 117, 118,119 is connected to the control apparatus 104 by two tension springs 121.

In FIG. 7, the "negative-y" arm 119 is in a retracted position, the body of the arm having been retracted into the inner hull 120 of the space capsule by a retraction means. The retraction of the negative-y arm 116 increases the distance between said negative-y arm 119 and the positive-y arm 118, creating a load on all the springs 121. The load is caused by a movement in the negatively direction, causing the control apparatus 104 to also move in the negative-y direction.

The springs 121 attaching the positive-x and negative-x arms 116, 117 to the control apparatus 104 are also pulled in the negative-y direction by the ends of the springs 121 attached to said control-apparatus 104. The effect is that the center hole 106 is offset from the z-axis 107 in the negative-y direction by the measurement equal to the distance 135 from the center hole's 106 current position and its original zero position. A tether threaded through the center hole 106 would similarly be offset from the z-axis 107.

Figure 8:
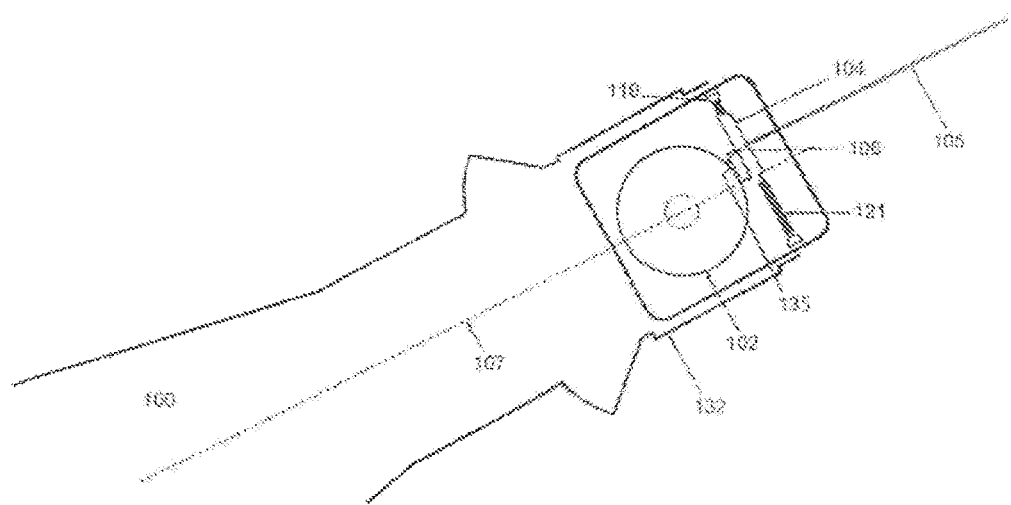
FIG. 8 is a side view showing the effect of a tether's "y-axis" offset, in accordance with an embodiment.

FIG. 8 shows a cut-away side view of the forward section of a space capsule 100 showing an offset 135 of the tether 105 in the negative-y direction due to a retraction of the positive-y arm, in accordance with an embodiment. The tether 105 is attached to and wound around a reel 102, said reel 102 being attached to the capsule body 100, said tether threaded through the center hole 106 of the control apparatus 104. The control apparatus 104 is connected to four retractable arms by tension springs 121. A retraction of the negative-y arm 119 into the capsule's hull 132 creates a load affecting the tension springs 121 in the negative-y direction. As a result, the control apparatus 104 is pulled in the negative-y direction, and a tether 105 threaded through the center hole 106 is offset from the capsule's 100 z-axis 107 by a distance 135 equal to the difference between the center hole's 106 current position and its original zero position.

Figure 9:
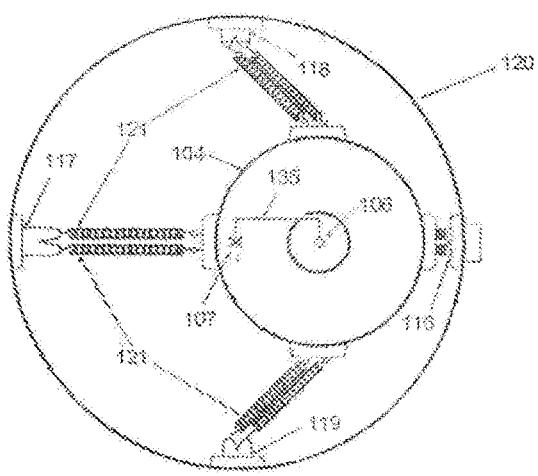
FIG. 9 is a top view of a forward section of a space capsule showing a control apparatus in an "x-axis" offset position, in accordance with an embodiment.

FIG. 9 is a top view of a forward section of a space capsule showing the operation of the control apparatus 104, in accordance with an embodiment. The control apparatus 104 is connected to four retracting arms 116, 117, 118, 119 equidistant from each other along the inner hull 120 of the space capsule.

Relative to the x-y axes as depicted in FIG. 9, the retracting arms are denoted as follows: "positive-x" 116, "negative-x" 117, "positive-y" 118, and "negative-y" 119. The retractable arms 116, 117, 118, 119 are connected to the control apparatus 104 by eight identical tension springs 121, designed to become longer under load. Each arm 116, 117, 118, 119 is connected to the control apparatus 104 by tension springs 121.

In FIG. 9, the positive-x arm 116 is in a retracted position, the body of the arm having been retracted into the inner hull 120 of the space capsule by a retraction means. The retraction of the positive-x arm 116 increases the distance between said positive-x arm 116 and the negative-x arm 117. The retraction of the positive-x arm 116 creates a load on all the springs 121. The load is caused by a movement in the positive-x direction, causing the control apparatus 104 to also move in the positive-x direction. The springs 121 attaching the positive-y and negative-y arms 118, 119 to the control apparatus 104 are also pulled in the positive-x direction by the ends of the springs 121 attached to the control apparatus 104. The effect is that center hole 106 is offset from the z-axis 107 in the positive-x direction by the measurement equal to the distance 135 from the center hole's current position and the zero position. A tether threaded through the center hole 106 would similarly be offset from the z-axis 107.

Figure 10:
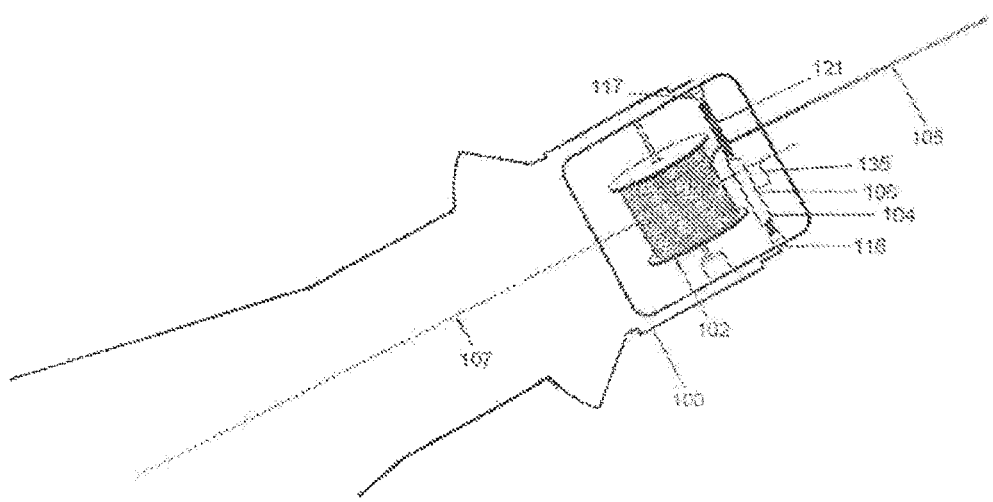
FIG. 10 is a side view showing the effect of a tether's "x-axis" offset, in accordance with an embodiment.

FIG. 10 shows a cut-away side view of the forward section of a space capsule 100 showing an offset 135 of the tether 105 in the positive-x direction after a retraction of the positive-x arm 116, in accordance with an embodiment. The tether 105 is attached to and wound around a reel 102, said reel 102 being attached to the capsule body 100, said tether threaded through the center hole 106 of the control apparatus 104. The control apparatus 104 is connected to the four retractable arms by tension springs 121. A retraction of the positive-x arm 116 into the capsule's hull 132 creates a load affecting the tension springs 121 in the positive-x direction. As a result, the control apparatus 104 is pulled in the positive-x direction, and a tether 105 threaded through the center hole 106 is offset from the capsule's z-axis 107 by a distance 135 equal to the difference between the center hole's 106 current position and its original zero position.

Figure 11:
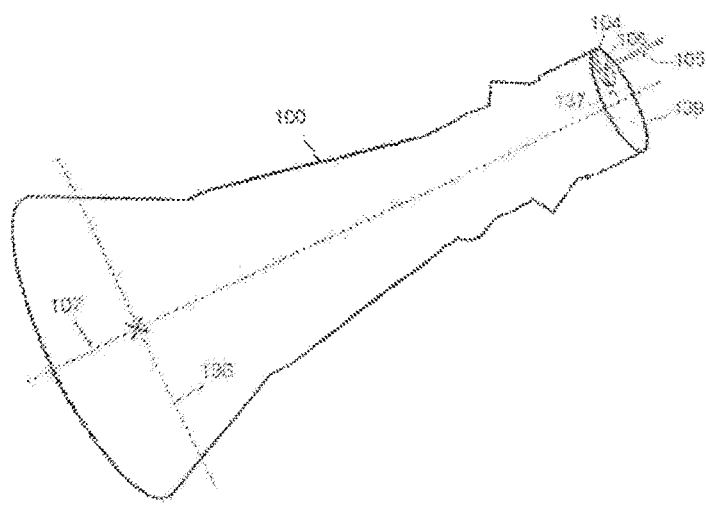
FIG. 11 shows a side view of a space capsule with a tether-based RCS system and illustrates how the RCS system induces attitude control by producing a moment generated by offsetting a tether from a space capsule's z-axis, in accordance with an embodiment.

FIG. 11 shows a cut-away side view of a space capsule 100 with a tether RCS system and illustrates how the RCS system induces attitude control by producing a moment by offsetting a tether 105 from a space capsule's z-axis, in accordance with an embodiment. The tether RCS system has a reel 102 for holding a length of tether 105. The tether 105 is threaded through the center hole 106 of a control apparatus 104, said control apparatus 104 initially in the zero position.

A moment is a rotational effect produced by a force at some distance from an axis of rotation. The moment (M) is equal to the product of the force (F) and the distance (d) from the axis of rotation about which it is applied. In FIG. 11 the control apparatus 104 has shifted the tether 105 along the capsule's x-axis 136 above and out of alignment with the capsule's center of mass line z-axis 107, creating an offset or moment arm 137. The tether's collision with molecules in the atmosphere creates a friction force 138.

The line that passes through the capsule's center of gravity and is perpendicular to both the capsule's z-axis 136 and said moment arm 137 is the axis of rotation and in this case happens to be the y-axis. Moment 139 is the product of the friction force produced by tether 138 and the offset 137, a distance equal to the difference between the center hole's 106 current position and z-axis. Here, the moment 139 acts about the capsule's center of mass in the clockwise direction, as viewed in FIG. 11. The effect of the moment 139 is that the capsule's angle of attack, relative to the atmosphere, decreases. In flight dynamics, this angle is called pitch.

Figure 12:
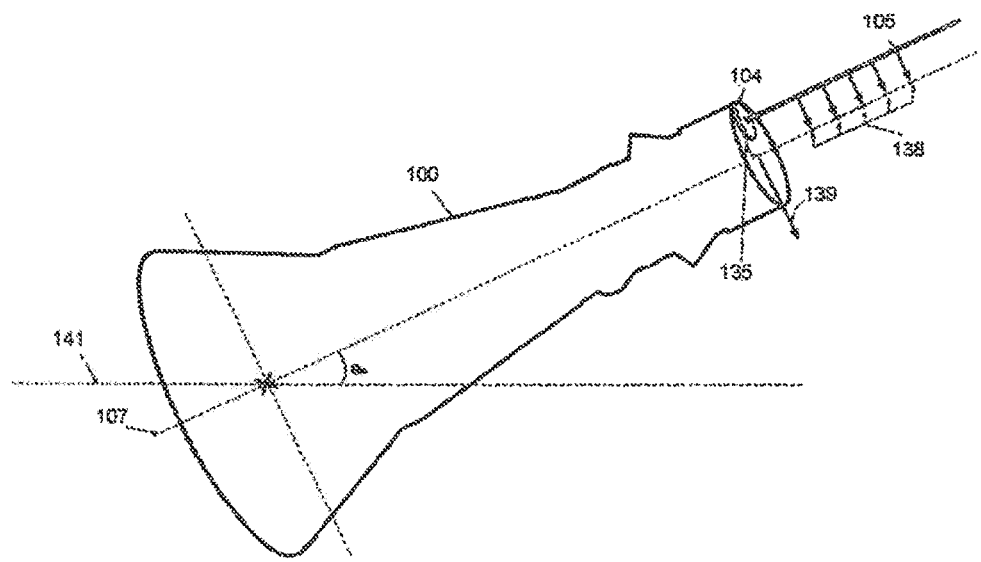
FIG. 12 is a side view illustrating the steps by which a space capsule uses a tether-based RCS system to adjust pitch to decrease a space capsule's angle of attack with respect to the atmosphere, in accordance with an embodiment.

FIG. 12 illustrates the steps by which a space capsule 100 uses a tether-based RCS system to adjust pitch to decrease a space capsule's angle of attack, θA, with respect to the atmosphere 140, in accordance with an embodiment. θA is the angle formed by the capsule's 100 z-axis 107 and the atmosphere 140. The tether based RCS system comprises of a reel 102 for holding a length of tether 105 and a control apparatus 104. The control apparatus 104 and the tether 105 are initially in the zero position. In FIG. 12, the control apparatus 104 offsets the tether 105 away from the z-axis 107. As a result, the tether 105 is offset in a direction away from the atmosphere 140 by a distance 135 equal to the difference between the zero position and the tether's current position. A friction force 138 is produced by the entire length of tether 105 colliding with molecules in the atmosphere 140. Because the friction force 138 is produced at a distance 135 from the z-axis 107, a moment 139 is produced, causing a rotational effect about the capsule's 100 center of mass 141. The spacecraft 107 rotates in a clockwise direction, closer to the atmosphere 140, by using the center of mass 141 as a pivot point, decreasing θA. The end result is that by offsetting the tether 105, the capsule 100 has adjusted pitch by decreasing θA for atmospheric reentry using the rotational effected generated by a moment 139.

Figure 13:
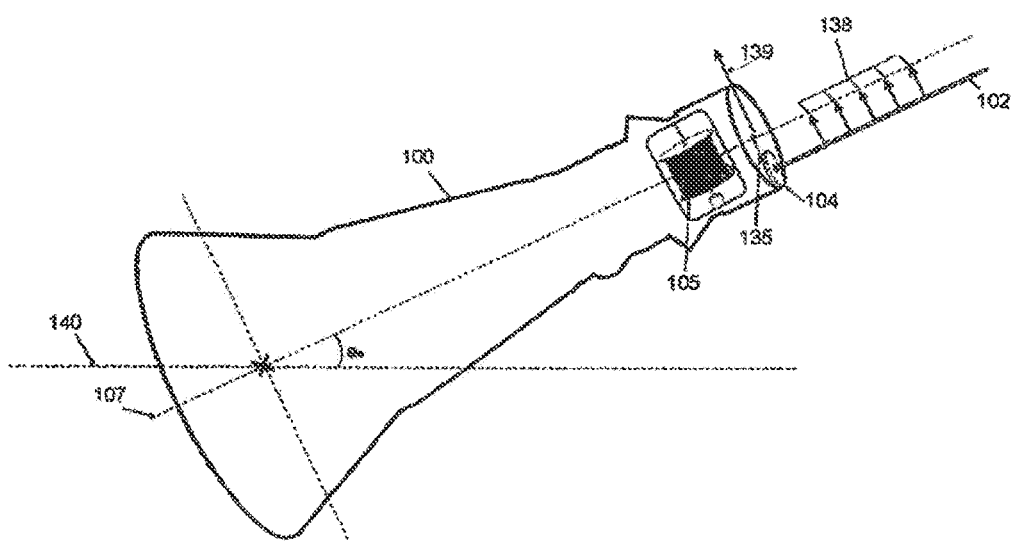
FIG. 13 is a side view illustrating the steps by which a space capsule uses a tether-based RCS system to adjust pitch to increase a space capsule's angle of attack with respect to the atmosphere, in accordance with an embodiment.

FIG. 13 illustrates the steps by which a space capsule 100 uses a tether-based RCS system to adjust pitch to increase a space capsule's angle of attack, θA, with respect to the atmosphere 140, in accordance with an embodiment. θA is the angle formed by the capsule's z-axis 107 and the atmosphere 140. The tether based RCS system comprises a reel 102 for holding a length of tether 105 and a control apparatus 104. The control apparatus 104 and the tether 105 are initially in the zero position. In FIG. 13, the control apparatus 104 offsets the tether 105 away from the z-axis 107. As a result, the tether 105 is offset in a direction towards the atmosphere 140 by a distance 135 equal to the difference between the zero position and the tether's current position.

A friction force 138 is produced by the entire length of tether 105 colliding with molecules in the atmosphere 140. Because the friction force 138 is produced at a distance 135 from the z-axis 107, a moment 139 is produced, causing a rotational effect about the capsule's 100 center of mass 141. The z axis 107 moves in a counterclockwise direction, further from the atmosphere 140 by using the center of mass 141 as a pivot point, increasing θA. The end result is that by offsetting the tether 105, the capsule 100 has adjusted pitch by increasing θA for atmospheric reentry using the rotational effect generated by a moment 139.

FIG. 14 is a top view looking down on a space capsule 100 re-entering the atmosphere 140, illustrating the steps by which said space capsule 100 uses a tether-based RCS system to adjust yaw to steer said space capsule's 100 approach vector 142 to the right of the z-axis 107, relative to said capsule's 100 orientation in this illustration, in accordance with an embodiment. The tether-based RCS system comprises a reel 102 for holding a length of tether 105 and a control apparatus 104. The control apparatus 104 and tether 105 are initially in the zero position. In FIG. 14, the control apparatus 104 offsets the tether 105 to the right of the z-axis 107 by a distance equal to the difference between the zero position and the tether's 105 current position.

A friction force 138 is produced by the entire length of tether 105 colliding with molecules in the atmosphere 140. Because the friction force 138 is produced at a distance 135 from the z-axis 107, a moment 139 is produced, causing a rotational effect about the capsule's 100 center of mass 141. The z-axis 107 is shifted in a clockwise direction, relative to the capsule's 100 orientation in this illustration, using the center of mass 141 as a pivot point. The z-axis's new position 143 acts as the capsule's new approach vector 144. The end result is that by offsetting the tether 105, the capsule 100 has adjusted yaw and steered its direction to a new approach vector 144 which is to the right of the original approach vector 142, relative to the capsule's 100 orientation in this illustration.

FIG. 15 is a top view, looking down on a space capsule 100 re-entering the atmosphere 140, illustrating the steps by which said space capsule 100 uses a tether-based RCS system to adjust yaw to steer said space capsule's approach vector 142 to the left of the z-axis 107, relative to said capsule's orientation in this illustration, in accordance with an embodiment. The tether-based RCS system comprises a reel 102 for holding a length of tether 105 and a control apparatus 104. The control apparatus 104 and the tether 105 are initially in the zero position. In FIG. 15, the control apparatus 104 offsets the tether 105 to the left of the z-axis 107 by a distance equal to the difference between the zero position and the tether's 105 current position.

A friction force 138 is produced by the entire length of tether 105 colliding with molecules in the atmosphere 140. Because the friction force 138 is produced at a distance 135 from the z-axis 107, a moment 139 is produced, causing a rotational effect about the capsule's center of mass 141. The z-axis 107 is shifted in a counter-clockwise direction relative to the capsule's orientation in this illustration, using the center of mass 141 as a pivot point. The z-axis's new position 143 acts as the capsule's new approach vector 144. The end result is that by offsetting the tether 105, the capsule 100 has adjusted yaw and steered its direction to a new approach vector 144 which is to the left of the original approach vector 142, relative to the capsule's orientation in this illustration. An example device comprises an aerodynamic decelerator for producing a tension force from aerodynamic drag, a vehicle capable of producing lift force that changes as the angle of attack varies, and a controller connected to the decelerator and also connected to the aerodynamic vehicle, for applying the tension force produced by the decelerator to the vehicle in a controlled manner to change the vehicle's angle of attack, thus varying the lift force produced by the vehicle. An example method is to adjust the load vector applied to a reentry vehicle by an aerodynamic decelerator to accomplish controlled skip entry through the upper atmosphere thereby reducing the vehicle's forward velocity vector and minimizing dynamic and thermal loads.

An illustrative embodiment comprises an aerodynamic decelerator for producing a tension force from aerodynamic drag, a vehicle capable of producing lift force that varies with angle of attack, and a control device connecting the aerodynamic decelerator to the aerodynamic vehicle, for applying the tension force produced by the decelerator to the vehicle in a controlled manner to change the vehicle's angle of attack, thus varying the lift force produced by the vehicle. An example method comprises using the devices described herein to accomplish controlled skip entry through the upper atmosphere in order to more gradually reduce the vehicle's forward velocity vector and thereby reduce dynamic and thermal loads.

A pull point is a point where drag generated by a tether is exerted on a space craft. For inflatable structures, rigidity is the degree of pressurization sufficient to retain structural integrity despite forces encountered during atmospheric entry. Skip entry is a method of atmospheric entry comprising one or more "skips" off of the atmosphere where energy is lost.

An example atmospheric entry device comprising a controllable tether and an aerodynamic body can use a skip entry technique.

Frictional drag force applied to a tether induces tension in the tether. An example device can comprise a tether attached to an aerodynamic body and a tether controller that shifts the pull point's location.

Atmospheric re-entry, even when initiated from a circular low-Earth orbit, typically requires a thermal protection system comprising a heat shield, ablative material, or radiative dissipation techniques. Semi-analytical and numerical simulations of the atmospheric re-entry from low-Earth orbits of a capsule with a 20-km heat resistant tether attached have shown that the thermal input flux on the capsule is reduced by more than one order of magnitude with respect to a comparable re-entry without a tether.

Long tethers have low ballistic coefficients and a large surface for heat dissipation. Moreover, a long tether is stabilized by gravity gradient and consequently tends to maintain a high angle of attack with respect to the wind velocity. The exposed surface of a 20 kilometer long 1 millimeter diameter tether is 20 square meters, which is larger than the typical cross section of a re-entry capsule. For example, the Apollo command module's cross section is under 12 square meters. The resulting strong drag decelerates the capsule during re-entry. Where an example embodiment allows variance of the application of drag force to the re-entry vehicle, so that the force vector is offset from the vehicle's center of mass, to change the vehicle's angle of attack, allowing control of the vehicle's reentry flight path. By using this method to allow the reentry vehicle to skip in and out of the atmosphere, especially during the portion of the reentry process where the greatest thermal and mechanical loads are produced, extends the time of reentry flight in a controlled manner and reduces the peak mechanical and thermal forces acting on the reentry vehicle.

A device, and the method of its use, for controlled atmospheric entry allows for an atmospheric entry system ("system") that may be controlled in order to produce a flight path having reduced deceleration loads over an extended period of time in order to decrease mechanical and thermal loads and stresses that occur during atmospheric entry. This will allow for a gentler more precisely controlled transit through an atmosphere.

An embodiment can be used with any spacecraft design that produces lifting force that can be varied by varying the vehicle's angle of attack. A winged shuttle, a lifting body, and a space capsule are all examples of such spacecraft. An embodiment can work with an inflatable reentry system that uses a pressurized flexible toroid to provide rigid support to a flexible conical aeroshell payload section. Synergistic benefits may be obtained by using a lightweight inflatable reentry vehicle in conjunction with an embodiment.

Aerodynamic Vehicle (100):

An inflatable aeroshell is an example of the type of aerodynamic vehicle discussed in the embodiment below. Examples of inflatable aeroshells comprise the NASA inflatable aeroshell and the Russian inflatable aeroshell. These inflatable aeroshells have the benefit of being lightweight. They also have the disadvantage of only operating in an uncontrolled ballistic reentry trajectory, which produces large thermal and mechanical loads.

An aerodynamic reentry vehicle capable of producing variable lift force when its angle of attack is varied may also be used. Examples of such vehicles include the USAF X37B robotic reusable reentry spacecraft as shown in FIG. 18, the Soyuz and Shinzu single use reentry vehicles illustrated in FIG. 19, and the Excalibur Almaz reusable reentry vehicle, as shown in FIG. 17.

FIG. 20 shows a detail view of the tether control shown in FIGS. 17, 18 and 19. In FIG. 20, controller 501 comprises a structural attachment point of the return vehicle 503. Control line control means 507, 511 and 515 are connected to one end of control lines 505, 509 and 515, respectively. The control line control means are adapted to be able to reel the control lines in and out so as to change their length in a controlled fashion. The end of these control lines are affixed to one end of tether 105 at point 517. Changing the length of the control lines varies the point of action of the tension force from the tether on the vehicle so as to control the vehicle's angle of attack.

FIG. 16 shows an embodiment comprising an inflatable aeroshell 100 and an Inflatable Aeroshell Toroid 207. The toroid 207 of aeroshell 100 is made of a material such as Kevlar such that the interior of toroid 207 is not in fluid communication with the exterior of the toroid. For storage and transportation the toroid may be deflated. During atmospheric entry, toroid 207 will be inflated causing toroid 207 to be pressurized to a point of rigidity to retain structural integrity despite the forces acting on it during the controlled atmospheric entry process.

The inflatable aeroshell skin 209 is fixedly attached to the exterior surface of toroid 207 at one or more locations about the circumference of the exterior surface of the toroid (possibly continuously attached such that there is no fluid communication between the inflatable toroid and the skin), and extends below the center of the toroid, forming an inverted payload volume 225. The skin being positioned in such a way that it forms a conical shape extending below the toroid. Skin 209 may be made of any material having mechanical strength sufficient to support the payload during reentry. It may be adapted to protect payload 225 against heating and may optionally comprise a thermal protection material 211.

The aerodynamic body 100 comprises the toroid 207 and the skin 209 that extends from the toroid, forming a conical nose 211 that sits underneath the toroid. This aerodynamic body automatically orients the entry system due to the action of natural aerodynamic forces in such a way as to have the aerodynamic body sit between the payload and the source of gravity with the nose-cone 211 pointing toward the gravitational source. Although an embodiment can reduce the thermal and mechanical loads acting on the reentry system and payload, it does not eliminate these loads entirely. The aerodynamic body therefore also shields the payload of the system from the majority of the frictional and thermal forces generated by the device's controlled transit through the atmosphere. The inflatable aerodynamic body acts as a lift generating body, aerodynamically orients and stabilizes the system, protects the rest of the system from friction with the atmosphere, can act as a backup life support system if it is pressurized with breathable gas, and may be provided with air bags to cushion the impact of the system when it impacts the surface of the celestial body.

The tether 105 is attached to the vehicle 100 by control system 203. The tether can be deployed by any number of different tether deployment means. The tether 105 is attached by any suitable mechanical means to the tether controller 203. The tether extends from the tether controller 203 to the tether end point 223. The tether 105 is deployed by a tether deployment means 158 and extends out behind the aerodynamic body 100. When the tether is extended it begins colliding with the molecules that constitute the atmosphere, causing friction. The friction generated by the tether exerts a drag force which is communicated to the rest of the atmospheric entry device at the Pull Point. If the tether is 20-km-long and 1-mm diameter tether, then its surface area is 20 square meters, which is much larger than the cross section of a re-entry capsule. For example the aerodynamic surface area of the 10 foot diameter NASA inflatable reentry system is about seven square meters.

The tether controller 203 is attached to tether 105 and through controllable lines 213, 215 and 217 to the exterior surface of the toroid. In FIG. 16 these three lines are attached to the toroid every 120 degrees around the toroid in such a way as to allow the tether controller 203 line actuator 219 the ability to change the length of control lines 213, 215 and 217 to change the angle of attack of the vehicle 100 with respect to the relative wind. The tether controller 203 tether length controller 158 can modify the aerodynamic characteristics of the tether by extending the tether, retracting the tether, altering the angle of the tether with respect to the main body of the atmospheric entry device, or altering the location at which the force being exerted on the tether is functionally communicated to the rest of the device ("Pull Point").

The tether control lines 213, 215 and 217 and the tether 105 itself can be extended or retracted by electric motors, by hydraulic or pneumatic actuators or even by manually pulling or winding the lines by mechanical means. This opens up the rather interesting possibility of extreme sports enthusiasts surfing the upper atmosphere from orbit.

In the lower atmosphere and at low, subsonic, speeds tether 105 may not generate a great deal of drag. Certain embodiments could incorporate a parachute into tether controller 203. This parachute could be deployed prior to landing. Alternatively, a deployable lighter than air balloon could be incorporated into the system to inflate to let the payload float in the atmosphere. Finally, the payload, with a balloon or parachute system, could be ejected after reentry, but prior to landing. An embodiment could also incorporate inflatable air bags or foam cushions to reduce the effect of the landing impact on the payload.

Inflation Means:

In one or more embodiments, the aerodynamic body comprises toroid, a skin, a payload volume, and one or more tether attachment points (possibly comprising a controller). There could be a way of going from a compacted deflated state to a rigid inflated state). The inflation of the toroid should be completed by the transfer of some material, gas or combination of gasses by an inflation means from a volume outside of the system to the un-inflated toroid of the aerodynamic body (preferably delivered from a pressure vessel). These details are not shown as inflating a flexible toroid is within the skill of those expert in the art. If an embodiment is used for human reentry, all or part of the toroid could be pressurized with oxygen or a breathing gas mixture to serve as a source of life support breathing gas.

Skip Entry:

Skip entry is a technique for entering an atmosphere. It is beneficial for entry systems that have a relatively low lift-to-drag ratio since these sorts of entry systems have difficulty extending their landing range and deceleration period due to their aerodynamic flight characteristics. When engaging in skip entry a space object makes one or more successive "skips" off of (or through) the atmosphere. Each successive "skip" reduces the energy of the space object relative to the celestial body whose atmosphere is being entered. The skip entry provides a space object entering an atmosphere a longer period of time and course of transit through the atmosphere. The increased period of transit increases the duration of time during which the entering object can shed energy relative to the celestial body. By increasing the duration of the atmospheric transit the energy of the space object can be released more gradually. This gradual reduction of the space object's energy is advantageous because it reduces both heating and rapid deceleration due to frictional forces that result from the space object's physical interaction with the molecules of gas and other particulates that comprise the atmosphere. Methods of achieving skip entry require precise guidance and control of the atmospheric entry system. Without precise guidance and control the atmospheric entry system attempting to achieve skip entry could fail to sustain its intended trajectory, which could result in one of a number of problems. If the atmospheric entry system takes too shallow of an entry trajectory, or achieves too much lift upon entry, the atmospheric entry system could skip entirely out of the atmosphere, and possibly out of the celestial body's gravity well. This could result in the complete loss of the atmospheric entry system and its payload. If the atmospheric entry system takes too steep of a trajectory, or has too small a velocity, the aerodynamics of the system may not generate enough lift for the atmospheric entry system to perform skip entry. This could cause the atmospheric entry system to engage in ballistic entry which could potentially destroy the atmospheric entry system and its payload due to excessive heating, high acceleration loads, or a high velocity impact with the surface of the celestial body. A third problematic possibility is that the atmospheric entry system achieves skip entry, but does so in such a way as to have the system and payload move off of its intended trajectory and land in an unintended location. The increased transit duration is effectively an increased flight path which allows for the atmosphere entry system to select a landing location from a larger potential landing area.

The method of skip entry into an atmosphere is achieved by calculating an appropriate trajectory, then initially descending into the outermost region of the atmosphere. After the initial descent, the aerodynamic profile of the atmospheric entry system (with or without help from some other forces including thrust or drag) generates lift which causes the entry system to ascend. As the object gradually ascends the gravitational force overrides the lift force and the object begins another descent into the atmosphere. This process may be repeated more than once before the atmospheric entry system loses the velocity (or other flight characteristics) required to generate sufficient lift to make another "skip." When the object cannot, or does not wish to, make another "skip," the atmospheric entry system travels along a ballistic trajectory through the remainder of the atmosphere. These "skips" increase the duration of the atmospheric entry system's transit in the upper, less dense, atmosphere. The increased duration of the atmospheric transit and the lower instantaneous deceleration gives this method of atmospheric entry many advantages as compared to fully ballistic atmospheric entry.

Increased duration of flight in the upper atmosphere is desirable because this is where most of the energy of reentry is dissipated. If the total energy release is made over more time, the effect is a much gentler and less stressful reentry.

The deceleration can be made more gradually resulting in lower acceleration loads being put on the payload and atmospheric entry system as a whole. Slower deceleration results in less intense aeroheating of the atmospheric entry system. The lower velocities and increased transit duration also reduce heat buildup on the entry system and acceleration loading on the system, which in turn allows for less mass of the system being dedicated to shielding. The increased atmospheric transit time coupled with the smaller velocities that the entry system achieves during the atmospheric entry allows the entry system more time to and ease of maneuvering.

An example method could facilitate atmospheric entry into the Earth's atmosphere from low Earth orbit. The devices and methods described can be used to provide a controlled reentry into any planetary atmosphere from any trajectory. Of course the control rules for each entry would be unique and would have to be calculated according to means well known to those skilled in the art of trajectory planning and atmospheric reentry.

The International Space Station ("ISS") orbits the earth in low Earth orbit ("LEO") 617. The outer bound of LEO is approximately 2,000 kilometers above the surface of the earth. In this orbit the ISS is traveling at approximately 18,000 miles per hour. In the event that some cargo needs to be safely, gently, and precisely transported from the ISS to a location on the surface of the Earth an embodiment could be used to accomplish the task.

Referring now to FIG. 21, the payload would first be attached to the deflated and compact atmospheric entry system in orbit 601. Then the atmospheric entry system with the payload attached to it would be ejected from the ISS and propelled by a deorbit rocket impulse or other means into a reentry trajectory. Since the system was ejected from the ISS its orbital speed would be approximately the same as that of the ISS. As the system enters into a decaying orbit the gravitational attraction between the system and the Earth pulls the system toward the surface of the Earth with a force proportional to the square of the distance between the two objects. At some point 603 after the system is released from the ISS, but before the system begins to interact with the Earth's outer atmosphere, the inflation means pressurizes at least the toroid to rigidity. At some point after the toroid is inflated, the tether is extended through the use of a tether deployment means to a desired length.

As the system continues on a decaying orbit it begins to interact with the top layer of the atmosphere at an altitude of about 100 km 623. As the system begins to descend into the outer limits of the Earth's atmosphere the aerodynamic drag characteristics of the aerodynamic body will cause the system to orient so that said aerodynamic body shields the payload from aeroheating. At the same time the molecules of the outer atmosphere colliding with the tether generates a frictional drag force that induces a tension in the tether. The force of this tension is exerted in the opposite direction from the system's path through atmosphere. This drag force causes the system to further decelerate. If no control is exerted on the reentry system, it will follow a pure ballistic trajectory 625 and experience large thermal and structural loads before impacting on the surface at point 627.

As the tether decelerates the system the tether controller exerts forces onto the tether in such a way as to cause the tether drag force to impart a torque on the system. This torque force alters the system's aerodynamic flight characteristics, including angle of attack, generating a greater lift/drag ratio. As the lift force generated increases it will eventually offset the gravitational force between the system and the planetary surface at point 605, causing the system to gain altitude for a period of time and extend its flight distance and time through the atmosphere before the lift force is no longer greater than the gravitational force at which point the system begins to descend again at point 607. Skip entry may be used as many times as required to minimize the deceleration loads/rates on the payload, or as many times as are desired for the flight profile as is illustrated by points 609, 611, 613. With each skip the system loses energy. The control can be as simple as measuring the deceleration force and changing the angle of attack of the reentry vehicle when the deceleration exceeds some pre-defined limit. In theory this could yield the result of a gentle return to the surface.

The increased period of time that skip entry allows for the system to be traversing through the atmosphere allows for an increased period of time in which the tether's drag force can gently decelerate the system. Once the system's velocity, altitude, or other flight characteristic preclude the system from engaging in any further "skips" off of the atmosphere as shown at point 615 the system would begin a ballistic trajectory, although the tether and tether controller could still be used for some course modification. At this point in the system's descent should be sufficiently slow as to allow parachutes, or some other deceleration means to gently lower the system to a point on the surface of the Earth, or to simply let the system fall to the surface of the celestial body at point 617.

The flight path and controls exerted on the system can be optimized to provide for the slowest deceleration possible or controlled, constant, sustained deceleration rates. This allows for the atmospheric entries to be completed entirely within predetermined parameters (time of descent, acceleration load requirements, landing location).

In an embodiment the tether controller comprises one or more control cords attached to a point on the tether and a point on the toroid. The means of control would be by varying the tension on the one or more control cords so that the tether's drag force is deflected through the one or more control cords and exerted on the control cord's point(s) of attachment to the toroid. This action will cause the sum of the tensions on the tether and the one or more control cords to be functionally exerted on a point different than the device's center of gravity. This deflection would cause there to be a torque force impart to the device which would alter its aerodynamic flight characteristics. By changing the aerodynamic body's aerodynamic flight characteristics, including but not limited to its angle of attack, the lift to drag ratio of the system can be modified to correspond to a desired flight plan. In certain embodiments, the tether controller comprises a control device that exerts a force on the tether such that there is a controllable change in the angle between the tether and the aerodynamic body. When the force exerted by the tether does not pass through the spacecraft's center of mass a torque alters' the spacecraft's angle of attack to change the lift forces acting on the system.

In an example embodiment the tether controller comprises a means by which the pull point of the tether may be altered in at least a two dimensions to shift the tether's force vector away from the vehicle's center of gravity to impart a moment on the vehicle to adjust pitch (angle of attack) or yaw. Furthermore, the tether's length may be extended or retracted through the use of a winch to vary the magnitude of the drag force imparted by the tether. When combined this method of controlling the length of the extended tether and the location of the pull point would allow for control of the amount of drag force that the tether would generate and where that drag force is functionally imputed on the reentry vehicle. This will provide a reactive guidance means for the atmospheric entry system as it descends through an atmosphere. If the tether is electrodynamic it may also be possible to generate drag forces outside of the atmosphere.

In certain embodiments, the tether controller comprises a means of moving the tether's physical attachment point to the rest of the system (most likely to the toroid). By moving the tether's attachment point the tether controller also moves the point at which the tether's drag force is functionally imparted to the rest of the system. If the vector along which the tether's drag force is functionally imparted to the rest of the system is moved away from the system's center of mass the drag force will impart a moment on the aerodynamic body. This moment would generally result in a change in the system's angle of attack, resulting in a change in the system's aerodynamic flight characteristics.

Inflation:

In an example embodiment, the gas that is used to inflate the toroid to rigidity is Oxygen ($O_2$). In this embodiment, there would be a hose equipped with a regulator allowing controllable fluid communication between the interior of the toroid and the payload volume. In this embodiment, the $O_2$ used to pressurize the toroid to rigidity could be tapped into as a life support system. In another example embodiment, the gas that is used to inflate the toroid to rigidity is Helium (He). Helium, being an inert gas, is unlikely to react with any other chemicals that it may be exposed to, and thus is unlikely to be dangerous. Helium gas is light weight which could increase the spacecraft's buoyancy. The increased buoyancy of the system could result in a smoother, gentler deceleration and stop than a less buoyant system would allow.

In an example embodiment, the toroid has a plurality of discrete compartments in fluid communication with one another through valves. The valves could be configured so that discrete compartments could be inflated by the release of pressurization material into discrete compartments, but would not allow the decompression of one compartment to deflate any other of the discrete compartments. This configuration would help the toroid retain some structural rigidity in the event of a damage that would cause depressurization. In certain embodiments, the skin of the aerodynamic body comprises one or more compartments in fluid communication with the toroid. These compartments inflate with the same pressurization fluid as the toroid. This would aid in the prevention of communication of heat from the outer surface of the skin of the aerodynamic body to the inner surface of the skin of the aerodynamic body. Inflatable components are light weight and can be deflated and stored in a relatively small volume.

Certain embodiments comprise an aerodynamic body, a hypersonic decelerator, and a controller that is connected to both the hypersonic decelerator and the aerodynamic body such that the forces acting on the hypersonic decelerator are transmitted to the aerodynamic body in a controllable manner so the hypersonic decelerator and control means can be used as a RCS (reaction control system) for the aerodynamic body.

In this embodiment the aerodynamic body may comprise a capsule, a shuttle, a heat shield, or an inflatable aeroshell. The aerodynamic body will preferably have flight characteristic that can be influenced by the controlled use of the hypersonic decelerator in such a way as to result in an alteration of the aerodynamic body's flight characteristics (angle of attack, lift/drag ratio, aerodynamic profile, shape, etc.).

The aerodynamic body allows the forces generated by the hypersonic decelerator to be translated from pure decelerating drag into a means for altering the flight characteristics of the system in order for the system as a whole to be controllably maneuverable.

The hypersonic decelerator refers not to a specific decelerator system but instead could comprise one, more than one, or a combination of hypersonic decelerators that rely on drag to decelerate an object traveling through an atmosphere at hypersonic speeds. This group comprises: single line tethers, multi-line tethers, tapes, ribbons, ballutes, parachutes, wings, and sails. Different hypersonic decelerators could be used simultaneously or in sequence. The hypersonic decelerator uses the drag generated by friction between the hypersonic decelerator and the atmosphere to both decelerate the entire system and to generate forces that can be controllably transferred to the aerodynamic body in order to alter the spacecraft's flight dynamics in a controllable manner.

Multiple hypersonic decelerators may be used in conjunction with one another, either having multiple distinct hypersonic decelerators used at the same time, or with different hypersonic decelerators used at different periods during the system flight in order to correspond to different deceleration requirements. This may include but is not limited to the use of different hypersonic decelerators depending on the velocity range that the system is traveling within, or the use of different hypersonic decelerators depending on the density of the atmosphere through which the system is traveling.

The control means can be any device, system, or method of use that allows for the drag forces generated by the hypersonic decelerator to be used to alter any one or more flight characteristics of the system in such a way as to allow the flight path of the system to be controlled by alteration of the drag forces acting on the hypersonic decelerator.

In a illustrative embodiment, the aerodynamic body comprises an inflatable aeroshell, the hypersonic decelerator comprises a tether, and the controller allows the spacecraft to engage in skip (single or multiple) entry of an atmosphere.

Mathematical Model of the Invention

The present invention has not yet been flight tested, so it is not possible to provide experimental examples to inform those skilled in the art. In order to provide information about the present invention to and those skilled in the art, the inventor has provided below a detailed mathematical model of the present invention. The general conclusion from this mathematical model is that de-orbit forces and heating rates are much less for the controlled reentry system made possible by the present invention.

Introduction

Of greater importance to the use of the tether as an entry trajectory controller is the observation that in the past attempts to use tethers on reentering objects have been unsuccessful because the tension distribution along the length of the tether becomes chaotic. Many slack regions develop and the tension at any single point is only intermittently positive. Moreover, the tension at the attachment point, which actually provides the control force, varies widely and is often zero. Trajectory control is impractical or impossible in such a system unless the system can be made to produce a non-zero, smoothly varying and predictable tension at the attachment point. One way to ameliorate this problem is to choose materials that offer diffuse reflection of atmospheric molecules in free molecular flow. In this case, the magnitude of the aerodynamic force is still proportional to the normal component of stream velocity, but it is also proportional to stream velocity itself, and thus can act in both the normal and tangential directions. As will be discussed in more detail below, this causes the tether to be smoother and the developments occur slower, with fewer slack regions. Thus the use of non-metallic tether material that diffusely reflects atmospheric molecules in free molecular flow is recommended for the present invention. In the following analysis only diffuse reflection is assumed. In practice this means the use of non-metallic tether material that diffusely reflects atmospheric molecules in free molecular flow is recommended.

As will be discussed in detail below, the tether tension at the attachment point to the spacecraft is initially small and it is sensitive to initial conditions. It is helpful to add an aft-body attached to the free end of the tether. The addition of an aft-body as part of the present invention is useful in order to reduce sensitivity to initial conditions and to generate non-negligible tether tension in the early part of the entry trajectory.

It may take as long as a half-hour for the maximum departure from the direction of spacecraft flight, i.e. the x-axis, to fall below 1 km in altitude, i.e. the y-axis, even with a large aft-body. Because of this it is desirable to gradually deploy the tether behind the spacecraft at a rate that maintains positive tension in the tether. When the towing speed is nearly the orbital speed, the deployed tether will be aligned with the x-axis. This method of operation is recommended. At the same time, if the gradual deployment method should fail and the tether deploys all at once, the action of the aft-body will eventually align it with the stream direction anyway.

In summary:

a. To promote faster stabilization in the initial portion of atmospheric entry, the tether material should be capable of diffuse reflection of atmospheric molecules.

b. In order to prevent large uncertainties in initial entry, the tether should be deployed gradually a so that the initial shape is parallel to the stream direction.

c. To provide insensitivity to initial conditions, guarantee some initial tension and devise some mechanism whereby the tether settles into to a steady shape and tension distribution for all flight regimes, it is necessary to add an aft-body attached to the free end of the tether.

d. The aft-body design parameters must be chosen to prevent flag flutter instability.

In the stability analysis to follow, it is assumed that the atmospheric density is constant along the tether and equal to its value at the attachment point, despite the very large tether length of 20 km in the nominal design concept. This is justified on a number of counts. First, for the flight regimes, (H,V) wherein the attachment point tension is largest, the tether is swept back toward the x axis, so that the variation of altitude along the tether is a small fraction of the nominal length. Secondly, models of heating and breakage conditions described in detail below show that a 20 km tether will experience extreme heating rate gradients and frequent breakage near the free end—thus necessitating the use of a shorter tether. A shorter tether will also be less sensitive to varying atmospheric conditions with altitude since it will "sample" variations over a smaller altitude range. Finally, a shorter tether, by reducing the spatial dependence of the density will render the dynamics more predictable.

The coefficients of the lateral modes behave as uncoupled, damped oscillators and are obviously exponentially stable. For sufficiently long time, the coupling becomes negligible so that the longitudinal mode coefficient also become uncoupled damped oscillators. Thus local stability can be concluded for the tether with aft-body as a matter of general principle.

This conclusion can be verified by assuming a 0.5 m radius aft-body and spot checking the plane instability regions determined previously with no aft-body. Starting each case with a several kilometer deviation from the equilibrium shape, it is found that all cases are stable. An example is provided by the case H=100 km, $V/V_0$=0.85 where the tether was started in a severe 4 km oscillation of the first lateral mode, resulting in significant variation in tension. After 730 seconds, the oscillation amplitudes in both the shape and tension distribution are significantly reduced. Finally, after approximately 1500 seconds, the shape and tension settle into equilibrium. The foregoing results show that a modestly sized, 0.5 meter radius aft-body, and assuming initial departures of 3-4 km or less in the initial deviation from the equilibrium, the tether/aft-body system will converge to a stabile equilibrium. This does not mean that the equilibrium state will be stable for larger initial deviations. However, the results discussed in detail in the mathematical model below do show that if initial deployment is slow and smooth and if altitude does not vary very rapidly, the system can stay close to a stable equilibrium shape and tension during the course of entry. Because the equilibrium state is relatively simple and predictable, this is a great advantage for the development of a robust, dependable entry trajectory controller.

In Summary:

1. A small aft-body avoids chaotic motion initial deviations from the equilibrium state 2. For flight regimes in which the variations of atmospheric properties over the tether length are small, the equilibrium shape is simple and relatively insensitive to temporal and spatial variations in atmospheric density. To secure this advantage over all altitude and velocity ranges, the tether length should be just long enough to provide the control force required. Moreover, a long tether will experience extreme heating rate gradients and frequent breakage near the free end. In other words, if we do not shorten the tether, Mother Nature will do it for us! Since the key parameter determining tension is the tether length x radius (for a round tether) it is possible to reduce the length while increasing the radius. The tether cross section need not be round, but may be a rectangular tape or an oval. A circular cross section tether is assumed in the mathematical model of the present invention set forth below for ease of calculation of this embodiment.

The entry profile for the present invention should be planned so density variations in the atmosphere are slow enough to allow the tether to follow its equilibrium configuration fairly closely. The mathematical model of the present invention shown in detail below teaches that the tether is efficient in redirecting the angle-of-attack of the spacecraft to match the tether tangent direction near the attachment point. If the tether is maintained in a sagged equilibrium shape, without oscillation, then the main effect is to impose a positive angle-of-attack on the fore-body. Moreover the moment arm of the tether tension about the spacecraft center-of-mass will be much larger than can be attained by only adjusting the attachment location of the tether to the back of the spacecraft. Thus changing the tether length allows more control force than adjusting the attachment point.

In Summary:

1. The present invention's entry profile must be planned so atmospheric density variations are slow enough to allow the tether to follow its equilibrium configuration fairly closely.

2. The tether appears to be quite efficient in redirecting the angle-of-attack of the fore-body to match the tether tangent direction near the attachment point. It is probable that changing the tether length might be a more effective control strategy than adjusting the attachment point. So how can the present invention be used to aid atmospheric entry? The overall goal of the present invention is to prolong the atmospheric entry process so heating rates on the fore-body are significantly reduced. To control entry the present invention can modulate the tether length, which can be increased or decreased and can vary the position of the attachment point of the tether relative to the spacecraft's center of mass. If the present invention includes sensors that can measure altitude and both the horizontal and vertical components of velocity and measure the tether's sag angle, then one possibility for using the tether to reduce entry speed is to periodically deploy and retract the tether so as to stimulate skipping in order to periodically "cool off" the vehicle by repeatedly moving to higher altitude. The model shown in detail below compares two cases, uncontrolled and controlled by the present invention, that feature entry from low Earth orbit. For both cases:

The tether is 500 m long and 2 mm in diameter,

In fore-body model, we set A=10 so that the lift-to-drag ratio is approximately unity The system starts at orbital speed at 1701 cm altitude.

The high altitude behavior is essentially the same in both cases because of the very low atmospheric density and the small frontal area of the tether. The significant differences between the two cases occur once they reach approximately 110 km altitude. Once the sensible atmosphere is reached, the pitch angle aligns with the velocity direction.

The uncontrolled reentry system sustains a shallow glide path and then very abruptly dives starting at about 95 km. The velocity versus time plot shows that the vehicle sustains nearly orbital velocity until it very suddenly comes to rest. On the whole, the entire entry event occupies only about a dozen minutes. This causes the "reentry fireball" whose thermal and mechanical loads are a major challenge to reusable spacecraft design designers.

In contrast, the controlled system develops larger amplitude skips before reaching 110 km. Well before this the controller makes the angle-of-attack converge to 45 degrees, thereby producing maximum lift. At about 100 km altitude, near the "Kármán line", the controlled system skips decrease in amplitude and increase in frequency. For a period of nearly 25 minutes, the controlled system maintains nearly horizontal flight (taking into account the skipping motion) that is centered on the Kármán line. It is during this period, the sequence of skips produces nearly step-changes in velocity. Once the skip amplitude dies out, the system completes entry to the surface with relatively gentle declines in altitude and velocity. Overall, the final entry, starting at 100 km, takes roughly 20 minutes nearly twice as long as in the uncontrolled case. The consequences for entry heating of the spacecraft depend on the details of the entry body. However, the skip amplitudes decrease and then cease after about 15 minutes. The maximum heating values for the controlled system are about two orders-of-magnitude below the uncontrolled case. Although the significant heating of the uncontrolled system lasts longer for the controlled system, the times spent near maximum heating values is only about three times that of the uncontrolled system. Thus the integrated heating rate, which is a measure of maximum temperature, is about an order-of-magnitude less for the controlled system than for the uncontrolled system.

The g-loads on the forebody structure, i.e. the inertial acceleration minus gravity are very different for the uncontrolled and controlled systems. The uncontrolled system shows a single large peak at about 5.5 gs. The controlled system experiences a lengthy sequence of maxima, corresponding to the skips, at values between 0.6 to 1.1 g, with very brief pulse at 1.9 g. The present invention can also be used by spacecraft for reentry from lunar or deep space trajectories, high elliptical orbits and generally any trajectory or orbit that is more energetic than low Earth orbit. First the tether is used as an aerobrake at the orbits perigee, which lowers the apogee. Then, when the orbit is circular low Earth orbit, the tether is used to control the angle of attack of the spacecraft as it reenters the atmosphere. The 'deep space' tether used for aerobraking the spacecraft into low Earth orbit could be a long tether and the 'low Earth orbit' tether used for controlling the spacecraft angle of attack could be a short tether. They can be two separate systems or they may be one system of controllable lengths.

If we inspect the velocity time histories for the uncontrolled deep space system there is a single, abrupt decrease in speed down to 2 km/s. The undulations seen in the later half of the entry process are due to uncontrolled oscillation of the angle-of-attack. The velocity of the controlled system drops suddenly on penetrating 100 km, but only drops to about 5.5 km/s. There follows a lengthy plateau corresponding to the first skip, then the second skip reduces the velocity to 2 km/s. Subsequently the vehicle glides smoothly to the ground with very small final velocity. Obviously, the controlled entry process is much more gentle and gradual than for the uncontrolled system.

A similar pattern is consistently repeated for the heating rate estimates. The uncontrolled system has a lone spike at $2.6 \times 10^9$, whereas the controlled system shows a very brief spike with a maximum at $0.8 \times 10^9$. Then there is a very small spike due to the second skip. Overall, the integrated heating rate of the uncontrolled system is about 2.5 times that of the controlled system. This is largely due to the fact that both systems must inevitably hit the Karman line as the first obstacle in their descent. This reduction in heating can be improved by using a tether aerobrake to make the high energy orbit into a low Earth orbit.

Finally, the uncontrolled system exhibits a maximum of over 300 gs. This is the deceleration profile for a meteorite. The vehicle is a fireball until it is nearly in free fall until it hits the ground at high velocity. The controlled system experiences a maximum of 30 g s, and this can be reduced to a short 1.8 g load by lowering the orbit from elliptical to low earth circular by using the present invention first as an aerobreak at orbital perigee and then, when the orbit is circular, using the present invention to control the skipping of the payload to lose energy near the 100 km line.

Prior to experimental testing of the present invention the inventors plan to include breaking conditions in the simulation code; examine thermal performance of the tether and investigate combined control of tether length as well as attachment point location.

Skipper Atmospheric Entry System Dynamics

1. Introduction

The present invention, which the inventors have named the "Skipper" is an atmospheric entry system comprising a fore-body, which may be a spacecraft, an ore body produced by space mining, or any other physical object to be reentered though an atmosphere, trailing a long, thin aerodynamic decelerator tether, which may be of any length and shape. The fore-body may be shaped to provide various desirable aerodynamic properties, e.g. a particular lift-to-drag ratio, etc. The tether is placed in tension due to aerodynamic forces applied during entry. By varying the point of attachment on the fore-body and/or the length of the tether, the tension force on the fore-body can be changed and made to alter the angle of attack of the fore-body. This change of angle of attack allows the entry trajectory of the fore-body and tether to be controlled so mechanical stress on and aero-thermal heating of the fore-body significantly reduced. Flight tests have not yet been conducted on this invention. The inventors therefore seek to substantiate that the postulated benefits of the present invention can be achieved by conducting a comprehensive mathematical modeling analysis of the dynamics, mechanics and heat transfer of the invention, the skipper system. As the invention is further developed, these mathematical models will be verified or refuted and refined by real world experience; experimental results from flight tests of the present invention.

This analysis starts by investigating the dynamics of the tether during high altitude flight through the atmosphere. This is done to examine two issues. First, past towed tether systems have exhibited a combination of a Bernard-von Karman vortex street and Kelvin-Helmholtz instability. In these cases the tether exhibited an unstable fluttering motion rather than assuming a simple, steady shape behind the towing body. The resulting instability built up large, erratic motions that rendered the past towed tether system useless. This past experience involved low altitude, subsonic flight at continuum flow conditions, and thus was significantly different from the system taught by the present invention. It is important to show that the present invention either will not exhibit such instabilities or can be modified to avoid them. The second issue explored is whether or not the aerodynamics of the tether will produce a steady, predictable tension force at the attachment point to the fore-body that is insensitive to reasonably anticipated initial conditions. This steady, predictable tension force is essential to successful design of the trajectory controller since the attachment point tension is the control actuation force. This condition is uncertain, may or may not hold, even when there are no large scale instabilities. To examine the relatively fast time-scale dynamics of the towed tether, we begin by making some simplifying assumptions about the fore-body motion. We assume the fore-body is much more massive than the tether and sustains horizontal flight at a constant speed that is equal to or less than the circular orbit speed at the given altitude. The attachment point is assumed to be fixed at the system center-of-mass. With these assumptions, we derive a system of equations for the tether motion, starting from various initial conditions. A simulation code based on the equations of motion is used to examine the tether motion. Later in this mathematical model, we will remove the above assumptions and generalize the formulation to include coupled fore-body/tether dynamics, aerodynamic heating and tether breaking conditions, leading ultimately to analysis and simulation of the trajectory control system.

2. Coordinate System and Reference Frame Definition

We refer the system motion to a rotating frame, the origin of which is centered at the system center-of-mass, which is identical to the fore-body center-of-mass. For this initial investigation, we assume that the fore-body exerts whatever lift forces are required to maintain horizontal flight at constant speed, V, over a non-rotating Earth. The rotating frame and coordinate axes are illustrated in FIG. 22. The reference frame rotates so that the coordinate origin remains fixed at the system center-of-mass. The system is assumed to travel in the counterclockwise direction, and the x axis points in the opposite direction. The y axis points toward the zenith and the z-axis is directed out of the plane of the diagram. We define unit vectors, $\hat{x}$, $\hat{y}$, $\hat{z}$ that are parallel to the x-, y- and z-axes, respectively.

The reference frame rotates relative to inertial space at angular rate, $\Omega\hat{z}$, where:

$\Omega = V/(R_E + H)$ $R_E$ = Earth radius $H$ = Altitude above the surface (2-1.a-c)

Note that if V is less that the orbital speed for a circular orbit at altitude H, the system is subject to a gravitational acceleration, $\tilde{g}$, in the negative y-direction, given by:

$$\tilde{g} = (R_E + H)(\Omega_0^2 - \Omega^2) \quad (2\text{-}2.\text{a-c})$$

$\Omega_0$ = Orbital angular velocity at altitude $H$ $= \sqrt{\mu_E/(R_E + H)^3}$ $\mu_E$ = Gravitational constant of the Earth At this point, we need to relate the time derivatives of various quantities relative to the inertial frame to their apparent rates of change as seen in the rotating frame. Denote by $$\frac{d}{dt}(\ldots)$$

the inertial derivative of a quantity, and by a dot over the quantity for the time derivative relative to the rotating frame. If $\bar{x} = x\hat{x} + y\hat{y} + z\hat{z}$ is the position vector of some point on the fore-body/tether system, then:

$$\frac{d\bar{x}}{dt} = \dot{\bar{x}} + \Omega\hat{z} \times (\bar{x} + (R_E + H)\hat{y}) \quad (2\text{-}3)$$
$$= \hat{x}(\dot{x} - \Omega(y + R_E + H)) + \hat{y}(\dot{y} + \Omega x) + \hat{z}\dot{z}$$

Likewise, the inertial acceleration of the point is given by:

$$\frac{d^2\bar{x}}{dt^2} = \ddot{\bar{x}} + 2\Omega\hat{z} \times \dot{\bar{x}} + \Omega^2\hat{z} \times (\hat{z} \times (\bar{x} + (R_E + H)\hat{y})) \quad (2\text{-}4)$$
$$= \hat{x}(\ddot{x} - 2\Omega\dot{y} - \Omega^2 x) + \hat{y}(\ddot{y} + 2\Omega\dot{x} - \Omega^2(y + R_E + H)) + \hat{z}\ddot{z}$$

Of principal importance is the difference between the centripetal and Coriolis accelerations and the gravitational acceleration, which we denote by $\bar{g}(\bar{x})$. This is given by:

$$\bar{g}(\bar{x}) = -\mu_E \frac{(x\hat{x} + (y + R_E + H)\hat{y} + z\hat{z})}{(x^2 + (y + R_E + H)^2 + z^2)^{3/2}} \quad (2\text{-}5)$$

Or using (2-2.b) to set $\mu_E = (R_E + H)^3\Omega_0^2$, we have:

$$\bar{g}(\bar{x}) = -\Omega_0^2(R_E + H) \quad (2\text{-}6)$$
$$\frac{((x/(R_E + H))\hat{x} + (1 + y/(R_E + H))\hat{y} + (z/(R_E + H))\hat{z})}{((x/(R_E + H))^2 + (1 + y/(R_E + H))^2 + (z/(R_E + H))^2)^{3/2}}$$

Thus, we obtain:

$$\frac{d^2\bar{x}}{dt^2} - \bar{g}(\bar{x}) = \hat{x}(\ddot{x} - 2\Omega\dot{y}) + \hat{y}(\ddot{y} + 2\Omega\dot{x}) + \quad (2\text{-}7)$$
$$\hat{z}\ddot{z} - \Omega^2(x\hat{x} + (y + R_E + H)\hat{y}) + \Omega_0^2(R_E + H)$$
$$\frac{((x/(R_E + H))\hat{x} + (1 + y/(R_E + H))\hat{y} + (z/(R_E + H))\hat{z})}{((x/(R_E + H))^2 + (1 + y/(R_E + H))^2 + (z/(R_E + H))^2)^{3/2}}$$

Note that if $\bar{x}$ is at the origin, the last two terms become $(\Omega_0^2 - \Omega^2)(R_E + H)\hat{y}$, which is minus the local acceleration of gravity at the center-of-mass, given by (2-2.a).

Since the spatial extent of the system is likely to be much smaller than $(R_E + H)$, we can approximate the expression (2.7) by expanding it out to linear terms in x, y, or z and neglecting higher order terms:

$$\frac{d^2\bar{x}}{dt^2} - \bar{g}(\bar{x}) = \hat{x}(\ddot{x} - 2\Omega\dot{y} + (\Omega_0^2 - \Omega^2)x) + \quad (2\text{-}8)$$
$$\hat{y}(\ddot{y} + 2\Omega\dot{x} + (\tilde{g} - 3\Omega_0^2 y) + (\Omega_0^2 - \Omega^2)y) + \hat{z}(\ddot{z} + \Omega_0^2 z)$$

If $\bar{x}$ is the position vector of an element of mass of the system the equations of motion are obtained by equating the right hand side of (2.8) to the external forces per unit mass applied to the element by aerodynamics or by other components of the system. In the following section we develop the lumped mass model of the tether and determine the forces produced by the interaction of the tether components.

3. Lumped Mass Model of the Tether

The initial skipper system evaluation by this model presumes the use of a long and very thin (of the order of millimeters) filament. The length-to-radius ratio is such that the tether is unlikely to have significant bending stiffness. Thus the appropriate model is a string; understood to be a filament that can support only axial tension. Moreover, it is also reasonable to assume that the filament offers no resistance to compression.

The inventor's experience with the dynamics of cable and tether systems indicates that the simplest and most effective model is a lumped mass model. This is illustrated in FIG. 23. The tether is divided into N segments of equal length. At the ends and at the junction of any two segments are point masses. The segments themselves are mass-less springs. The point masses represent the inertia of the adjoining tether regions and the spring stiffness reflect the actual elastic properties of the filament. This model converges to the partial differential equations of motion as N approaches infinity. In addition, by precisely and literally modeling the system as a chain of point masses, important integrals of the motion such as linear and angular momentum and energy (in the case of exo-atmospheric flight) remain well defined for any N.

As illustrated in FIG. 3.1, the total tether length is L and the length of each segment is:

$$l = L/N \quad (3\text{-}1)$$

Assume that the tether is of circular cross-section and allow for the possibility that the radius, r(s), can vary with the arc-lengths, where s=0 at the attachment point. The N segments are labeled with indices starting at unity near the attachment point, and likewise for the N+1 point masses. The position vectors of the point masses in the rotating frame are denoted by $\bar{x}_k(t)$ for k=1, 2, ..., N+1. In this initial investigation, $\bar{x}_1(t)$ is constrained to be at the origin. For the case of variable radius, we estimate the mass, $m_k$, of the kth point mass to be:

$$m_k = l\pi\rho_T \begin{cases} \frac{1}{2}\left(r^2\left(l\left(k-\frac{3}{2}\right)\right) + r^2\left(l\left(k-\frac{1}{2}\right)\right)\right); & k=2,\ldots,N \\ \frac{1}{2}r^2\left(l\left(k-\frac{3}{2}\right)\right); & k=N+1 \end{cases} \quad (3\text{-}2)$$

$\rho_T$=Volumetric mass density of the tether material

For later use in the aerodynamic model, we also define the area, $A_k$, projected by each segment onto a plane perpendicular to the segment direction:

$$A_k = l(r(kl) + r((k-1)l)); k=1,\ldots,N \quad (3\text{-}3)$$

Each segment offers resistance only to stretching, with a stiffness, $G_k$, given by:

$$G_k = \pi E \frac{1}{2}(r^2(kl) + r^2((k-1)l)); k=1,\ldots,N \quad (3\text{-}4)$$

E=Elastic modulus of the tether material

The tension, $T_k(t)$, in segment k is this stiffness multiplied by the segment (positive) strain. We also model a small extensional damping in the segment. This adds a term to the tension equal to $G_k\eta$ multiplied by the strain rate, where $\eta \ll 1$ is a viscous damping coefficient. These quantities are now calculated explicitly in terms of the position vectors of the N+1 point masses.

The axial strain in segment k and the strain rate are given by:

$$\delta_k = (|\bar{x}_{k+1} - \bar{x}_k| - l)/l$$

$$\dot{\delta}_k = (\bar{x}_{k+1} - \bar{x}_k) \cdot (\bar{v}_{k+1} - \bar{v}_k)/(l^2(1+\delta_k)) \quad (3\text{-}5.a,b)$$

Where $\bar{v}_k$ denotes the velocity of mass k in the rotating reference frame:

$$\bar{v}_k = \dot{\bar{x}}_k \quad (3\text{-}6)$$

Then the tension, $T_k(t)$, in segment k is given by:

$$T_k(t) = \max\{0, G_k(\delta_k + \eta\dot{\delta}_k)\} \quad (3\text{-}7)$$

The elastic force per unit mass on the $k^{th}$ point mass is:

$$\bar{f}_k^{(elastic)}(t) = (T_k\hat{l}_k - T_{k-1}\hat{l}_{k-1})/m_k; k=2,\ldots,N+1$$

$$\hat{l}_k = (\bar{x}_{k+1} - \bar{x}_k)/|\bar{x}_{k+1} - \bar{x}_k| \quad (3\text{-}8.a,b)$$

Note that $\hat{l}_k$ is the unit vector parallel to segment k.

We can now state the equations of motion for the tether system. We equate the inertial acceleration of mass k minus the gravitational acceleration; namely $$\frac{d^2\bar{x}_k}{dt^2} - \bar{g}(\bar{x}_k)$$

to the sum of the elastic force per unit mass, (3-8.a), and the aerodynamic force per unit mass. Making use of (2-8) and (3-6), and setting $\bar{x}_k = x_k\hat{x} + y_k\hat{y} + z_k\hat{z}$, and $\bar{v}_k = v_{kx}\hat{x} + v_{ky}\hat{y} + v_{kz}\hat{z}$, we have for k=2, ..., N+1:

$$\dot{v}_{kx} = 2\Omega v_{ky} - (\Omega_0^2 - \Omega^2)x_k + \hat{x} \cdot \bar{f}_k^{(elastic)} + \hat{x} \cdot \bar{f}_k^{(aero)}$$

$$\dot{v}_{ky} = -2\Omega v_{kx} - (\bar{g} - 3\Omega_0^2 y_k) - (\Omega_0^2 - \Omega^2)y_k + \hat{y} \cdot \bar{f}_k^{(elastic)} + \hat{y} \cdot \bar{f}_k^{(aero)}$$

$$\dot{v}_{kz} = -\Omega_0^2 z_k + \hat{z} \cdot \bar{f}_k^{(elastic)} + \hat{z} \cdot \bar{f}_k^{(aero)} \quad (3\text{-}9.a\text{-}c)$$

where $\bar{f}_k^{(aero)}$ is the aerodynamic force per unit mass. This quantity is formulated in the next section.

4. Aerodynamic Forces on the Tether

To formulate the correct model for the aerodynamic forces acting on the tether during entry, an important parameter is the Knudsen number, Kn. This is defined as):

$$Kn = \lambda/D$$

$\lambda$=molecular mean free path

D=characteristic length scale of the tether (4-1.a-c)

[See further: J. A. Storch, "Aerodynamic Disturbances on Spacecraft in Free Molecular flow". Aerospace Corporation Report No. TR-2003 (3397)-1, 17 Oct. 2002.]

In this case, the characteristic length scale is that which determines the largest gradients of the flow, namely the tether diameter. The nominal concept is to assume a uniform diameter of 1 mm. The Knudsen number classifies the flow across the spectrum from continuum to highly rarified flow. By convention, Kn<0.01 indicates the fully continuum regime, while flows with Kn>10 are free molecular. In free molecular flow, momentum transfer occurs when individual molecules arrive at a body surface and are subsequently reflected or re-emitted, such that during this process the molecules do not interact among themselves. The skipper system starts operation in Earth orbit and even for extremely low orbits, $\lambda$ is almost 1 km. Thus the flow is certain to be in the free molecular regime initially.

To assess the limitations of this formulation, it is necessary to consider the variation of mean free path with altitude. $\lambda$ is determined by:

$$\lambda = \frac{RT}{\sqrt{2}\,\pi d_a^2 AP} \quad (4\text{-}2.\text{a-f})$$

$R$ = Gas law constant = 8.3145 joule – $K^{-1}$mole$^{-1}$ $A$ = Avagadro's number = 6.0221 mole$^{-1}$ $T$ = Atmospheric temperature (K)

$d_a^2$ = Collisional cross-section (m)

$P$ = Pressure (Pa)

Using temperature and pressure profiles according to the U.S. Standard Atmosphere, one obtains the altitude as a function of mean free path shown in FIG. 24. If D=1 mm in (4-1), then free molecular flow prevails above ~85 km. Also, some reasonable degree of approximation may be hoped for when Kn≈1, which corresponds to ~70 km. Below altitude ~35 km, the flow is definitely continuum. If the skipper system is capable of dissipating much of the entry velocity and heating rate above ~70 km, we may rely on the free molecular flow approximation. This remains to be determined, but for the present, we provisionally adopt the free molecular flow assumption. If performance at low altitudes is found to be important, we will augment the model by adding a transition to continuum flow.

We can expect that the shape assumed by the tether centerline will have radii of curvature on the order of total length, and this is many orders of magnitude larger than r(s). Therefore, to calculate the aerodynamic forces per unit length on the tether in the vicinity of some arc length coordinate, s, one can approximate the tether as a right circular cylinder, as illustrated in FIG. 25. This shows a portion of the tether near the location on the centerline corresponding to (un-stretched) arc length s, where the filament radius is r(s). $\hat{t}(s)$ is the unit vector tangent to the centerline at coordinate s. $\nabla_a(s)$ is the inertial velocity of the centerline at s relative to the atmosphere, and the angle this makes with the centerline is the angle of attack, $\beta$.

In order to calculate the aerodynamic forces within the free molecular flow theory, we need to introduce two surface interaction parameters:

$$\sigma = \frac{\tau_i - \tau_r}{\tau_i} \quad (4\text{-}3.\text{a, b})$$

$$\sigma' = \frac{p_i - p_r}{p_i - p_w}$$

where $\tau_i$ and $\tau_r$ are the incident and re-emitted tangential momentum fluxes, and $p_i$, $p_r$, $p_w$ are respectively the normal fluxes of momentum that are incident, re-emitted, and that which would be re-emitted if all molecules left in Maxwellian equilibrium with the surface. In this model, we shall deal mainly with the two extreme cases: perfectly diffuse reflection ($\sigma = \sigma' = 1$), and perfectly specular reflection ($\sigma = \sigma' = 0$).

With the above definitions, the normal and tangential force components, denoted by N and T, respectively, can be given in terms of the normal and tangential force coefficients:

$$N = \rho_a r(s)|\overline{V}_a|^2 C_N, T = \rho_a r(s)|\overline{V}_a|^2 C_T \quad (4\text{-}4.\text{a,b})$$

Where $\rho_a$ is the atmospheric mass density at the given altitude. This is calculated by interpolation of the U.S. Standard Atmosphere density versus altitude tables.

For free molecular flow around the right circular cylinder illustrated in FIG. 25, the force coefficients are given by:

$$C_N = \frac{\sqrt{\pi}}{S}(4 + \sigma - 2\sigma') \quad (4\text{-}5.\text{a, b})$$

$$e^{-\xi^2/2}\left[\left(\frac{1}{2} + \frac{1}{3}\xi^2\right)I_0(\xi^2/2) + \left(\frac{1}{6} + \frac{1}{3}\xi^2\right)I_1(\xi^2/2)\right]\sin\beta +$$

$$\frac{\pi^{3/2}}{4|\overline{V}_a|}\sigma'\sqrt{2T_w R/M}\sin\beta$$

$$C_T = \frac{\sqrt{\pi}}{S}\sigma e^{-\xi^2/2}\left[(1+\xi^2)I_0(\xi^2/2) + \xi^2 I_1(\xi^2/2)\right]\cos\beta$$

[See further: L. Talbot. "Free Molecule Flow Forces and Heat Transfer for an Infinite Circular Cylinder at an Angle of Attack". University of California Institute of Engineering Research, Berkeley, Calif., Technical report No. HE-150-136, 26 Mar., 1956.] where $I_0(\xi^2/2)$ and $I_1(\xi^2/2)$ are modified Bessel functions of the first kind, $T_w$ is the temperature of the tether surface, and:

$\xi = S \sin \beta$ $S$ = the speed ratio = $|\overline{V}_a|/V_{av}$ \quad (4-6.a,b)

and where $V_{av}$ is the average speed of atmospheric molecules:

$V_{av} = \sqrt{2RT_a/M}$ $T_a$ = Atmospheric temperature $M$ = Average molecular weight \quad (4-7.a-c)

The above expressions are complex to implement. Moreover, through (4-5.a) the force equations are coupled to the thermal dynamics of the system. Fortunately, we can invoke the large speed ratio approximation. Even at temperature ~27K (with M=28 g/mole) the average molecular speed is less than 500 m/s. At higher altitudes as can be judged from the U.S. Standard Atmosphere, the molecular speed is considerably less. On the other hand, during the most critical portion of atmospheric entry, the entry vehicle speed is of the order of several kilometers per second. Thus, except for very small angles of attack, both S and $\xi$ are ~10 or greater. Series expansions of the Bessel functions for large arguments yield:

$$I_0(\xi^2/2) \text{ and } I_1(\xi^2/2) \cong \frac{1}{\sqrt{\pi}\xi}e^{\xi^2/2}\left(1 + O\left(\frac{1}{S^2}\right)\right) \quad (4\text{-}8.\text{a, b})$$

Substituting these expressions into (4-5) and neglecting terms of order $1/S^2$ or smaller, we obtain:

$$C_N = \frac{2}{3}(4 + \sigma - 2\sigma')\sin^2\beta \quad (4\text{-}9.\text{a, b})$$

$$C_T = 2\sigma\sin\beta\cos\beta$$

'Now, returning to (4-4), we express the force per unit length, denoted here by $\overline{F}_a(s)$, in vector notation. Let $\nabla_{at}(s)$ and $\overline{v}_{an}(s)$ denote the components of $\nabla_a(s)$ parallel to and orthogonal to $\hat{t}(s)$:

$\overline{V}_{at}(s) = (\overline{V}_a \cdot \hat{t}(s))\hat{t}(s)$ $\overline{V}_{an}(s) = \overline{V}_a - (\overline{V}_a \cdot \hat{t}(s))\hat{t}(s)$ \quad (4-10.a,b)

And define the unit normal vector:

$$\hat{n}(s) = \vec{V}_{an}/|\vec{V}_{an}| \quad (4\text{-}11)$$

Then combining (4-4) and (4-9) and making use of (4-10,11), we have:

$$\vec{F}_a(s) = -\rho_a r(s)|\vec{V}_a|^2 \left\{ \frac{2}{3}(4 + \sigma - 2\sigma')\sin^2\beta \hat{n}(s) + 2\sigma|\sin\beta|\cos\beta \hat{t}(s) \right\} \quad (4\text{-}12)$$

Where the minus sign arises because $\vec{F}_a(s)$ always acts in a direction that opposes $\vec{V}_a(s)$. Finally, noting that $$|\vec{V}_a| \sin\beta \hat{n}(s) = \vec{V}_{an} \text{ and } |\vec{V}_a| \cos\beta \hat{t}(s) = \vec{V}_{at} \quad (4\text{-}13)$$

we obtain:

$$\vec{F}_a(s) = -\rho_a r(s)|\vec{V}_{an}|^2 \left\{ \frac{2}{3}(4 + \sigma - 2\sigma')\vec{V}_{an} + 2\sigma \vec{V}_{at} \right\} \quad (4\text{-}14)$$

We conclude this section of the analysis by relating this model to the discretized tether model introduced in the last section. Using the definition $\hat{l}_k = (\bar{x}_{k+1} - \bar{x}_k)/|\bar{x}_{k+1} - \bar{x}_k|$ given in (3-8.b), we define the tangent vector at the position of the kth mass as an average of the tangent vectors of the adjoining segments:

$$\hat{t}_k = \begin{cases} (\hat{l}_k + \hat{l}_{k-1})/|(\hat{l}_k + \hat{l}_{k-1})|, & k = 2, \ldots, N \\ \hat{l}_k, & k = N+1 \end{cases} \quad (4\text{-}15)$$

This takes the place of $\hat{t}(s)$. (4-10) are replaced by:

$$\vec{V}_{at}(k) = (\vec{v}_a(k) \Box \hat{t}_k)\hat{t}_k$$

$$\vec{v}_{an}(k) = \vec{v}_a(k) - (\vec{V}_a(k) \Box \hat{t}_k)\hat{t}_k \quad (4\text{-}16\text{.a,b})$$

for $k = 2, \ldots, N+1$. Using (2-3) and (3-6), we find that $$\vec{v}_a(k) = \hat{x}(v_{kx} - \Omega(y_k + R_E + H)) + \hat{y}(v_{ky} + \Omega x_k) + \hat{z}v_{kz} \quad (4\text{-}17)$$

The total aerodynamic force on a segment of length l is applied to mass k. We replace r(s) in (4-14) by the average ½(r(kl)+r((k−1)l)). Thus the total force on mass k, using (4-15)-(4-17) is:

$$\frac{1}{2}(r(kl) + r((k-1)l))\vec{F}_a(s) = -\frac{1}{2}\rho_a l(r(kl) + r((k-1)l)) \quad (4\text{-}18)$$

$$|\vec{V}_{an}(k)|\left\{ \frac{2}{3}(4 + \sigma - 2\sigma')\vec{V}_{an}(k) + 2\sigma \vec{V}_{at}(k) \right\} =$$

$$-\frac{1}{2}\rho_a A_k |\vec{V}_{an}(k)|\left\{ \frac{2}{3}(4 + \sigma - 2\sigma')\vec{V}_{an}(k) + 2\sigma \vec{V}_{at}(k) \right\}$$

where in the last line, we have used definition (3-3). The force per unit mass, $\vec{f}_k^{(aero)}$, is this expression divided by $m_k$:

$$\vec{f}_k^{(aero)} = -\frac{1}{2m_k}\rho_a A_k |\vec{V}_{an}(k)|\left\{ \frac{2}{3}(4 + \sigma - 2\sigma')\vec{V}_{an}(k) + 2\sigma \vec{V}_{at}(k) \right\} \quad (4\text{-}19)$$

In summary, equations (3-9), with (3-8) and (4-19) and associated definitions constitute the equations of motion of the system. These are incorporated into the "skippertow" simulation code, wherein the dynamical equations are integrated using a modified third-order Adams method. The integration method necessitates use of a smaller time step than the popular fourth-order Runge-Kutta algorithm, but requires only two derivative evaluations per time step. In the following sections of this model, we use the simulation code to examine various dynamics issues. This part of the model analysis closes with a summary of what the remainder of this analysis model must consider relating to the addition of fully coupled fore-body dynamic, formulation of the thermal dynamics of the system, and complete simulations of the entry trajectory in order to refine our choice of system parameters.

5. Effects of Initial Conditions and Surface Interaction Parameters

In this section the analytical model, simulation code is used to study the dynamical motion resulting from various initial tether deployment states in the high-altitude, nearly orbital portion of flight. This is done for the two extreme cases of the surface interaction parameters, namely: perfectly diffuse reflection ($\sigma=\sigma'=1$), and perfectly specular reflection ($\sigma=\sigma'=0$). The tether parameters assumed are:

$$L = 20 \text{ km}; r(s) = \text{constant} = 0.5 \text{ mm}$$

$$E = 248 \times 10^9 N\text{-}m^{-2}; \rho_T = 2100 \text{ kg-}m^{-3}$$

$$\eta = 1.0 \times 10^{-3} \quad (5\text{-}1\text{.a,c})$$

The values for L and r are consistent with [1]. The elasticity modulus and mass density are approximately those of Kevlar. For future reference, we also stipulate the breaking tenacity, $E_{break}$, which when multiplied by the strain yields the stress at which failure occurs. For the stipulated material:

$$E_{break} = 7.0 \times 10^9 N\text{-}m^{-2} \quad (5\text{-}2)$$

In the following discussion, the tether is modeled with 40 segments:

$$N = 40 \quad (5\text{-}3)$$

For the initial skipper flight condition, we assume a 100 km altitude and that the towing speed is the orbit speed:

$$H = 100 \text{ km}$$

$$\Omega = \Omega_0 \quad (5\text{-}4\text{.a,b})$$

We first study the tether behavior when the initial configuration is at a large angle to the stream direction (the x-axis). In particular, suppose that the tether, due to gravity gradient is aligned along the negative y-axis, as shown in FIG. 26. We start with the perfectly specular reflection case, $\sigma=\sigma'=0$. The quantity t denotes the time after the initial instant At the outset, (FIG. 28, t=26 s), the tether is blown back by the air stream such that a diagonal portion next to the attachment point joins a straight section perpendicular to the wind near the free end. The diagonal section that is swept back from the fore-body grows to cover nearly the entire length (FIG. 29, t=41.4 s). This represents a transverse wave on the string that subsequently rebounds from the free end to produce a whip-like motion and a reverse curl near the free end, while the remaining portion rotates toward the x axis (FIG. 30, t=46.6). The reverse curl begins to produce slack, zero tension regions in the string. This appears to engender somewhat chaotic motion. Overall counterclockwise rotation continues, then gradually comes to a halt at t=82.77 s (FIG. 31). At this point, the tether reaches a maximum excursion along the positive y axis of 16.8 km. then the airstream reverses its rotation to the clockwise and the tether passes across the x-axis again (FIG. 32, t=142.2 s). Again a lateral wave hits the free end and rebounds to produce a strong whip-like rotation near the free end and a reversed curling motion. The clockwise rotation is halted at t=186.2 s (FIG. 33) and the tether attains a maximum distance along the negative y axis. The whip-like motions and overall oscillations continue for an extended period.

The following table summarizes the maximum excursions along the y axis. It is evident that the departures from the x axis slowly damp out, but at a rate that is much less than exponential. This can be expected from the fact that in the specular reflection case, the magnitude of the aerodynamic forces depends only on the normal component of velocity, and the force acts only in the normal direction. There is negligible force when the tether is tangent to the stream because (4.5.b) shows that $C_T=0$ when $\sigma=0$. Thus as the tether assumes a shape that is closer to the x axis, the stabilizing aerodynamic force is strongly reduced in magnitude. Also, for similar reasons, the whip-like curling motions are relatively weakly opposed by the aerodynamics since those portions of the curl that are parallel to the stream experience almost no opposing force.

Of greater importance to the use of the tether as an entry trajectory controller is the observation that the tension distribution becomes chaotic. Many slack regions develop and the tension at any single point is only intermittently positive. For example, FIG. 34 shows the tension distribution in a fairly late stage when the tether shape begins to "settle down". Even in this case, there is rapid variation and wide regions of zero tension, especially near the free end. Moreover, the tension at the attachment point, which actually provides the control force, varies widely and is often zero. Trajectory control is impossible unless the system can be made to produce a non-zero, smoothly varying and predictable tension at the attachment point.

One way to ameliorate this problem is to choose materials that offer diffuse reflection of atmospheric molecules in free molecular flow. In this case, the magnitude of the aerodynamic force is still proportional to the normal component of stream velocity, but it is also proportional to stream velocity itself, and thus can act in both the normal and tangential directions. FIGS. 35-40 show results for the diffuse reflection case, $\sigma=\sigma'=1$. The plots display the tether shape at approximately the same stages of development as in FIGS. 28-33 for the specular reflection case. The shapes tend to be smoother and the developments occur slower, with fewer slack regions. Thus the use of non-metallic tether material that diffusely reflects atmospheric molecules in free molecular flow is recommended. In the following we assume only diffuse reflection.

On the other hand, chaotic motion near the free end still occurs and convergence to a straight shape along the stream direction is still very slow. Moreover, even when such convergence occurs, the angle of attack approaches zero, and the aerodynamic drag is very small ($C_T=0$ in the large speed ratio approximation, but equal to $\sqrt{\pi}/S$ according to the precise formula (4.5.b)). Thus the tension at the attachment point is very small and sensitive to initial conditions. To remedy this difficulty, it is necessary to add an aft-body attached to the free end of the tether. To model this we increase the mass of the N+1 point mass and treat it as a sphere of given radius to obtain the aerodynamic model. More specifically, for point mass N+1, we set:

$$\vec{f}_{N+1}^{(aero)} = -\frac{1}{m_{aft}} \rho_a A_{aft} |\vec{V}_a(N+1)| \vec{V}_a(N+1) \quad (5\text{-}5)$$

Where $A_{aft}$ is the effective frontal area of the aft-body which is assumed to be a sphere, but it may be another more optimal shape as may be determined by further detailed models or by flight testing. The sphere is used in this model as an example and to simplify the simulation.

Assuming a two meter radius, FIG. 41-h show the development of the motion starting from the vertical initial condition shown in FIG. 26. In this case we show the shapes only at the times when the end of the tether is at maximum displacement from the x axis. It is clear that the tether shapes are much smoother. There is negligible whip-like snap back as in previous cases, and the tension is nearly always positive. The motion shows a steady convergence toward the x axis and becomes nearly a straight line in the later stages. Several oscillations later, the maximum displacement from the x axis is less than 1 Ian and the shape is nearly a straight line, as shown in FIG. 49. At the same time the tension (FIG. 50) settles down to a nearly constant distribution.

The convergence situation is summarized by FIG. 51 which shows the maximum excursions from the x axis and the times at which they occur. There is steady, albeit slower than exponential convergence. Maximum departure from the x-axis falls below 1 km after a half-hour. Therefore the addition of an aft-body as part of the present invention is useful in order to reduce sensitivity to initial conditions and to generate non-negligible tether tension in the early part of the entry trajectory.

In this example, it still takes a half-hour for the maximum departure from the x-axis to fall below 1 km, even with a rather large aft-body. Because of this it is desirable to gradually deploy the tether behind the fore-body at a slow rate such that there is always some tension in the tether. In this case, when the towing speed is nearly the orbital speed, we can expect the deployed tether to be aligned with the x-axis. This method of operation is recommended. At the same time, if the gradual deployment method should fail and the tether deploy all at once, the action of the aft-body will still align it with the stream direction.

6. Tether Dynamics at Sub-Orbital Velocities

In this section of the mathematical model of the present invention, we examine tether motion when the fore-body travels at a speed that is below orbital speed. It is assumed that the foregoing recommendations are in place, i.e. specularly reflective materials, an aft-boy, and gradual deployment from the forebody. Based on the last assumption, we assume in the following calculations that the tether/aft-body are initially along the x axis.

In this case, $\Omega<\Omega_0$, and the local acceleration of gravity, $\tilde{g}$, is nonzero. Thus we expect the tether to sag under this partial gravity. The tether will therefore present a nonzero angle-of-attack along its entire length, thereby increasing the tension at the attachment point. There are two questions to be examined. First, will the tether assume a static shape, without any occurrence of a Helmholtz or "flag fluttering" instability? Secondly, assuming it does settle into a static shape, how is the attachment point tension affected?

Rather than assume a large aft-body, let us consider the result if the size of the aft body is reduced to 1 meter diameter and suppose it is a mylar balloon of 1 mm thickness. Assuming a mass density of 1390 kg/m³, the aft body mass is 4.367 kg. Thus, using (3.2), $$m_{N+1} = \frac{1}{2} l\pi \rho_T r^2 + 4.367 \text{ kg.}$$

To provide an initial example, the fore-body speed is assumed to be 80% of the orbit speed, i.e., $\Omega=0.8\Omega_0$. As FIG. 53 shows, the tether begins to sag under gravity until its motion is temporarily halted by aerodynamics. Then (FIG. 54) it rebounds, and then sinks again. This oscillation continues with decreasing amplitude until the tether appears to (almost) settle down into a steady shape. However, some time later, persistent lateral waves appear near the free end FIG. 55 shows the shape at t=5183 and approximately ten seconds later, at 5192.1. A lateral wave of ~500 m amplitude is evident at the free end, and lower amplitude variations are also present across the tether length. FIG. 56 shows the tension distribution at this time. The variability is largely caused by traveling waves propagating in the string. The wave amplitudes appear to reach constant values; resembling a steadily fluttering flag, but there is still great variability in the tension distribution.

To see if this chaotic motion can be stabilized, let us revert to the case of a 2 m radius aft-body. FIG. 57 shows the initial sag and rebound shapes, which are a lot smoother in this case. After running the simulation for some time, the tether settles into the static shape shown in FIG. 58. Note that the shape is nearly a straight line. FIG. 59 shows the corresponding tension distribution, which is also very nearly linear and constant.

The foregoing results show there is a combination (or combinations) of altitude and towing speed that results in what we shall call flag flutter instability. While the amplitude of flutter does not grow beyond a certain point, there results rapidly changing tension distributions, which are not desirable for the entry trajectory control application. We also see that it is possible to select aft-body parameters that will stabilize the system. However the stabilizing design of the aft-body remains in question. Simulation studies of every possible flight condition are impractical. Clearly, analysis is needed to determine the general conditions under which the flag flutter instability occurs in order to attain a stable predictable design.

At this point in the analysis we have developed a fairly complete model of the dynamics of a tether being towed by a massive fore-body in steady horizontal flight, including aerodynamic forces due to free molecular flow. The dynamic simulations performed according to this model indicate:

a. To promote faster stabilization in the initial portion of atmospheric entry, the tether material should be capable of diffuse reflection of atmospheric molecules.

b. In order to prevent large uncertainties in initial entry, the tether should be deployed gradually a so that the initial shape is parallel to the stream direction.

c. To provide insensitivity to initial conditions, guarantee some initial tension and devise some mechanism whereby the tether settles into to a steady shape and tension distribution for all flight regimes, it is necessary to add an aft-body attached to the free end of the tether.

d. The aft-body design parameters must be chosen to prevent flag flutter instability.

This leads to the next part of the mathematical model analysis of the present invention Skipper deorbit system:

A. Analytical investigation of the conditions leading to flag-flutter instability, and determination of corresponding design rules.

B. Development of a fore-body model and coupling it to the tether dynamics in the simulation code.

C. Development of an aerodynamic heating model, and breaking conditions for the simulation code.

D. Exercise the complete simulation code in order to design the entry trajectory control law.

7. Equations of Motion for Stability Analysis

As mentioned in Section 6, above, this analysis of the present invention must determine the general conditions under which "flag flutter instability" occurs in order to attain a stable predictable design. To accomplish this, we first formulate the continuum dynamics problem by allowing N to approach infinity in the lumped mass model previously developed for the simulation code.

This process amounts to assembling Equations (3-19) with elastic forces given by (3-2), (3-5), (3-7), (3-8), and aerodynamic forces defined by (4-16), (4-19) and (5-5-), and taking the limit $N\to\infty$ while maintaining L=Nl fixed. In performing this limiting process, we identify a material point on the filament centerline by its arclength, s, from the attachment point when the string is un-stretched. The resulting equations of motion in the continuum formulation are:

$$\ddot{\bar{x}} = 2\Omega(\dot{y}\hat{x} - \dot{x}\hat{y}) - (\bar{g} - 3\Omega_0^2 y)\hat{y} - \qquad (7\text{-}1)$$

$$(\Omega_0^2 - \Omega^2)\bar{x} + \frac{1}{\pi r^2 \rho_T}\frac{\partial}{\partial s}\left(T\frac{\partial \bar{x}}{\partial s}\bigg/\left|\frac{\partial \bar{x}}{\partial s}\right|\right) - \frac{\rho_a}{\pi r \rho_T}|\vec{V}_{an}|\vec{V}_a$$

$$T(s,t) = G\left(\left|\frac{\partial \bar{x}}{\partial s}\right| - 1\right) + \eta G\left(\frac{\partial \bar{x}}{\partial s}\Box\frac{\partial^2 \bar{x}}{\partial s \partial t}\right)\bigg/\left|\frac{\partial \bar{x}}{\partial s}\right|, \quad G = \pi r^2 E \qquad (7\text{-}2.\text{a, b})$$

$$\vec{V}_a = \dot{\bar{x}} - (\Omega y + V)\hat{x} + \Omega x \hat{y} \qquad (7\text{-}3.\text{a-c})$$

$$V = \Omega(R_E + H)$$

$$\vec{V}_{an} = \vec{V}_a - \left(\vec{V}_a \Box \frac{\partial \bar{x}}{\partial s}\bigg/\left|\frac{\partial \bar{x}}{\partial s}\right|\right)\frac{\partial \bar{x}}{\partial s}\bigg/\left|\frac{\partial \bar{x}}{\partial s}\right|$$

with boundary conditions:

$$s = 0: \bar{x} = 0 \qquad (7\text{-}4.\text{a, b})$$

$$s = L: \ddot{\bar{x}} = 2\Omega(\dot{y}\hat{x} - \dot{x}\hat{y}) - (\bar{g} - 3\Omega_0^2 y)\hat{y} -$$

$$(\Omega_0^2 - \Omega^2)\bar{x} - \frac{1}{m_{af}}T\frac{\partial \bar{x}}{\partial s}\bigg/\left|\frac{\partial \bar{x}}{\partial s}\right| - \frac{\rho_a}{m_{af}}A_{af}|\vec{V}_a|\vec{V}_a$$

Here $\bar{x}$, T, and $\bar{V}_a$ are the continuously-valued functions of both time and arclength that are the continuum counterparts of the lumped mass position, link segment tension and stream velocity at the mass locations. [Compare this with D. Yong, "Strings, Chains and Ropes". *SLAM Review*, Vol. 48, No. 4, pp 771-781, 2006.]

This analysis is closely related to the problem of a periodically driven chain hanging under gravity. This apparently simple system displays complex dynamics; including parametric resonance, instability, chaotic motion, and even self-knotting [See further: A. Belmonte, M. J. Shelley, S. T. Eldakar, and C. H. Wiggens, "Dynamic Patterns and Self-Knotting of a Driven Hanging Chain". *Physical Review Letters*. Vol. 87, No. 11, 10 Sep. 2001, which displays some rather spectacular examples. This reference describes a motion similar to one observed in connection with a towed cable system:

"We also observe a state, occurring only at large L (small s), in which the chain simultaneously rotates and swings three dimensionally around its suspension point, which we term stellate as the chain traces a multipointed pattern during its motion (Reference FIGS. 1c and 1d) . . . "]

The hanging chain results indicate that one must carefully analyze the skipper system to ensure that unstable or chaotic motion is avoided.

Before embarking on this task, one can introduce reasonable approximations for the gravity and inertial terms in (7-1), (7-2), and (7-4.b). While $\tilde{g}$ is typically a substantial fraction of one "g", even given a tether length of 20 km, the terms $-3\Omega_0^2 y$ and $(\Omega_0^2-\Omega^2)\bar{x}$ are on the order of milli-g's. These can be neglected in (7-1) and (7-4.b). Moreover, the stability analysis is concerned with small motions from a static equilibrium shape, so that the coriolis term, $2\Omega(\dot{y}\hat{x}-\dot{x}\hat{y})$ can also be neglected. Likewise, because $x<<(R_E+H)$ and $y<<(R_E+H)$, these terms are much smaller than V and can be neglected in (7-3.a).

Making these simplifications, we get:

$$\ddot{\bar{x}} = \frac{1}{\pi r^2 \rho_T}\frac{\partial}{\partial s}\left(T\frac{\partial \bar{x}}{\partial s}\Big/\left|\frac{\partial \bar{x}}{\partial s}\right|\right) - \frac{\rho_a}{\pi r \rho_T}|\vec{V}_{an}|\vec{V}_a - \tilde{g}\hat{y} \qquad (7\text{-}1)$$

$$T(s,t) = G\left(\left|\frac{\partial \bar{x}}{\partial s}\right|-1\right) + \eta G\left(\frac{\partial \bar{x}}{\partial s}\Box\frac{\partial^2 \bar{x}}{\partial s \partial t}\right)\Big/\left|\frac{\partial \bar{x}}{\partial s}\right|, \qquad (7\text{-}2.\text{a, b})$$

$$G = \pi r^2 E$$

$$\vec{V}_a = \dot{\bar{x}} - V\hat{x} \qquad (7\text{-}3.\text{a-c})$$

$$V = \Omega(R_E + H)$$

$$\vec{V}_{an} = \vec{V}_a - \left(\vec{V}_a\Box\frac{\partial \bar{x}}{\partial s}\Big/\left|\frac{\partial \bar{x}}{\partial s}\right|\right)\frac{\partial \bar{x}}{\partial s}\Big/\left|\frac{\partial \bar{x}}{\partial s}\right|$$

with boundary conditions:

$$s = 0: \bar{x} = 0 \qquad (7\text{-}8.\text{a, b})$$

$$s = L: \ddot{\bar{x}} = -\frac{1}{m_{af}}T\frac{\partial \bar{x}}{\partial s}\Big/\left|\frac{\partial \bar{x}}{\partial s}\right| - \frac{\rho_a}{m_{af}}A_{af}|\vec{V}_a|\vec{V}_a - \tilde{g}\hat{y}$$

In our stability analysis to follow, it is assumed that the atmospheric density is constant along the tether and equal to its value at the attachment point, despite the very large tether length of 20 km in the nominal design concept. This is justified on a number of counts. First, for the flight regimes, (H,V) wherein the attachment point tension is largest, the tether is swept back toward the x axis, so that the variation of altitude along the tether is a small fraction of the nominal length. Secondly, models of heating and breakage conditions in the sequel will show that a 20 km tether will experience extreme heating rate gradients and frequent breakage near the free end—thus necessitating the use of a shorter tether. A shorter tether will also be less sensitive to varying atmospheric conditions with altitude since it will "sample" variations over a smaller altitude range. Finally, a shorter tether, by reducing the spatial dependence of the density will render the dynamics more predictable, e.g. the equilibrium solution for given (H,V) takes a particularly simple form, as shown below.

In the following three sections of this mathematical analysis of the present invention, the problem without the aft body is considered. First, in Section 8, the equilibrium solution is obtained. Then, in Section 9, the dynamics of small departures from equilibrium are formulated, and stability conditions for this static state are obtained in Section 10. Subsequently the full problem, comprising Equations (7-5)-(7-8), is considered, viewing the aft body terms in (7-8.b) as a perturbation.

8. Equilibrium Solution

Here, all the time derivatives in (7-5)-(7-8) are set to zero, and we consider the case $m_{af} \to \infty$ in (7-8.b) to obtain:

$$s=L: T=0 \qquad (8\text{-}1)$$

which replaces (7-8.b).

Under these conditions, Equations (7-5)-(7-8) become:

$$0 = \frac{1}{\pi r^2 \rho_T}\frac{\partial}{\partial s}(T_s \hat{t}_s) + \frac{\rho_a V^2}{\pi r \rho_T}|\hat{x} - (\hat{x}\Box\hat{t}_s)\hat{t}_s|\hat{x} - \tilde{g}\hat{y} \qquad (8\text{-}2.\text{a-d})$$

$$T_s(s) = G\left(\left|\frac{\partial \bar{x}}{\partial s}\right|-1\right)$$

$$s = 0: \bar{x}_s = 0$$

$$s = L: T_s = 0$$

Where the subscript "s" indicates the quantity pertains to its value for the static equilibrium configuration, and $\hat{t}_s$ denotes the unit tangent vector, $$\frac{\partial \bar{x}_s}{\partial s}\Big/\left|\frac{\partial \bar{x}_s}{\partial s}\right|.$$

In this case, one can see that the tether equilibrium shape is a straight line, as suggested by the simulation results in Section 6. Let us proceed on the assumption that $\hat{t}_s$ is a constant vector. Let $\hat{n}_s$ ($\hat{n}_s\Box\hat{t}_s=0$, $\hat{n}_s\Box\hat{y}>0$) be the unit normal vector to the filament curve. If $\theta$ is the angle between the x axis and the unit tangent vector, then one can write:

$$\hat{t}_s = \cos\theta\hat{x} - \sin\theta\hat{y}, \hat{n}_s = \sin\theta\hat{x} + \cos\theta\hat{y} \qquad (8\text{-}3.\text{a,b})$$

Forming the dot product of (8-2.a) with $\hat{t}_s$ assuming $\hat{t}_s$ is a constant vector, and using (8-2.d) after integrating the expression for $T_s(s)$ one obtains:

$$T_s(s)=r\rho_a V^2(L-s)[\cos\theta+2\gamma]\sin\theta \qquad (8\text{-}4)$$

where we define:

$$\gamma = \frac{\pi \rho_T r \tilde{g}}{2\rho_a V^2} = \frac{\pi}{2}\frac{\rho_T}{\rho_a}\frac{r}{R_E+H}\left(\left(\frac{V_0}{V}\right)^2 - 1\right) \qquad (8\text{-}5)$$

and where the last line follows by substitution of the previous expressions for $\tilde{g}$, V, and $V_0$. Next, taking the dot product of (8-2.a) with $\hat{n}_s$ and assuming $\hat{t}_s$ and hence $\hat{n}_s$ are constant gives:

$$\sin^2\theta = 2\gamma\cos\theta \qquad (8\text{-}6)$$

From (8-6) we obtain:

$$\sin\theta = \sqrt{2[-\gamma^2+\gamma\sqrt{1+\gamma^2}]} \qquad (8\text{-}7)$$

Finally, substituting all the above results back into (8-2.a) gives $d\hat{t}_s/ds=0$ identically, showing that the only unique solution for the equilibrium shape is a straight line.

Collecting results, we can summarize as follows:

$$\bar{x}_s(s) = \left(1 + \delta_s(s=0)\left(L - \frac{1}{2}s\right)\right)s\hat{t}_s \qquad (8\text{-}8.\text{a-f})$$

$$\hat{t}_s = \cos\theta\hat{x} - \sin\theta\hat{y}$$

$$\delta_s = \text{static axial strain} = T_s(s)/G$$

$$T_s(s) = r\rho_a V^2(L-s)[\cos\theta + 2\gamma]\sin\theta$$

$$\sin\theta = \gamma\sqrt{2\left(-1 + \sqrt{1 + 1/\gamma^2}\right)}$$

$$\gamma = \frac{\pi}{2}\frac{\rho_T}{\rho_a}\frac{r}{R_E+H}\left(\left(\frac{V_0}{V}\right)^2 - 1\right)$$

9. Dynamics of Small Departures from Equilibrium

To investigate the stability of the equilibrium state found in the last section, we specialize the equations of motion, (7-5)-(7-8), to the case of small departures from equilibrium. Let:

$$\bar{x}(t,s)=(1+\delta)\hat{t}_s+u(t,s)\hat{t}_s+w(t,s)\hat{n}_s \quad (9\text{-}1)$$

Where u and w are of order $\epsilon L$, $\epsilon \ll 1$. Unless otherwise noted, we evaluate the various terms in (7-5)-(7-8) up to contributions of order unity and order $\epsilon$, but neglect higher order terms. This prescription leads to:

$$\frac{\partial \bar{x}}{\partial s} \Big/ \left|\frac{\partial \bar{x}}{\partial s}\right| = \hat{t}_s + \frac{\partial w}{\partial s}\hat{n}_s + O(\epsilon^2) \quad (9\text{-}2.\text{a-c})$$

$$T(s,t) = T_s(s) + G\frac{\partial u}{\partial s} + \eta G\frac{\partial^2 u}{\partial s \partial t} + O(\epsilon^2)$$

$$|\bar{V}_{an}| = V\left(\sin\theta - \cos\theta\frac{\partial w}{\partial s}\right) + O(\epsilon^2)$$

where we also treat the term $$\eta G \frac{\partial^2 u}{\partial s \partial t}$$

as or order $\epsilon$ since me material damping coefficient may be considered quite small. Substituting these expressions into (7-5) and noting that the time-independent terms cancel out by virtue of the static equilibrium solution, we obtain:

$$\ddot{u}\hat{t}_s + \ddot{w}\hat{n}_s = \frac{1}{\pi\rho_T r^2}\frac{\partial}{\partial s}\left[\left(T_s + G\frac{\partial u}{\partial s}\right)\frac{\partial w}{\partial s}\hat{n}_s + G\frac{\partial u}{\partial s}\hat{t}_s\right] - \quad (9\text{-}3)$$

$$\frac{\rho_a V}{\pi\rho_T r}\left[\sin\theta(\dot{u}\hat{t}_s + \dot{w}\hat{n}_s) + \cos\theta\frac{\partial w}{\partial s}\hat{x}\right] + O(\epsilon^2)$$

Note that the term $$\frac{\partial u}{\partial s}\frac{\partial w}{\partial s}$$

might appear to be of order $\epsilon^2$, but it will be seen that the coefficient multiplying it is quite large, and moreover, this term is the most critical to the stability issue since it represents a parametric excitation similar to that occurring in the vertically excited hanging chain problem. In addition, since $T_s(L)=0$ this term dominates in the region near the free end. Thus, ignoring the order $\epsilon^2$ terms except as noted, and taking the dot products of (9-3) with $\hat{t}_s$ and $\hat{n}_s$ gives the equations of motion for small departures from the static equilibrium:

$$\ddot{w} = \frac{1}{\pi\rho_T r^2}\frac{\partial}{\partial s}\left[\left(T_s + G\frac{\partial u}{\partial s}\right)\frac{\partial w}{\partial s}\right] - \frac{\rho_a V}{\pi\rho_T r}\left[\dot{w} + V\cos\theta\frac{\partial w}{\partial s}\right]\sin\theta \quad (9\text{-}4.\text{a,b})$$

$$\ddot{u} = \frac{G}{\pi\rho_T r^2}\frac{\partial^2 u}{\partial s^2} - \frac{\rho_a V}{\pi\rho_T r}\left[\dot{u}\sin\theta + V\cos^2\theta\frac{\partial w}{\partial s}\right]$$

with boundary conditions:

$$s = 0: \quad u = 0, w = 0 \quad (9\text{-}5.\text{a,b})$$

$$s = L: \quad \frac{\partial u}{\partial s} = 0, |w| < \infty$$

To clarify the parameter dependencies, we conclude the section with the dimensionless forms of (9-4) and (9-5). Define the dimensionless arclength and time as:

$$\xi = (L-s), \quad (9\text{-}6.\text{a, b})$$

$$\tau = \sqrt{\frac{2}{\pi}\frac{\rho_a V^2}{\rho_T L r}}\, t$$

Also, introduce the dimensionless displacements from Equilibrium:

$$U=u/L, W=w/L \quad (9\text{-}7.\text{a,b})$$

And define the following parameters:

$$\kappa = \sqrt{\frac{\pi}{2}\frac{r}{L}\frac{E}{\rho_a V^2}}, \quad (9\text{-}8.\text{a, b})$$

$$\lambda = \sqrt{\frac{2\rho_a L}{\pi\rho_T r}}$$

With these definitions, (9-4) and (9-5) can be written:

$$\frac{\partial^2 W}{\partial \tau^2} = \quad (9\text{-}9.\text{a-d})$$

$$\frac{\partial}{\partial \xi}\left[\frac{1}{2}\tan\theta\,\xi\frac{\partial W}{\partial \xi} - \kappa^2\frac{\partial U}{\partial \xi}\frac{\partial W}{\partial \xi}\right] - \frac{1}{2}\left[\lambda\frac{\partial W}{\partial \tau} - \cos\theta\frac{\partial W}{\partial \xi}\right]\sin\theta$$

$$\frac{\partial^2 U}{\partial \tau^2} = \kappa^2\frac{\partial^2 U}{\partial \xi^2} - \frac{1}{2}\left[\lambda\frac{\partial U}{\partial \tau}\sin\theta - \cos^2\theta\frac{\partial W}{\partial \xi}\right]$$

$$\xi = 0: \quad \frac{\partial U}{\partial \xi} = 0, |W| < \infty$$

$$\xi = 1: \quad U = W = 0$$

We see that aside from the small (but not unimportant) damping factor, $\lambda$, the system is driven by just two parameters, $\theta$ (alternately $\gamma$) and $\kappa$.

10. Stability Analysis Without an Aft Body

To gain insight, we perform eigen-analysis of various operators in (9-9) to reduce these relations to ordinary differential equations for the various mode coefficients. First consider the eigen-problem associated with the terms $$\frac{\partial}{\partial \xi}\left[\frac{1}{2}\tan\theta\,\xi\frac{\partial W}{\partial \xi}\right] + \frac{1}{2}\left[\cos\theta\frac{\partial W}{\partial \xi}\right]\sin\theta$$

in (9-9.a). Setting $W=\hat{W}(\xi)\exp(i\omega\tau)$, this takes the form:

$$\frac{d}{d\xi}\left[\frac{1}{2}\tan\theta\,\xi\frac{d\hat{W}}{d\xi}\right] + \frac{1}{2}\left[\cos\theta\frac{d\hat{W}}{d\xi}\right]\sin\theta = -\omega^2\hat{W} \quad (10\text{-}1)$$

From which we deduce:

$$\hat{W} = C_1 \xi^{-\cos^2\theta/2} J_{\cos^2\theta}\left(2\sqrt{2\frac{\cos\theta}{\sin\theta}}\,\xi^{1/2}\omega\right) + \quad (10\text{-}2)$$

$$C_2 \xi^{-\cos^2\theta/2} J_{-\cos^2\theta}\left(2\sqrt{2\frac{\cos\theta}{\sin\theta}}\,\xi^{1/2}\omega\right)$$

Where $$J_{\cos^2\theta}\left(2\sqrt{2\frac{\cos\theta}{\sin\theta}}\,\xi^{1/2}\omega\right) \qquad (5)$$

is the Bessel motion of the first kind, of order $\cos^2\theta$ and $C_1$ and $C_2$ are constants. Since, the second term approaches infinity as $\xi$ approaches zero, $C_2=0$. We choose $C_1$ below so as to simplify the orthonormality conditions. Further we must satisfy the boundary condition $\hat{W}(\xi=1)=0$. This yields:

$$2\sqrt{\frac{2}{\tan\theta}}\,\omega = \nu_k = k^{th} \text{ zero of } J_{\cos^2\theta} \qquad (10\text{-}3)$$
$$k = 1, 2, \ldots$$

In summary, the eigen-solution for (10-1) is:

$$\hat{W}_k(\xi) = \xi^{-\cos^2\theta/2} J_{\cos^2\theta}(\nu_k \xi^{1/2})/|J_{1+\cos^2\theta}(\nu_k)| \qquad (10\text{-}4.\text{a-c})$$

$$\frac{d}{d\xi}\left[\frac{1}{2}\tan\theta\,\xi\frac{d\hat{W}_k}{d\xi}\right] + \frac{1}{2}\cos\theta\sin\theta\frac{d\hat{W}_k}{d\xi} = -\omega_k^2 \hat{W}_k$$

$$\omega_k = \frac{1}{2}\sqrt{\frac{1}{2}\tan\theta}\,\nu_k, \; k = 1, 2, \ldots$$

With the choice of the coefficient in (10-4.a), the $\hat{W}_k$s obey the following orthonormality condition:

$$\int_0^1 \hat{W}_k(\xi)\xi^{\cos^2\theta}\hat{W}_j(\xi)d\xi = \delta_{kj} \qquad (10\text{-}5)$$

Next, in connection with (9-9.b), consider the eigen-problem $$\kappa^2 \hat{U}''(\xi) = -\bar{\omega}^2 \hat{U}(\xi); (\hat{U}')_{\xi=0} = 0, \hat{U}(\xi=1)=0. \text{ The obvious results are:}$$

$$\hat{U}_k(\xi) = \sqrt{2}\cos\left(\frac{\pi}{2}(2k-1)\xi\right) \qquad (10\text{-}6.\text{a-d})$$

$$\kappa^2 \frac{d^2\hat{U}_k(\xi)}{d\xi^2} = -\bar{\omega}_k^2 \hat{U}_k(\xi)$$

$$\bar{\omega}_k = \pi\left(k - \frac{1}{2}\right)\kappa, \; k = 1, 2, \ldots$$

$$\int_0^1 \hat{U}_k(\xi)\hat{U}_j(\xi)d\xi = \delta_{kj}$$

$W(\xi,\tau)$ and $U(\xi,\tau)$ may be expressed as:

$$W(\xi,\tau) = \sum_{m=1}^{\infty} A_m(\tau)\hat{W}_m(\xi), \qquad (10\text{-}7.\text{a, b})$$

$$U(\xi,\tau) = \sum_{m=1}^{\infty} B_m(\tau)\hat{U}_m(\xi)$$

Now we substitute (10-7.a) and (10-7.b) into (9-9.a), and (9-9.b), respectively; multiply by $\hat{W}_k(\xi)$ and $\hat{U}_k(\xi)$, integrate over $\xi \in [0,1]$, and make use of the orthonormality conditions (10-5) and (10-6.d) to obtain:

$$\frac{d^2 A_k}{d\tau^2} = -\omega_m^2 A_k - \frac{1}{2}\lambda\sin\theta\frac{dA_k}{d\tau} + \kappa^2 \sum_{m=1}^{\infty}\sum_{n=1}^{\infty} A_m B_n \Gamma_{kmn} \qquad (10\text{-}8.\text{a, b})$$

$$\frac{d^2 B_k}{d\tau^2} = -\bar{\omega}_m^2 B_k - \frac{1}{2}\lambda\sin\theta\frac{dB_k}{d\tau} + \frac{1}{2}\cos^2\theta\sum_{m=1}^{\infty} A_m \Psi_{km}$$

where:

$$\Gamma_{kmn} = \int_0^1 d\xi\left(\frac{d}{d\xi}(\xi^{\cos^2\theta}\hat{W}_k(\xi))\right)\left(\frac{d}{d\xi}\hat{W}_m(\xi)\right)\left(\frac{d}{d\xi}\hat{U}_n(\xi)\right) \qquad (10\text{-}9.\text{a, b})$$

$$\Psi_{km} = \int_0^1 d\xi \hat{U}_k(\xi)\frac{d}{d\xi}\hat{W}_m(\xi)$$

The above equations give some insight regarding the possible modes of instability. As in the case of the vertically forced hanging chain, the small amplitude lateral motion is expressed as a Bessel series, where, in the absence of forcing $B_n=0$ in (10-8.a), the mode coefficients in the expansion behave as damped oscillators. In the hanging chain problem, the forcing term, of the formed $\epsilon\omega^2 A_k \cos\omega\tau$, replaces the last term on the right in (10-8.a), making it a Mathieu equation with viscous damping. For the Mathieu equation, and for each mode, there exist an infinite number of unstable driving frequencies which branch into tongues of parametric instability in the $(\epsilon,\omega)$ plane [7]. Note that because it couples the lateral motion to the longitudinal dynamics, the term $$\kappa^2 \sum_{m=1}^{\infty}\sum_{n=1}^{\infty} A_m B_n \Gamma_{kmn}$$

on the right of (10-8.a) can play the roll (at least for a time) of a harmonic forcing term. If there are small initial deflections such that $A_m B_n \Gamma_{kmn} \neq 0$ and the combination frequencies $\omega_m \pm \bar{\omega}_n \approx \omega_k$, then this term initially appears as a harmonic disturbance near the resonant frequency of the $k^{th}$ mode and we may expect initial growth in amplitude as in the hanging chain. Subsequently, the growing amplitude, $A_k$, further serves to excite the longitudinal modes via the coupling term on the right side of (10-9.b). This feedback effect raises the possibility of a true instability with initial exponential growth. Note, however, in distinction from the hanging chain case, the present model does not permit negative tension. Thus amplitudes cannot grow indefinitely, but must ultimately produce regions of slack, whereupon the system breaks into chaotic motion with limited amplitudes but highly variable tension distributions.

To obtain specific results, recourse must be had to the simulation code. Here we sample a grid of points in the $(H,V/V_0)$ plane, in increments of 0.1 along the $V/V_0$ axis and 10 km along the H axis. The tether is initially in its equilibrium position plus a random, uniformly distributed deviation at each lumped mass with maximum variation of one km. For completeness, altitudes down to 20 km were investigated, although fully continuum flow can be anticipated at below 30 km. Above 170 km, the aerodynamic forces are so weak that the equilibrium shape is near vertical and the tension is very small.

FIG. 60 maps the regions of instability in the $(H,V/V_0)$ plane. The region labeled "P" on the upper left entails slowly growing pendulum motion with weak coupling to the longitudinal modes. It is unlikely that the system will actually enter this region with its combination of high altitudes and low velocities. By far the most severe regime is that on the right-hand side of the figure, where towing velocities are near the orbital velocity. To illustrate the kinds of motion encountered, consider the case H=100 km, V/V$_0$=0.85 (marked by the red cross in FIG. 60). After about 19 s, the tether settles down to a shape and tension distribution very close to the equilibrium solution, as shown in FIGS. 61 and 62. A minute after, the free end starts to "wag", leading to a fairly large amplitude lateral oscillation by ~190 seconds, shown in FIG. 63. At this stage there is relatively little longitudinal motion and the tension distribution is still close to the linear equilibrium form. The lateral motion starts to weaken at this point and involves a larger curvature at the free end (indicating growth in a higher order lateral mode). By 336 seconds FIG. 64), there appears to be stronger coupling to the longitudinal vibration, as the lateral motion a "snap back" pattern. This produces a strong tension maximum near the free end as can be seen in FIG. 65 Beyond this point, the tension distribution ceases to resemble the equilibrium solution and there appears to be very strong interaction between higher order lateral and longitudinal modes.

By 646 s (FIG. 66), one sees evidence of very high order lateral motions, with steadily growing longitudinal vibrations (FIG. 67). The longitudinal vibration grows until its amplitude is sufficient to produce negative tension—actually slack regions in our model—near the free end as illustrated in FIGS. 68 and 69. After approximately 15 minutes, chaotic motion prevails (FIG. 70) and slack regions appear almost everywhere along the tether (FIG. 7I) with wide variations in the attachment point tension. Beyond this point, chaotic motion, both in longitudinal and lateral oscillations continues apparently indefinitely. More immediately, just after 15 minutes, the lateral oscillations begin to pick up in magnitude (tens of kilometers) and cover an ever wider region of the tether length. Clearly, these unstable regions in the (H,V/V$_0$) plane must be suppressed. In the next Section, we determine the smallest aft-body that is capable of achieving this.

11. Stability Analysis Aft Body Design

Now consider the addition of an aft body to the present invention Skipper tether deorbit system. The objective here is to determine if a reasonably small aft body can prevent the instabilities and chaotic motions noted above. As in Section 5, we assume the aft-body to be a thin-walled sphere with approximately the same mass density as the tether. To model this we increase the mass of the N+1 point mass by m$_{aft}$, where:

$$m_{aft} = 4\pi r_{aft}^2 h_{aft} \rho_T$$

$r_{aft}$=Aft-body radius $h_{aft}$=Aft-body sphere thickness≈r (11-1.a-c)

Also, we employ the aerodynamic force model given by (5-5), i.e.:

$$\vec{f}_{N+1}^{(aero)} = -\frac{1}{m_{aft}} \rho_a A_{aft} |\vec{V}_a(N+1)| \vec{V}_a(N+1) \quad (11\text{-}2.\text{a, b})$$

$$A_{aft} = \pi r_{aft}^2$$

With these assumptions, we revisit (7-5) through (7-8), the only new feature being (7-8.b):

$$s = L: \ddot{\vec{x}} = -\frac{1}{m_{af}} T \frac{\partial \vec{x}}{\partial s} \Big/ \left| \frac{\partial \vec{x}}{\partial s} \right| - \frac{\rho_a}{m_{af}} A_{af} |\vec{V}_a| \vec{V}_a - \tilde{g}\hat{y} \quad (11\text{-}3)$$

The first task is to see how the revised end condition affects the equilibrium solution. Setting all time derivatives to zeros, the revised version of (8-2) is:

$$0 = \frac{1}{\pi r^2 \rho_T} \frac{\partial}{\partial s}(T_s \hat{t}_s) + \frac{\rho_a V^2}{\pi r \rho_T} |\hat{x} - (\hat{x}\square\hat{t}_s)\hat{t}_s |\hat{x} - \tilde{g}\hat{y} \quad (11\text{-}4.\text{a-d})$$

$$T_s(s) = G\left(\left|\frac{\partial \vec{x}}{\partial s}\right| - 1\right)$$

$$s = 0: \vec{x}_s = 0$$

$$s = L: T\hat{t}_s = \rho_a V^2 A_{af} \hat{x} - \tilde{g} m_{af} \hat{y}$$

Note that the normal components of (11-4.a) and (11-4.d) express the equilibration of the lifting aerodynamic forces and the downward local gravity force. For a reasonably sized aft-body, the contribution of the aft-body to the equilibrium in the normal direction, which is expressed by the normal component of (11-4.d) is negligible. Therefore this component may be discarded and only the tangential component retained:

$$s = L: T = \rho_a V^2 A_{af} \hat{x} \square \hat{t}_s - \tilde{g} m_{af} \hat{y} \square \hat{t}_s \quad (11\text{-}5)$$

This ultimately implies that the unit tangent vector, $\hat{t}_s$, is constant as in the previous case. This is also consistent with the results shown in Section 5 assuming a rather large aft-body.

Following Section 8, because of (11-5), equation (8.4) must be modified by the addition of a nonzero tension at the aft end:

$$T_s(s) = r\rho_a V^2 \left[(L-s)(\cos\theta + 2\gamma)\sin\theta + \frac{r_{aft}^2}{r}(\pi\cos\theta + 8\gamma\sin\theta)\right] \quad (11\text{-}6)$$

Taking the dot product of (11-4.a) we recover (8.7) once again. In summary, the equilibrium solution is:

$$\vec{x}_s(s) = \left(1 + \delta_s(s=0)(L - \frac{1}{2}s)\right) s\hat{t}_s \quad (11\text{-}7.\text{a-f})$$

$$\hat{t}_s = \cos\theta\hat{x} - \sin\theta\hat{y}$$

$$\delta_s = \text{static axial strain} = T_s(s)/G$$

$$T_s(s) = r\rho_a V^2 \left[(L-s)(\cos\theta + 2\gamma)\sin\theta + \frac{r_{aft}^2}{r}(\pi\cos\theta + 8\gamma\sin\theta)\right]$$

$$\sin\theta = \gamma\sqrt{2\left(-1 + \sqrt{1 + 1/\gamma^2}\right)}$$

$$\gamma = \frac{\pi}{2}\frac{\rho_T}{\rho_a}\frac{r}{R_E + H}\left(\left(\frac{V_0}{V}\right)^2 - 1\right)$$

The partial differential equations, (9-4) and boundary conditions (9-5) describing small departures from equilibrium remain unchanged, except that T$_s$(s) is now given by (11-7.d). Denote by $\overline{T}_s$ the constant:

$$\overline{T}_s = \frac{r_{aft}^2}{rL}(\pi\cos\theta + 8\gamma\sin\theta) \quad (11\text{-}8)$$

Then, adopting the dimensionless variables (9-6) and (9-7), and defining parameters as in (9-8), we find that the dimensionless equations of motion can be written:

$$\frac{\partial^2 W}{\partial \tau^2} = \frac{\partial}{\partial \xi}\left[\frac{1}{2}(\tan\theta\xi + \overline{T}_s)\frac{\partial W}{\partial \xi} - \kappa^2\frac{\partial U}{\partial \xi}\frac{\partial W}{\partial \xi}\right] - \quad (11\text{-}9.\text{a-d})$$

$$\frac{1}{2}\left[\lambda\frac{\partial W}{\partial \tau} - \cos\theta\frac{\partial W}{\partial \xi}\right]\sin\theta$$

$$\frac{\partial^2 U}{\partial \tau^2} = \kappa^2\frac{\partial^2 U}{\partial \xi^2} - \frac{1}{2}\left[\lambda\frac{\partial U}{\partial \tau}\sin\theta - \cos^2\theta\frac{\partial W}{\partial \xi}\right]$$

$$\xi = 0: \quad \frac{\partial U}{\partial \xi} = 0, |W| < \infty$$

$$\xi = 1: \quad U = W = 0$$

The presence of $\overline{T}_s$ in (11-9.a) introduces a qualitative change since the tension is positive everywhere. That means that one can always find bounds on $$\frac{\partial U}{\partial \xi}\frac{\partial W}{\partial \xi}$$

such that the term $$\kappa^2\frac{\partial U}{\partial \xi}\frac{\partial W}{\partial \xi}$$

is completely dominated by $$\frac{1}{2}(\tan\theta\xi + \overline{T}_s)\frac{\partial W}{\partial \xi}.$$

Thus, for analysis of local stability involving sufficiently small initial departures from equilibrium, the term $$\kappa^2\frac{\partial U}{\partial \xi}\frac{\partial W}{\partial \xi}$$

may indeed be considered of order $\epsilon^2$ and dropped from (11-9.a). Therefore for local stability, we consider:

$$\frac{\partial^2 W}{\partial \tau^2} = \frac{\partial}{\partial \xi}\left[\frac{1}{2}(\tan\theta\xi + \overline{T}_s)\frac{\partial W}{\partial \xi}\right] - \frac{1}{2}\left[\lambda\frac{\partial W}{\partial \tau} - \cos\theta\frac{\partial W}{\partial \xi}\right]\sin\theta \quad (11\text{-}10.\text{a-d})$$

$$\frac{\partial^2 U}{\partial \tau^2} = \kappa^2\frac{\partial^2 U}{\partial \xi^2} - \frac{1}{2}\left[\lambda\frac{\partial U}{\partial \tau}\sin\theta - \cos^2\theta\frac{\partial W}{\partial \xi}\right]$$

$$\xi = 0: \quad \frac{\partial U}{\partial \xi} = 0, |W| < \infty$$

$$\xi = 1: \quad U = W = 0$$

Adopting the same procedure as in Section 10, we address the eigen-problem:

$$\frac{d}{d\xi}\left[\frac{1}{2}(\xi\tan\theta + \overline{T}_s)\frac{d\hat{W}}{d\xi}\right] + \frac{1}{2}\left[\cos\theta\frac{d\hat{W}}{d\xi}\right]\sin\theta = -\overline{\omega}^2\hat{W} \quad (11\text{-}11)$$

By setting $\chi = \xi\tan\theta + \overline{T}_s$, we can transform this equation into a form very similar to that of (10-1). The end results can be summarized as:

$$\hat{W}_k(\xi) = C(\xi\tan\theta + \overline{T}_s)^{-\cos^2\theta/2} J_{\cos^2\theta}\left(v_k\sqrt{\frac{\xi\tan\theta + \overline{T}_s}{\tan\theta + \overline{T}_s}}\right) \quad (11\text{-}12.\text{a-c})$$

$$\frac{d}{d\xi}\left[\frac{1}{2}(\xi\tan\theta + \overline{T}_s)\frac{d\hat{W}_k}{d\xi}\right] + \frac{1}{2}\cos\theta\sin\theta\frac{d\hat{W}_k}{d\xi} = -\overline{\omega}_k^2\hat{W}_k$$

$$\overline{\omega}_k = \frac{v_k\tan\theta}{2\sqrt{2(\tan\theta + \overline{T}_s)}}, k = 1, 2, \ldots$$

where again, $v_k$ is the $k^{th}$ zero of $J_{\cos^2\theta}$. The eigen-problem associated with the longitudinal motion remains unchanged.

With the above results, we introduce the mode expansions, (10-7):

$$W(\xi, \tau) = \sum_{m=1}^{\infty} A_m(\tau)\hat{W}_m(\xi), \quad (11\text{-}13.\text{a, b})$$

$$U(\xi, \tau) = \sum_{m=1}^{\infty} B_m(\tau)\hat{U}_m(\xi)$$

and derive equations analogous to (10-8):

$$\frac{d^2 A_k}{d\tau^2} = -\overline{\omega}_m^2 A_k - \frac{1}{2}\lambda\sin\theta\frac{dA_k}{d\tau} \quad (11\text{-}14.\text{a, b})$$

$$\frac{d^2 B_k}{d\tau^2} = -\tilde{\omega}_k^2 B_k - \frac{1}{2}\lambda\sin\theta\frac{dB_k}{d\tau} + \frac{1}{2}\cos^2\theta\sum_{m=1}^{\infty} A_m\overline{\Psi}_{km}$$

$$k = 1, 2, \ldots$$

The coefficients of the lateral modes behave as uncoupled, damped oscillators and are obviously exponentially stable. For sufficiently long time, the coupling term in (11-14.b) becomes negligible so that the longitudinal mode coefficient also become uncoupled, damped oscillators. Thus local stability can be concluded for the tether with aft-body as a matter of general principle. We verify the above prediction by assuming a 0.5 m radius aft-body and spot checking the (V/V$_0$, H) plane instability regions determined previously with no aft-body. Starting each case with a several kilometer deviation from the equilibrium shape, it is found that all cases are stable. An example is provided by the case H=100 km, V/V$_0$=0.85 (marked by the red cross in FIG. 60. As FIG. 72 shows, the tether was started in a severe 4 km oscillation of the first lateral mode, resulting in significant variation in tension FIG. 73). After 730 seconds, the oscillation amplitudes in both the shape and tension distribution are significantly reduced (FIGS. 74 and 75) Finally, after approximately 1500 s, the shape and tension settle into the equilibrium solution as shown in FIGS. 76 and 77.

The foregoing results show that with a modestly sized, 0.5 meter radius aft-body (in contrast to the 2 m radius aft-body postulated in Section 6), and assuming initial departures of 3-4 km or less in the initial deviation from the equilibrium, the tether/aft-body system will converge to a stabile equilibrium such is not the case. This does not mean that the equilibrium state will be stable for larger initial deviations. However, the results do show that if initial deployment is slow and smooth and if altitude does not vary very rapidly, the system can stay close to a stable equilibrium shape and tension during the course of entry. Because the equilibrium state is relatively simple and predictable, this is a great advantage for the development of a robust, dependable entry trajectory controller.

We determined the equilibrium condition of the tether during steady flight under free molecular flow aerodynamics. The stability of this state was investigated and insight was achieved concerning the conditions for instability and chaotic motion. The following recommendations are offered:

1. A spherical aft-body having radius on the order of 0.5 meter appears to avoid chaotic motion at least for modest initial deviations from the equilibrium state 2. For flight regimes in which the variations of atmospheric properties over the tether length are small, the equilibrium shape is extremely simple and relatively insensitive to temporal and spatial variations in atmospheric density. To secure this advantage over all altitude and velocity ranges, the tether length should be reduced. Moreover, in Section 7, we argued that models of heating and breakage conditions to be explored in the sequel will show that a 20 km tether will experience extreme heating rate gradients and frequent breakage near the free end. In other words, if we do not shorten the tether, Mother Nature will do it for us! Since the key parameter determining tension is rL there is plenty of latitude for reducing the length while increasing the radius.

The next section of this model of the present invention Skipper tether deorbit system considers the following points:

1. Development of a fore-body model and coupling it to the tether dynamics in the simulation code.

2. Development of an aerodynamic heating model, and breaking conditions for the simulation code.

3. Exercise the complete simulation code in order to design the entry trajectory control law.

12. Kinematics of Coupled Tether/Fore-body Motion

So far, this model of the present invention has considered the motion of the tether when it is towed by an infinitely massive fore-body moving at constant speed and altitude. The model now extends this earlier formulation to include coupled fore-body/tether dynamics. This development begins with consideration of the kinematics of the fore-body motion.

As FIG. 78 shows, we again define the (x, y, z) reference frame with its origin at the center-of-mass of the fore-body, but now H and $\Omega$ are time-varying. As before, we define unit, mutually orthogonal vectors, $\hat{x}$, $\hat{y}$, $\hat{z}$ that are parallel to the x-, y- and z-axes, respectively. Furthermore, we assume that this floating reference frame has a component of angular velocity, $\Lambda\hat{y}$, in addition to $\Omega\hat{z}$. Thus $\Lambda$ is related to the rate of change of the heading angle, and $\dot{H}$ is associated with the flight path angle.

If $\vec{x} = x\hat{x} + y\hat{y} + z\hat{z}$ is the position vector of some point on the fore-body/tether system, then the inertial velocity is:

$$\frac{d\vec{x}}{dt} = \hat{x}(\dot{x} - \Omega(y + R_E + H) + \Lambda z) + \hat{y}(\dot{y} + \dot{H} + \Omega x) + \hat{z}(\dot{z} - \Lambda x) \quad (12\text{-}1)$$

Likewise, the inertial acceleration of the point is given by:

$$\frac{d^2 \vec{x}}{dt^2} = \hat{x}(\ddot{x} - \dot{\Omega}(y + R_E + H) + \quad (12\text{-}2)$$
$$\dot{\Lambda} z - 2\Omega(\dot{y} + \dot{H}) + 2\Lambda\dot{z} - (\Omega^2 + \Lambda^2)x) +$$
$$\hat{y}(\ddot{y} + \ddot{H} + \dot{\Omega} x + 2\Omega\dot{x} + \Omega\Lambda z - \Omega^2(y + R_E + H)) +$$
$$\hat{z}(\ddot{z} - \dot{\Lambda} x - 2\Lambda\dot{x} + \Lambda\Omega(y + R_E + H) - \Lambda^2 z)$$

As in section 2, we determine the difference between the inertial velocity and the gravitational acceleration, $\vec{g}(\vec{x})$, given by:

$$\vec{g}(\vec{x}) = -\Omega_0^2(R_E + H)\frac{((x/(R_E+H))\hat{x} + (1 + y/(R_E+H))\hat{y} + (z/(R_E+H))\hat{z})}{((x/(R_E+H))^2 + (1 + y/(R_E+H))^2 + (z/(R_E+H))^2)^{3/2}} \quad (12\text{-}3)$$

Subtracting this from (12-2), we obtain:

$$\frac{d^2 \vec{x}}{dt^2} - \vec{g}(\vec{x}) = \quad (12\text{-}4)$$
$$\hat{x}(\ddot{x} - \dot{\Omega}(y + R_E + H) + \dot{\Lambda} z - 2\Omega(\dot{y} + \dot{H}) + 2\Lambda\dot{z} - \Lambda^2 x) +$$
$$\hat{y}(\ddot{y} + \ddot{H} + \dot{\Omega} x + 2\Omega\dot{x} + \Omega\Lambda z) +$$
$$\hat{z}(\ddot{z} - \dot{\Lambda} x - 2\Lambda\dot{x} + \Lambda\Omega(y + R_E + H) - \Lambda^2 z) -$$
$$\Omega^2(x\hat{x} + (y + R_E + H)\hat{y}) + \Omega_0^2(R_E + H)$$
$$\frac{((x/(R_E+H))\hat{x} + (1 + y/(R_E+H))\hat{y} + (z/(R_E+H))\hat{z})}{((x/(R_E+H))^2 + (1 + y/(R_E+H))^2 + (z/(R_E+H))^2)^{3/2}}$$

Note that if $\vec{x}$ is at the origin, the last two terms become $(\Omega_0^2 - \Omega^2)(R_E + H)\hat{y}$, which is minus the local acceleration of gravity at the center-of-mass, given by (2-2.a).

Since the spatial extent of the system is much smaller than $(R_E + H)$, we can approximate the expression (12.4) by expanding it out to linear terms in x, y, or z and neglecting higher order terms:

$$\frac{d^2 \vec{x}}{dt^2} - \vec{g}(\vec{x}) = \quad (12\text{-}5)$$
$$\hat{x}(\ddot{x} - \dot{\Omega}(y + R_E + H) + \dot{\Lambda} z - 2\Omega(\dot{y} + \dot{H}) + 2\Lambda\dot{z} - \Lambda^2 x +$$
$$(\Omega_0^2 - \Omega^2)x) +$$
$$\hat{y}(\ddot{y} + \ddot{H} + \dot{\Omega} x + 2\Omega\dot{x} + \Omega\Lambda z + \tilde{g} - 3\Omega_0^2 y + (\Omega_0^2 - \Omega^2)y) +$$
$$\hat{z}(\ddot{z} - \dot{\Lambda} x - 2\Lambda\dot{x} + \Lambda\Omega(y + R_E + H) - \Lambda^2 z + \Omega_0^2 z)$$

If $\vec{x}$ is the position vector of an element of mass of the system the equations of motion are obtained by equating the right hand side of (12-5) to the external forces per unit mass applied to the element by aerodynamics or by other components of the system. Regarding the lumped mass model of the tether where the $k^{th}$ mass position and velocity in the (x, y, z) frame are denoted by $\bar{x}_k = x_k \hat{x} + y_k \hat{y} + z_k \hat{z}$, and $\hat{v}_k = v_{kx} \hat{x} + v_{ky} \hat{y} + v_{kz} \hat{z}$, we have for k=2, ..., N+1 the generalization of (3-9.a-c):

$$\dot{v}_{kx} = -\dot{\Omega}(y_k + R_E + H) - \dot{\Lambda} z_k + 2\Omega(v_{ky} + \dot{H}) - 2\Lambda v_{kz} + \Lambda^2 x_k - (\Omega_0^2 - \Omega^2) x_k + \ddot{x} \Box f_k^{(elastic)} + \ddot{x} \Box f_k^{(aero)}$$

$$\dot{v}_{ky} = -\ddot{H} - \dot{\Omega} x_k - 2\Omega v_{kx} - \Omega \Lambda z_k - \tilde{g} + 3\Omega_0^2 y_k - (\Omega_0^2 - \Omega^2) y_k + \ddot{y} \Box f_k^{(elastic)} + \ddot{y} \Box f_k^{(aero)}$$

$$\dot{v}_{kz} = \dot{\Lambda} x_k + 2\Lambda v_{kx} - \Lambda \Omega(y_k + R_E + H) + \Lambda^2 z_k - \Omega_0^2 z_k + \ddot{z} \Box f_k^{(elastic)} + \ddot{z} \Box f_k^{(aero)} \quad (12\text{-}6.\text{a-c})$$

The elastic and aerodynamic forces are the same as previously, except that (12-1) is now used to determine particle velocities with respect to the atmosphere. In addition, treatment of the aft-body remains the same. Recall that to model this we increase the mass of the N+1 point mass and treat it as a sphere of given radius to obtain the aerodynamic model given by (5-5), where (12.1) now determines the velocity, $\overline{V}_a(N+1)$.

In order to complete the treatment of coupled motion kinematics, and because the fore-body is treated as a rigid body, a system of body-fixed axes must be established. Let $(x_b, y_b, z_b)$ be orthogonal axes with origin at the center-of-mass of the fore-body (which is also the origin of the (x,y,z) system). Also, let $(\hat{x}_b, \hat{y}_b, \hat{z}_b)$ be the triad of unit basis vectors parallel to the body-fixed axes. The triad $(\hat{x}_b, \hat{y}_b, \hat{z}_b)$ is obtained from by (1) a rotation of $(\hat{x}, \hat{y}, \hat{z})$ about the x axis by angle $\gamma$ to produce $(\hat{x}', \hat{y}', \hat{z}')$; followed by (2) a rotation about the y' axis by angle $\alpha$ to produce $(\hat{x}'', \hat{y}'', \hat{z}'')$; concluded by (3) a rotation about the z" axis by angle $\beta$ to finally yield $(\hat{x}_b, \hat{y}_b, \hat{z}_b)$. This rotation sequence is illustrated in FIG. 79. The angles $\gamma, \alpha, \beta$ correspond to roll, yaw and pitch angles, respectively.

With the above definition, the unit basis vectors, $(\hat{x}_b, \hat{y}_b, \hat{z}_b)$, can be related to $(\hat{x}, \hat{y}, \hat{z})$ by:

$$\begin{pmatrix} \hat{x}_b \\ \hat{y}_b \\ \hat{z}_b \end{pmatrix} = C \begin{pmatrix} \hat{x} \\ \hat{y} \\ \hat{z} \end{pmatrix}$$

$$C = \begin{bmatrix} \cos\beta\cos\alpha & \sin\beta\cos\gamma + \cos\beta\sin\alpha\sin\gamma & \sin\beta\sin\gamma - \cos\beta\sin\alpha\cos\gamma \\ -\sin\beta\cos\alpha & \cos\beta\cos\gamma - \sin\beta\sin\alpha\sin\gamma & \cos\beta\sin\gamma + \sin\beta\sin\alpha\cos\gamma \\ \sin\alpha & -\cos\alpha\sin\gamma & \cos\alpha\cos\gamma \end{bmatrix}$$

Next, let us denote the angular velocity of the body-fixed frame relative to the (x,y,z) frame by $\bar{\omega}$ and assume that its components are defined in the $(\hat{x}_b, \hat{y}_b, \hat{z}_b)$ basis, so that:

$$\bar{\omega} = \omega_x \hat{x}_b + \omega_y \hat{y}_b + \omega_z \hat{z}_b \quad (12\text{-}8)$$

Referring to FIG. 79, we have:

$$\bar{\omega} = \dot{\gamma} \hat{x}' + \dot{\alpha} \hat{y}'' + \dot{\beta} \hat{z}_b \quad (12\text{-}9)$$

Or, effecting the transformations to the $(\hat{x}_b, \hat{y}_b, \hat{z}_b)$ basis:

$$\omega_x = \dot{\gamma} \cos\alpha \cos\beta + \dot{\alpha} \sin\beta$$

$$\omega_y = -\dot{\gamma} \cos\alpha \sin\beta + \dot{\alpha} \cos\beta$$

$$\omega_z = \dot{\gamma} \sin\alpha + \dot{\beta} \quad (12\text{-}10.\text{a-c})$$

We now invert these relations to obtain expressions for the derivatives of the yaw, roll and pitch angles in terms of the angular velocity components in the $(\hat{x}_b, \hat{y}_b, \hat{z}_b)$ basis.

$$\dot{\alpha} = \omega_x \sin\beta + \omega_y \cos\beta$$

$$\dot{\gamma} = (\omega_x \cos\beta - \omega_y \sin\beta)/\cos\alpha$$

$$\dot{\beta} = \omega_z - \dot{\gamma} \sin\alpha \quad (12\text{-}11.\text{a-c})$$

To conclude this section, we note that when in the following, a vector, $\overline{A}$, is accompanied by a superscript, as in $\overline{A}^{(b)}$, it means that its components are given in the $(\hat{x}_b, \hat{y}_b, \hat{z}_b)$ basis.

13. Fore-Body Equations of Translational and Rotational Motion

To obtain the equations governing the translational motion of the fore-body center-of-mass, we $$\frac{d^2 \bar{x}}{dt^2} - \bar{g}(\bar{x})$$

equate the quantity in (12-5) evaluated for $\bar{x}=0$ to the sum of the accelerations due to the tether tension and aerodynamic forces. This produces:

$$\dot{\Omega} = -2\Omega \dot{H}/(R_E + H) - \left(F_x^{tether} + F_x^{aero}\right)/(M_f(R_E + H)) \quad (13\text{-}1.\text{a-d})$$

$$\ddot{H} = -\tilde{g} + \left(F_y^{tether} + F_y^{aero}\right)/M_f$$

$$\Lambda = \left(F_z^{tether} + F_z^{aero}\right)/(M_f \Omega(R_E + H))$$

$$\dot{\Lambda} = -\frac{\left(F_z^{tether} + F_z^{aero}\right)}{M_f \Omega(R_E + H)} \left[\frac{\dot{\Omega}}{\Omega} + \frac{\dot{H}}{R_E + H}\right]$$

where $M_f$ is the mass of the fore-body and $\overline{F}^{tether}$ and $\overline{F}^{aero}$ are the force exerted by the tether and the aerodynamic force, respectively, with components referred to the $(\hat{x}, \hat{y}, \hat{x})$ basis. The tether force is given simply by (see Equations (3-8.a,b)):

$$\overline{F}^{tether} = T_1 \hat{l}_1$$

$$\hat{l}_1 = (\bar{x}_2 - \bar{x}_1)/|\bar{x}_2 - \bar{x}_1|$$

$$\bar{x}_1 = \bar{x}_{attach} \quad (13\text{-}2.\text{a-c})$$

where, $\bar{x}_{attach}$ is the position of the attachment point of the tether to the fore-body. We will usually specify this vector in terms of its components in the $(\hat{x}_b, \hat{y}_b, \hat{z}_b)$ basis, i.e. by (b) $\bar{x}_{attach}^{(b)} = x_{attach} \hat{x}_b + y_{attach} \hat{y}_b + z_{attach} \hat{z}_b$. In the global basis, the components of $\bar{x}_{attach}$ are:

$$\bar{x}_{attach} \Box \hat{x} = x_{attach} \cos\beta \cos\alpha - y_{attach} \sin\beta \cos\alpha + z_{attach} \sin\alpha$$

$$\bar{x}_{attach} \Box \hat{y} = x_{attach} (\sin\beta \cos\gamma + \cos\beta \sin\alpha \sin\gamma) + y_{attach} (\cos\beta \cos\gamma - \sin\beta \sin\alpha \sin\gamma) - z_{attach} \cos\alpha \sin\gamma$$

$$\bar{x}_{attach} \Box \hat{z} = x_{attach} (\sin\beta \sin\gamma - \cos\beta \sin\alpha \cos\gamma) + y_{attach} (\cos\beta \sin\gamma + \sin\beta \sin\alpha \cos\gamma) - z_{attach} \cos\alpha \cos\gamma \quad (13\text{-}3.\text{a-c})$$

The aerodynamic forces will be given in the next section.

Next we consider the rotational equations of motion for the fore-body. We assume that the $(x_b, y_b, z_b)$ axes are the principal axes of inertia, and write Euler's equations of rotational motion for the components of angular velocity in the $(x_b, y_b, z_b)$ frame. Note that the inertial angular velocity consists of $\bar{\omega} = \omega_x \hat{x}_b + \omega_y \hat{y}_b + \omega_z \hat{z}_b$, and the angular velocity of the $(\hat{x}, \hat{y}, \hat{z})$.

Let $(\Psi_x, \Psi_y, \Psi_z)$ denote the components of this angular velocity in the $(x_b, y_b, z_b)$ frame. Then:

$$\Psi_x = \Lambda(\sin\beta\cos\gamma + \cos\beta\sin\alpha\sin\gamma) + \Omega(\sin\beta\sin\gamma - \cos\beta\sin\alpha\cos\gamma)$$

$$\Psi_y = \Lambda(\cos\beta\cos\gamma - \sin\beta\sin\alpha\sin\gamma) + \Omega(\cos\beta\sin\gamma + \sin\beta\sin\alpha\cos\gamma)$$

$$\Psi_z = -\Lambda(\cos\alpha\sin\gamma) + \Omega\cos\alpha\cos\gamma \qquad (13\text{-}4.\text{a-c})$$

And we can state Euler's equations as:

$$I_x\dot\omega_x = -I_x\dot\Psi_x - (I_z - I_y)(\omega_y + \Psi_y)(\omega_z + \Psi_z) + T_x^{tether} + T_x^{aero}$$

$$I_y\dot\omega_y = -I_y\dot\Psi_y - (I_x - I_z)(\omega_x + \Psi_x)(\omega_z + \Psi_z) + T_y^{tether} + T_y^{aero}$$

$$I_z\dot\omega_z = -I_z\dot\Psi_z - (I_y - I_x)(\omega_x + \Psi_x)(\omega_y + \Psi_y) + T_z^{tether} + T_z^{aero} \qquad (13\text{-}5.\text{a-c})$$

where $I_x$, $I_y$, and $I_z$ are the moments of inertia, and $\overline{T}^{tether}$ and $\overline{T}_{aero}$ are the torques due to the tether and to aerodynamics, both expressed in components within the body-fixed reference frame. The torque produced by the tether is simply:

$$\overline{T}^{tether} = \overline{x}_{attach}^{(b)} \times \overline{F}^{tether(b)} \qquad (13\text{-}6)$$

where $\overline{F}^{tether(b)}$ is the tension force on the first link of the tether (see (13-2.a-c)) with components referred to the body-fixed axes. The aerodynamic torques will be constructed in the next section.

14. Model of the Fore-body and Its Aerodynamics

A variety of different types of fore-body may be employed in the skipper system, this general model of the present invention postulates a generic fore-body characterized by the fewest possible parameters. In essence, as FIG. 80 illustrates, we assume a "flying" slab in the shape of a blunt chevron. As indicated, one might assume that some internal mass is removed from the aft portion so as to bring the center-of-mass forward of the center-of-pressure. If $\overline{c}_p$ denotes the location of the center-of-pressure, we have:

$$\overline{c}_p = c_{px}\hat{x}_b + c_{py}\hat{y}_b + c_{pz}\hat{z}_b$$

$$c_{px} > 0 \qquad (14\text{-}1.\text{a,b})$$

where, in the nominal model, $c_{py} = c_{pz} = 0$.

For derivation of inertial, and aerodynamic properties we ignore the more detailed features in the sketch of FIG. 80 and approximate the fore-body as a rectangular solid of uniform density, $\rho_f$, and dimensions $l_x$, $l_y$, and $l_z$ along the $x_b$, $y_b$, and $z_b$ axes, respectively. Then the mass and moments of inertia are:

$$M_f = \rho_f l_x l_y l_z \qquad (14\text{-}2.\text{a-d})$$

$$I_x = \frac{1}{12}M_f(l_y^2 + l_z^2)$$

$$I_y = \frac{1}{12}M_f(l_x^2 + l_z^2)$$

$$I_z = \frac{1}{12}M_f(l_x^2 + l_y^2)$$

In addition, define the characteristic area, S, as the area of the forward face normal to the $x_b$ axis, and let A denote a characteristic aspect ratio. These quantities are defined by:

$$S = l_y l_z$$

$$A = l_z / l_y > 1 \qquad (14\text{-}3.\text{a,b})$$

where we assume $l_y < l_z < l_x$.

Since the dimensions of the fore-body will of the order of several meters, the flow is not in the free molecular flow regime. This would appear to necessitate a complicated continuum flow model. However, for the blunt body postulated here, one may assume complete boundary layer or shock separation at the edges of the various flat surfaces. Moreover, the pressure on a given surface is the result of pressure drag (or form drag) which is generated by the component of stream velocity normal to the surface.

The first step in computing the aerodynamic model is to evaluate the fore-body velocity relative to the atmosphere, $\overline{V}_{af}$. This is given by (12-1) evaluated at the origin of the (x, y, z) frame $$\overline{V}_{af} = -\Omega(R_E + H)\hat{x} + \dot{H}\hat{y} \qquad (14\text{-}4)$$

Or, in the body-fixed frame:

$$\overline{V}_{af}^{(b)} = [-\Omega(R_E + H), \dot{H}, 0]C^T\begin{pmatrix}\hat{x}_b \\ \hat{y}_b \\ \hat{z}_b\end{pmatrix} \qquad (14\text{-}5)$$

Under the pressure drag assumption the aerodynamic force on the forward rectangular face, for example, is given by:

$$\overline{F} = -\frac{1}{2}\rho_a SV_{af}L(\overline{V}_{af}^{(b)} \Box \hat{x}_b)\hat{x}_b \qquad (14\text{-}6.\text{a-c})$$

$$V_{af} = |\overline{V}_{af}^{(b)}|$$

$$L(x) = \begin{cases} x, & x > 0 \\ 0, & \text{otherwise}\end{cases}$$

In other words, the force on a given face is directed toward the inward-pointing normal to that face (note that the stream velocity relative to the fore-body is $-\overline{V}_{af}^{(b)}$). The magnitude is proportional to the component of the stream velocity along the normal to the surface. L(x) is the integral of the Heavyside function and is present in (14-6) because, when $\overline{V}_{af}^{(b)} \Box \hat{x}_b < 0$ the surface of the face is in the lee of the air-stream and the force must vanish. Collecting together the results for all six faces of the rectangular solid, we get:

$$\overline{F}^{aero(b)} = -\frac{1}{2}\rho_a V_{af}\begin{pmatrix} SL(\overline{V}_{af}^{(b)}\Box\hat{x}_b)\hat{x}_b - SL(-\overline{V}_{af}^{(b)}\Box\hat{x}_b)\hat{x}_b \\ -SAL(-\overline{V}_{af}^{(b)}\Box\hat{y}_b)\hat{y}_b + SAL(\overline{V}_{af}^{(b)}\Box\hat{y}_b)\hat{y}_b \\ l_x l_y L(\overline{V}_{af}^{(b)}\Box\hat{z}_b)\hat{z}_b - l_x l_y L(-\overline{V}_{af}^{(b)}\Box\hat{z}_b)\hat{z}_b \end{pmatrix} \qquad (14\text{-}7)$$

The aerodynamic force appearing in the equations of translational motion, (13-1.a-c) is simply the above expression transformed into the $(\hat{x}, \hat{y}, \hat{z})$ basis. The torque, $\overline{T}^{aero}$, in the equation of rotational motion, (13-5.a-c), is given by:

$$\overline{T}^{aero} = \overline{c}_p \times \overline{F}^{aero(b)} \qquad (14\text{-}8)$$

Note that (14-7) and (14-8) constitute a very simple model that at least crudely approximates flow around a blunt body and has no dependence on Mach number.

Before leaving this topic, we comment on the qualitative aspects of the above aerodynamic model in terms of conventional parameters, such as lift and drag coefficients, etc. These aspects can best be illustrated by considering planar motion in which only the pitch angle differs from zero, and in which the vehicle velocity is along the x axis. In that case, if a is the angle-of-attack, then (14-7) gives the following expressions for the lift and drag components of force (denoted by L and D, respectively):

$$L = \vec{F}^{aero(b)} \Box \hat{y} = \frac{1}{2}\rho_a V_{af}^2 S(A-1)\sin a \cos a \quad (14\text{-}9.a, b)$$

$$D = \vec{F}^{aero(b)} \Box \hat{x} = \frac{1}{2}\rho_a V_{af}^2 S(\cos^2 a + A\sin^2 a)$$

From these formulae it is clear that the conventional lift and drag coefficients are:

$$C_L = (A-1)\sin\alpha \cos\alpha$$

$$C_D = (\cos^2\alpha + A\sin^2\alpha) \quad (14\text{-}10.a,b)$$

The drag polar is illustrated (for A=3) in FIG. 81. The lift coefficient has a maximum value of $$\frac{1}{2}(A-1)$$

at 45 degrees angle-of-attack, at which point the drag coefficient is $$\frac{1}{2}(A+1).$$

These are qualitatively reasonable and generic features. Note also that the drag polar has the form of a circle with center at $C_L=0$, $$C_D = \frac{1}{2}(A+1)$$

and radius $$\frac{1}{2}(A-1).$$

15. Preliminary Coupled Tether/Fore-body Simulation Results

Here we consider some preliminary results for the fully coupled system. In the cases shown, the length of the tether is reduced to a somewhat more realistic length of 2.0 km, while we increase the radius to 0.5 cm. This preserves the maximum frontal area presented to the airstream as in the previously considered 20 km length and 0.5 mm case. All material properties are kept the same. The fore-body parameters are assumed as follows:

$$l_x=0.5 \text{ m}, l_y=2.0 \text{ m}, l_z=4.5 \text{ m}$$

$$\rho_f=9000 \text{ kg/m}^3 \quad (15\text{-}1.a\text{-}d)$$

The center-of-pressure position is given by (14-1) with:

$$c_{px}=2.0 \text{ m}, c_{py}=c_{pz}=0 \quad (15\text{-}2.a\text{-}c)$$

Also, the tether attachment point location is assumed to be:

$$\bar{x}_{attach}=(5 \text{ m})\hat{x}_b \quad (15\text{-}3)$$

Regarding initial conditions, it is assumed that the tether starts in its equilibrium position in the x-y plane. Likewise, the fore-body initial position and velocity are within the x-y plane, i.e.:

$$\alpha=0, \beta=\beta_0, \gamma=0$$

$$\omega_x=0, \omega_y=0, \omega_z=\omega_{z0}$$

$$\Lambda=0 \quad (15\text{-}4.a\text{-}g)$$

Under these conditions, motion is confined to the x-y plane. This is reasonable since our first order of business is to design the entry strategy in the initial vertical plane (the plane defined by the initial velocity and the center of the Earth). The relatively smaller deviations in heading angle can be investigated later.

First, consider the motion of the fore-body alone. FIG. 82 shows the altitude versus time for various altitudes when the fore-body is initially horizontal ($\beta=\beta_0=0$) and the initial velocity is also horizontal and 0.95 times the orbital velocity at that altitude. This gives some notion of entry time as a function of the steepness of entry. It is seen that, as expected, for sufficiently high starting altitude, fore-body will exhibit a "skip" entry.

Next, FIG. 83 shows the altitude time history for the most severe entry conditions featured in FIG. 82. As before the initial velocity is horizontal and 0.95 times the orbital velocity. The tether is initially in its equilibrium configuration, which is essentially aligned with the vertical. In this case, the coupled system equilibrium position is such that the fore-body is also vertical, i.e. $\beta_0=-\pi/2$, so that the $\hat{x}_b$ axis points downward. In this case, to illustrate some design guidelines, we sketch the sequence of motions executed by the tether. In the following plots one should note that the fore-body main axis (the $\hat{x}_b$ axis) is always closely aligned with the tether tangent vector at the attachment point.

After 82.79 s, the fore-body/tether combination is still mostly vertical but the tether begins to bow out in the leeward direction (FIG. 84). Then the entire tether begins to rotate, but with a trailing free end (FIG. 85). A large-scale lateral wave moves toward the free end (FIG. 86) and then snaps back whip-like (FIG. 86). The tether continues to rotate until reaching a maximum excursion above the fore-body shown in FIG. 88; again with a whip-like motion near the free end. There are several oscillations of this character and it is only somewhat below 100 km that the rapidly increasing atmospheric density causes the oscillation to damp out, allowing the tether to approach its equilibrium shape (FIG. 88).

The observed oscillations occur because the entry is steep and the resulting rate of change in atmospheric density is too rapid for the tether to assume its equilibrium shape. This is unfavorable because during half of each cycle, the fore-body is forced into a positive angle-of-attack with greater lift resulting. But during the next half cycle, this is reversed; the angle-of-attack is negative. The end result is that the two effects nearly cancel out the presence of the tether in altering the altitude time history. Thus, in our design considerations we must take care to ensure that the entry profile involves density variations that are slow enough to allow the tether to follow its equilibrium configuration fairly closely.

Another observation is that the tether appears to be quite efficient in redirecting the angle-of-attack of the fore-body to match the tether tangent direction near the attachment point. Now if the tether is maintained in its sagged equilibrium shape, without oscillation, the main effect is to impose a positive angle-of-attack on the fore-body. Moreover the moment arm of the tether tension about the fore-body center-of-mass is likely much larger than can be attained by adjusting the attachment location in the back of the fore-body. Thus, it is probable that changing the tether length might be a more effective control strategy than adjusting the attachment point. FIG. 90 shows a result for the coupled system using the same initial conditions as the previous case, but with the initial altitude of 300 km. It is seen that the coupled system can indeed skip, even though there is no attempt to implement a control strategy. We completed the extension of the simulation code to include a generic fore-body model that is fully coupled to the tether dynamics model. Preliminary simulation results motivate the following recommendations:

1. Care must be taken to ensure that the entry profile involves density variations that are slow enough to allow the tether to follow its equilibrium configuration fairly closely.

2. The tether appears to be quite efficient in redirecting the angle-of-attack of the fore-body to match the tether tangent direction near the attachment point. It is probable that changing the tether length might be a more effective control strategy than adjusting the attachment point. The capability for controlled length change will be installed into the simulation code.

The following section of this model of the present invention examines:

Development of an aerodynamic heating model, and breaking conditions for the simulation code. Exercises the complete simulation code in order to design the entry trajectory control law.

16. Aerothermal Model of the Tether

By far the most fragile component of the present invention Skipper tether reentry system is likely to be tether itself. If the tether survives the aerodynamic heating during atmospheric entry, so will the spacecraft fore-body. Thus we concentrate attention in this part of the model of the present invention on modeling the aerothermal dynamics of the tether. As in Section 4 (and referring to FIG. 25), we assume free molecular flow with a large molecular speed ratio and we treat each segment of the tether as a portion of a right circular cylinder of radius r(s) at arclength s from the attachment point and unit tangent vector i(s). As before, $\beta$ denotes the angle of attack of the tether at arclength s, i.e. the angle between i(s) and the velocity of the tether relative to the atmosphere, $\bar{v}_a(s)$.

Under these conditions, the heat input, to a differential element of area, dA, is given by [4]:

$$dQ = \alpha \rho_a \frac{RT_a}{M} \sqrt{\frac{RT_a}{2\pi M}} \left\{ \begin{pmatrix} S^2 + \frac{\gamma}{\gamma-1} - \frac{\gamma}{2(\gamma-1)} \frac{T_w}{T_a} \end{pmatrix} \times \\ \left( e^{-(S\sin\theta)^2} + \sqrt{\pi}(S\sin\theta)[1 + \text{erf}(S\sin\theta)] \right) - \frac{1}{2} e^{-(S\sin\theta)^2} \right\} dA \quad (16-1)$$

where S is the speed ratio, $T_a$ is the atmospheric temperature, M the average molecular weight, $\rho_a$ the atmospheric density, y the ratio of specific heats (~1.4), and $T_w$ denotes the tether wall temperature. $\theta$ is the angle between $\bar{V}_a(s)$ and the tangent to the surface in the plane of $\bar{v}_a(s)$ and the surface normal at the point located by the azimuthal angle, $\varphi$, about the centerline axis. Therefore, sin $\theta$=sin $\beta$ sin $\varphi$ and dA=2rd$\varphi$. $\alpha$ is the thermal accommodation coefficient for the surface interaction, defined as:

$$\alpha = \frac{dE_i - dE_r}{dE_i - dE_w} \quad (16-2)$$

where $dE_i$ is the total energy input, $dE_r$ is the total energy flux of the molecules re-emitted from the surface, and $dE_w$ is the energy flux which would be re-emitted if all molecules departed in Maxwellian equilibrium at the suface temperature, $T_w$. In accordance with our earlier recommendation that the tether surface material approximate perfectly diffuse reflection, we assume $\alpha$ to be unity.

With the assumption S>>1 the exponential terms in (16-1) are negligible and the error function approaches unity. Therefore we obtain the approximation:

$$dQ \cong \frac{1}{2}\rho_a\left[|\vec{V}_a|^2 - \frac{\gamma}{\gamma-1}\frac{RT_w}{M}\right]|\vec{V}_a|\sin\theta dA \quad (16-3)$$

Hence the heat transfer per unit length is approximately:

$$Q \cong r\rho_a \int_{-\pi/2}^{\pi/2}\left[|\vec{V}_a|^2 - \frac{\gamma}{\gamma-1}\frac{RT_w}{M}\right]|\vec{V}_a||\sin\beta||\sin\phi|d\phi = \quad (16-4)$$

$$2r\rho_a\left[|\vec{V}_a|^2 - \frac{\gamma}{\gamma-1}\frac{RT_w}{M}\right]|\vec{V}_a||\sin\beta|$$

Since $|\vec{V}_a|$ sin $\beta$=$|\bar{v}_{an}|$, (16-4) yields:

$$Q = 2r\rho_a\left[|\vec{V}_a|^2 - \frac{\gamma}{\gamma-1}\frac{RT_w}{M}\right]|\vec{V}_{an}| \quad (16\text{-}4.a, b)$$

$$\vec{V}_{an}(s) = \vec{V}_a - (\vec{V}_a \square \hat{\imath}(s))\hat{\imath}(s)$$

Next, we note that the thermal inertia of the thin tether is likely to be very small so that the interior of the tether is nearly in thermal equilibrium with the wall temperature. In other words, the temperature is uniformly equal to $T_w$ over a cross-section and is a function only of the arc length coordinate. Further, as a worst case we neglect the thermal conductivity of the tether so that there is no heat flow along the tether. This means that (16-5) is the only heat input and the temperature $T_w$ evolves according to:

$$\frac{dT_w}{dt} = \frac{2\rho_a}{\pi r \rho_T C_{pT}}\left[|\vec{V}_a|^2 - \frac{\gamma}{\gamma-1}\frac{RT_w}{M}\right]|\vec{V}_a - (\vec{V}_a \square \hat{\imath}(s))\hat{\imath}(s)| \quad (16-6)$$

Where $C_{pT}$ is the constant pressure specific heat of the tether material. (In the following, we assume the tether material to have high specific heat typical of such materials as Kevlar, where $C_{pT} \approx 1400$ J/kg–K. See [8].)

In terms of the discretized tether model, we replace $\hat{\imath}(s)$ by $\hat{\imath}_k = (\bar{x}_{k+1} - \bar{x}_k)/|\bar{x}_{k+1} - \bar{x}_k|$ and $\vec{V}_a$ by $\vec{V}_a(k)$. Then if $T_w(k)$ denotes the temperature of the $k^{th}$ link, then:

$$\frac{dT_w(k)}{dt} = \frac{2\rho_a}{\pi r \rho_T C_{pT}}\left[|\vec{V}_a|(k)^2 - \frac{\gamma}{\gamma-1}\frac{RT_w(k)}{M}\right]|\vec{V}_a(k) - (\vec{V}_a(k)\square \hat{\imath}_k)\hat{\imath}_k| \quad (16-7)$$

$$k = 1, 2, \ldots, N$$

17. Consolidation of the AeroThermal Dynamic Equations

With (16-6) and (16-7), we have completed formulation of the dynamical model and its corresponding simulation code. At this point it is necessary to collect together the dynamical equations and consolidate them into forms suitable for analysis and for the formulation of the skipper system control algorithms. Since the principal phenomena addressed by the system pertain to the motion within the initial orbit plane, we specialize the equations developed in Sections 12 through 14 to the case of planar motion. Furthermore, we have seen that if rates of change of altitude and velocity are relatively slow, then at any instant, the tether approximately conforms to its equilibrium configuration. Therefore, the tether parameters as they affect the interaction with the for-body are modeled as in Section 8 and equations (8-8.a-f).

We begin by specializing the fore-body translational equations of motion. For planar motion, $\Lambda=0$, so that (13-1.a-d) become simply:

$$\dot\Omega = -2\Omega\dot H/(R_E+H) - (F_x^{tether} + F_x^{aero})/(M_f(R_E+H))$$

$$\ddot H = -\bar g + (F_y^{tether} + F_y^{aero})/M_f \qquad (17\text{-}1.\text{a,b})$$

where the force components are given in the (x,y) coordinate frame. These are now explicitly stated. The tether force is:

$$F_x^{tether} = T_s(0)\hat t_s \square \hat x = T_s(0)\cos(\theta)$$

$$F_y^{tether} = T_s(0)\hat t_s \square \hat y = -T_s(0)\sin(\theta) \qquad (17\text{-}2.\text{a,b})$$

where $\hat t_s$ is the unit tangent vector to the tether at the attachment point, given by (8-8.b) and $T_s(0)$ is the tension at the attachment point given by (8-8.d) at s=0. Note that $\theta$ is the angle of sag due to gravity, i.e. at the attachment the tether points downward as s increases. $\theta$ is the angle between the horizontal and the tangent vector.

In the body-fixed frame the aerodynamic forces greatly simplify to:

$$\vec F^{aero(b)} = -\frac{1}{2}\rho_a V_{af} S\left(\vec V_{af}^{(b)}\square\hat x_b\right)\hat x_b - \frac{1}{2}\rho_a V_{af} S\left(\vec V_{af}^{(b)}\square\hat y_b\right)\hat y_b \qquad (17\text{-}3.\text{a, b})$$

$$\vec V_{af} = -\Omega(R_E+H)\hat x + \dot H\hat y$$

where (17-3.b) repeats (14-4). We need to express $\bar V_{af}$ in the $(x_b, y_b)$ frame and $\vec F^{aero(b)}$ in the (x, y) frame in order to obtain explicit expressions. The transformation between these coordinate frames, (12-7), is greatly simplified since for planar motion, $\alpha=\gamma=0$, so that:

$$\begin{pmatrix}\hat x_b \\ \hat y_b\end{pmatrix} = C\begin{pmatrix}\hat x \\ \hat y\end{pmatrix}, \quad C = \begin{bmatrix}\cos\beta & \sin\beta \\ -\sin\beta & \cos\beta\end{bmatrix} \qquad (17\text{-}4.\text{a, b})$$

Using this relation to transform $\vec V_{af}$ into the $(x_b, y_b)$ frame, we get:

$$\bar V_{af}^{(b)}\square\hat x_b = -\Omega(R_E+H)\cos\beta + \dot H\sin\beta$$

$$\bar V_{af}^{(b)}\square\hat y_b = \Omega(R_E+H)\sin\beta + \dot H\cos\beta \qquad (17\text{-}5.\text{a,b})$$

Substituting these relations into (17-3.a) and transforming the force into the (x, y) frame we obtain:

$$\bar F_x^{aero} = \qquad (17\text{-}6.\text{a, b})$$

$$\frac{1}{2}\rho_a V_{af} S\left[\Omega(R_E+H)(\cos^2\beta + A\sin^2\beta) + \dot H(A-1)\sin\beta\cos\beta\right]$$

-continued $$\bar F_y^{aero} =$$

$$-\frac{1}{2}\rho_a V_{af} S\left[\Omega(R_E+H)(A-1)\sin\beta\cos\beta + \dot H(\sin^2\beta + A\cos^2\beta)\right]$$

where $V_{af} = |V_{af}| = \sqrt{\Omega^2(R_E+H)^2 + \dot H^2}$.

Next consider the rotational dynamics. For planar motion, the pitch angle $\beta$, is the only Euler angle, $\omega_z$ is the only rotational component and (12-11.c) gives $\dot\beta=\omega_z$, while (13-4) gives $\Psi_z=\Omega$. Hence (13-5) yields:

$$\ddot\beta = -\dot\Omega + \frac{1}{I_z}\left(T_z^{tether} + T_z^{aero}\right) \qquad (17\text{-}7)$$

Recall from (13-6) that $\vec T^{tether} = \bar x_{attach}^{(b)} \times \vec F^{tether(b)}$. Also we specify that $\bar x_{attach}^{(b)} = x_{attach}\hat x_b + y_{attach}\hat y_b$. Then, using (17-3), and (17-4), we obtain:

$$T_z^{tether} = -x_{attach}T_s(0)\sin(\theta+\beta) - y_{attach}T_s(0)\cos(\theta+\beta) \qquad (17\text{-}8)$$

According to (14-8), $\vec T^{aero} = \bar c_p \times \vec F^{aero(b)}$. We consider only the simplified case wherein $\bar c_p = c_{px}\hat x_b$. Then using (17-3), we get:

$$T_z^{aero} = -\frac{1}{2}\rho_a V_{af} AS\left[\Omega(R_E+H)\sin\beta + \dot H\cos\beta\right]c_{px} \qquad (17\text{-}9)$$

Now consider the tether equilibrium equations. In the context of general planar motion of the fore-body reentering spacecraft, the ratio $$\left(\frac{V_0}{V}\right)^2$$

appearing in (8-8.a-f) is actually the ratio of the total initial value of the gravitational energy and kinetic energy per unit mass to its current value. Notice that this energy is given by $$E(t) = \frac{1}{2}(\Omega^2 + \Omega_0^2)(R_E+H)^2 + \frac{1}{2}\dot H^2.$$

Assuming the system is initially in orbit at altitude $H(0)=H_0$, $E(0)=\Omega_0^2(R_E+H_0)^2$. Hence the ratio $$\left(\frac{V_0}{V}\right)^2$$

must be replaced by:

$$E(0)/E(t) = \frac{2\Omega_0^2(R_E+H_0)^2}{(\Omega^2+\Omega_0^2)(R_E+H)^2 + \dot H^2} \qquad (17\text{-}10)$$

At this point we assemble the explicit forms of all equations before introducing certain conventions and alternate variables that greatly simplify their form. Collecting relations (17-1), (17-2), (17-6)-(17-9) and (8-8) with replacement (17-10) we have:

Translational Equations $$\dot{\Omega} = \qquad (17\text{-}11.\text{a-c})$$

$$-\frac{1}{(R_E+H)M_f}\left(\begin{array}{c} 2\Omega\dot{H}M_f + T_s(0)\cos(\theta) + \\ \frac{1}{2}\rho_a V_{af} S\left[\begin{array}{c}\Omega(R_E+H)(\cos^2\beta + A\sin^2\beta) + \\ \dot{H}(A-1)\sin\beta\cos\beta\end{array}\right] \end{array}\right)$$

$$\ddot{H} = -(R_E+H)(\Omega_0^2 - \Omega^2) -$$

$$\frac{1}{M_f}\left(\begin{array}{c} T_s(0)\sin(\theta) + \\ \frac{1}{2}\rho_a V_{af} S\left[\begin{array}{c}\Omega(R_E+H)(A-1)\sin\beta\cos\beta + \\ \dot{H}(\sin^2\beta + A\cos^2\beta)\end{array}\right] \end{array}\right)$$

$$V_{af} = \sqrt{\Omega^2(R_E+H)^2 + \dot{H}^2}$$

Rotational Equation $$\ddot{\beta} = -\dot{\Omega} - \frac{1}{I_z}\left(\begin{array}{c} x_{attach}T_s(0)\sin(\theta+\beta) + y_{attach}T_s(0)\cos(\theta+\beta) + \\ \frac{1}{2}\rho_a V_{af} AS[\Omega(R_E+H)\sin\beta + \dot{H}\cos\beta]c_{px} \end{array}\right) \qquad (17\text{-}12)$$

Tether Attachment Point Conditions $$T_s(0) = r\rho_a V^2 L[\cos\theta + 2\gamma]\sin\theta \qquad (17\text{-}13.\text{a-c})$$

$$\sin\theta = \gamma\sqrt{2\left(-1 + \sqrt{1+1/\gamma^2}\right)}$$

$$\gamma = \frac{\pi}{2}\frac{\rho_T}{\rho_a}\frac{r}{R_E+H}\left(\frac{2\Omega_0^2(R_E+H_0)^2}{(\Omega^2+\Omega_0^2)(R_E+H)^2+\dot{H}^2} - 1\right)$$

Armed with the above results, we introduce various conventions that simplify their form. First, let us describe the attachment point coordinates as shown in FIG. 91 where the attachment is distant by $r_a$ from the fore-body center-of-mass and is placed at the angle $\theta_a$ from the $x_b$ axis. Thus $x_{attach}=r_a\cos\theta_a$ and $y_{attach}=r_a\sin\theta_a$. Also let us denote $|\bar{v}_{af}|$ more simply as just V, and denote $T_s(0)$ by $T_0$. Moreover, let $\psi$ denote the angle between the velocity vector and the horizontal (positive upward). Then:

$$\Omega(R_E+H) = V\cos\psi$$

$$\dot{H} = V\sin\psi \qquad (17\text{-}14.\text{a,b})$$

Using 17-11 and the above conventions; and approximating ratios such as $(R_E+H)/(R_E+H_0)$ by unity, we get the following equations of translational motion in terms of V and $\psi$:

$$\dot{V} = -\frac{\sin\psi}{R_E+H_0}V_0^2 - \frac{T_0}{M_f}\cos(\psi-\theta) - \qquad (17\text{-}15.\text{a-e})$$

$$\frac{\rho_a V^2}{2M_f}S(\cos^2(\psi+\beta) + A\sin^2(\psi+\beta))$$

$$\dot{\psi} = \frac{\cos\psi}{R_E+H_0}(V-V_0) + \frac{T_0}{M_f V}\sin(\psi-\theta) -$$

$$\frac{\rho_a V}{2M_f}S(A-1)\sin(\psi+\beta)\cos(\psi+\beta)$$

$$\psi(0) = 0,$$

$V(0) = V_0 =$ orbital velocity at initial altitude $H_0$ $$\dot{H} = V\sin\psi$$

Likewise, the rotational equation and the attachment conditions become:

$$\frac{d}{dt}(\dot{\beta}+\Omega) = -\frac{T_0}{I_z}r_a\sin(\theta+\beta+\theta_a) - \frac{\rho_a V^2}{2I_z}c_{px}AS\sin(\psi+\beta) \qquad (17\text{-}16)$$

$$T_0 = r\rho_a V^2 L[\cos\theta + 2\gamma]\sin\theta$$

$$\sin\theta = \gamma\sqrt{2\left(-1+\sqrt{1+1/\gamma^2}\right)} \qquad (17\text{-}17.\text{a-c})$$

$$\gamma = \frac{\pi}{2}\frac{\rho_T}{\rho_a}\frac{r}{R_E+H}\left(\frac{V_0^2 - V^2\cos^2\psi}{V_0^2 + V^2\cos^2\psi}\right)$$

Lastly the heat flow equation becomes:

$$\frac{dT_w}{dt} = \frac{2\rho_a}{\pi r\rho_T C_{pT}}\left[V^2 - \frac{\gamma}{\gamma-1}\frac{RT_w}{M}\right]V|\sin(\psi-\theta)| \qquad (17\text{-}18)$$

18. Analysis of the Dynamical Equations as Pertains to the Control Problem

With Equations (17-15) through (17-18), together with various simulation results, we can begin to gather some insight on how the tether can be used to aid atmospheric entry. The overall goal is to prolong the entry process so that heating rates on the fore-body are significantly reduced. To control entry we have at our disposal the tether length L which can be increased or decreased and the position of the attachment point. Let us also suppose that the system is equipped with sensors that can measure altitude and both horizontal and vertical components of velocity (so that both $\Omega$ and $\dot{H}$ can be known). Further, it is assumed that the sag angle, $\theta$, can be measured. First the "skipping" motion that occurs when starting from sufficiently high orbit, or entering with sufficiently small inclination needs to be considered. At high altitude, with very low atmospheric density, both the tether and aerodynamic forces are dominated by the first terms on the right sides of (17-15a,b). Neglecting these terms, and recognizing that both $\psi$ and $V-V_0$ are small, the linearized versions of these equations are:

$$\frac{d}{dt}(V-V_0) = -\frac{V_0^2}{R_E+H_0}\psi \qquad (18\text{-}1.\text{a, b})$$

$$\frac{d}{dt}\psi = \frac{1}{R_E+H_0}(V-V_0)$$

This system has eigenvalues $\pm iV_0/(R_E+H_0)=\pm i\Omega_0$ with periodic solutions. However, this does not reflect orbit eccentricity since $\dot{H}=V\sin\psi$, and hence H are periodic with period half that of the orbit; so this motion is an atmospheric skipping phenomenon. This has been observed in the simulation results shown in FIGS. 82 and 90.

One possibility for using the tether to reduce entry speed is to periodically deploy and retract the tether so as to stimulate skipping in order to periodically "cool off" the vehicle by repeatedly moving to higher altitude. To examine this consider the simulation of the system initially at orbital velocity for 230 km initial altitude. In this case we postulate a tether having 500 m maximum length and 2.5 cm radius. FIG. 92 shows the fixed at 500 m and the system when the tether is periodically deployed and retracted.

Here, the tether is fully deployed when the rate of descent increases and is retracted to essentially zero length when altitude begins to increase. This certainly encourages skipping and the variable length tether prolongs the entry process by more than a factor of two. However, the entry of the fore-body without the tether takes slightly longer. Thus this strategy seems to have merely reduced the drag of the system to the level of the fore-body alone. This does not mean that varying the length cannot be beneficial, rather it indicates that the tether dimensions make the tether-induced drag dominate the drag of the system.

Indeed, if we take the ratio of the tether force to the aerodynamic force (both of which are aerodynamic in origin) in (17-15.a), and use (17-17) to evaluate $T_0$, we get:

$$\frac{\text{tether force}}{\text{aero force}} = \frac{(2rL)[\cos\theta + 2\gamma]\sin\theta\cos(\psi-\theta)}{S(\cos^2(\psi+\beta) + A\sin^2(\psi+\beta))} \approx O\left(\frac{2rL}{S}\right) \quad (18\text{-}2)$$

Thus, aside from the angle terms, the ratio is of the order of the maximum total frontal area of the tether, 2rL to that of the fore-body. Even in the above example, $2rL=25$ m$^2$, whereas the area of the fore-body is just a few meters squared. We notice that in (17-15.a) the tether force is essentially always negative so it produces only enhanced drag which tends to shorten the entry process. The ratio of forces is the same for the $\dot{\psi}$ equation, (17-15.b). But $\psi$ is negative so that the term $$\frac{T_0}{M_f V}\sin(\psi-\theta)$$

is also negative and the tether produces only drag and no lift—and that drag dominates for the tether dimensions so far assumed.

Clearly using the tether just to increase drag is no way to prolong entry. Instead, 2rL must be chosen so that the tether forces in the translational equations are dominated by the aerodynamic forces on the fore-body. Thus, for example, a length of 500 m and diameter of a millimeter might be more appropriate. In such a case, the system does not have appreciably more drag than the fore-body alone.

To see what strategy remains to us, consider the aerodynamic force in the $\dot{\psi}$ equation. If the angle $\psi+\beta$ can be made negative, the aero force is positive—a lift force that decreases the angle of descent. The key to making this happen is to use the tether to control the pitch angle and thus enable the system to generate appreciable lift.

With this view in mind, examine (17-16), the pitch rotational equation. Note that the term $$-\frac{\rho_a V^2}{2I_z}c_{px}AS\sin(\psi+\beta)$$

tends to make the pitch axis follow the stream direction and this will tend to oppose the effect of the tether force. It is recommended that we ensure that $r_a(rL) \gg c_{px}AS$ that the first term on the right in (17-16) dominates.

In accordance with the above recommendations and the fact that $\dot{\Omega}$ is extremely small, (17-16) become approximately:

$$\ddot{\beta} = -\frac{T_0}{I_z}r_a\sin(\theta + \beta + \theta_a) \quad (18\text{-}3)$$

Now suppose we use the knowledge of the pitch angle rate, and the sag angle $\theta$ to adjust the attachment point angle such that:

$$\theta_a = -\theta - \beta_* - \eta\dot{\beta} \quad (18\text{-}4.\text{a,b})$$

Here $\beta_*$ is the desired or targeted pitch angle that we shall specify in terms of measurable quantities below, and $\eta$ is a positive constant of order unity. Substituting into (18-3), we obtain:

$$\ddot{\beta} = -\frac{T_0}{I_z}r_a\sin(\beta - \beta_* - \eta\dot{\beta}) \quad (18\text{-}5)$$

This system has dynamics with a time scale of order $$\sqrt{\frac{I_z}{r_a(rL)\rho_a V^2}}$$

and this is generally a few tens of seconds and much faster than the evolution of the altitude or inclination angle (upon which $\beta_*$ will depend). This means that $\beta_*$ varies much more slowly in (18-5) than $(\beta+\Gamma)$ and that $\beta_*$ may be treated as a constant in (18-5). In that case, $\beta$ closely approaches the current value of $\beta_*(t)$, that is:

$$\beta(t) = \beta_*(t) + O\left(\dot{\beta}_*\sqrt{\frac{I_z}{r_a(rL)\rho_a V^2}}\right) \quad (18\text{-}6)$$

In other words, the control law (18-4) creates a stable, invariant manifold that is rapidly approached by the system such that $\beta(t) \approx \beta_*(t)$.

The above discussion means that we may approximately replace $\beta(t)$ in the translational equations of motion with $\beta_*(t)$. Hence (17-15.a,b) may be replaced by:

$$\dot{V} = -\frac{\sin\psi}{R_E + H_0}V_0^2 - \frac{T_0}{M_f}\cos(\psi-\theta) - \quad (18\text{-}7.\text{a, b})$$
$$\frac{\rho_a V^2}{2M_f}S(\cos^2(\psi+\beta_*) + A\sin^2(\psi+\beta_*))$$
$$\dot{\psi} = \frac{\cos\gamma}{R_E + H_0}(V - V_0) + \frac{T_0}{M_f V}\sin(\psi-\theta) - $$
$$\frac{\rho_a V}{2M_f}S(A-1)\sin(\psi+\beta_*)\cos(\psi+\beta_*)$$

Now it is evident that one way to prolong the entry process is to choose $\beta_*$ so as to maximize the vertical force term in (18-7.b), for given V; namely the expression $$-\frac{\rho_a V}{2M_f}S(A-1)\sin(\psi+\beta_*)\cos(\psi+\beta_*).$$

This obviously is maximum for $\beta_* = -\psi - \pi/4$, attaining the value $$+\frac{\rho_a V}{4M_f}S(A-1).$$

Thus our proposed tether attachment control law is as follows:

19. Preliminary Simulation Results for the Attachment Controller

To assess the suitability of (18-8), we compare two cases that feature entry from low Earth orbit. For both cases, (1) the tether is 500 m long and 2 mm in diameter, (2) in our fore-body model, we set A=10 so that the lift-to-drag ratio is approximately unity, (3) the system starts at orbital speed at 170 km altitude. In the uncontrolled system, $\theta_a$ is fixed at zero, while the controlled system employs (18-8).

The high altitude behavior is essentially the same in both cases because of the very low atmospheric density and the small frontal area of the tether. FIG. 93 shows altitude versus time for the first 12 hours of flight (actually for the controlled case, but the uncontrolled result is very similar. The initial conditions produce a small amplitude skipping motion, but on the whole there is a very slow decline in altitude. This continues for a long time. For example, FIG. 94 shows the altitude plot for 48 to 60 hours after the initial time; and FIG. 95 shows the same sort of behavior for 192 to 240 hours. In both cases, it takes approximately 100 days to reach the Kamian line (100 km altitude).

The significant differences between the two cases occur once they reach approximately 110 km altitude. FIG. 96 shows the last 45 minutes of altitude versus time of the uncontrolled system. Once the sensible atmosphere is reached, the pitch angle aligns with the velocity direction. The system sustains a shallow glide path and then very abruptly dives starting at about 95 km. The velocity versus time plot in FIG. 97 shows that the vehicle sustains nearly orbital velocity until it very suddenly comes to rest. On the whole, the entire entry event occupies only about a dozen minutes.

In contrast, the controlled system (see FIG. 98) develops larger amplitude skips before reaching 110 km. Well before this the controller makes the angle-of-attack converge to 45 degrees, thereby producing maximum lift. Near the Korman line, the skips decrease in amplitude and increase in frequency, as should be expected from Equation (18-7). For this period of nearly 25 minutes, the system maintains nearly horizontal flight (plus the skipping motion) centered on the Korman line. It is during this period, as FIG. 99 shows, that the sequence of skips produces nearly step-changes in velocity. Once the skip amplitude dies out, the system completes entry with relatively gentle declines in altitude and velocity. Overall, the final entry, starting at 100 km, takes roughly 20 minutes nearly twice as long as in the uncontrolled case.

The consequences for entry heating are difficult to determine precisely since they depend on the details of the entry body. However (examine Equation (17-18)) the combination $\rho_a S V^3$ at least establishes the order of magnitude of overall heating rate. Since the frontal area, S, is common to both cases, we take $\rho_a V^3$ as a crude measure of comparative heating rate.

FIG. 100 shows $\rho_a V^3$ versus time for the uncontrolled system. As expected, there is significant growth as the Korman line is approached, followed by a single sharp peak rising to $\rho_a V^3 = 7 \times 10^8$ just before the violent deceleration event. In contrast (see FIG. 101) the controlled system shows a sequence of spikes one for each down-stroke of the skips. The skip amplitudes decrease and then cease after about 15 minutes. The maximum values are approximately $8 \times 10^6$, i.e. two orders-of-magnitude below the uncontrolled case. Although the significant heating lasts longer for the controlled system, the times spent near maximum values is only three times that of the uncontrolled system. Thus the integrated heating rate (a crude measure of maximum temperature) is still well under an order-of-magnitude less for the controlled system.

Finally, we consider the g-loads on the forebody structure, i.e. the inertial acceleration minus gravity. FIGS. 102 and 103 show the g-loads for the uncontrolled and controlled system, respectively. The uncontrolled system shows a single large peak at ~5.5 gs. On the other hand the controlled system experiences a lengthy sequence of maxima, corresponding to the skips, and assuming values between 0.6 to 1.1 g, and a very brief pulse at 1.9 g.

We round out this section by considering initial entry conditions typical of entry from interplanetary space. Denoting the entry angle and speed by $\alpha_{entry}$ and $V_{entry}$, respectively, we set initial conditions for $\Omega$ and $\dot{H}$ as follows:

$$\dot{H}(0) = -V_{entry} \sin \alpha_{entry}$$

$$\Omega(0) = V_{entry} \cos \alpha_{entry} \qquad (19\text{-}1.a,b)$$

In the results shown below, we take $\alpha_{entry} = 25°$, and $V_{entry} = 12$ km/s. The initial altitude is set far beyond the sensible atmosphere, at 350 km. Note that if $\alpha_{entry} < 12.5°$, the vehicle skips and is sent on an escape trajectory.

As FIG. 104 shows, the uncontrolled system penetrates the Kármán line for a considerable distance, then abruptly alters its flight path angle at ~30 km. The entire entry process lasts only ~2.9 minutes. In contrast the controlled system, FIG. 105, takes nearly an order of magnitude longer at 28.5 minutes. The system hits the Kármán line and penetrates only to 60 km, then executes a large skip, rising to over 400 km before dropping once more. It then bounces again at ~60 km and executes two lower amplitude skips before leveling out at approximately 20 minutes. The vehicle then flies at maximum lift-to-drag along a shallow glide angle to the ground.

If we inspect the velocity time histories, not surprisingly, the uncontrolled system (see FIG. 105) a single, abrupt decrease in speed down to 2 km/s. The undulations seen in the later half of the entry process are due to uncontrolled oscillation of the angle-of-attack. The velocity of the controlled system, shown in FIG. 107, drops suddenly on penetrating 100 km, but only drops to ~5.5 km/s. There follows a lengthy plateau corresponding to the first skip, then the second skip reduces the velocity to 2 km/s. Subsequently the vehicle glides smoothly to the ground with very small final velocity. Obviously, the entry process is much more gentle and gradual than for the uncontrolled system.

The above noted patterns are consistently repeated for the heating rate estimates. The uncontrolled system (FIG. 108) shows a lone spike at $2.6 \times 10^9$, whereas the controlled system (FIG. 109) shows a very brief spike with a maximum at $0.8 \times 10^9$. Then there is a very small spike due to the second skip. Overall, the integrated heating rate (crude estimate of maximum temperature) of the uncontrolled system is only ~2.5 times that of the controlled system. This is largely due to the fact that both systems must inevitably hit the Kaman line as the first obstacle in their descent.

Finally, we compare the g-loads for the uncontrolled and controlled systems. The uncontrolled system (FIG. 110) exhibits a maximum of over 300 gs (note the log scale). Observe that the loads fall below 1 g in the final descent. This is because the angle-of-attack is oscillating close to zero; drag is minimum and the flight path is nearly vertical. In other words, the vehicle is nearly in free fall until it hits the ground at high velocity. As might be expected (FIG.

111), the controlled system experiences a maximum of ~30 gs, and it approaches 1 g because its final descent is at low acceleration.

This model developed an aerodynamic heating model, and breaking conditions for the simulation code model of the present invention. This analysis developed an aerodynamic heating model for the tether. Although inclusion of breaking conditions in the simulation code is relatively straightforward, we deferred this task. Instead, the equations of motion were consolidated and placed in forms suitable for analysis of the entry control problem. A preliminary control algorithm for moving the tether attachment point location was proposed. Simulation results show that de-orbit and heating rates are much gentler for the controlled system.

Prior to experimental testing of the present invention the inventors plan to include breaking conditions in the simulation code; examine thermal performance of the tether and investigate combined control of tether length as well as attachment point location.

While only certain features of the selected embodiments have been illustrated and described herein, many modifications and changes will occur to those skilled in the art. It is, therefore, to be understood that the appended claims are intended to cover all such modifications and changes as fall within the true spirit of the embodiments.

What is claimed is:

1. A spacecraft reaction control system operable to actively control an angle of attack of a returnable spacecraft during atmospheric re-entry, said spacecraft reaction control system comprising:
   a tether attachment point on the returnable spacecraft offset from a center of mass of said returnable spacecraft;
   a length of free tether extending from said tether attachment point at an angle defined more by an aerodynamic drag force than a gravitational force to control the angle of attack of said returnable spacecraft; and
   a control apparatus configured to actively alter said offset of the tether attachment from said center of mass of said returnable spacecraft during re-entry to achieve a desired flight path.

2. The spacecraft reaction control system of claim 1, wherein said offset further comprises a direction of offset from said center of mass; and said control apparatus determines said direction of offset from said center of mass.

3. The spacecraft reaction control system of claim 1, wherein said offset further comprises a magnitude of offset from said center of mass; and said control apparatus determines said magnitude of offset from said center of mass.

4. The spacecraft reaction control system of claim 1, further comprising a reel rotatably connected to said returnable spacecraft, wherein a wound tether is wound on said reel, wherein said wound tether and said free tether comprise a single length of tether, wherein said wound tether further comprises a wound tether length and a free tether length.

5. The spacecraft reaction control system of claim 4, wherein said reel comprises a brake connected to said reel to stop or slow rotation of said reel to control unwinding of said length of tether.

6. The spacecraft reaction control system of claim 4, further comprising a force exerted upon said free tether having a magnitude, and a motor connected to said reel to rotate said reel to unwind or wind said reel to change said free tether length and thereby affect said magnitude.

7. The spacecraft reaction control system of claim 1, wherein said control apparatus comprises a center hole through which said length of free tether passes.

8. The spacecraft reaction control system of claim 7, wherein said control apparatus further comprises a retractable arm retractably connected to said spacecraft, said arm connected to one end of a tension spring, a second end of said tension spring connected to said center hole such that when said retractable arm retracts away from said center of mass, tension in said tensions spring increases and causes said center hole to move in the direction of said tension.

9. The spacecraft reaction control system of claim 1, further comprising a backup reaction control system, wherein said backup reaction control system comprises a pressurized gas, and a translation thruster in fluid communication with said pressurized gas.

10. The spacecraft reaction control system of claim 9, wherein said spacecraft further comprises a life support system comprising a breathable atmosphere and said pressurized gas comprises a breathable gas, and wherein said pressurized gas is in fluid communication with said breathable atmosphere.

11. The spacecraft reaction control system of claim 1, wherein said spacecraft further comprises a radio communication system that is connected to said free tether so that said free tether acts as an antenna.

12. A method of controlling a returnable spacecraft during atmospheric reentry, said returnable spacecraft having a center of mass, an attachment point, and a length of free tether extending from said attachment point, said method comprising:
   generating a drag force by frictional interaction between the entire length of free tether and an atmosphere;
   actively controlling a positioning of said attachment point relative to said spacecraft's center of mass, wherein said length of free tether extends from the attachment point at an angle defined more by an aerodynamic drag force than a gravitational force to control an angle of attack of said returnable spacecraft.

13. The method of controlling a spacecraft of claim 12, wherein said attachment point is actively offset from said center of mass to induce a moment that changes said spacecraft's pitch.

14. The method of controlling a spacecraft of claim 12, wherein said attachment point is offset from said center of mass to induce a moment that changes said spacecraft's yaw.

15. The method of controlling a spacecraft of claim 12, wherein said attachment point is offset from said center of mass to induce a moment that causes said spacecraft to roll.

16. The method of controlling a spacecraft of claim 12, comprising changing said length of free tether.

17. The method of controlling a spacecraft of claim 16, wherein said length of free tether is changed to increase a force that said length of free tether exerts upon said spacecraft and increase said angle of attack.

18. The method of controlling a spacecraft of claim 16, wherein said length of free tether is changed to decrease a force that said length of free tether exerts upon said spacecraft.

19. A means for atmospheric re-entry of a spacecraft comprising:
   a control apparatus; and
   a tether comprising an attachment mechanism, a reel, a free tether length, and a wound tether length,
   wherein said reel releases said wound tether length, thereby increasing said free tether length;
   wherein said free tether length extends from said spacecraft at an attachment point offset from a center of mass of said spacecraft such that a drag force exerted upon said spacecraft by said free tether length will be offset from said center of mass; and wherein said control apparatus is configured to actively alter an offset of said attachment point from said center of mass during re-entry to achieve a desired flight path.

20. The means for atmospheric re-entry of claim 19, wherein said control apparatus actively moves said attachment point to direct said tether to adjust a pitch angle for decreasing an angle of attack of said spacecraft.

21. The means for atmospheric re-entry of claim 19, wherein said control apparatus actively moves said attachment point to direct said tether to adjust a pitch angle for increasing an angle of attack of said spacecraft.

22. The means for atmospheric re-entry of claim 19, wherein said control apparatus is configured dynamically modify an angle of attack of the spacecraft such that a lift force acting on said spacecraft is a greater magnitude than a force of gravity acting on the spacecraft.

\* \* \* \* \*